T

United States Patent
Suzuki et al.

(10) Patent No.: US 6,994,437 B2
(45) Date of Patent: Feb. 7, 2006

(54) IMAGE DISPLAY DEVICE AND ADJUSTMENT FOR ALIGNMENT

(75) Inventors: Hiroshi Suzuki, Tokyo (JP); Kohei Teramoto, Tokyo (JP); Jiro Suzuki, Tokyo (JP); Shinsuke Shikama, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 11 days.

(21) Appl. No.: 10/969,078

(22) Filed: Oct. 21, 2004

(65) Prior Publication Data

US 2005/0083491 A1    Apr. 21, 2005

Related U.S. Application Data

(62) Division of application No. 10/639,425, filed on Aug. 13, 2003, now Pat. No. 6,824,274, which is a division of application No. 09/852,031, filed on May 10, 2001, now Pat. No. 6,631,994.

(30) Foreign Application Priority Data

| May 10, 2000 | (JP) | ............................. 2000-137602 |
| Aug. 9, 2000 | (JP) | ............................. 2000-241757 |
| Sep. 8, 2000 | (JP) | ............................. 2000-273723 |
| Oct. 13, 2000 | (JP) | ............................. 2000-313652 |
| Nov. 13, 2000 | (JP) | ............................. 2000-345571 |
| Feb. 16, 2001 | (JP) | ............................. 2001-40739 |

(51) Int. Cl.
*G03B 21/22* (2006.01)
*G03B 21/28* (2006.01)

(52) U.S. Cl. ............................. 353/77; 353/74; 353/98

(58) Field of Classification Search ................. 353/77, 353/74, 98, 7, 68

See application file for complete search history.

(56) References Cited

U.S. PATENT DOCUMENTS

| 3,938,775 A | 2/1976 | Sarofeen ..................... 249/102 |
| 4,969,730 A | 11/1990 | van den Brandt ............. 353/31 |
| 5,194,884 A | 3/1993 | Parker et al. ................ 353/122 |
| 5,274,406 A | 12/1993 | Tejima et al. ................. 353/70 |
| 5,379,080 A | 1/1995 | Onozuka ...................... 353/37 |
| 5,442,484 A | 8/1995 | Shikawa ..................... 359/651 |
| 5,716,118 A | 2/1998 | Sato et al. ..................... 353/98 |

(Continued)

FOREIGN PATENT DOCUMENTS

EP    0 722 108 A1    7/1996

(Continued)

OTHER PUBLICATIONS

D.M. Burns, et al., "Micro-Electro-Mechanical Focusing Mirrors," Micro Electro Mechanical Systems, 1998. MEMS 98. Proceedings, The Eleventh Annual International Workshop, Heidelberg, Germany, Jan. 25-29, 1998, New York, NY, IEEE.

*Primary Examiner*—Judy Nguyen
*Assistant Examiner*—Magda Cruz
(74) *Attorney, Agent, or Firm*—Birch, Stewart, Kolasch & Birch, LLP

(57) ABSTRACT

An image display device includes an optical imaging arrangement for providing image information to illumination light and for transmitting the image information as an optical image signal; a projecting optical arrangement for receiving the optical image signal and for projecting the optical image signal; a display for receiving the optical image signal through the projecting optical arrangement and for displaying an image based on the image information; and a plane mirror for reflecting the optical image signal output from the projecting optical arrangement on the display.

8 Claims, 84 Drawing Sheets

U.S. PATENT DOCUMENTS

| | | | |
|---|---|---|---|
| 5,833,339 A * | 11/1998 | Sarayeddine | 353/20 |
| 5,993,003 A | 11/1999 | McLaughlin | 353/7 |
| 6,233,024 B1 | 5/2001 | Hiller et al. | 348/744 |
| 6,276,802 B1 | 8/2001 | Naito | 353/74 |
| 6,631,994 B2 | 10/2003 | Suzuki et al. | 353/77 |
| 6,804,055 B2 * | 10/2004 | Peterson et al. | 359/457 |
| 6,808,271 B1 * | 10/2004 | Kurematsu | 353/70 |

FOREIGN PATENT DOCUMENTS

| | | |
|---|---|---|
| JP | 58-50452 U | 4/1983 |
| JP | 59-10902 A | 1/1984 |
| JP | 60-107012 A | 6/1985 |
| JP | 61-23130 A | 1/1986 |
| JP | 62-53416 U | 4/1987 |
| JP | 62-203113 | 9/1987 |
| JP | 63-170633 A | 7/1988 |
| JP | 1-207716 A | 8/1989 |
| JP | 2-79037 A | 3/1990 |
| JP | 03-186831 A | 8/1991 |
| JP | 5-119283 A | 5/1993 |
| JP | 6-11767 A | 1/1994 |
| JP | 06-027535 A | 2/1994 |
| JP | 06-043546 A | 2/1994 |
| JP | 07-104182 A | 4/1995 |
| JP | 7-41519 U | 7/1995 |
| JP | 8-327809 A | 12/1996 |
| JP | 9-65246 A | 3/1997 |
| JP | 9-138349 A | 5/1997 |
| JP | 9-218379 A | 8/1997 |
| JP | 10-133109 A | 5/1998 |
| JP | 10-170824 A | 6/1998 |
| JP | 11-231215 A | 8/1999 |
| JP | 11-326755 A | 11/1999 |
| JP | 2000-002837 A | 1/2000 |
| JP | 2000-019647 A | 1/2000 |
| WO | WO 98/29773 A1 | 7/1998 |
| WO | WO 99/14716 A1 | 3/1999 |

* cited by examiner

FIG.1
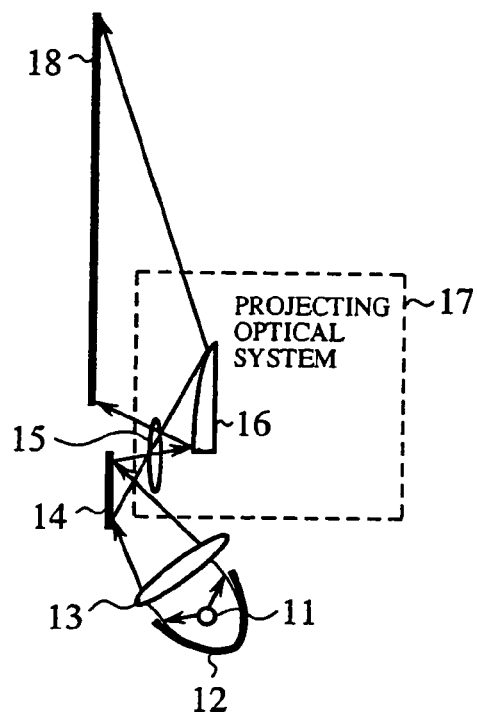
FIG.2
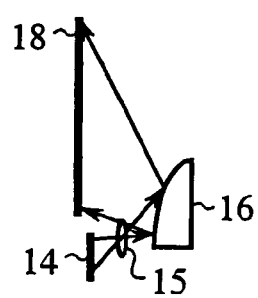
     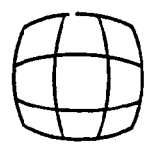     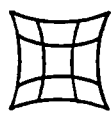     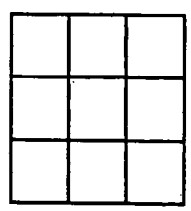
(A)            (B)            (C)            (D)

REFRACTIVE INDEX $n_1$ | REFRACTIVE INDEX $n_2$ $n_1 < n_2$

------- BLUE OPTICAL PATH
——— RED OPTICAL PATH

FIG.22

CONFIGURATION DATA

| | SURFACE NO. | RADIUS OF CURVATURE (mm) | THICKNESS (mm) | REFRACTIVE INDEX nd | ABBE'S NUMBER νd |
|---|---|---|---|---|---|
| | 1 | ∞ | 30 | | |
| stop | 2 | ∞ | 0 | | |
| | 3 | -14.66425866 | 1 | 1.673 | 32.2 |
| | 4 | 19.57365899 | 3.4 | 1.800 | 42.3 |
| a1 | 5 | -71.52517928 | 0.2 | | |
| | 6 | 46.57431333 | 5.7 | 1.734 | 51.1 |
| | 7 | -18.29405936 | 0.2 | | |
| | 8 | -40.70466802 | 2.8 | 1.689 | 31.2 |
| | 9 | 29.58192706 | 0.601907206 | | |
| | 10 | 40.63225731 | 10.4 | 1.734 | 51.1 |
| | 11 | -18.55101371 | 0.2 | | |
| | 12 | -21.25419861 | 1.2 | 1.620 | 36.3 |
| | 13 | 36.18745731 | 18 | 1.805 | 25.5 |
| | 14 | -52.79556347 | 18.44366577 | | |
| | 15 | -22.2362126 | 2.6 | 1.699 | 30.1 |
| | 16 | -373.1950411 | 0.2 | | |
| | 17 | -377.4162065 | 1.5 | 1.583 | 30.2 |
| a2 | 18 | -377.4162065 | 28 | | |
| | 19 | -36.51210431 | 4.3 | 1.493 | 58.3 |
| a3 | 20 | -27.84174798 | 200 | | |
| a4 | 21 | 99.76542177 | -185 | mirror | |
| | 22 | ∞ | 235 | mirror | |
| | 23 | ∞ | 0 | | |

ASPHERICAL SURFACE COEFFICIENT

| SURFACE NO. | 5(a1) | 18(a2) |
|---|---|---|
| k | -27.07818351 | 411.8441246 |
| A | 5.8307554E-05 | 7.9259800E-06 |
| B | 2.2448345E-07 | 1.3052778E-08 |

| SURFACE NO. | 20(a3) | 21(a4) |
|---|---|---|
| k | -0.185161669 | -4.423779483 |
| AR1 | 0 | 0.001258226 |
| AR2 | 0.003607536 | -0.000570833 |
| AR3 | -2.0171885E-05 | 1.9194137E-07 |
| AR4 | 2.9870872E-06 | -3.4523509E-09 |
| AR5 | 1.2983498E-07 | 5.7545484E-11 |
| AR6 | -6.5096954E-09 | 2.1100900E-14 |
| AR7 | 6.2670569E-11 | -2.1391081E-15 |
| AR8 | 1.9677727E-12 | 5.9659829E-18 |

FIG.28

CONFIGURATION DATA

| | SURFACE NO. | RADIUS OF CURVATURE (mm) | THICKNESS (mm) | REFRACTIVE INDEX nd | ABBE'S NUMBER νd |
|---|---|---|---|---|---|
| | 1 | ∞ | 30 | | |
| stop | 2 | -20.6576453533 | 4.7 | 1.468 | 33.8 |
| | 3 | -80.5590059694 | 0.2 | | |
| | 4 | 105.1808714030 | 9 | 1.795 | 45.4 |
| | 5 | -22.7193673760 | 0.856893940799 | | |
| | 6 | -17.3195136863 | 1.5 | 1.699 | 30.1 |
| | 7 | -36.5709492186 | 0.1 | | |
| | 8 | ∞ | 0 | | |
| | 9 | -117.4048328480 | 8.4 | 1.734 | 51.1 |
| | 10 | -18.4433151695 | 0.610560115593 | | |
| | 11 | -18.0444912892 | 2 | 1.717 | 29.5 |
| | 12 | 58.2778027126 | 0.1 | | |
| | 13 | 60.6427596822 | 13.5 | 1.755 | 52.3 |
| | 14 | -48.8581369974 | 22.9151946067 | | |
| | 15 | 134.5886723560 | 1.5 | 1.670 | 39.3 |
| | 16 | 50.1278660368 | 0.2 | | |
| | 17 | 50.1825926071 | 10.4 | 1.805 | 25.5 |
| | 18 | -127.7639461820 | 28.4346465294 | | |
| | 19 | -37.7652148481 | 2 | 1.805 | 25.5 |
| | 20 | -67.5410544326 | 32.6137406027 | | |
| | 21 | -38.6933083141 | 1.5 | 1.805 | 25.5 |
| a1 | 22 | -72.6271254361 | 200 | | |
| a2 | 23 | 97.9695439905 | -185 | | mirror |
| | 24 | ∞ | 235 | | mirror |
| | 25 | ∞ | 0 | | |

ASPHERICAL SURFACE COEFFICIENT

| SURFACE NO. | 22(a1) |
|---|---|
| k | 0 |
| A | 2.14260670628E-06 |
| B | -4.79111799587E-10 |
| C | -7.8046619422E-14 |

| SURFACE NO. | 23(a2) |
|---|---|
| k | -5.24681962734 |
| AR1 | 0.00196450411864 |
| AR2 | -0.000239993326253 |
| AR3 | 3.63342308137E-07 |
| AR4 | -9.24814356675E-09 |
| AR5 | 7.39934860564E-12 |
| AR6 | 2.02289771668E-13 |
| AR7 | -3.98993312603E-16 |
| AR8 | -6.84585972298E-19 |

FIG.30

CONFIGURATION DATA

|  | SURFACE NO. | RADIUS OF CURVATURE (mm) | THICKNESS (mm) | REFRACTIVE INDEX nd | ABBE'S NUMBER νd |
|---|---|---|---|---|---|
|  | 1 | ∞ | 30 |  |  |
| stop | 2 | ∞ | 0 |  |  |
|  | 3 | -12.2904711278 | 4.4 | 1.805 | 25.5 |
|  | 4 | -16.4195184751 | 0.2 |  |  |
|  | 5 | 104.5354229330 | 5.7 | 1.788 | 47.5 |
|  | 6 | -19.6319108577 | 1.17708106134 |  |  |
|  | 7 | -17.3104022925 | 1 | 1.805 | 25.5 |
|  | 8 | -99.5878191538 | 3.78999966183 |  |  |
|  | 9 | -64.4356830029 | 1.8 | 1.689 | 31.2 |
|  | 10 | 405.8043036740 | 0.1 |  |  |
|  | 11 | 205.5484851810 | 3.8 | 1.773 | 49.6 |
|  | 12 | -37.9436126442 | 16.3275458444 |  |  |
|  | 13 | 351.0732445020 | 5.2 | 1.805 | 39.6 |
|  | 14 | -66.7950420770 | 34.6140975436 |  |  |
|  | 15 | -25.3154161226 | 1.3 | 1.581 | 40.9 |
|  | 16 | -49.5460449762 | 28 |  |  |
|  | 17 | -30.6367731626 | 1.3 | 1.487 | 70.4 |
| a1 | 18 | -41.3463744375 | 200 |  |  |
| a2 | 19 | 99.7565078437 | -185 |  | mirror |
|  | 20 | ∞ | 235 |  | mirror |
|  | 21 | ∞ | 0 |  |  |

ASPHERICAL SURFACE COEFFICIENT

| SURFACE NO. | 18(a1) | 19(a2) |
|---|---|---|
| k | 0.26122774128 | -4.84979881319 |
| AR1 | 5.08543725099E-04 | 0.00113628431 |
| AR2 | -2.31479750093E-04 | -3.98908468387E-04 |
| AR3 | -1.06950444718E-05 | 1.91130104677E-07 |
| AR4 | 3.86431430675E-06 | -5.95426848631E-09 |
| AR5 | -4.74490920644E-08 | 4.64306112540E-11 |
| AR6 | -9.03166761795E-10 | 6.54614682822E-14 |
| AR7 | 3.49012367035E-11 | -1.74594047087E-15 |
| AR8 | 5.98706752604E-14 | 4.674735107000E-18 |

FIG.32

CONFIGURATION DATA

|  | SURFACE NO. | RADIUS OF CURVATURE (mm) | THICKNESS (mm) | REFRACTIVE INDEX nd | ABBE'S NUMBER νd |
|---|---|---|---|---|---|
|  | 1 | ∞ | 30 |  |  |
| stop | 2 | ∞ | 0 |  |  |
|  | 3 | -14.8674137388 | 1 | 1.673 | 32.2 |
|  | 4 | 18.5559337996 | 3.4 | 1.800 | 42.3 |
| a1 | 5 | -74.0536848715 | 0.2 |  |  |
|  | 6 | 43.6696369615 | 5.7 | 1.734 | 51.1 |
|  | 7 | -18.5192833307 | 0.2 |  |  |
|  | 8 | -40.4744736638 | 2.8 | 1.689 | 31.2 |
|  | 9 | 28.1242054109 | 0.721410946123 |  |  |
|  | 10 | 39.1984702090 | 10.4 | 1.734 | 51.1 |
|  | 11 | -18.6885145614 | 0.2 |  |  |
|  | 12 | -21.0924464244 | 1.2 | 1.620 | 36.3 |
|  | 13 | 34.4444350214 | 18 | 1.805 | 25.5 |
|  | 14 | -51.9422716099 | 18.3565287687 |  |  |
|  | 15 | -22.3972908894 | 4.1 | 1.699 | 30.1 |
| a2 | 16 | -479.2220790420 | 28 |  |  |
|  | 17 | -36.7674341411 | 4.3 | 1.487 | 70.4 |
| a3 | 18 | -27.7830763359 | 200 |  |  |
| a4 | 19 | 99.7654217668 | -185 |  | mirror |
|  | 20 | ∞ | 235 |  | mirror |
|  | 21 | ∞ | 0 |  |  |

ASPHERICAL SURFACE COEFFICIENT

| SURFACE NO. | 5(a1) | 16(a2) |
|---|---|---|
| k | -30.6753040764 | 689.5547308060 |
| A | 5.71039286720E-05 | 7.13647300379E-06 |
| B | 2.25311896143E-07 | 1.19485813073E-08 |

| SURFACE NO. | 18(a3) | 19(a4) |
|---|---|---|
| k | -0.1793477113 | -4.4237794828 |
| AR1 | 0 | 0.0012582257858 |
| AR2 | 0.00365144111288 | -0.000570832798628 |
| AR3 | -2.08418127864E-05 | 1.91941370309E-07 |
| AR4 | 3.06790134130E-06 | -3.45235087113E-09 |
| AR5 | 1.28809224318E-07 | 5.75454836583E-11 |
| AR6 | -6.46419170810E-09 | 2.11008995385E-14 |
| AR7 | 5.60800488063E-11 | -2.13910807996E-15 |
| AR8 | 2.10739642573E-12 | 5.96598292076E-18 |

FIG.34

CONFIGURATION DATA

| | SURFACE NO. | RADIUS OF CURVATURE (mm) | THICKNESS (mm) | REFRACTIVE INDEX nd | ABBE'S NUMBER νd |
|---|---|---|---|---|---|
| | 1 | ∞ | 30 | | |
| | 2 | ∞ | 0 | | |
| | 3 | -15.44465 | 1 | 1.673 | 32.2 |
| | 4 | 22.29631 | 3.4 | 1.806 | 40.7 |
| a1 | 5 | -213.55978 | 0.2 | | |
| | 6 | 39.68662 | 5.7 | 1.697 | 55.5 |
| stop | 7 | -21.23434 | 0.2 | | |
| | 8 | -76.49347 | 2.8 | 1.689 | 31.2 |
| | 9 | 24.81811 | 0.28796 | | |
| | 10 | 28.11617 | 10.0 | 1.734 | 51.1 |
| | 11 | -19.46732 | 0.5 | | |
| | 12 | -21.07916 | 2.0 | 1.620 | 36.3 |
| | 13 | 41.20070 | 17.2 | 1.805 | 25.5 |
| | 14 | -47.74581 | 20.2 | | |
| | 15 | -19.64666 | 1.8 | 1.699 | 30.1 |
| | 16 | -285.50057 | 1.2 | | |
| | 17 | -296.46506 | 2.3 | 1.583 | 30.2 |
| a2 | 18 | -296.46506 | 22 | | |
| | 19 | -41.83187 | 6.5 | 1.493 | 58.3 |
| a3 | 20 | -28.78769 | 222.6 | | |
| a4 | 21 | 101.38793 | -185 | | mirror |
| | 22 | ∞ | 235 | | mirror |
| | 23 | ∞ | 0 | | |

ASPHERICAL SURFACE COEFFICIENT

| SURFACE NO. | 5(a1) | 18(a2) |
|---|---|---|
| k | 94.803794 | 231.121259 |
| A | 5.68235E-05 | 7.22298E-06 |
| B | 9.96524E-08 | 1.21095E-08 |

| SURFACE NO. | 20(a3) | 21(a4) |
|---|---|---|
| k | -0.034091 | -4.2611 |
| AR1 | 0 | 0.0017037 |
| AR2 | 2.3760E-03 | -5.4703E-04 |
| AR3 | -1.3655E-05 | 2.2681E-07 |
| AR4 | 2.0976E-06 | -3.7501E-09 |
| AR5 | 1.6646E-07 | 5.5657E-11 |
| AR6 | -7.5921E-09 | 2.2956E-14 |
| AR7 | 6.4636E-11 | -2.0653E-15 |
| AR8 | 2.7930E-12 | 5.8043E-18 |

FIG.36

CONFIGURATION DATA

|  | SURFACE NO. | RADIUS OF CURVATURE (mm) | THICKNESS (mm) | REFRACTIVE INDEX nd | ABBE'S NUMBER νd |
|---|---|---|---|---|---|
|  | 1 | ∞ | 30 |  |  |
|  | 2 | ∞ | 0 |  |  |
|  | 3 | -17.34243 | 1 | 1.673 | 32.2 |
|  | 4 | 18.31171 | 3.4 | 1.806 | 40.7 |
| a1 | 5 | -431.65942 | 0.2 |  |  |
|  | 6 | 29.08428 | 5.7 | 1.697 | 55.5 |
| stop | 7 | -22.39460 | 0.2 |  |  |
|  | 8 | -70.37449 | 2.8 | 1.689 | 31.2 |
|  | 9 | 20.78432 | 0.422916 |  |  |
|  | 10 | 24.46057 | 10 | 1.734 | 51.1 |
|  | 11 | -25.60922 | 0.5 |  |  |
|  | 12 | -27.87924 | 2.0 | 1.620 | 36.3 |
|  | 13 | 33.45787 | 17.2 | 1.805 | 25.5 |
|  | 14 | -48.80317 | 20.2 |  |  |
|  | 15 | -16.72859 | 1.8 | 1.699 | 30.1 |
|  | 16 | -472.97398 | 1.2 |  |  |
|  | 17 | -432.97164 | 2.3 | 1.583 | 30.2 |
| a2 | 18 | -432.97164 | 18.59086 |  |  |
|  | 19 | -47.05214 | 12 | 1.487 | 70.4 |
|  | 20 | -31.45896 | 0.2 |  |  |
|  | 21 | -34.76999 | 2 | 1.493 | 58.3 |
| a3 | 22 | -36.76734 | 205.6 |  |  |
| a4 | 23 | 100.46532 | -185 |  | mirror |
|  | 24 | ∞ | 235 |  | mirror |
|  | 25 | ∞ | 0 |  |  |

ASPHERICAL SURFACE COEFFICIENT

| SURFACE NO. | 5(a1) | 18(a2) |
|---|---|---|
| k | 1123.385176 | 453.751298 |
| A | 5.72413E-05 | 1.02654E-05 |
| B | 1.15746E-07 | -1.71142E-09 |

| SURFACE NO. | 22(a3) |
|---|---|
| k | 0.306525 |
| A | 8.66086E-07 |
| B | 1.02860E-09 |
| C | -1.51387E-12 |
| D | 1.15559E-15 |

| SURFACE NO. | 23(a4) |
|---|---|
| k | -4.3207 |
| AR1 | 2.0932E-03 |
| AR2 | -5.3836E-04 |
| AR3 | 3.0012E-07 |
| AR4 | -3.7476E-09 |
| AR5 | 5.3519E-11 |
| AR6 | 9.5182E-15 |
| AR7 | -2.0763E-15 |
| AR8 | 6.2448E-18 |

FIG.38

CONFIGURATION DATA

|  | SURFACE NO. | RADIUS OF CURVATURE (mm) | THICKNESS (mm) | REFRACTIVE INDEX nd | ABBE'S NUMBER νd |
|---|---|---|---|---|---|
|  | 1 | ∞ | 30 |  |  |
| stop | 2 | -13.4261664433 | 4.4 | 1.805 | 25.5 |
|  | 3 | -18.5697706537 | 0.1 |  |  |
|  | 4 | ∞ | 0 |  |  |
|  | 5 | 96.5265031257 | 5.7 | 1.788 | 47.5 |
|  | 6 | -17.4308819114 | 0.397498402225 |  |  |
|  | 7 | -16.4228675060 | 1 | 1.805 | 25.5 |
|  | 8 | -60.2043783294 | 1.342174017 |  |  |
|  | 9 | -73.1869001667 | 1.8 | 1.689 | 31.2 |
|  | 10 | 173.0147244620 | 0.780042494674 |  |  |
|  | 11 | -129.3791808580 | 2.8 | 1.773 | 49.6 |
|  | 12 | -33.6477898040 | 15.8750139763 |  |  |
|  | 13 | 196.0051080580 | 5.2 | 1.805 | 39.6 |
|  | 14 | -74.0063177141 | 52.0143705416 |  |  |
|  | 15 | -28.5012732493 | 1.3 | 1.581 | 40.9 |
|  | 16 | -55.6266733382 | 28 |  |  |
|  | 17 | -30.9418208415 | 1.3 | 1.487 | 70.4 |
| a1 | 18 | -45.9668803671 | 128 |  |  |
| a2 | 19 | 85.3955888127 | -190 |  | mirror |
|  | 20 | ∞ | 235 |  | mirror |
|  | 21 | ∞ | 0 |  |  |

ASPHERICAL SURFACE COEFFICIENT

| SURFACE NO. | 18(a1) | 19(a2) |
|---|---|---|
| k | 0.192778928749 | -5.60777761791170 |
| AR1 | 1.774508723E-03 | -0.00114723527653 |
| AR2 | -8.66337658673E-04 | -4.95421889495E-04 |
| AR3 | -4.78199895283E-07 | -9.97000490749E-08 |
| AR4 | 4.28880134809E-06 | -6.48715736783E-09 |
| AR5 | -3.13809231047E-08 | 4.81877304832E-11 |
| AR6 | -8.86192485666E-10 | 8.84967561950E-14 |
| AR7 | 2.69189766537E-11 | -1.65622637923E-15 |
| AR8 | -8.33108856115E-14 | 4.18083936646E-18 |

FIG.42A
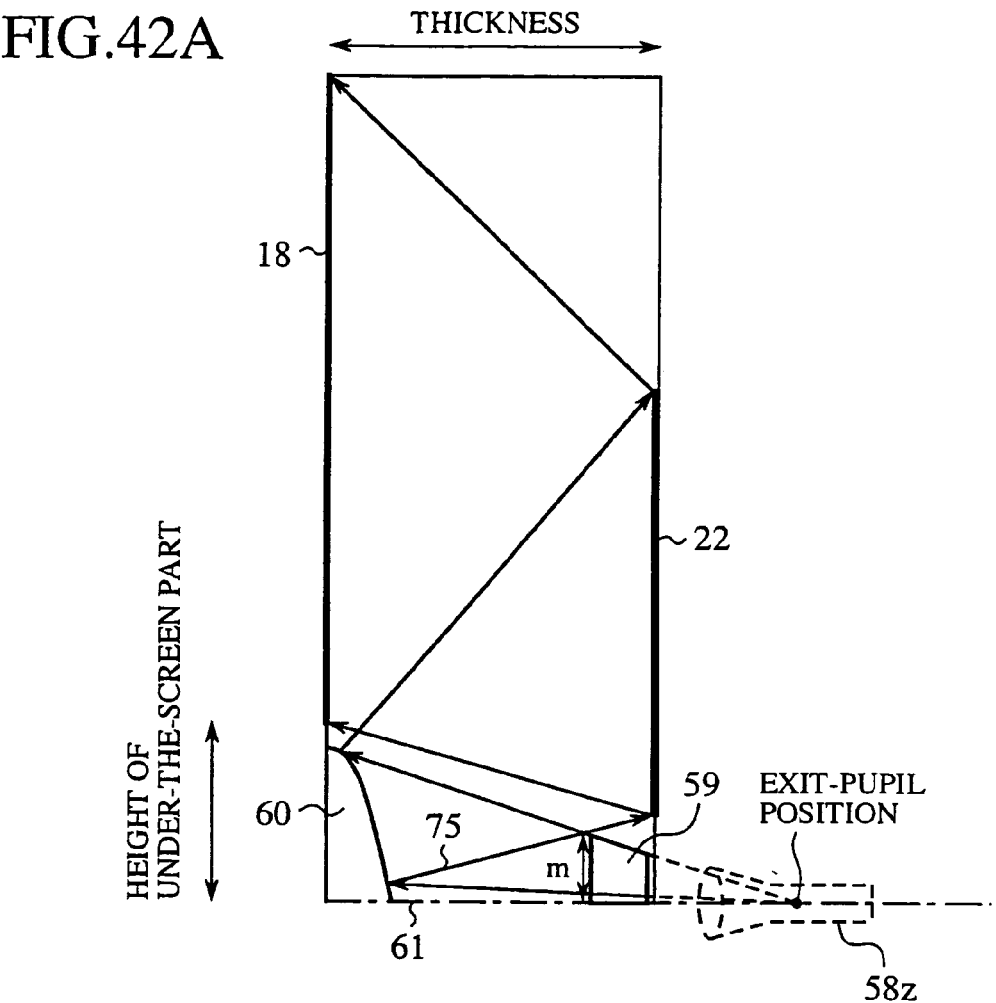
FIG.42B
FIG.42C
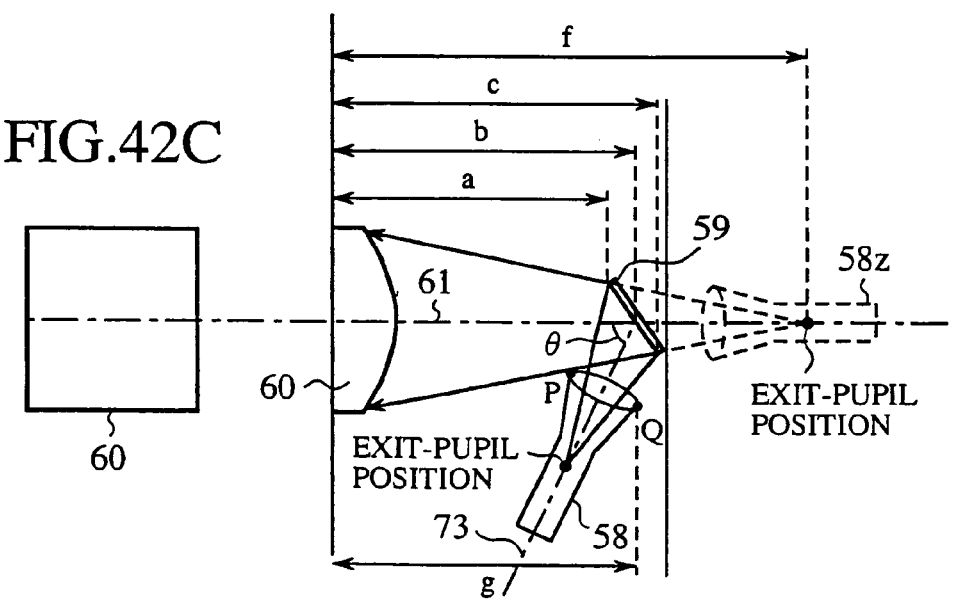

FIG.44A
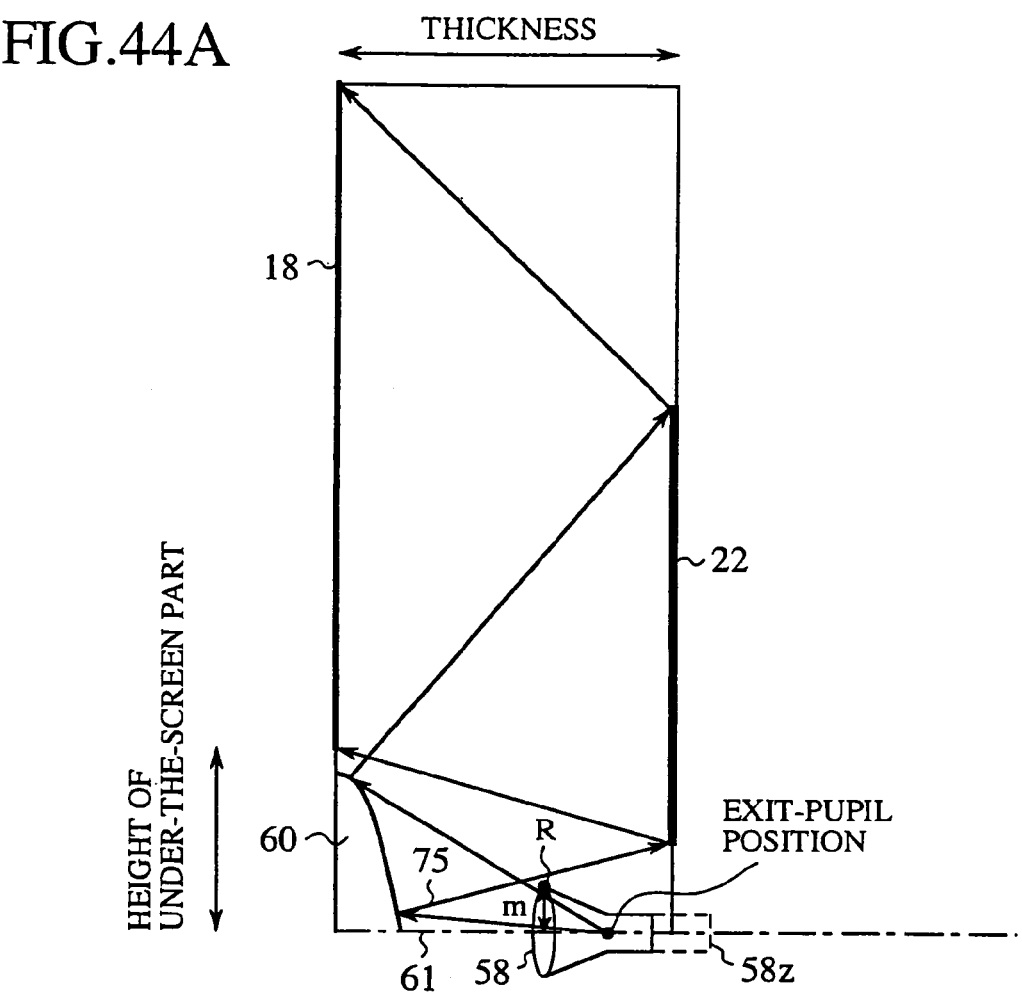
FIG.44B
FIG.44C
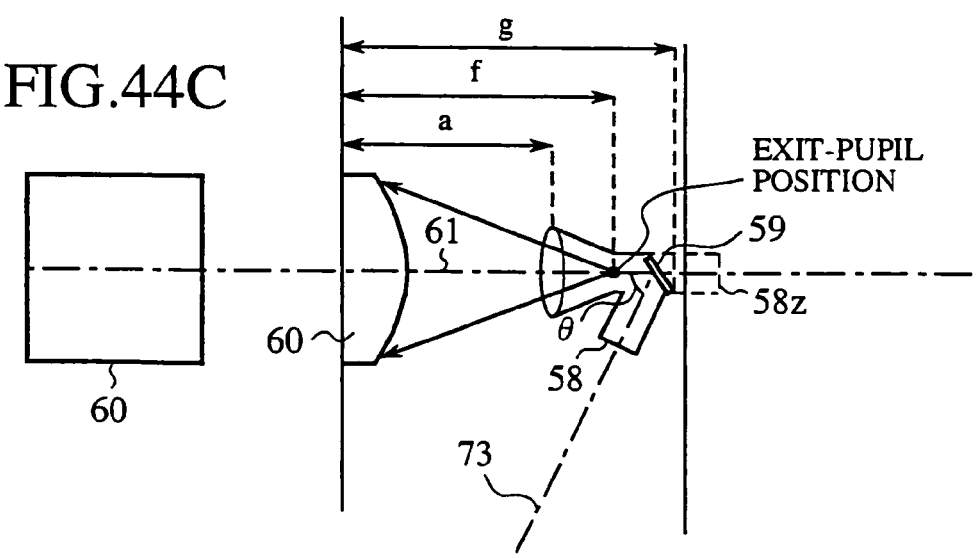

FIG.46

| | SURFACE NO. | RADIUS OF CURVATURE (mm) | THICKNESS (mm) | REFRACTIVE INDEX nd | ABBE'S NUMBER νd |
|---|---|---|---|---|---|
| | 1 | ∞ | 30 | | |
| stop | 2 | ∞ | 0.759413002 | | |
| | 3 | -18.08246509 | 1.293319809 | 1.645 | 34.2 |
| | 4 | 14.76967369 | 3.046801019 | 1.812 | 46.5 |
| a1 | 5 | -89.85177909 | 0.1 | | |
| | 6 | 38.06047971 | 6.316794446 | 1.652 | 57.8 |
| | 7 | -22.10508829 | 0.1 | | |
| | 8 | -369.4581445 | 0.75 | 1.669 | 35.9 |
| | 9 | 30.52687812 | 3.514448063 | | |
| | 10 | 178.9300355 | 5.999639512 | 1.755 | 51.6 |
| | 11 | -18.24854958 | 0.1 | | |
| | 12 | -20.32053065 | 0.75 | 1.609 | 37.1 |
| | 13 | 18.88427392 | 7.742297755 | 1.598 | 61.5 |
| | 14 | 118.7889006 | 6.210410756 | | |
| | 15 | 75.82426822 | 11.42955737 | 1.805 | 25.4 |
| | 16 | -45.48096773 | 23.85514754 | | |
| | 17 | -23.81858954 | 0.75 | 1.605 | 37.6 |
| | 18 | -78.5219672 | 0.948010192 | | |
| | 19 | -51.73173658 | 0.75 | 1.578 | 41.3 |
| a2 | 20 | 234.0322249 | 1.220004284 | | |
| | 21 | -80.15802174 | 8.419857503 | 1.608 | 60.9 |
| | 22 | -20.55147589 | 0.75 | 1.808 | 30.7 |
| a3 | 23 | -48.10173307 | 2.848868085 | | |
| | 24 | -3046.703797 | 1.735926726 | 1.722 | 28.6 |
| a4 | 25 | -2.400127241 | 208.6471271 | | |
| a5 | 26 | 98.10117098 | -185 | | mirror |
| | 27 | ∞ | 235 | | mirror |
| | 28 | ∞ | 0 | | |

ASPHERICAL SURFACE COEFFICIENT

| SURFACE NO. | 5(a1) | 20(a2) |
|---|---|---|
| k | -4.32940673132E+17 | -1.21836467670E+03 |
| A | 6.70013658492E-05 | -5.88743894511E-06 |
| B | 1.37864501703E-07 | -1.73552289497E-08 |
| C | -7.06479501573E-10 | 1.18834320118E-11 |
| D | 5.53966960363E-12 | -6.80318146301E-14 |

| SURFACE NO. | 23(a3) | 25(a4) |
|---|---|---|
| k | -4.724966832 | -1.50277006191E+15 |
| A | 7.74200201398E-06 | -4.02340217867E-06 |
| B | 1.45468946297E-10 | 1.93027721059E-09 |
| C | 6.05222618687E-12 | 1.94579724047E-12 |
| D | 2.84368236883E-15 | -5.14946061841E-15 |

| SURFACE NO. | 26(a5) |
|---|---|
| k | -4.196831481 |
| AR1 | 0.002610563 |
| AR2 | -0.000642464 |
| AR3 | -4.3515321786E-07 |
| AR4 | -3.6279999567E-09 |
| AR5 | 1.0315413556E-10 |
| AR6 | -1.0512922326E-13 |
| AR7 | -2.4533992418E-15 |
| AR8 | 5.0201588256E-18 |
| AR9 | -7.7746688347E-21 |
| AR10 | 1.8233746123E-23 |
| AR11 | 4.0004474833E-25 |
| AR12 | 1.9572075845E-27 |
| AR13 | -1.0853722256E-29 |

FIG.52

| | SURFACE NO. | RADIUS OF CURVATURE (mm) | THICKNESS (mm) | REFRACTIVE INDEX nd | ABBE'S NUMBER νd |
|---|---|---|---|---|---|
| | 1 | ∞ | 30 | | |
| stop | 2 | ∞ | 0 | | |
| | 3 | -36.20569316 | 2.450194072 | 1.755200 | 27.5 |
| | 4 | 12.28575345 | 2.84681536 | 1.743300 | 49.3 |
| a1 | 5 | -51.08200239 | 0.1 | | |
| | 6 | 60.74463277 | 4.440052074 | 1.729160 | 54.7 |
| | 7 | -11.85997421 | 0.75 | 1.805181 | 25.5 |
| | 8 | -87.60955983 | 18.16014798 | | |
| | 9 | -100.7895973 | 7.55 | 1.805181 | 25.5 |
| | 10 | -31.95229299 | 0.1 | | |
| | 11 | 55.14907044 | 9.008423098 | 1.805181 | 25.5 |
| | 12 | -151.9493125 | 5.05 | | |
| | 13 | 1123.09334 | 20 | 1.696802 | 55.5 |
| | 14 | -24.68341928 | 6.516931913 | 1.805181 | 25.5 |
| | 15 | -226.0041685 | 1.971694287 | | |
| | 16 | -47.77345182 | 1.3 | 1.806100 | 33.3 |
| | 17 | 19.4398449 | 6.997754926 | 1.622994 | 58.1 |
| | 18 | 122.6856621 | 9.290681858 | | |
| | 19 | -18.03371133 | 1 | 1.805181 | 25.5 |
| | 20 | -61.36251152 | 0.2 | | |
| | 21 | -213.3989174 | 12.93782856 | 1.496997 | 81.6 |
| | 22 | -27.11650652 | 0.3 | 1.525 | 49.0 |
| a2 | 23 | -27.1165053 | 220 | | |
| a3 | 24 | 97.9514514 | -180 | | mirror |
| | 25 | ∞ | 230 | | mirror |
| | 26 | ∞ | 0 | | |

ASPHERICAL SURFACE COEFFICIENT

| SURFACE NO. | 5(a1) | 23(a2) |
|---|---|---|
| k | -4.32940673132E+17 | -6.44192632533E-02 |
| A | 2.06464810175E-05 | 2.25891515654E-06 |
| B | 4.22130612543E-08 | 1.27763942489E-09 |
| C | -4.28109161934E-10 | -1.48949338494E-12 |
| D | 3.18505494008E-12 | 4.41143555338E-15 |

| SURFACE NO. | 24(a3) |
|---|---|
| k | -5.890257058 |
| A | -1.68371401519E-09 |
| B | -3.15175891126E-13 |
| C | 1.85045591079E-17 |
| D | -4.44896288674E-22 |
| E | 4.06924422352E-27 |

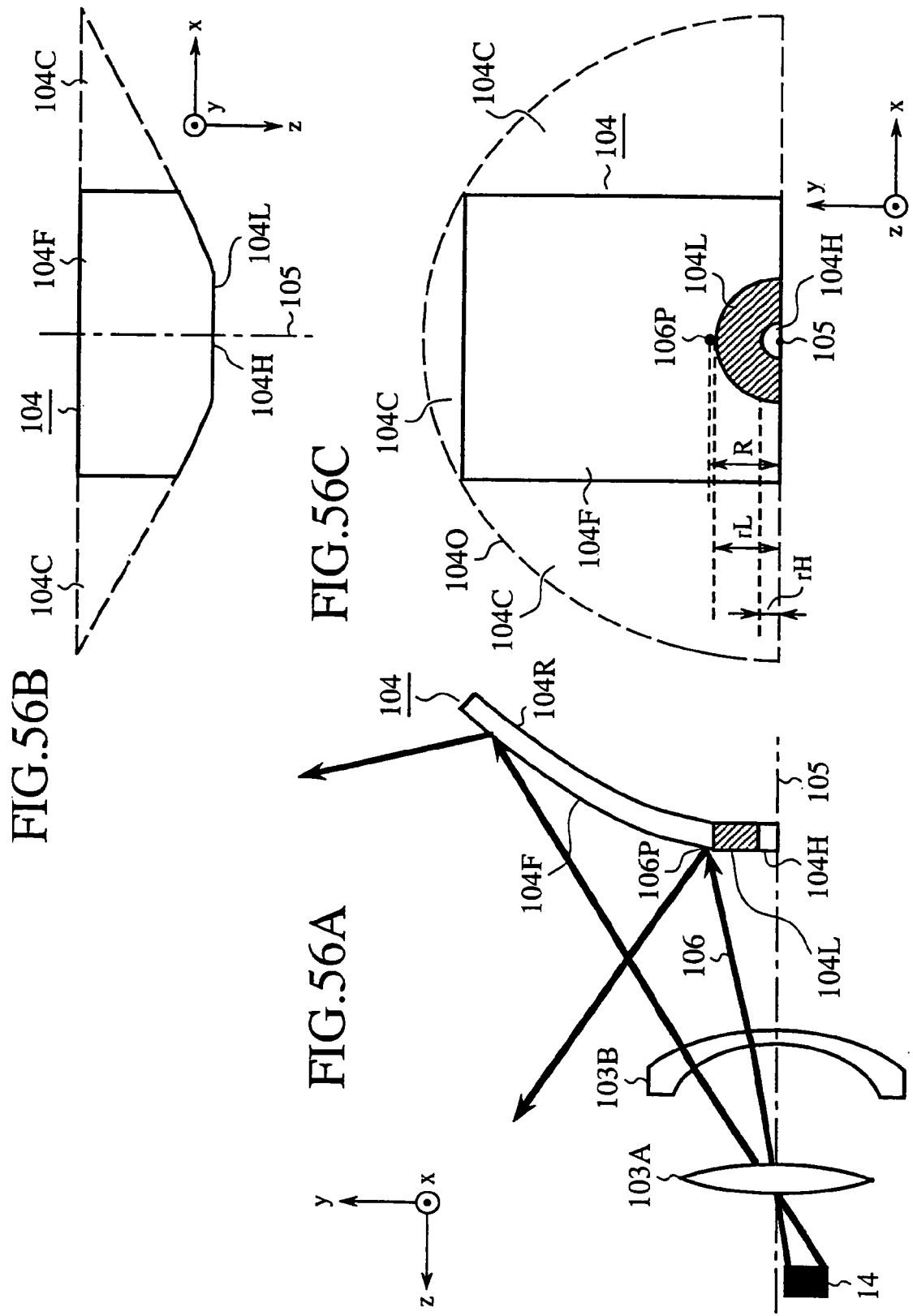

FIG.61

| | SURFACE NO. | RADIUS OF CURVATURE (mm) | THICKNESS (mm) | REFRACTIVE INDEX nd | ABBE'S NUMBER νd |
|---|---|---|---|---|---|
| | 1 | ∞ | 16.968 | | |
| | 2 | ∞ | 4.5 | 1.487488 | 70.4 |
| | 3 | ∞ | 10 | | |
| stop | 4 | ∞ | 0 | | |
| | 5 | -32.67553228 | 2.2 | 1.755200 | 27.5 |
| | 6 | 12.58063824 | 3 | 1.743300 | 49.3 |
| a1 | 7 | -52.90163133 | 0.2 | | |
| | 8 | 61.0404767 | 4.4 | 1.729160 | 54.7 |
| | 9 | -11.15923642 | 0.75 | 1.805181 | 25.5 |
| | 10 | -76.60896233 | 15.79661203 | | |
| | 11 | -124.8193679 | 7 | 1.805181 | 25.5 |
| | 12 | -38.93002102 | 0.2 | | |
| | 13 | -443.3986638 | 7 | 1.805181 | 25.5 |
| | 14 | -52.34621034 | 0.2 | | |
| | 15 | 79.93164049 | 7 | 1.805181 | 25.5 |
| | 16 | -309.0156537 | 5.05 | | |
| | 17 | -154.4333819 | 20 | 1.696802 | 55.5 |
| | 18 | -23.63819092 | 5.65 | 1.805181 | 25.5 |
| | 19 | -72.50920655 | 0.1 | | |
| | 20 | -135.8874032 | 1.3 | 1.806100 | 33.3 |
| | 21 | 19.12119784 | 6.033332559 | 1.622994 | 58.1 |
| | 22 | 47.30795139 | 10.38100593 | | |
| | 23 | -17.33118223 | 1 | 1.805181 | 25.5 |
| | 24 | -107.7455893 | 0.2 | | |
| | 25 | 6275.660982 | 13.85243075 | 1.496997 | 81.6 |
| | 26 | -28.5622612 | 0.3 | 1.517900 | 52.3 |
| a2 | 27 | -28.56225984 | 220 | | |
| a3 | 28 | 100.7024021 | -180 | | mirror |
| | 29 | ∞ | 230 | | mirror |
| | 30 | ∞ | 0 | | |

| ASPHERICAL SURFACE COEFFICIENT | SURFACE NO. | 7(a1) | 27(a2) |
|---|---|---|---|
| | k | -4.32940673132E+17 | -2.28341058574E-01 |
| | A | 2.12269026040E-05 | 6.27190024566E-07 |
| | B | 3.29700420778E-08 | 1.37772750580E-10 |
| | C | -8.29121655424E-10 | -2.97585526938E-12 |
| | D | 8.20349889370E-12 | 4.49026971395E-15 |

| SURFACE NO. | 28(a3) |
|---|---|
| k | -5.53539236314 |
| A | -1.01852653476E-08 |
| B | 3.39532791265E-13 |
| C | -7.71671397273E-18 |
| D | 8.40279684117E-23 |

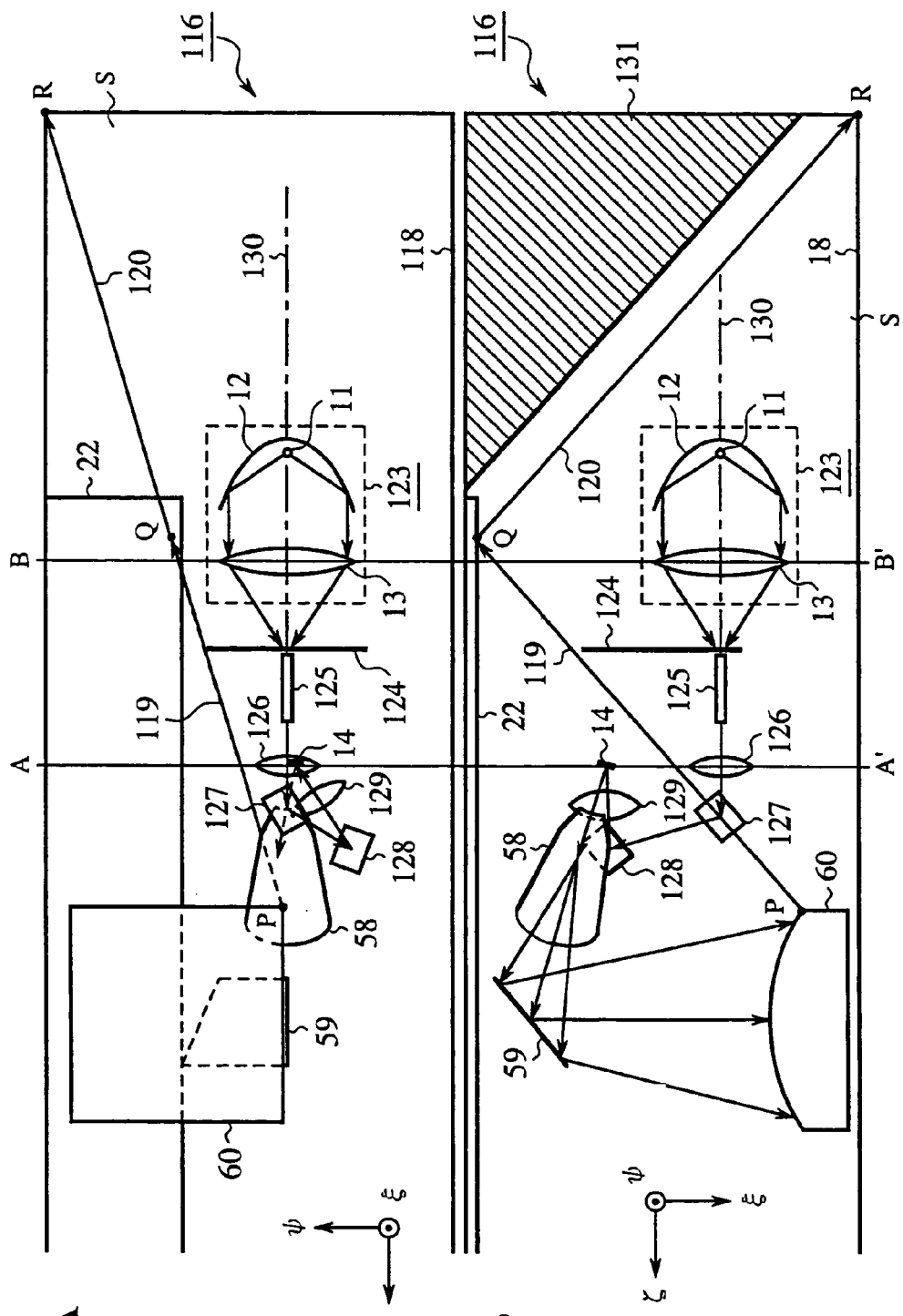

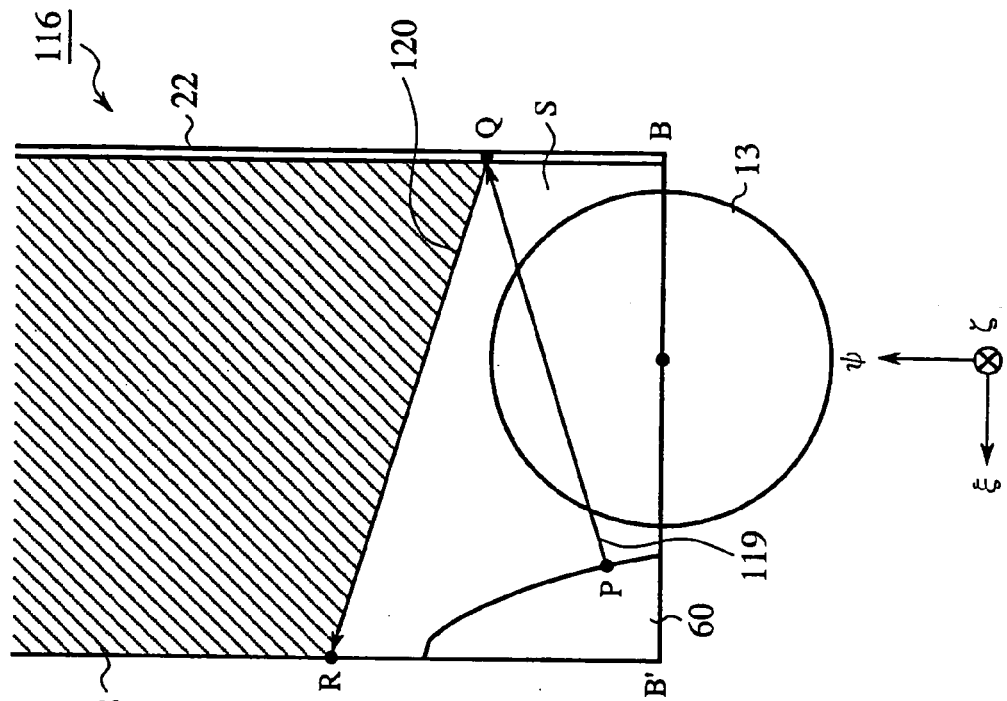
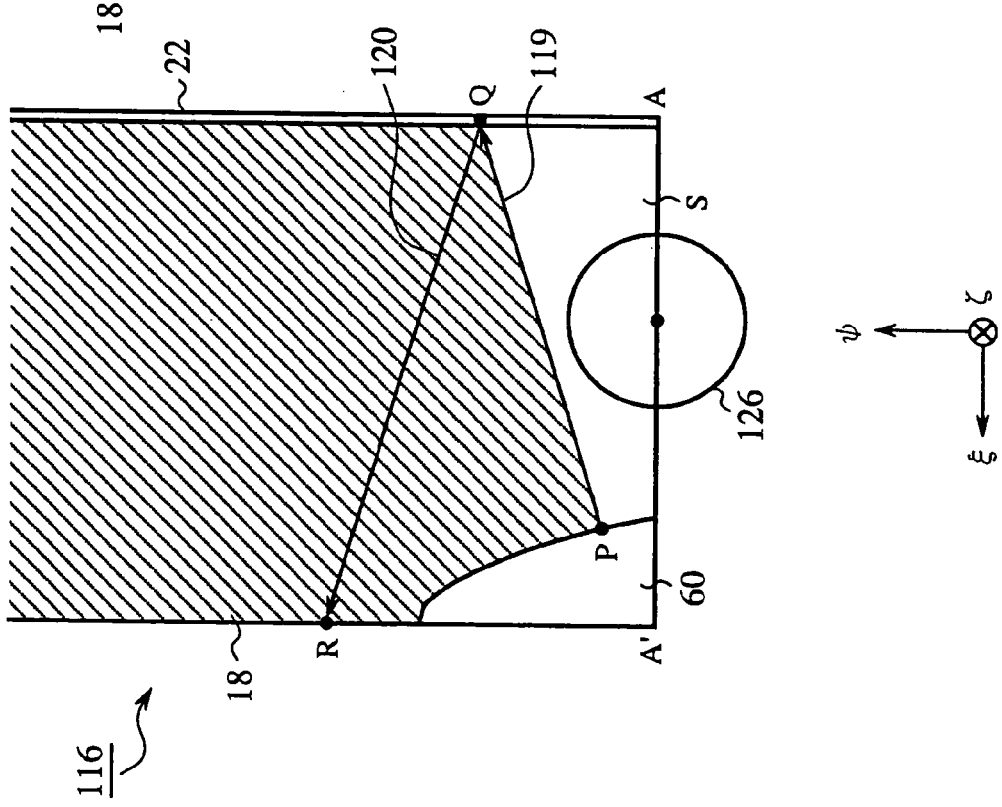

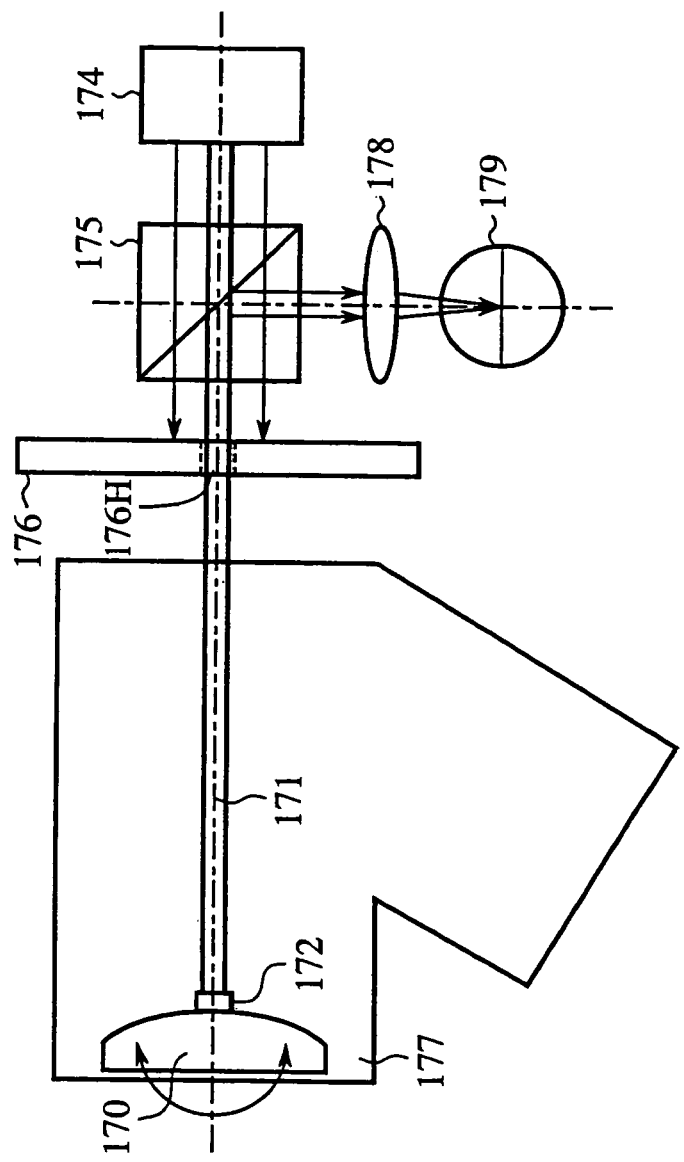
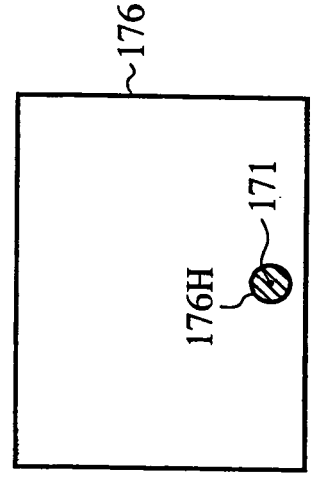
FIG.84A
FIG.84B

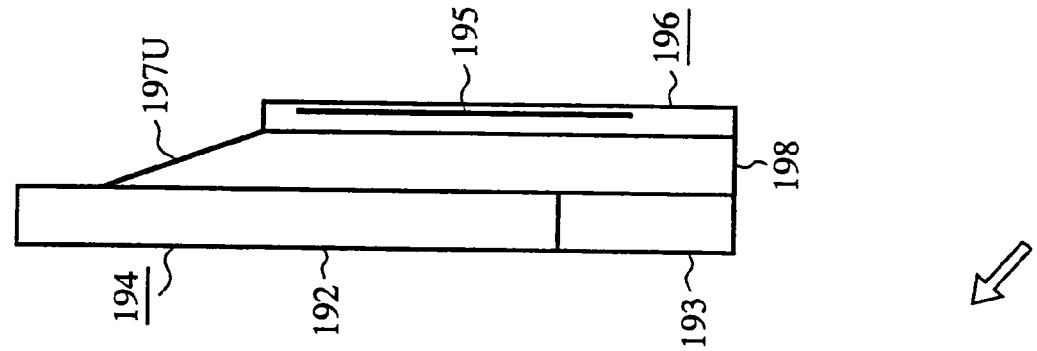
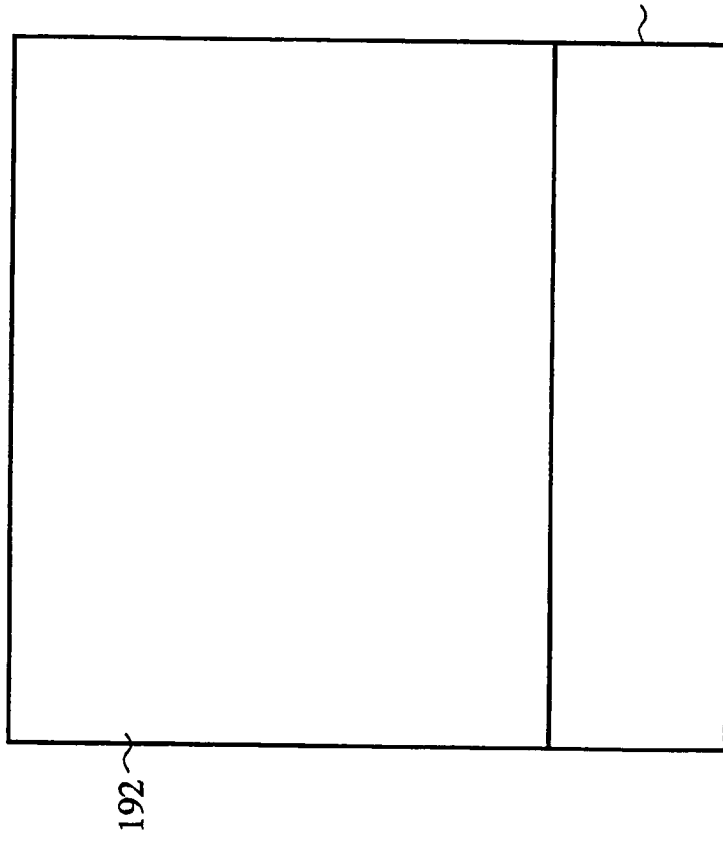
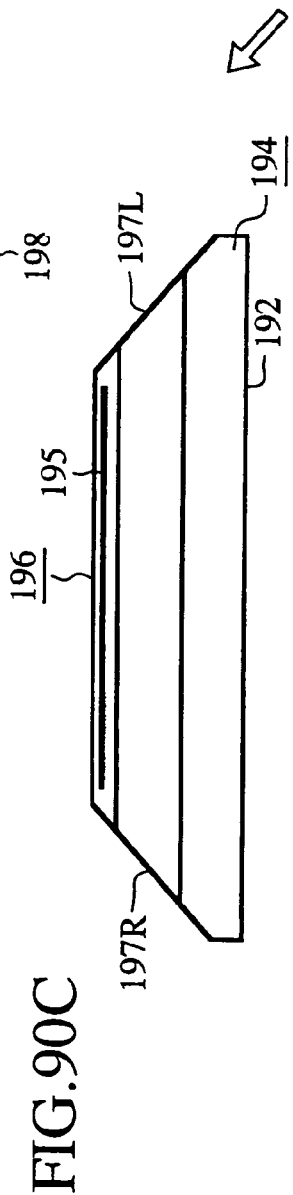

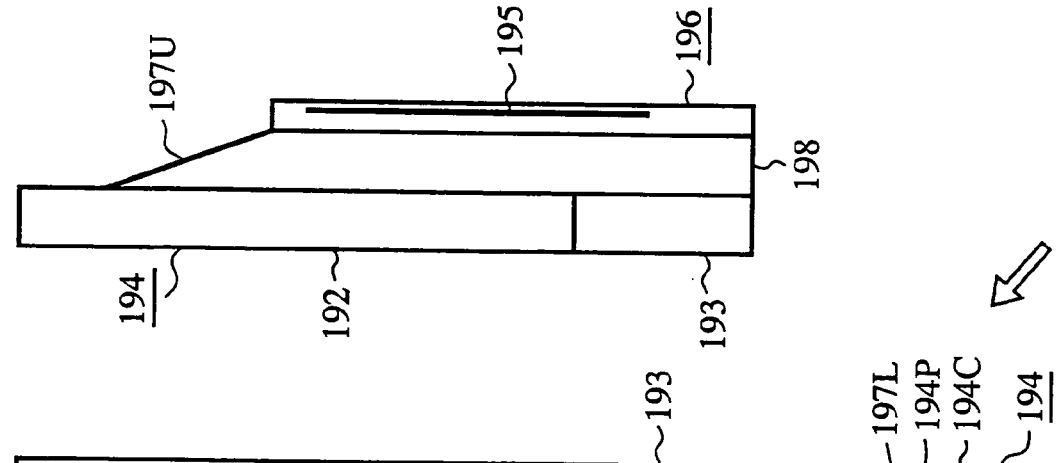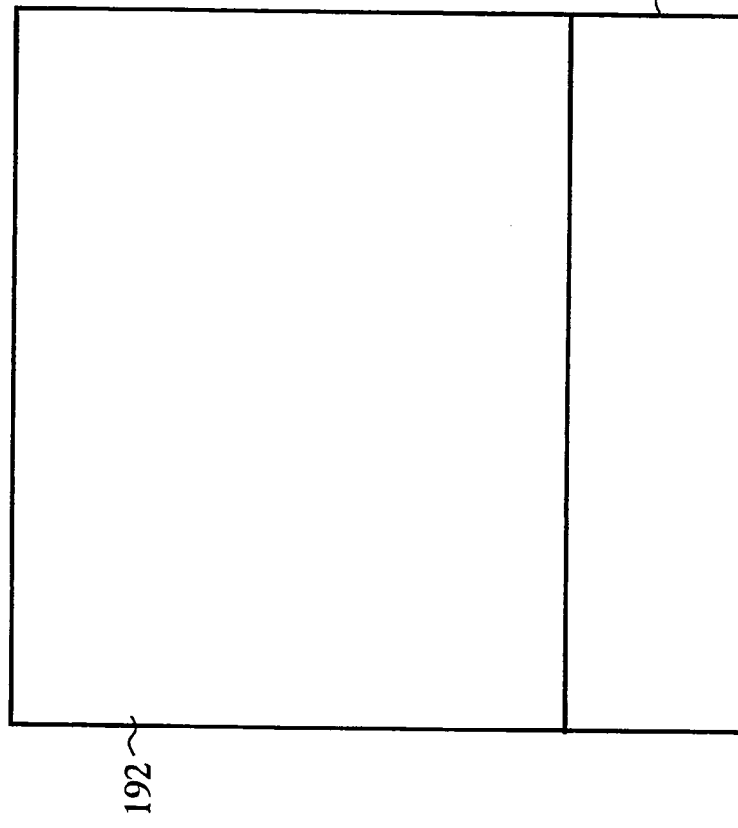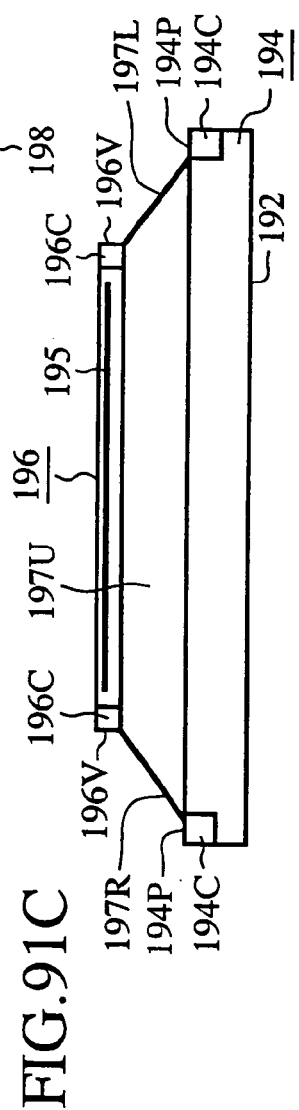

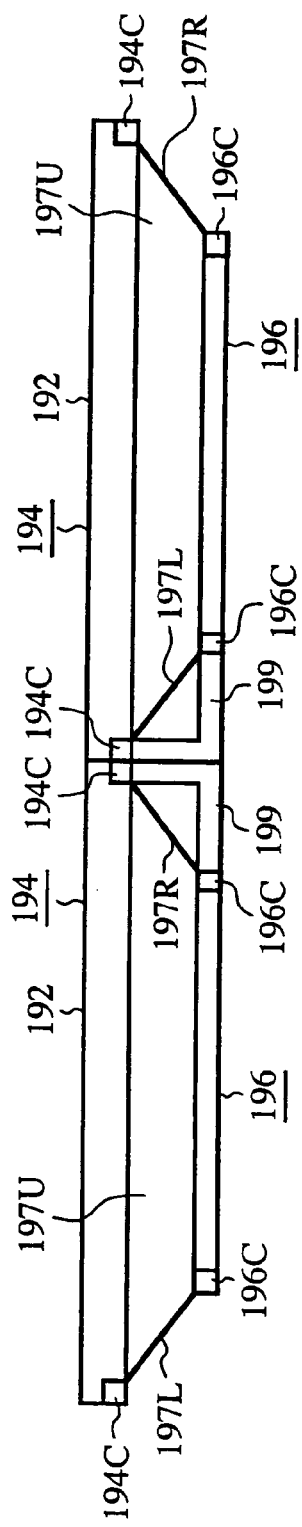
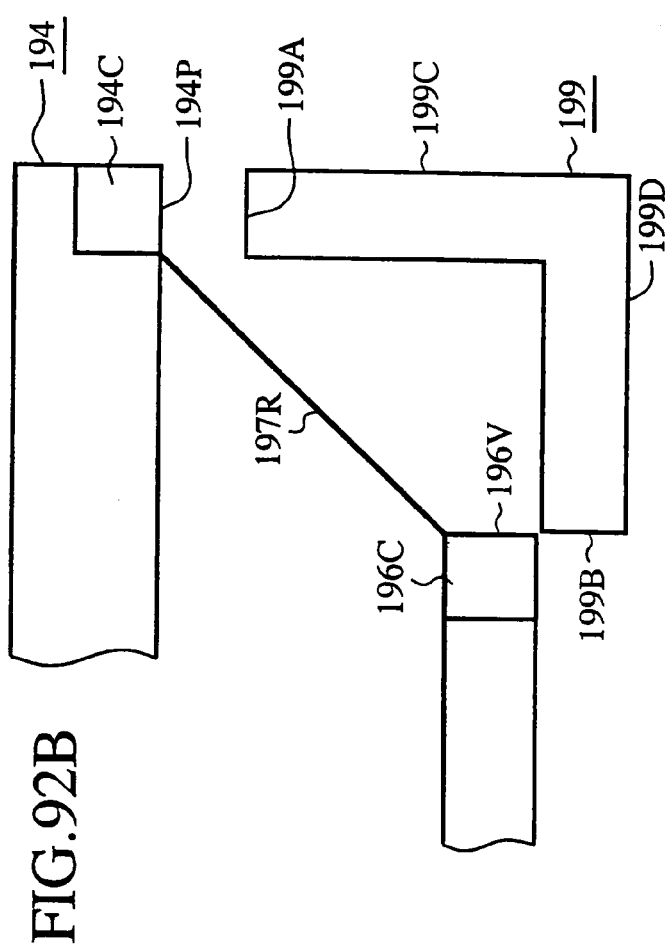
FIG.92A
FIG.92B

IMAGE DISPLAY DEVICE AND ADJUSTMENT FOR ALIGNMENT

This application is a divisional of application Ser. No. 10/639,425, filed on Aug. 13, 2003, now U.S. Pat. No. 6,824,274 which is a divisional of application Ser. No. 09/852,031, filed on May 10, 2001 and issued as U.S. Pat. No. 6,631,994 on Oct. 14, 2003, the entire contents of which are hereby incorporated by reference and for which priority is claimed under 35 U.S.C. § 120; and this application claims priority of application Ser. Nos. 2000-137602 filed in Japan on May 10, 2000; 2000-241757 filed in Japan on Aug. 9, 2000; 2000-273723 filed in Japan on Sep. 8, 2000; 2000-313652 filed in Japan on Oct. 13, 2000; 2000-345571 filed in Japan on Nov. 13, 2000; and 2001-40739 filed in Japan on Feb. 16, 2001 under 35 U.S.C. § 119.

BACKGROUND OF THE INVENTION

1. Field of the Invention

The present invention relates to an image display device by which an optical image signal based on image information is projected onto a display means to display an image, and a method for adjusting optical elements of in the image display device into alignment.

2. Description of the Prior Art

FIG. 95 is a diagrammatic representation of a conventional image display device. Reference numeral 1 denotes a luminous element for emitting light; 2 denotes a parabolic reflector for reflecting the light from the luminous element 1 mostly into parallel rays of light; and 3 denotes a condenser lens for gathering the light reflected by the parabolic reflector 2. The luminous element 1, the parabolic reflector 2 and the condenser lens 3 constitute an illumination light source system.

Reference numeral 4 denotes a light valve for spatially intensity-modulating the light gathered by condenser lens 3 based on image information; 5 denotes a projecting optical lens for projecting the light intensity-modulated by the light valve onto a screen; and 6 denotes the screen for displaying, as an image, the light projected thereon by the projecting optical lens 5. The arrows indicate optical paths.

Next, the operation of the prior art example will be described below.

Light emitted from the luminous element 1 is reflected by the parabolic reflector 2 and focused through the condenser lens 3 onto the light valve 4. The light valve 4 spatially intensity-modulates the focused light based on image information. The intensity-modulated light is projected by the projecting optical lens 5 onto the screen 6 from behind (from the left-hand side in FIG. 95) and displayed thereon. A user of the image display device visually identifies the image from the front (from the right-hand side in FIG. 95).

The depth dimension of the image display device of FIG. 95 corresponds to the distance from the illumination light source system composed of the luminous element 1, the parabolic reflector 2 and the condenser lens 3 to the screen 6. It is preferable to minimize the depth dimension of the image display device if the image size displayable is the same. For such a reason, the conventional image display device of FIG. 95 uses a wide-angle projecting optical lens 5 to display an image on the screen so that the depth dimension of the display device is minimized to provide a flat device configuration.

Since the projecting optical lens 5 has a limitation of increasing its angle of field, however, it is customary in the art, with a view to reducing the depth dimension, to place a plane mirror at an angle of 45° to the horizontal to bend the optical path from the projecting optical lens 5, projecting an image onto the screen 6 as depicted in FIG. 96.

In the image display device of FIG. 96, the illumination light source system, the light valve 4 and the projecting optical lens 5 are disposed in the direction of height of the device (in the vertical direction in FIG. 96) to reduce the depth dimension of the device. The depth dimension of the image display device in this case corresponds to the distance from the plane mirror 7 to the screen 6. With the plane mirror 7 tilted more than 45° from the horizon, the depth dimension of the image display device can be further reduced; in this instance, however, the light valve 4 and the illumination light source system interfere with the projected light, and the light is shaded or eclipsed accordingly, resulting in the light path getting out of the screen 6.

In Japanese Patent Application Laid-Open Gazette 6-11767 there is disclosed an image display device of the type wherein light is reflected by a convex mirror is used in place of the plane mirror 7 in FIG. 96 to display a magnified image on the screen 6, but the image displayed on the screen 6 is distorted.

The conventional device configurations described above impose limitations on the reduction of the depth dimension of the device and permit no further reduction.

SUMMARY OF THE INVENTION

It is therefore an object of the present invention to provide an image display device that provides an enlarged display of distortion-free images and permits further reduction of its depth dimension than in the prior art.

Another object of the present invention is to provide a method of adjusting optical elements of the image display device into alignment.

According to an aspect of the present invention, there is provided an image display device which comprises projecting optical means composed of a reflecting part for reflecting the optical image signal, and a refracting optical part for correcting for a distortion if the reflecting part has the distortion and for projecting the optical image signal onto the reflecting part, and wherein display means receives the optical image signal through the projecting optical means.

According to another aspect of the present invention, there is provided an image display device which comprises projecting optical means composed of a reflecting part having a reflecting surface for reflecting the optical image signal, and a refracting optical part having a refracting surface for projecting the optical image signal onto the reflecting part, and wherein the display means receives the optical image signal through the projecting optical means and at least one of the reflecting surface and the refracting surface is aspherical.

According to another aspect of the present invention, the transmitting means comprises: an illumination light source part for emitting illumination light; and a reflecting type image information providing part for receiving the illumination light emitted from the illumination light source part and for providing image information to the illumination light and reflecting the illumination light as the optical image signal.

According to another aspect of the present invention, the reflecting part has a rotationally symmetric aspherical surface for reflecting the optical image signal transmitted from the transmitting means.

According to another aspect of the present invention, the reflecting part is a convex mirror of negative power.

According to another aspect of the present invention, the reflecting part is a Fresnel mirror of negative power.

According to another aspect of the present invention, the reflecting part has a reflecting surface that is formed by a low dispersive medium and a high dispersive medium stacked in the direction in which to transmit the optical image signal sent from the transmitting means, has a negative power and reflects the optical image signal having passed through the low and high dispersive media.

According to another aspect of the present invention, the reflecting part has a reflecting surface formed so that its convex curvature is large around an optical axis and becomes smaller toward the periphery of the reflecting surface.

According to another aspect of the present invention, the reflecting part has an odd-order aspherical reflecting surface obtained by adding odd-order terms to a polynomial composed of even-order terms.

According to another aspect of the present invention, the refracting optical part has odd-order aspherical refracting surfaces obtained by adding odd-order terms to a polynomial composed of even-order terms.

According to another aspect of the present invention, the reflecting part or refracting optical part reflects or refracts the optical image signal by the reflecting or refracting surface except around the optical axis of the reflecting or refracting part.

According to another aspect of the present invention, the refracting optical part is provided with a curvature-of-field correcting means for canceling a curvature of field of the reflecting part.

According to another aspect of the present invention, the refracting optical part is provided with positive lenses of positive power, negative lenses of negative power having a refractive index lower than that of the positive lens, and a Petzval's sum correcting lens for correcting for a Petzval's sum contributing component of the reflecting part.

According to another aspect of the present invention, the projecting optical means has an aspherical optical surface at places where principal rays of the optical image signal to be projected onto the reflecting part from the transmitting means are divergent and/or convergent.

According to another aspect of the present invention, the projecting optical means is provided with path-bending means for reflecting the optical image signal from the refracting optical part to the reflecting part, the optical axis of the refracting optical part being bent at an appropriate angle in a horizontal plane containing the optical axis of the reflecting part.

According to another aspect of the present invention, the projecting optical means is provided with path-bending means for reflecting the optical image signal from first lens means to second lens means.

According to another aspect of the present invention, the refracting optical part has at least one lens formed of synthetic resin.

According to another aspect of he present invention, the refracting optical part and the reflecting part are rotationally symmetric about an optical axis made common to them.

According to another aspect of the present invention, the image display device further comprises a plane mirror for reflecting the optical signal from the projecting optical means to the display means.

According to another aspect of the present invention, a light receiving surface of the display means and a reflecting surface of the plane mirror are held in parallel to each other.

According to another aspect of the present invention, the refracting optical part comprises a retro-focus optical system composed of a positive lens group of positive power and a negative lens group of negative power, and a refracting optical lens for fine-tuning the angle of emission of the optical image signal from the retro-focus optical system to the reflecting part.

According to another aspect of the present invention, the retro-focus optical system is composed of two positive lens groups and one negative lens group.

According to another aspect of the present invention, the retro-focus optical system is composed of one positive lens group and one negative lens group.

According to another aspect of the present invention, the refracting optical part comprises negative lenses having an average value of refractive indexes in the range of 1.45 to 1.722 and having negative power, and positive lenses having an average value of refractive indexes in the range of 1.722 to 1.9 and having positive power.

According to another aspect of the present invention, the refracting optical part comprises negative lenses having an average value of Abbe's number in the range of 25 to 38 and having negative power, and positive lenses having an average value of Abbe's number in the range of 38 to 60 and having positive power.

According to another aspect of the present invention, the refracting optical part comprises positive lenses made of glass materials and negative lenses made of glass materials, the difference between average refractive indexes of the glass materials for the positive and negative lenses is in the range of 0.04 to 1.

According to another aspect of the present invention, the refracting optical part comprises positive lenses made of glass materials and negative lenses made of glass materials, the difference between average Abbe's number of the glass materials for the positive and negative lenses is in the range of 0 to 16.

According to another aspect of the present invention, a back focal length from the closest one of a plurality of lenses forming the refracting optical part to a light emitting surface of the transmitting means to the light emitting surface is equal to the distance from the light emitting surface of the transmitting means to the position of an entrance pupil of the refracting optical part.

According to another aspect of the present invention, the projecting optical means has negative lenses of negative power provided at the position of low marginal ray.

According to another aspect of the present invention, the angle of bending the optical axis of the refracting optical part is set such that the refracting optical part is as close to a path from the path-bending means to the reflecting part as possible without intercepting the optical path.

According to another aspect of the present invention, the angle of bending the optical axis of the first lens means is set such that the first lens means is as close to a path from the path-bending means to the second lens means as possible without intercepting the optical path.

According to another aspect of the present invention, the shortest distance from the refracting optical part to a reflecting part placement plane is chosen within a range smaller than a thickness limiting value.

According to another aspect of the present invention, the longer one of the longest distance from a reflecting part placement plane to the path-bending means and the longest distance from the reflecting part placement plane to the refracting optical part is equal to a thickness limiting value.

According to another aspect of the present invention, the longest distance from a reflecting part placement plane to the path-bending means and the longest distance from the reflecting part placement plane to the refracting optical part are equal to each other.

According to another aspect of the present invention, the refracting optical part has a shape obtained by removing a non-transmitting portion that does not transmit the optical image signal.

According to another aspect of the present invention, the reflecting part has a shape obtained by removing a non-reflecting portion that does not reflect the optical image signal to the display means.

According to another aspect of the present invention, the image display device further comprises a retaining mechanism for retaining the refracting optical part and the reflecting part as a one-piece structure.

According to another aspect of the present invention, the image display device further comprises a retaining mechanism for retaining the refracting optical part, the path-bending means and the reflecting part as a one-piece structure.

According to another aspect of the present invention, the refracting optical part has positive lenses of positive power provided at the position of high marginal ray.

According to another aspect of the present invention, letting hi represent the height of the marginal ray of light incident to the refracting optical part, hm the maximum height of the marginal ray in a positive lens disposed at the center of the refracting optical part and ho represent the height of the marginal ray of light emitted from the refracting optical part, the refracting optical part satisfy the relationships 1.05 hi<hm<3 hi and 0.3 hi<ho<1 hi.

According to another aspect of the present invention, the projecting optical means has poor optical performance in an unused area around its optical axis but has high image formation performance in an area to be used other than that around the optical axis.

According to another aspect of the present invention, the projecting optical means is adapted so that an image-forming position at the center of the optical axis and an image-forming position around the optical axis are not in the same plane.

According to another aspect of the present invention, the projecting optical means allows distortion in the vicinity of the center of the optical axis to increase the image formation performance of the area to be used.

According to another aspect of the present invention, the projecting optical means limits the range of degradation of the optical performance to the range of the field angle related only to the base of a screen.

According to another aspect of the present invention, a plane mirror for reflecting the light from the projecting optical means to the display means has a shape that corrects for distortion of the projecting optical means.

According to another aspect of the present invention, the refracting optical part has a construction in which an exit pupil of light emitted toward the central area of the reflecting part around the optical axis thereof and an exit pupil of light emitted toward the peripheral area of the reflecting part are spaced apart to thereby adjust the position and angle of incidence of the emitted light toward the reflecting part.

According to another aspect of the present invention, the reflecting part has a uniform thickness from its front surface as a reflecting surface for reflecting the optical image signal to the rear surface provided behind the front surface.

According to another aspect of the present invention, the reflecting part has a planar low-reflectivity surface provided on a non-projecting front surface about the optical axis of the reflecting part and a planar high-reflectivity surface smaller in area than the low-reflectivity surface and provided in the low-reflectivity surface about the optical axis.

According to another aspect of the present invention, the transmitting means is provided with a cover glass for protecting an image information light emitting surface and a compensator glass of an optical thickness that decreases or increases as a change in the optical thickness of the cover glass increases or decreases, the transmitting means emitting the image information light to the refracting optical part through the cover glass and the compensator glass.

According to another aspect of the present invention, the refracting optical part is provided with means for detachably mounting the compensator glass on the side of incidence of the illumination light from the transmitting means.

According to another aspect of the present invention, the image display device further comprises a bottom perpendicular to the reflecting surface of the plane mirror and the light receiving surface of the display means, and an optical component is disposed in a space defined by segments joining: a first point present on the base of a square image displayed on the display means and the farthest from the center of the image; a second point on the plane mirror to which light toward the first point is reflected; a third point on the reflecting part to which light toward the second point is reflected; a first projected point by projecting the first point to the bottom from the direction normal to the bottom; a second projected point by projecting the second point to the bottom from the direction normal to the bottom; and a third projected point by projecting the third point from the direction normal to the bottom.

According to another aspect of the present invention, the transmitting means comprises: a converging optical system principal part composed of: an illumination light source part for emitting illumination light; a color wheel for coloring emitted light from the illumination light source part in three primary colors one after another; a rod integrator for receiving the illumination light from the illumination light source part and for emitting illumination light of a uniform illuminance distribution from a light emitting surface; and a relay lens for relaying the illumination light from the rod integrator; a field lens for directing principal rays of the illumination light from the relay lens to the same direction; and a reflecting type image information providing part for providing image information to the illumination light from the field lens. The converging optical system principal part is disposed as the optical component in the space, and is further provided with second and third path-bending means for reflecting the illumination light from the converging optical system principal part to the field lens.

According to another aspect of the present invention, the optical axis of the converging optical system principal part is parallel to the light receiving surface of the display means and the bottom.

According to another aspect of the present invention, the optical axis of the converging optical system principal part is parallel to the light receiving surface of the display means and is tilted so that the intersection point of the illumination light source part and the optical axis is higher than the intersection point of the relay lens and the optical axis in the vertical direction.

According to another aspect of the present invention, the transmitting means is provided with an adjustment table for mounting the converging optical system principal part and the field lens, the adjustment table having a hole for receiving the third path-bending means.

According to another aspect of the present invention, at least one of the second and third path-bending means has a curved optical surface.

According to another aspect of the present invention, the reflecting part is made of synthetic resin.

According to another aspect of the present invention, the reflecting part is rectangular in front configuration viewed form the direction of its optical axis, a nonreflecting portion of the reflecting part that does not reflect the optical image signal to the display means being removed. The reflecting part is provided with: a first screwing part provided on the lower side of the rectangular front configuration close to but spaced a predetermined eccentric distance apart from the optical axis of the reflecting part and pivotally secured to a first reflecting part mounting mechanism; a second screwing part provided on another side of the rectangular front configuration and slidably held on a second reflecting part mounting mechanism; and a third screwing part provided still another side of the rectangular front configuration and slidably secured to a third reflecting part mounting mechanism.

According to another aspect of the present invention, the first reflecting part mounting mechanism and said first screwing part are screwed together by a taper screw and each have a screw hole conforming to a tapered portion of said taper screw.

According to another aspect of the present invention, the reflecting part is rectangular in front configuration viewed form the direction of its optical axis, a nonreflecting portion of the reflecting part that does not reflect the optical image signal to the display means being removed. The reflecting part is provided with: a recess provided on the lower side of the rectangular front configuration close to but spaced a predetermined eccentric distance apart from the optical axis of the reflecting part; a cylindrical support for engagement with the recess; two springs fixed at one end to the reflecting part on both sides of the recess, for biasing the reflecting part; a second screwing part provided on another side of the rectangular front configuration and slidably held on a second reflecting part mounting mechanism; and a third screwing part provided still another side of the rectangular front configuration and slidably secured to a third reflecting part mounting mechanism.

According to another aspect of the present invention, the reflecting part is rectangular in front configuration viewed form the direction of its optical axis, a nonreflecting portion of the reflecting part that does not reflect the optical image signal to the display means being removed. The reflecting part is provided with: protrusion provided on the lower side of the rectangular front configuration close to but spaced a predetermined eccentric distance apart from the optical axis of the reflecting part; a V-grooved support having a V-shaped groove for engagement with the protrusion; two springs fixed at one end to the reflecting part on both sides of the protrusion, for biasing the reflecting part; a second screwing part provided on another side of the rectangular front configuration and slidably held on a second reflecting part mounting mechanism; and a third screwing part provided still another side of the rectangular front configuration and slidably secured to a third reflecting part mounting mechanism.

According to another aspect of the present invention, the reflecting part is provided with two springs fixed at one end to the reflecting part on both sides of the first screwing part and at the other end to a common point, for biasing the reflecting part.

According to another aspect of the present invention, the first, second and third screwing parts hold the reflecting part with its reflecting front surface in contact with the first, second and third reflecting part mounting mechanisms.

According to another aspect of the present invention, the image display device further comprises: two sliding supports mounted on the retaining mechanism, for slidably supporting all or some of lenses of the refracting optical part; a first mounting plate disposed between the two sliding support and fixed to the retaining mechanism; a second mounting plate disposed between the two sliding supports and fixed to the lower ends of all or some of the lenses of the refracting optical part; and a piezoelectric element held between the first and second mounting plates and expanding or contracting in the direction of the optical axis of the refracting optical part as a control voltage applied to the piezoelectric element increases or decreases.

According to another aspect of the present invention, the image display device further comprises a gear mechanism supported on a gear support provided on the retaining mechanism, for moving the reflecting part, or all or some of lenses of the refracting optical part in the direction of the optical axis of the refracting optical part.

According to another aspect of the present invention, the image display device further comprises a heater/cooler for heating/cooling at least one of the refracting optical part held on the retaining mechanism and the retaining mechanism.

According to another aspect of the present invention, the image display device further comprises: a temperature sensor for sensing a lens-barrel temperature of the refracting optical part; a temperature sensor for sensing the internal temperature of the retaining mechanism; and a control unit for controlling at least one of the piezoelectric element, the gear mechanism and the heater/cooler according to a focus-compensation amount calculated from the lens-barrel temperature and the internal temperature.

According to another aspect of the present invention, the image display device further comprises: a temperature sensor for sensing an environmental temperature; and a control unit for controlling at least one of the piezoelectric element, the gear mechanism and the heater/cooler according to a focus-compensation amount calculated by adding the environmental temperature to a linear interpolation equation derived from at least two different focus adjustment points.

According to another aspect of the present invention, the image display device further comprises: a CCD for detecting focusinformation from light to be incident to a non-image-display area of the display means; and a control unit for controlling at least one of the piezoelectric element, the gear mechanism and the heater/cooler according to the result of analysis of the focus information.

According to another aspect of the present invention, the image display device further comprises a miniature reflector for reflecting to the CCD the light to be incident to the non-image-display area of the display means.

According to another aspect of the present invention, the control unit regards the intensity distribution of the light received by the CCD as focus information, analyzes a peak value of the focus information and effects control to increase the peak value.

According to another aspect of the present invention, the control unit regards the intensity distribution of the light received by the CCD as focus information, analyzes the width of a predetermined level of the focus information and effects control to decrease the width of the predetermined level.

According to another aspect of the present invention, the control unit regards the intensity distribution of the light received by the CCD as focus information, analyzes the inclination of a shoulder of the focus information and effects control to increase the inclination.

According to another aspect of the present invention, the retaining mechanism is provided with a plurality of supports for supporting the refracting optical part and the reflecting part, the plurality of supports having the same product of their height and coefficient of linear expansion.

According to another aspect of the present invention, the reflecting part has a high- or low-reflectivity surface, or a reflecting protrusion or reflecting recess that is high-reflectivity over the entire area of its reflecting surface.

According to another aspect of the present invention, the reflecting part has a lens layer covering its front surface for reflecting said optical image signal.

According to another aspect of the present invention, there is provided an image display device comprising: a cabinet front portion provided on the bottom of a cabinet and having display means; a cabinet rear portion provided on the bottom; and upper slanting surface, a left-hand slanting surface and right-hand slanting surface provided between the cabinet front portion and the cabinet rear portion and defining a housing space together with the bottom. The left- and right-hand slanting surfaces leave left- and right-hand parallel surfaces parallel to the display means on the back of the cabinet front portion and perpendicular surface perpendicular to the display means on both side of the cabinet rear portion.

According to another aspect of the present invention, the image display device further comprises a connector having a first end face for connection with either one of the left- and right-hand parallel surfaces, a second end face for connection to that one of the perpendicular surfaces on the same side of e.a4d the either one of the parallel surfaces, and a connection face parallel to the second end face. The connection surface is coupled to a connection face of another connector.

According to another aspect of the present invention, the connector has the same height as that of the image display device and is provided with a third end face perpendicular to the first and second end faces, for connection to the another connector.

According to another aspect of the present invention, air and heat are discharged or cables are extended out of the cabinet through the upper, left- and right-hand slanting surfaces.

According to another aspect of the present invention, there is provided a method of adjustment for correct alignment, which comprises the steps of: applying rectilinearly propagating light to a reflecting part and adjusting the attitude of the reflecting part so that the outgoing path of said rectilinearly propagating light for incidence to a high-reflectivity surface of thereflecting part and the incoming path of the rectilinearly propagating light reflected by the high-reflectivity surface come into alignment with each other; and applying the rectilinearly propagating light on the outgoing path to the high-reflectivity surface of the reflecting part through the refracting optical part, emitting from the refracting optical part the rectilinearly propagating light on the incoming path reflected by the high-reflectivity surface and adjusting the attitude of the refracting optical part to maximize the power of the rectilinearly propagating light emitted from the refracting optical part.

According to still another aspect of the present invention, there is provided a method of adjustment for correct alignment, which comprises the steps of: reflecting a bundle of parallel rays, applied perpendicularly to a jig display means and having passed through a first through hole, by a high-reflectivity surface of a reflecting part to bring outgoing and incoming paths of a bundle of parallel rays into alignment between the high-reflectivity surface and the first through hole; reflecting a bundle of parallel rays about an ideal optical axis of a refracting optical part by a path-bending reflector to the high-reflectivity surface to bring outgoing and incoming paths of the bundle of parallel rays into alignment between the high-reflectivity surface and the path-bending reflector; mounting, on a lens-holding flange, a holed reflector having a second through hole made in alignment with the optical axis of the refracting optical part, and reflecting a bundle of parallel rays about an ideal optical axis of the refracting optical part by the path-bending reflector to the high-reflectivity reflector through the second through hole, by which the direction of travel of the bundle of parallel ray reflected by the holed reflector and the direction of travel of the bundle of parallel rays on an incoming path reflected by the high-reflectivity surface to the path-bending reflector are brought into coincidence with each other; removing the holed reflector from the lens-holding flange and placing the refracting optical part on the lens-holding flange instead; and placing an illumination light source part and an image information providing part at predetermined positions, rendering the illumination light from the illumination light source part by the image information providing part to an optical image signal, and applying the optical image signal via the refracting optical part, the path-bending reflector and the reflecting part to the jig display means to form an image of the optical image signal on the jig display means at a normal position.

BRIEF DESCRIPTION OF THE DRAWINGS

FIG. 1 is a diagram illustrating the configuration of an image display device according to a first embodiment of the present invention;

FIG. 2 is a diagram for conceptually explaining how a barrel distortion of a refracting optical lens compensates for a pincushion distortion of a convex mirror;

FIG. 22 is a table showing an example of results of numerical calculations;

FIG. 28 is a table showing numeric data of Numerical Value Example 8A;

FIG. 30 is a table showing numeric data of Numerical Value Example 8B;

FIG. 32 is a table showing numeric data of Numerical Value Example 8C;

FIG. 34 is a table showing numeric data of Numerical Value Example 4A;

FIG. 36 is a table showing numeric data of Numerical Value Example 4B;

FIG. 38 is a table showing numeric data of Numerical Value Example 7A;

FIG. 42 is a diagram for explaining the condition for placement of a path-bending reflector;

FIG. 44 is a diagram for explaining the condition for placement of a path-bending reflector;

FIG. 46 is a table showing numeric data of Numerical Value Example 11A of an 11th embodiment of the present invention;

FIG. 52 is a table showing numeric data of Numerical Value Example 14A;

FIG. 56 is a diagram depicting the configuration of an image display device according to a 15th embodiment of the present invention;

FIG. 61 is a table showing numeric data of Numerical Value Example 16A;

FIG. 64 is a diagram depicting the configuration of an image display device according to a 17th embodiment of the present invention;

FIGS. 65(*a*) and (*b*) are diagrams showing in cross-section the image display device along the lines A–A' and B–B' perpendicular to the screen;

FIG. 84 is a diagram how optical system components are sequentially arranged by the alignment-adjusting method;

FIG. 90 is a diagram showing appearance of the image display device of each embodiment housed in a conventional cabinet;

FIG. 91 is a diagram showing appearance of a cabinet for the image display device according to a 22nd embodiment of the present invention;

FIG. 92 is a diagram showing the case where two image display devices are assembled into a one-piece structure;

DETAILED DESCRIPTION OF THE PREFERRED EMBODIMENTS

Embodiment 1

Figure 3:
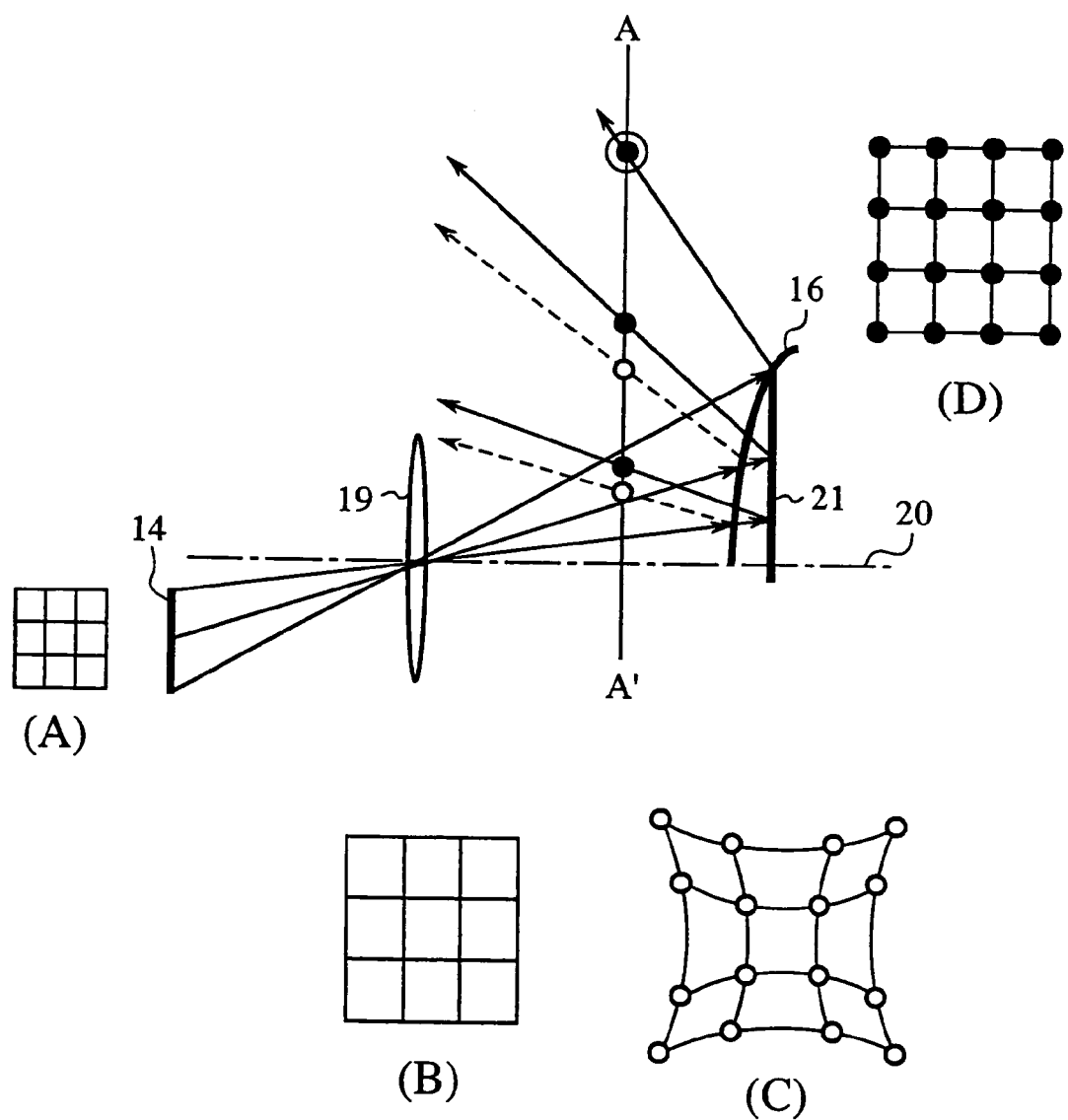
FIG. 3 is a diagram conceptually depicting a method by which an image, reflected through a aplanatic refracting optical lens or by a convex or plane mirror, is detected through ray tracing.

FIG. 1 schematically illustrates the configuration of an image display device according to a first embodiment (Embodiment 1) of the present invention. Reference numeral 11 denotes a luminous element that emits light (illumination light); 12 denotes a parabolic reflector for reflecting the light from the luminous element 11 mostly into parallel rays of light; and 13 denotes a condenser lens for gathering the rays of light reflected by the parabolic reflector 12. The luminous element 11, the parabolic reflector 12 and the condenser lens 13 constitute a illumination light source system (sending means, illumination light source part).

Reference numeral 14 denotes a micro-mirror device (sending means, a reflecting image information imparting part, digital micro-mirror device (DMD), a registered trademark of Texas Instruments Incorporated (TI)) that is a reflecting spatial light modulator. The micro-mirror device 14 spatially intensity-modulates the light gathered by the condenser lens 13 and reflects intensity-modulated light as an optical image signal containing image information. While the present invention is applicable to image display devices equipped with any kinds of spatial light modulators, the invention will hereinafter be described to use the micro-mirror device 14. Reference numeral 15 denotes a refracting optical lens (a refracting optical part) have a barrel distortion (compensating aberration); 16 denotes a convex mirror (a reflecting part) having a pincushion distortion; and 17 denotes a projecting optical system (projecting optical means) composed of the refracting optical 15 and the convex mirror 16. The projecting optical system 17 projects onto the screen 18 the light spatially intensity-modulated by the micro-mirror device 14; the light intensity-modulated by the micro-mirror device 14 is projected by the refracting optical lens 15 onto the convex mirror 16. The reflecting surface of the convex mirror 16 has a negative power, and throws a magnified image of the incident light onto a screen 18. Reference numeral 18 denotes the screen (display means) that receives the light projected from the projecting optical system 17 and displays the image. The optical paths indicated by the arrows.

In this embodiment, the reflecting surface of the micro-mirror device 14 and the light receiving surface of the screen 18 are disposed in parallel to minimize the depth dimension of the image display device. And, in order to prevent shading of light, the micro-mirror device 14 and the screen 18 are displaced from each other in the vertical direction, that is, they are staggered. Further, the projecting optical system 17 is so placed as to satisfy the above-mentioned positional relationship between the micro-mirror device 14 and the screen 18 and maintain the conjugate relationship between the image of the micro-mirror device 14 and the image on the screen 18.

Next, the operation of this embodiment will be described below.

The light emanating from the luminous element 11 is reflected by the parabolic reflector 12, and impinges aslant on the reflecting surface of the micro-mirror device 14 through the condenser lens 13. The micro-mirror device 14 spatially intensity-modulates the incident light based on image information. The thus intensity-modulated light is projected by the projecting optical system 17 onto the screen 18 to display thereon an image. The user of the image display device visually identifies the image from the left-hand side of the screen 18 in FIG. 1.

A description will be given of the micro-mirror device 14.

The micro-mirror device 14 has a reflecting surface formed by a two-dimensional arrays of 16 $\mu$m square micro mirrors with a 17 $\mu$m pitch, and the small mirrors usually have a one-to-one correspondence with image formats. For example, by a voltage from a controller (not shown), it is possible to change the inclination of each micro mirror and hence change the direction of light that is reflected off the micro mirror.

That is, in the case of projecting reflected light from a certain micro mirror onto the screen 18, the inclination of the micro mirror concerned is changed so that it reflects light toward the aperture of the projecting optical system 17. In the case of avoiding the projection of reflected light from a certain micro mirror onto the screen 18, the inclination of the micro mirror concerned is controlled so that light is reflected to the outside of the aperture of the projecting optical system 17. Since the time for changing the inclination of each micro mirror is less than 10 $\mu$sec, the micro-mirror device 14 is capable of intensity modulating light at high speed.

Since the micro-mirror device 14 is a reflecting type spatial light modulator, it is capable of intensity-modulating light incident thereon obliquely to its reflecting surface. For example, in the case of using liquid crystal as the spatial light modulator, light needs to be launched into the liquid crystal from behind substantially at right angles thereto; taking into consideration that the thickness reduction of the image display device is limited by an illumination light source disposed behind the liquid crystal, the effectiveness of the micro-mirror device 14 will be understood. With the use of the micro-mirror device 14 as in this embodiment, it is possible to dispose the illumination light source between the spatial light modulator and the convex mirror 16 on the side to which the micro-mirror device 14 emits light. This allows effective use of the space in the direction of the height of the image display device, preventing the illumination light source system from jutting out.

Next, the projecting optical system 17 will be described below.

The light intensity-modulated by the micro-mirror device 14 is reflected to the projecting optical system 17. As depicted in FIG. 1, the optical axis of the refracting optical lens 15 is perpendicular to the reflecting surface of the micro-mirror device 14 and the light receiving surface of the screen 18 and is set off the center of the micro-mirror device 14 and the center of the screen 18. Accordingly, only one part of the field angle of the refracting optical lens 15 is used to project the light from the micro-mirror device 14. In FIG. 1, since the light is incident on the refracting optical lens 15 diagonally from below, the light is emitted diagonally upward.

FIG. 2 is a diagram for conceptually explaining how a barrel distortion of the refracting optical lens 15 compensates for a pincushion distortion of the convex mirror 16. As depicted in FIG. 2, the refracting optical lens 15 is so designed as to have a barrel distortion. When light of a grid-like image (FIG. 2($a$)) is projected onto the refracting optical lens 15 from the micro-mirror device 14, the grid-like image is transformed to a barrel shape (FIG. 2($b$)). This barrel distortion is a feature of correcting for the pincushion distortion (FIG. 2($c$)) that occurs in the convex mirror 16. The refracting optical lens 15 is designed based on the pincushion distortion of the convex mirror 16.

Consequently, when the light corrected for distortion is projected onto the screen 18, an enlarged grid-like image (FIG. 2($d$)) is displayed without distortion. In general, distortion of an image that occurs in the optical system can be corrected for by signal processing, but since the definition of the image is deteriorated, this embodiment optically corrects for the distortion.

Now, the pincushion distortion of the convex mirror 16 will be described.

FIG. 3 is a diagram conceptually showing how to calculate, by ray tracing, an image when the light from the micro-mirror device 14 is reflected by the convex mirror 16 or plane mirror 21 through an aplanatic refracting optical lens 19. In FIG. 3, the solid lines indicate the optical path reflected by the plane mirror 21 and the broken lines the optical path reflected by the convex mirror.

When micro-mirror device 14 emits light having a grid-like image (FIG. 3($a$)), the light having passed through the aplanatic refracting optical lens 19 is not distorted (FIG. 3($b$)). Accordingly, when the light having passed through the aplanatic refracting optical lens 19 is reflected by the plane mirror 21, black dots are found to be arranged at equal intervals on a plane A–A' perpendicular to the optical axis 20 of the refracting optical lens 19 (FIG. 3($d$)). That is, in the case of the projecting optical system composed of the aplanatic refracting optical lens 19 and the plane mirror 21, the grid-like image undergoes no distortion while remaining intact.

On the other hand, when the light having passed through the aplanatic refracting optical lens 19 is reflected by the convex mirror 16, pincushion distortion occurs on the plane A–A' as indicated by white dots (FIG. 3($c$)) because the position of reflection on the reflecting surface of the convex mirror 16 in the direction of its optical axis differs for each optical path. Since the pincushion distortion can be calculated by ray tracing once the shape of the convex mirror 16 is determined, the calculation result can be used to design the distortion of the refracting optical lens 15 in FIG. 1.

Since the refracting optical lens 15 is used to provide the barrel distortion that compensates for the pincushion distortion of the convex mirror 16 as described above, it is possible to display a magnified distortion-free image on the screen 18 placed at such a position as to provide a flat device configuration.

Incidentally, the convex mirror 16 can easily be manufactured through mirror-finish lathing by forming its reflecting surface as a rotational aspherical surface that is obtainable by rotating a quadratic curve about an axis—this permits substantial reduction of the manufacturing costs. The convex mirror 16 can be designed freely according to the specifications of the image display device, and at any rate the refracting optical lens 15 needs only to be designed which has the barrel distortion that compensates for the pincushion distortion of the convex mirror 16.

Figure 96:
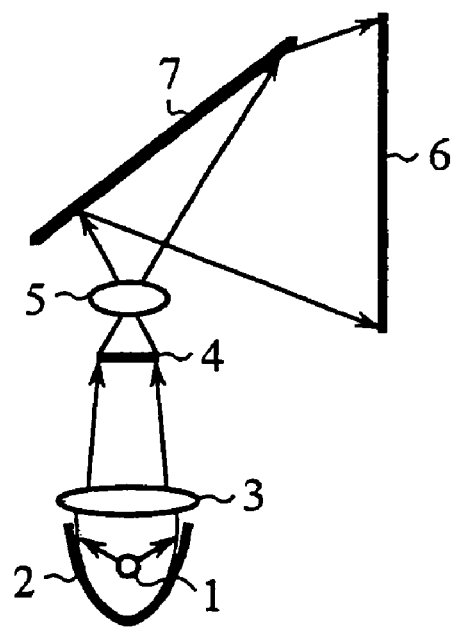
FIG. 96 is a diagram showing the configuration of another conventional image display device using a plane mirror.

Further, the prior art requires such optical path bending means as the plane mirror 7 in FIG. 96 in addition to the projecting optical system 17, but in this embodiment part of the projecting optical system functions to bend the optical path—this decreases the number of optical parts used and hence reduces the distance between the screen 18 and the convex mirror 16 accordingly.

Figure 4:
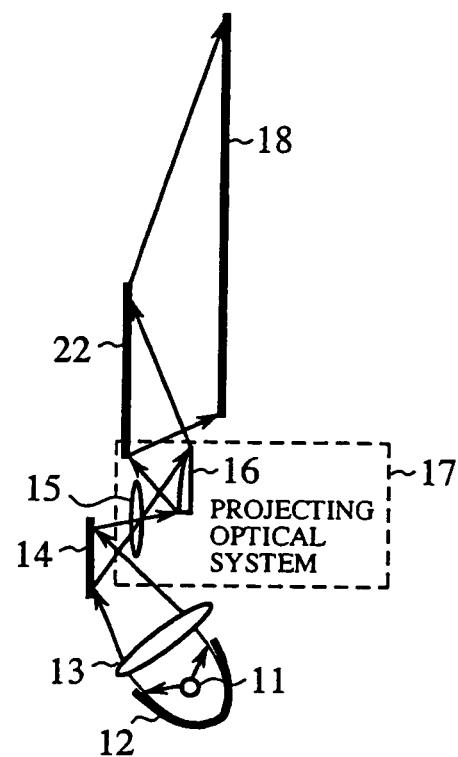
FIG. 4 is a diagram depicting the configuration of an image display device according to another aspect of the first embodiment in which a plane mirror is added.

When the illumination light source system greatly protrudes widthwise thereof as depicted in FIG. 4, a plane mirror 22 for reflecting the light from the projecting optical system 17 is added to bend the optical path to the screen 18, by which it is possible to make utmost use of the space of the image display device. Incidentally, the plane mirror 22 and the projecting optical system 17 may be interchanged, and the plane mirror 22 may be replaced with a projecting optical system other than that 17.

As described above, the image display device according to this embodiment comprises: sending means composed of the illumination light source system and the micro-mirror device 14, for emitting an optical image signal intensity-modulated based on image information; the screen 18 for receiving the optical image signal and displaying an image based on the image information; the convex mirror 16 having a negative power, for reflecting the intensity-modulated light onto the screen 18; and the refracting optical lens 15 having the barrel distortion that compensates for the pincushion distortion of the convex mirror 16 and so disposed as to project the light from the sending means onto the convex mirror 16. It is therefore possible to compensate for the pincushion distortion of the intensity-modulated light by the convex mirror 16 and provide an enlarged display of the image on the screen 18. And the screen 18 can be placed at the position optimal for reduction of the depth dimension of the image display device. Accordingly, the image display device according to this embodiment is smaller in its depth dimension than the prior art.

Moreover, according to this embodiment, since the sending means is formed by the illumination light source composed of the luminous element 11, the parabolic reflector 12 and the condenser lens 13 and the micro-mirror device 14 for modulating the light from the illumination light source system based on image information and reflecting the light, the illumination light source system can be disposed at the side to which the micro-mirror device 14 reflects the intensity-modulated light. This also permits further reduction of the depth dimension of the device.

Besides, according to this embodiment, since the light reflected by the micro-mirror device 14 is reflected by the projecting optical system 17 onto the screen 18, there is no need for using an optical part for bending the optical path to the screen 18—this decreases the number of optical parts used and reduce the distance between the screen 18 and the convex mirror 16.

Additionally, according to this embodiment, since the convex mirror 16 has a rotational aspherical surface, it can easily be manufactured by mirror-finish lathing—this permits substantial reduction of manufacturing costs.

Embodiment 2

While in Embodiment 1 the projecting optical system 17 is comprised of the refracting optical lens 15 of barrel distortion and the convex mirror 16 of pincushion distortion, this embodiment (Embodiment 2) forms the projecting optical system by a Fresnel mirror capable of magnifying an image with a short projection distance as is the case with the convex mirror and having no distortion.

Figure 5:
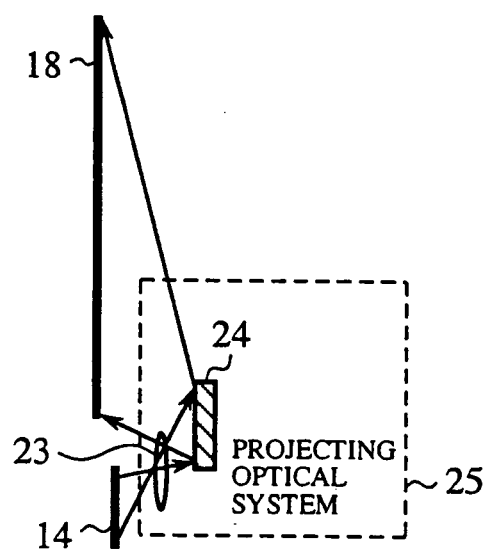
FIG. 5 is a diagram depicting the configuration of an image display device according to a second embodiment of the present invention.

FIG. 5 is a diagram schematically depicting the configuration of an image display device according to Embodiment 2. Reference numeral 23 denotes an aplanatic refracting lens (a refracting optical part); 24 denotes a Fresnel mirror (a reflecting part) for reflecting light from the refracting optical lens 23 onto the screen 18; and 25 denotes a projecting optical system (projecting optical means) composed of the refracting optical lens 23 and the Fresnel mirror 24. As is the case with the convex mirror 16, the reflecting surface of the Fresnel mirror 24 has negative power. For brevity sake, no illumination light source system is shown.

Figure 6:
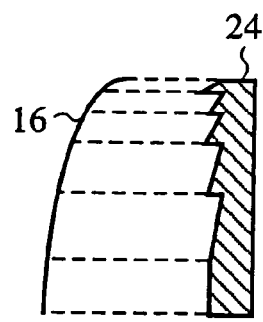
FIG. 6 is an enlarged diagram showing a convex mirror and a Fresnel mirror.

FIG. 6 is a magnified view of the Fresnel mirror 24. In FIG. 6 there is also similarly shown the convex mirror 16 in Embodiment 1. As depicted in FIG. 6, the reflecting surface of the Fresnel mirror has a periodic structure whose sections are identical in inclination with the corresponding sections of the reflecting surface of the convex mirror 16.

As will be seen from FIG. 6, the Fresnel mirror 24 is thinner than the convex mirror 16.

Figure 7:
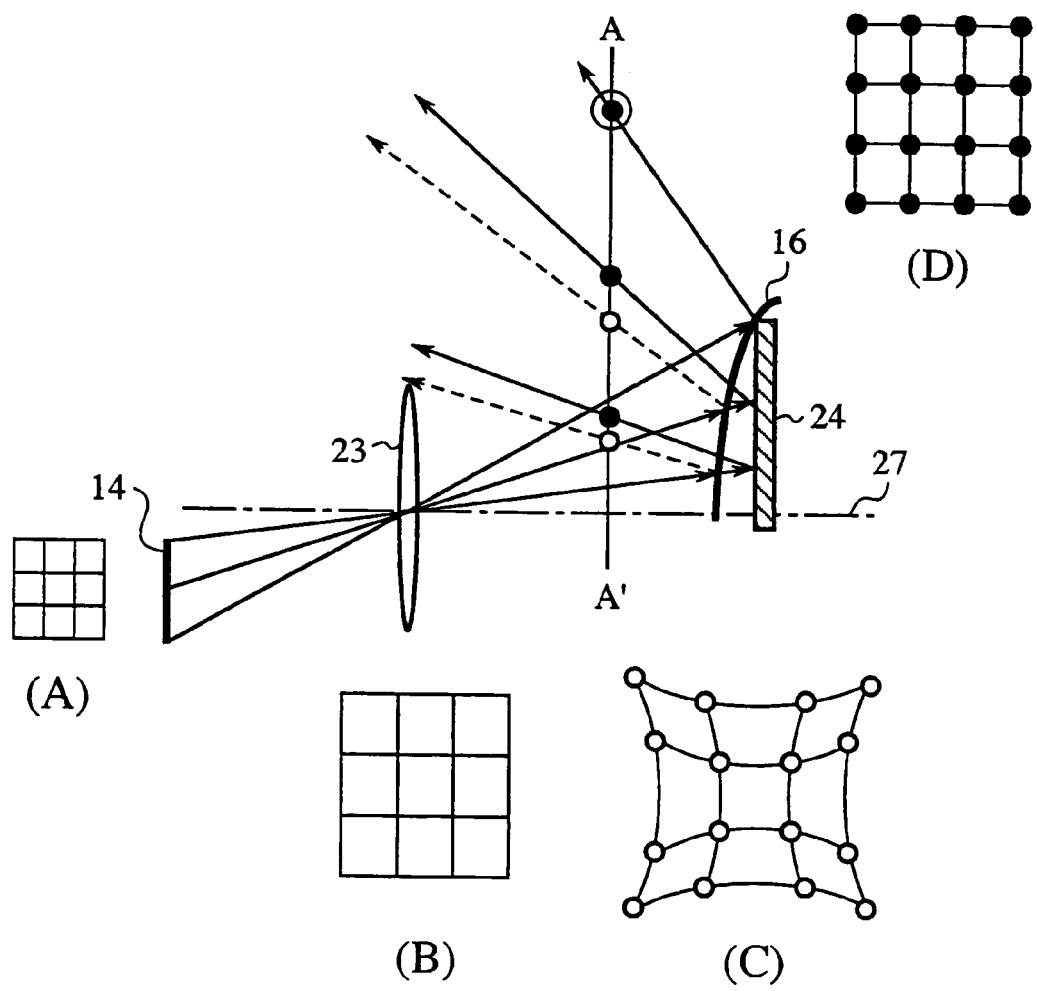
FIG. 7 is a diagram for comparison of distortions of the convex mirror and the Fresnel mirror.

FIG. 7 is a diagram for explaining the difference in distortion between the convex mirror 16 and the Fresnel mirror 24. As described previously in connection with Embodiment 1, the optical paths (indicated by the broken lines in FIG. 7) in which a grid-like image (FIG. 7(*a*)) from the micro-mirror device 14 or aplanatic refracting optical lens 23 is reflected by the convex mirror 16 undergo pincushion distortion (FIG. 7, white dots) on the plane A–A' perpendicular to the optical axis 27 of the refracting optical lens 23 due to a different position of reflection in each optical path that is attributable to the convex reflecting surface configuration. On the other hand, in the case of using the Fresnel mirror 24, no distortion occurs (FIG. 7(*d*)) as is the case with the plane mirror 21 in FIG. 3 because the positions of reflection in the direction of the optical axis are all the same. Accordingly, the use of the Fresnel mirror 24 for the projecting optical system 25 avoids the necessity for taking into account the compensation for distortion and allows the use of the aplanatic refracting lens 23 as it is. Since the other arrangements and operations of this embodiment are the same as those of Embodiment 1, no description will be given of them.

As described above, according to this embodiment, since the projecting optical system is made up of the Fresnel mirror 24 that magnifies an image with a short distance as is the case with the convex mirror but does not distort the image of light passing therethrough and the aplanatic refracting optical lens 23, it is possible to display a magnified image on the screen 18 without the need for compensating the pincushion distortion of the convex mirror 16 by the refracting optical lens as in Embodiment 1—this facilitates the design and fabrication of the image display device.

Further, this embodiment uses, as part of the projecting optical system 2, the Fresnel mirror 24 formed thinner than the convex mirror 16, and hence permits further reduction of the depth dimension of the image display device.

Embodiment 3

In this embodiment the projecting optical system is made up of an optical element that has a convex projecting surface on the side thereof opposite the light receiving surface and a refracting optical lens.

Figure 8:
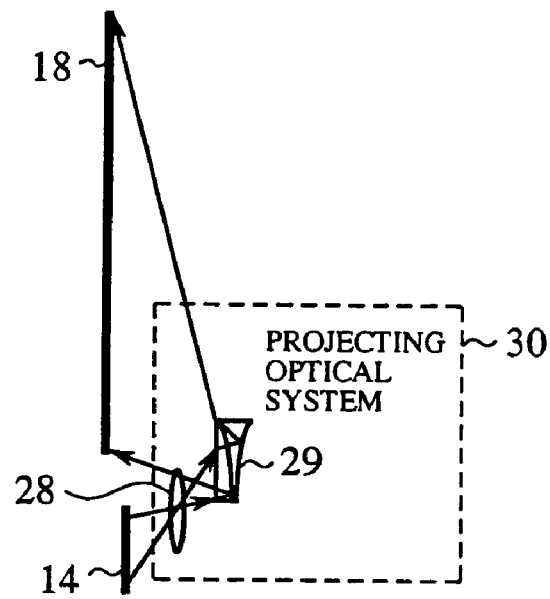
FIG. 8 is a diagram depicting the configuration of an image display device according to a third embodiment of the present invention.

FIG. 8 is a diagram schematically illustrating the configuration of an image display device according to a third embodiment (Embodiment 3) of the present invention. Reference numeral 28 denotes a refracting optical lens (a refracting optical part); 29 denotes an optical element (a reflecting part) formed of two optical materials of different dispersion characteristics; and 30 denotes a projecting optical system (projecting optical means) made up of the refracting optical lens 28 and the optical element 29. For the brevity sake, no illumination light source system is shown.

Figure 9:
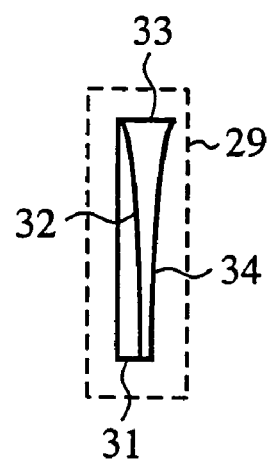
FIG. 9 is a magnified view of an optical element.

FIG. 9 depicts the optical element in enlarged dimension. Reference numerals 31 and 33 denote low dispersion glass (low dispersion medium) and high dispersion glass (high dispersion medium), respectively; 32 denotes an interface between the low dispersion glass 31 and the high dispersion glass 33; and 34 a reflecting surface that forms an interface between the high dispersion glass 33 and air. As viewed from the light receiving surface, the interface 32 has a concave configuration that provides positive power and the reflecting surface 34 has a convex configuration that provides negative power. When light enters and leaves the optical element 29, chromatic aberration occurs as is the case with a prism; hence, the low dispersion glass 31 and the high dispersion glass 33 are combined for achromatization.

Next, the operation of this embodiment will be described below,.

Figure 10:
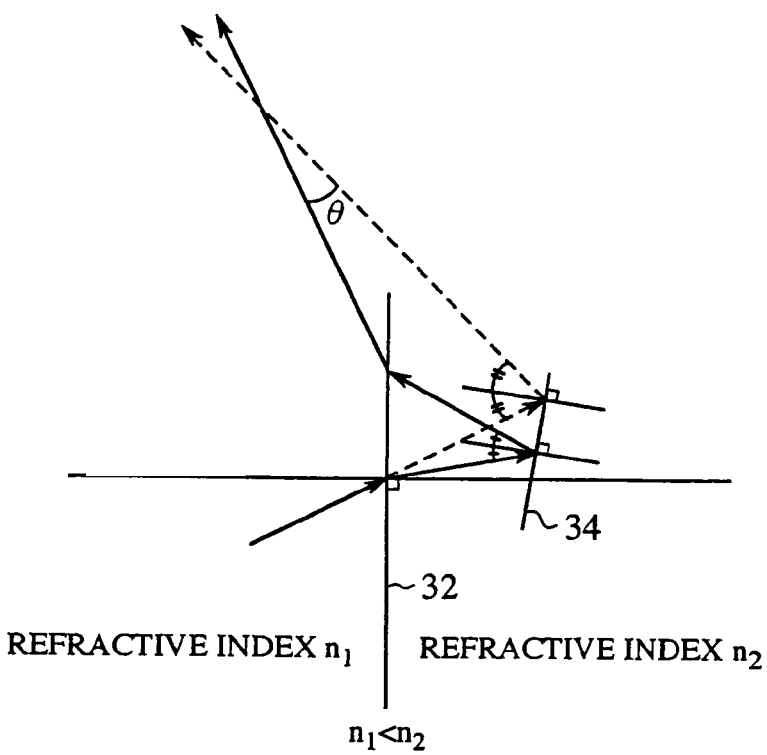
FIG. 10 is a diagram depicting incident paths in the optical element.

FIG. 10 is a diagram showing the optical path of incident light in the optical element 29. In FIG. 10 the left-hand side of the interface 32 corresponds to the low dispersion glass 31 (of a refractive index $n_1$) and the right-hand side corresponds to the high dispersion glass 33 (of a refractive index $n_2$). The refractive indexes $n_1$ and $n_2$ can be chosen arbitrarily, but in this example $n_1 < n_2$. A convex mirror, which has the same configuration as that of the reflecting surface 34, used, and the optical path of the incident light merely bent by the convex mirror used as the reflecting surface 34 is indicated by the broken lines.

As will be seen from comparison between the solid and broken lines, the optical path by the optical element 29, which passes through the low dispersion glass 31 and the high dispersion glass 33 in this order and strikes on the convex reflecting surface 34, can be bend at an angle larger than in the case of the optical path bend by the mere convex mirror, and consequently a wider-angle image can be projected onto the screen 18.

With the use of the optical element 29, it is possible to project an image onto the screen 18 at wider angle than does the reflecting surface 16 in Embodiment 1 and hence reduce the convexity of the reflecting surface 34 accordingly. Further, since the position of emission of light from the optical element 29 can be controlled by adjusting the thicknesses of the low dispersion glass 31 and the high dispersion glass 33, the distortion that occurs in the reflecting surface 34 can be compensated inside the optical element 29.

Figure 11:
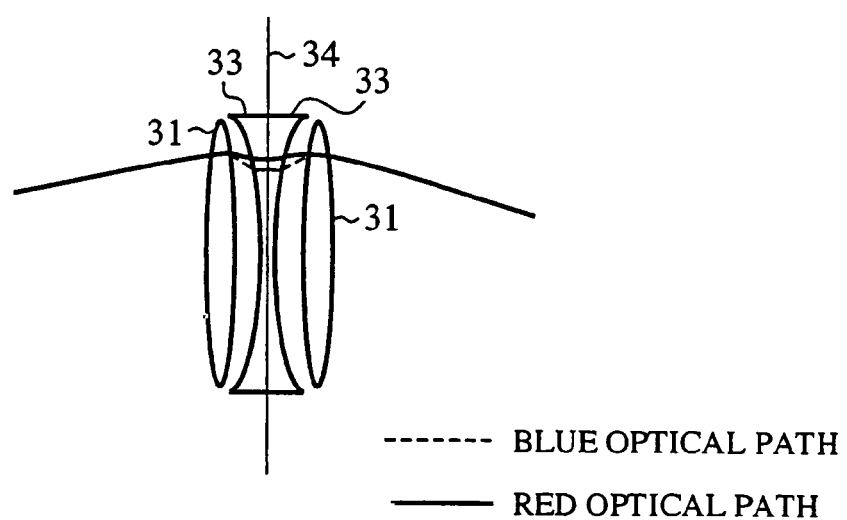
FIG. 11 is a diagram in which paths reflected by a reflecting surface in the optical element are developed in one direction.

Next, a description will be given of the achromatization by the optical element 29. In FIG. 11 there are indicated optical paths of red and blue colors by the solid and broken lines, respectively. Glass is called high or low dispersion glass, depending on whether its refractive index changes greatly with a change in the wavelength of incident light. In general, glass materials have a characteristic that the refractive index increases with a decrease in the wavelength of light.

Accordingly, as depicted in FIG. 11, the blue light of shorter wavelength is greatly refracted in the low dispersion glass, whereas the red light of longer wavelength is not so refracted as is the blue light. Since the high dispersion glass 33 differs from the low dispersion glass 31 in terms of the degree of refraction according to color, it is possible, even with a high dispersion glass of lower power than that of the low dispersion glass 31, to provide dispersion with which color aberration having occurred in the low dispersion glass 31 can be compensated for. Thus, an achromatic lens of positive power can be constituted by such a combination of high and low dispersion glass materials. An achromatic lens of negative power can be obtained simply by reversing the combination of the low dispersion glass 31 and the high dispersion glass 33.

Figure 12:
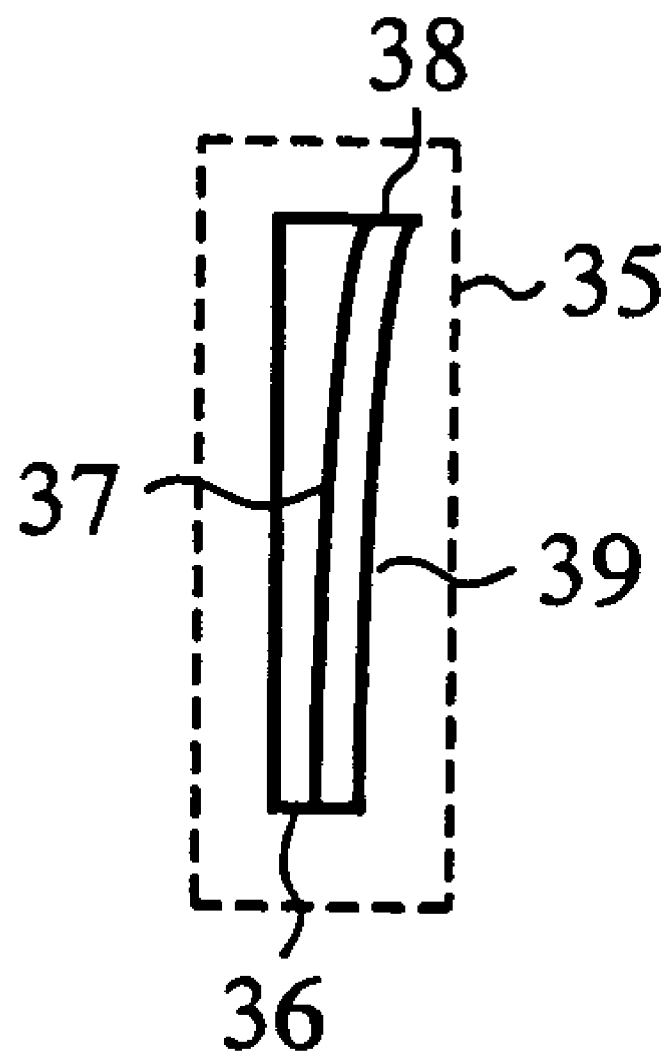
FIG. 12 is a magnified view of the optical element.

In FIG. 9 the low dispersion glass 31 is disposed on the light receiving side, but an optical element 35 of such a structure as shown in FIG. 12, in which a low dispersion glass 38 is sandwiched between a high dispersion glass 36 disposed at the light receiving side and a reflecting surface 39 of negative power, may sometimes be more effective in achromatization. Such optical element structures can be freely chosen at the time of design.

As described above, according to this embodiment, light is projected onto the screen 18 by the optical element 29 that is composed of the low dispersion glass 31 and the high dispersion glass 33 laminated in the direction of transmission of light and the reflecting surface that has negative power and reflects the light having passed through the low dispersion glass 31 and the high dispersion glass 33. With such an arrangement, light of the same field angle as that of light reflected off the convex mirror 16 in Embodiment 1 can be projected by the reflecting surface 34 of less convex configuration than that of the convex mirror 16, and the distortion by the reflecting surface 34 can be compensated for in the optical element 29 or 35 by adjusting the thicknesses of the low dispersion glass 31 and the high dispersion glass 33—this allows ease in compensating for the pincushion distortion that occurs in the reflecting surface 34.

Embodiment 4

This embodiment corrects for distortion by a refracting lens or convex mirror that has a aspherical refracting or reflecting surface.

Figure 13A:
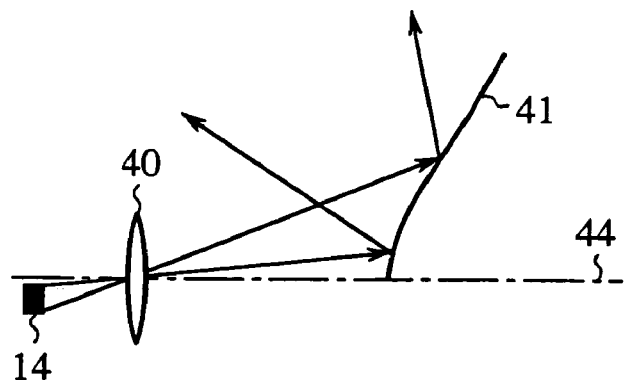
FIG. 13 is a diagram depicting the configuration, of an image display device according to an aspect of a fourth embodiment of the present invention.
Figure 13B:
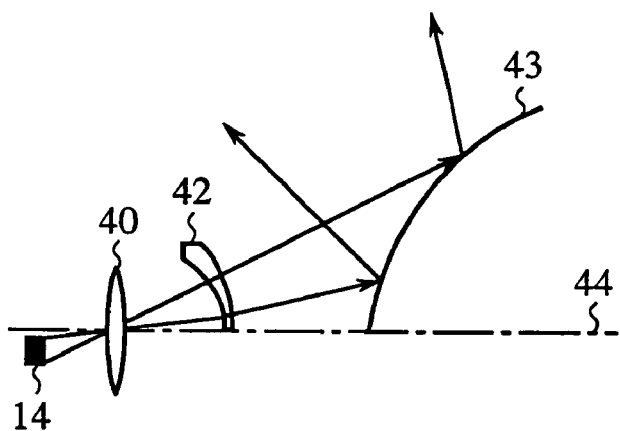
Figure 13C:
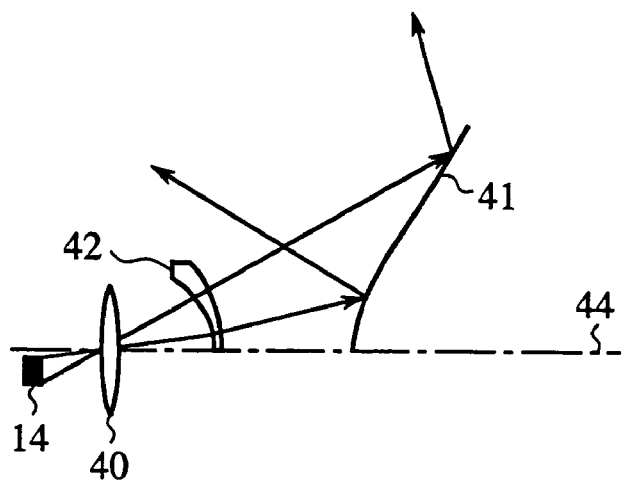

FIG. 13 schematically illustrates the configuration of an image display device according to a fourth embodiment (Embodiment 4) of the present invention. Reference numeral 40 denotes a refracting optical lens of positive power (projecting optical means, refracting optical part); 41 denotes an aspherical convex mirror having an aspherical reflecting surface (projecting optical means, reflecting part); 42 denotes an aspherical lens having an aspherical refracting surface (projecting optical means, refracting optical part); 43 denotes a spherical convex mirror having a spherical reflecting surface (projecting optical means, reflecting part); 44 denotes an optical axis common to the refracting optical lens 40, the aspherical convex mirror 41, the aspherical lens 42 and the spherical convex mirror 43. Incidentally, an illumination light source system and a screen are not shown for the sake of brevity.

An analysis according to the Fermat's principle reveals that a spherical refracting surface of a lens or reflecting surface of a mirror provides no stigmatism, whereas an aspherical refracting surface of a lens or reflecting surface of a mirror reduces aberration. This embodiment corrects for distortion by placing an optical element of such aspherical configuration at the position where principal rays are divergent.

For example, as depicted in FIG. 13(*a*), light from the micro-mirror device 14 as a spatial light modulator, which passes through the refracting optical lens 40, is reflected by the aspherical convex mirror 41 for projection onto the screen 18 (not shown).

Alternatively, as shown in FIG. 13(*b*), the aspherical lens 42 is disposed between the refracting optical lens 40 and the spherical convex mirror 43 at the position where the principal rays are divergent, and the light from the micro-mirror device 14, which passes through the refracting optical lens 40 and the aspherical lens 42, is reflected by the spherical convex mirror 43 for projection onto the screen 18.

Since the reflecting surface configuration of the aspherical convex mirror 41 or the refracting surface configuration of the aspherical lens 42 has a one-to-one correspondence with the distortion, the reflecting surface configuration or refracting surface configuration is designed through ray tracing in either case.

Accordingly, in the both cases of FIGS. 13(*a*) and 13(*b*), since light is projected onto the screen 18 through the aspherical convex mirror 41 and the aspherical lens 42, it is possible to provide an image display device with reduced depth dimension and correct for distortion of the image projected onto the screen 18.

As an alternative to the above arrangements, the aspherical lens 42 and the aspherical convex mirror 41 could be placed as depicted in FIG. 13(*c*). This arrangement allows more ease in correcting for distortion.

Further, though not shown, several aspherical lens 42 can be interposed between the refracting optical lens 40 and the aspherical convex mirror 41 (or the spherical convex mirror 43), in which case distortion can be further corrected for.

The following three schemes can be used for more effective correction for distortion by the aspherical configuration described above.

Figure 14:
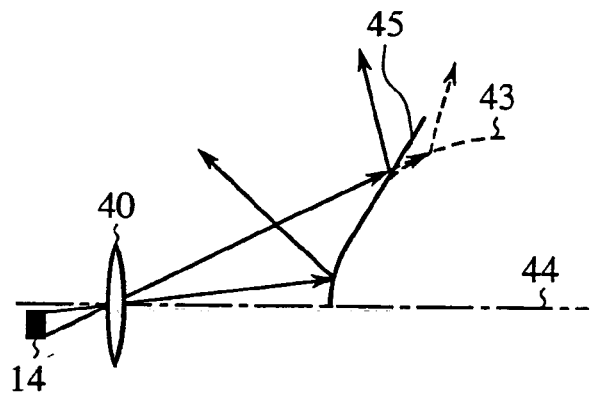
FIG. 14 is a diagram depicting the configuration of an image display device according to another aspect of the fourth embodiment of the present invention.

FIG. 14 depicts the configuration of an image display device according to this embodiment. For the sake of brevity, the illumination light source system and the screen are not shown. Reference numeral 45 denotes an aspherical convex mirror (projecting optical means, a reflecting part) that has a reflecting surface whose convex curvature is large at the center of the optical axis but gradually decreases toward the periphery. For the purpose of comparison, there are shown the spherical convex mirror 43 (indicated by the broken line) and the reflected ray (indicated by the broken-line arrow) by the spherical convex mirror 43.

As referred to previously with reference to Embodiment 1, the pincushion distortion occurs in the spherical mirror 43 and causes distortion of an image. Since the pincushion distortion appears in the periphery of the spherical convex mirror 43, the illustrated example uses the aspherical convex mirror 45 having a reflecting surface whose convex curvature is large at the center of the optical axis 44 but gradually diminishes toward the periphery. The use of such an aspherical convex mirror permits further reduction of distortion.

Figure 15:
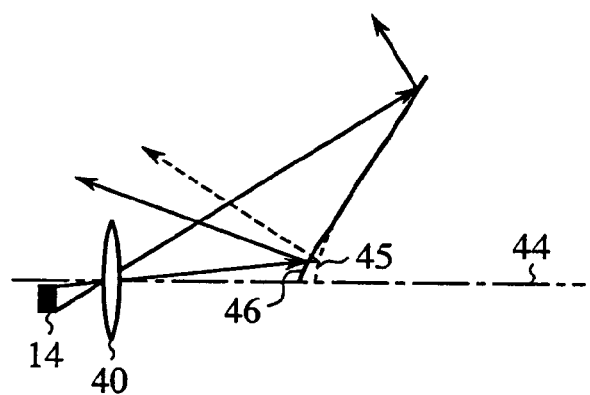
FIG. 15 is a diagram depicting the configuration of an image display device according to another aspect of the fourth embodiment of the present invention.

FIG. 15 depicts another configuration of the image display device according to this embodiment. Neither the illumination light source system nor the screen is shown for brevity sake. Reference numeral 46 denotes an aspherical convex mirror (projecting optical means, a reflecting part) that has an odd-order aspherical reflecting surface.

In general, a three-dimensional curved surface is expressed by a polynomial composed of even-order terms. By adding odd-order terms to the polynomial to make respective aspherical coefficients appropriate, the odd-order aspherical reflecting surface of the aspherical convex mirror 46 in FIG. 15 is obtained. It will be seen from FIG. 15 that, in comparison with the aspherical reflecting surface of the aspherical convex mirror 45 (indicated by the broken line), the odd-order aspherical reflecting surface of the aspherical convex mirror 46 has a convexity (or concavity) in the vicinity of the optical axis 44.

The convexity (or concavity) near the optical axis 44 is formed by adding odd-order terms to the polynomial. When the micro-mirror device 14 is placed off the optical axis 44 as depicted in FIG. 15, the reflecting surface near the optical axis 44 does not project light. Accordingly, even if the projection and image formation performance near the optical axis is deteriorated by discontinuity of the curvature of the central area of the aspherical convex mirror 46, no influence is exerted to the display performance of the display device. The use of the aspherical convex mirror 46 implements a projecting optical system in which the correction for distortion is consistent with an excellent image formation characteristic for off-axis projected light.

In the central area of an odd-order aspherical or lens that contains a 1st order term, reflected/refracted light is disturbed, in principle, due to discontinuity of curvature, leading to degradation of the image formation performance.

In view of the above, according to this embodiment, incident light is reflected by or transmitted through such an odd-order asphecrical surface except its central area (a point on the optical axis) to project the reflected or transmitted light onto the screen 18, thereby achieving excellent image formation performance. To perform this, the micro-mirror device 14 is disposed with its effective display surface shifted off the optical axis.

The odd-order aspherical surface is also applicable to the refracting optical lens.

Figure 16:
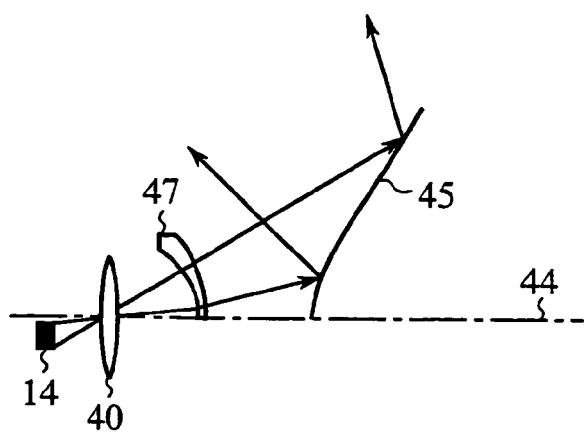
FIG. 16 is a diagram depicting the configuration of an image display device according to still another aspect of the fourth embodiment of the present invention.

FIG. 16 illustrates another configuration of the image display device according to this embodiment. Reference numeral 47 denotes an aspherical lens (projecting means, refracting optical part) whose refracting surface facing the aspherical convex mirror 45 is formed as an odd-order aspherical surface.

The closer to the aspherical convex mirror 45 the light emanating portion of the refracting surface of the refracting lens is, the more the principal rays are divergent; hence, the configuration of the light emanating portion is locally modified to reduce distortion.

As described above, according to this embodiment, since the aspherical convex mirror 41 having an aspherical reflecting surface is used, distortion of light that is projected onto the screen 18 can be corrected for.

Further, according to this embodiment, since at least one aspherical lens 42 having an aspherical refracting surface is interposed between the refracting optical lens 40 and the convex mirror at the position where the principal ray is disturbed, it is possible to correct for distortion of the light that is projected onto the screen 18.

Further, according to this embodiment, since the aspherical convex mirror 45 is used whose convex curvature is large at the center of the optical axis but gradually decreases toward the periphery, the light to be projected onto the screen 18 can be further corrected for distortion.

Further, according to this embodiment, since the aspherical convex mirror 46 is used which has an odd-order aspherical reflecting surface formed by adding an odd-order term to a polynomial representing an even-order aspherical surface, it is possible to implement a projecting optical system in which the correction for distortion and an excellent image formation performance for off-axis projected light are compatible with each other.

Further, according to this embodiment, since the aspherical lens 47 is used which as an odd-order aspherical refracting surface formed by adding an odd-order term to a polynomial representing an even-order aspherical surface, it is possible to locally modify the configuration of the refracting surface, facilitating reduction of distortion and permitting improvement in the off-axis image formation performance.

Incidentally, the above-mentioned configurations of the refracting optical lens and the convex mirror can be chosen arbitrarily at the time of designing the image display device.

Moreover, some of lenses forming the refracting optical part, such as the refracting optical lens 40, the aspherical lens 42, or the aspherical lens 47, that is, at least one refracting optical lens forming the refracting optical part, can be mass-produced with a die of a desired aspherical configuration by injection molding of plastic synthetic resin such as polycarbonate or acrylic plastic. In general, the melting point of glass for use as a material for a lens is about 700° C. and the melting point of glass for molding use is 500° C., whereas the melting point of the plastic synthetic resin is lower; hence, the fabrication of the refractive optical lens from the plastic synthetic resin provides increased productivity, and cuts the manufacturing cost of the image display device.

Of course, a known glass molding method can be used to obtain the aspherical lenses 42 and 47. In such an instance, since the aspherical lens if formed of a glass material, environmental characteristics (such as the operating temperature range and humidity range) can be more improved than in the case of using plastic materials. The lens material for the refracting optical part needs only to be chosen according to the purpose, usage and specifications of the image display device desired to fabricate, taking into account merits of individual materials.

Embodiment 5

Embodiment 4 is adapted to correct for distortion by means of the aspherical convex mirror having an aspherical reflecting surface or refracting optical lens having an aspherical refracting surface as described above, but in this case a curvature of field occurs in the image projected onto the screen 18, developing what is called an "out of focus" phenomenon. A fifth embodiment (Embodiment 5) of the present invention is intended to reduce the curvature of field.

It is the Petzval's sum P that is commonly used to consider the curvature of field. The Petzval's sum P is expressed by the following equation (1).

$$P = \sum Pi \qquad (1)$$
$$= \sum [1/(ni \cdot fi)]$$
$$= \sum [\phi i/ni] \quad (i = 1, \ldots, N)$$

where $\Sigma$ is an operator that means the sum total related to an index i of sum, i is the number of an optical element, N is the total sum of optical elements, Pi is a component of an i-th optical element that contributes to the Petzval's sum, ni is the refractive index of the i-th optical element, fi is the focal length of the i-th optical element, and $\phi i$ represents the power that the i-th optical element has.

The condition for forming a plane image with no curvature of field on a flat object is called the Petzval's condition, which is satisfied when P=0. That is, an image with reduced curvature of field can be displayed on the screen 18 by causing the Petzval's sum to approach zero.

Figure 17:
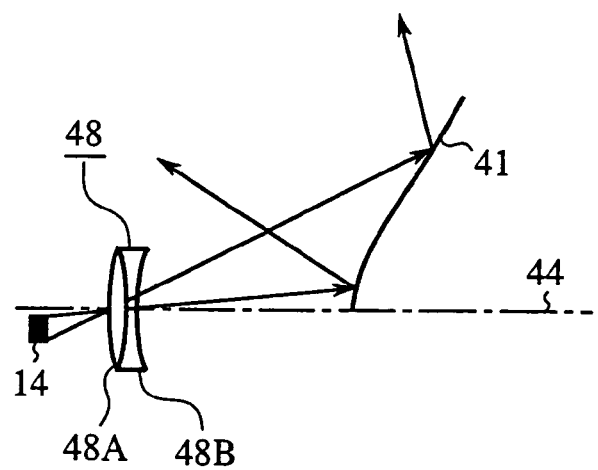
FIG. 17 is a diagram depicting the configuration of an image display device according to a fifth embodiment of the present invention.

Now, consider the application of a refracting optical lens (projecting optical means, refracting optical part, Petzval's sum compensating lens) 48 to the image display device of FIG. 13(*a*) as depicted in FIG. 17. The refracting optical lens 48 is an achromatic lens 48 composed of a positive lens 48A and a negative lens 48B.

Since the aspherical mirror 41 (i=3) has a refractive index n3=−1 and a negative power $\phi 3$ (<0) of a large absolute value, the component P3 of the aspherical convex mirror 41 that contributes to the Petzval's sum P is likely to take a positive value owing to a division of negative values.

Accordingly, the curvature of field is corrected for by designing the refracting optical lens 48 that cancels the component P3 of the aspherical convex mirror 41. That is, the refracting optical lens 48 made up of the positive lens 48A (i=1) and the negative lens 48B (i=2) makes the Petzval's sum contributing component P1+P2 a negative value, canceling the component P3 of the aspherical convex mirror 41.

Since the positive lens 48A has a positive power $\phi 1$ (>0), its refractive index n1 is increased to obtain the contributing component P1=$\phi 1$/n1≈0, lessening the influence on the Petzval's sum P.

Since the negative lens 48B has a negative power $\phi 2$ (<0), its refractive index n2 is decreased to obtain a negative contributing component P2=$\phi 2$/n2 whose absolute value is large.

As described above, by selecting the refractive indexes of the positive and negative lenses 48A and 48B to be n1>n2, the contributing component P1+P2 is made to approach the negative value as much as possible, thereby reducing the influence of the component P1+P2 on the component P3 of the aspherical convex mirror 41.

Moreover, the Petzval's condition can be further satisfied by setting Abbe's numbers v1 and v2 of the positive and negative lenses 48A and 48B to values close to each other. In general, letting a refractive index change by a wavelength change be represented by $\Delta n$, the Abbe's number is defined by $v=(n-1)/\Delta n$; a small Abbe's number means an optical material of a large dispersion value.

Letting combined power of the positive and negative lenses 48A and 48B of the refracting optical lens 48 in FIG. 17 be represented by $\Phi$, the following equations (2) and (3) are obtainable from an equation of the combined power, $\Phi=\Sigma(\phi i)$, and an equation of the condition for achromatism, $\Sigma(\phi i/vi)=0$.

$$\phi 1 = \Phi \cdot v1/(v1-v2) \qquad (2)$$

$$\phi 2 = -\Phi \cdot v2/(v1-v2) \qquad (3)$$

Figure 18:
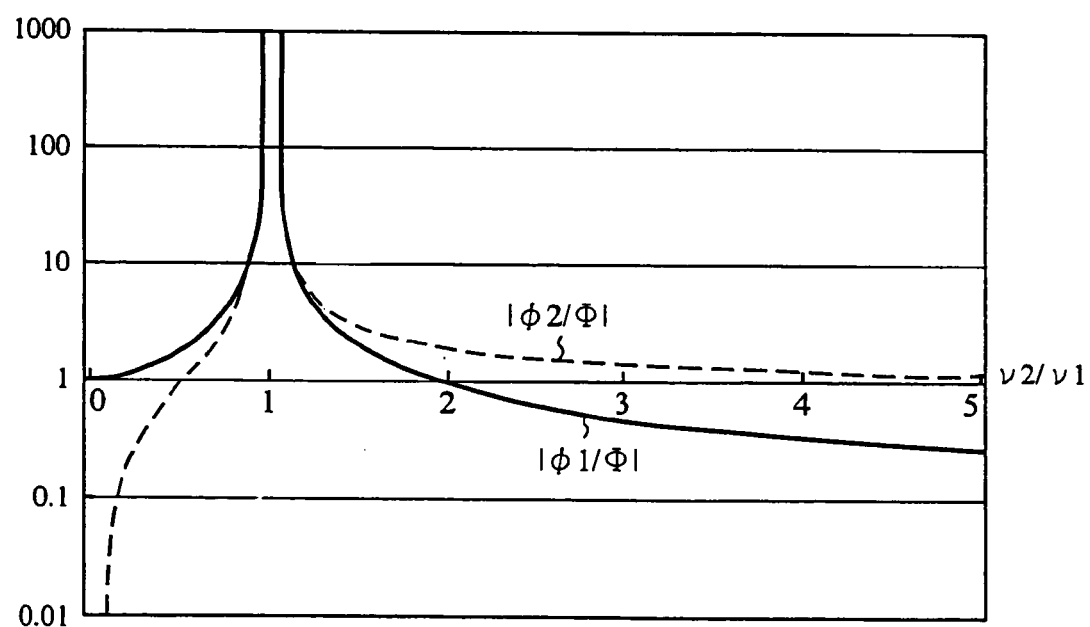
FIG. 18 is a diagram showing how powers of positive and negative lenses change relative to the rate of their Abbe's number.

In FIG. 18 there are shown variations in the absolute values of ($\phi 1/\Phi$) and ($\phi 2/\Phi$) for (v2/v1) when Equations (2) and (3) are modified to the following Equations (4) and (5), respectively.

$$\phi 1/\Phi = 1/[1-(v2/v1)] \qquad (4)$$

$$\phi 2/\Phi = -(v2/v1)/[1-(v2/v1)] \qquad (5)$$

In FIG. 18, the abscissa represent (v2/v1) and the ordinate represents absolute values of Equations (4) and (5), |$\phi 1/\Phi$| and |$\phi 2/\Phi$|. It is apparent from FIG. 18 that as (v2/v1) approaches the value 1, the powers $\phi 1$ and $\phi 2$ of the positive and negative lenses 48A and 48B increase.

It is possible to further satisfy the Petzval's condition by increasing the powers of the positive and negative lenses 48A and 48B through utilization of the above. That is, the Abbe's numbers v1 and v2 of the positive and negative lenses 48A and 48B are set to values close to each other by increasing the refractive index n1 of the positive lens 48A and decreasing the refractive index n2 of the negative lens 48B.

For example, setting the refractive indexes of the positive and negative lenses 48A and 48B to n1=n2=1.6 and their Abbe's numbers to ν1=50 and ν2=30 and assuming that the combined power Φ=1 in Equations (2) and (3), φ1=50/(50−30)=2.5 and φ2=−30/(50−30)=−1.5; the Petzval's sum of refracting optical lens 48 at this time is P1+P2=(2.5/1.6)+(−1.5/1.6)=0.625.

The refractive index of the positive lens 48A is increased and the refractive index of the negative lens 48B is decreased so that the Petzval's condition is approached from the above state. For example, when the refractive index of the positive lens 48A is set larger than the refractive index of the negative lens 48B such that n1=1.8 and n2=1.6, the Petzval's sum is P1+P2=(2.5/1.8)+(−1.5/1.6)=0.4514; that is, the Petzval's sum is closer to a negative value than that before the refractive indexes n1 and n2 are changed, and the Petzval's sum is improved accordingly.

Then, the Abbe's numbers ν1 and ν2 of the positive and negative lenses 48A and 48B are set to values close to each other. For example, when the Abbe's numbers are set to ν1=45 and ν2=43 so that their difference ν1−ν2 is small, φ1=45/(45−43)=22.5 and φ2=−43/(45−43)=−21.5 (assume that Φ=1) from Equations (2) and (3), and the Petzval's sum P1+P2=(22.5/1.8)+(−21.5/1.6)=−0.9375; thus, the Petzval's sum P1+P2 of the refracting optical lens 48 can be made negative. Accordingly, the Petzval's sum P in FIG. 17, containing the aspherical convex mirror 41, can be made to approach zero, permitting reduction of the curvature of field.

As described above, this embodiment uses the refracting optical lens 48 composed of the positive lens 48A of positive power and the negative lens 48B of negative power, the refracting index of the former being made larger than the refractive index of the latter and their Abbe's numbers being set to values close to each other. With such a refracting optical lens 48, it is possible to correct for distortion and satisfy the Petzval's condition to correct for the curvature of field.

While in the above the refracting optical lens 48 has been described as being applied to the image display device of FIG. 13(a), this embodiment is not limited specifically thereto but may be applied as well to the other device configurations of Embodiment 4.

Embodiment 6

A sixth embodiment (Embodiment 6) of the present invention generates an over curvature of field by a refracting optical lens to correct for the curvature of field that occurs in the aspherical convex mirror.

Figure 19A:
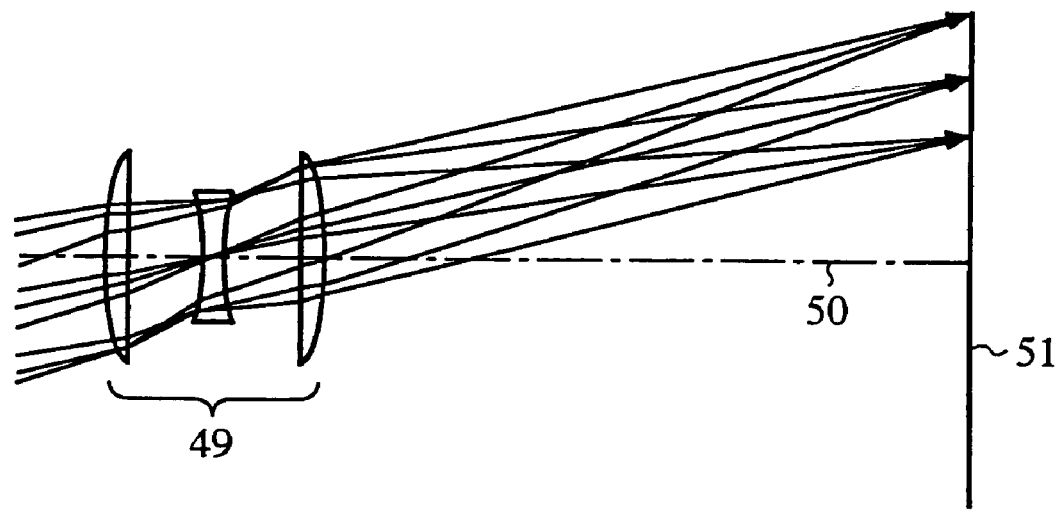
FIG. 19 is a diagram for explaining an under curvature of field that occurs in an aspherical convex mirror.

FIG. 19 is explanatory of an under curvature of field that occurs in the aspherical convex mirror. In FIG. 19(a), reference numeral 49 denotes a refracting optical lens; 50 denotes the optical axis of the refracting optical lens 49; and 51 denotes a plane perpendicular to the optical axis 50. Light having passed through the refracting optical lens 49 forms an image on the plane 51. In FIG. 19(a) a flat image is obtained.

When light is projected onto the aspherical convex mirror of Embodiment 4 through the refracting optical lens 49, the best image surface is curved with its concavity toward the projecting optical system due to an under curvature of field that occurs in the aspherical convex mirror.

Figure 19B:
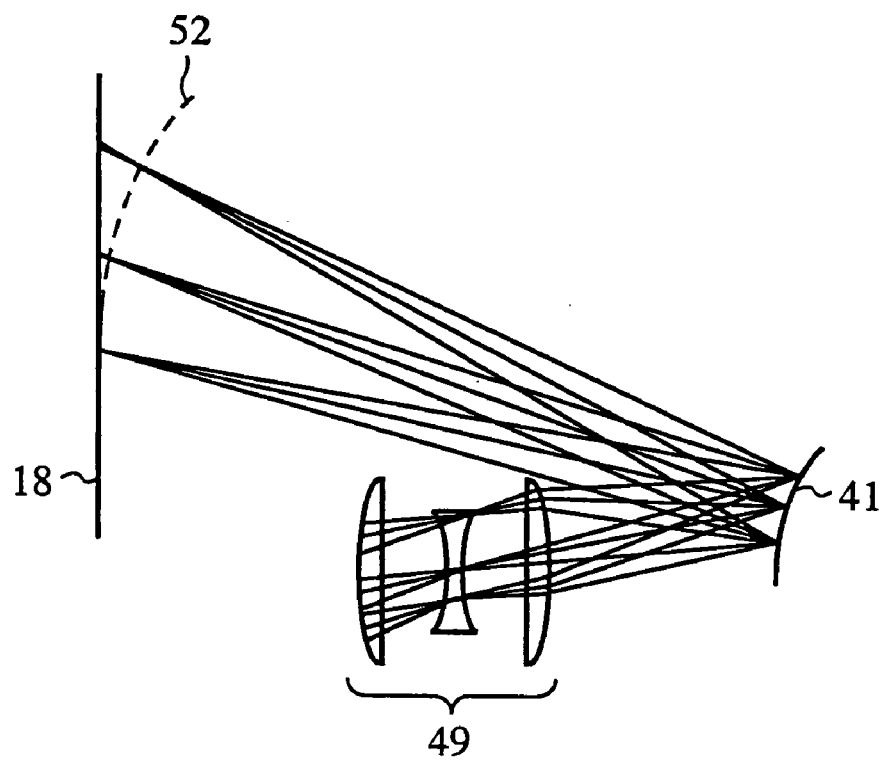

For example, when light is emitted from the refracting optical lens 49 to the aspherical convex mirror 41 as depicted in FIG. 19(b), the reflected light undergoes curvature of field as indicated by an image surface 52, resulting in a blurred image being displayed on the screen 18. To correct for the under curvature of field by the aspherical convex mirror 41, the refracting optical system is used to provide an over curvature of field to flatten the projected image surface.

Figure 20:
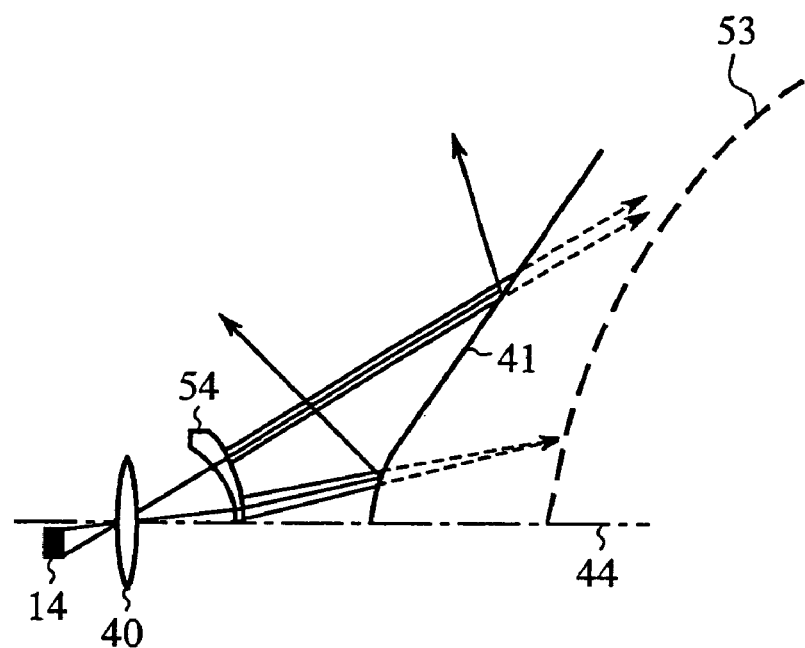
FIG. 20 is a diagram depicting the configuration of an image display device according to a sixth embodiment of the present invention.

That is, as depicted in FIG. 20, an image surface 53 having an over curvature of field such that the focal length increases with distance from the optical axis 44 is provided by a refracting optical lens (projecting optical means, a refracting optical part, a curvature of field correcting lens) 54 interposed between the micro-mirror device 14 and the aspherical convex mirror 41, thereby canceling the over curvature of field by the refracting optical lens 54 and the under curvature of field by the aspherical convex mirror 41. As a result, it is possible to correct for the under curvature of field by the aspherical convex mirror 41 used for correcting for distortion and hence display a distortion-free image with no curvature of field.

The configuration of the refracting surface of the refracting optical lens 54 can be optimized through numerical calculations for ray tracing by a computer.

Further, the results of numerical calculations for ray tracing have revealed that an aspherical optical element effectively reduces the distortion at the place where the principal rays are divergent and the curvature of field at the place where the principal rays are convergent. This will be described below in respect of FIG. 21.

Figure 21:
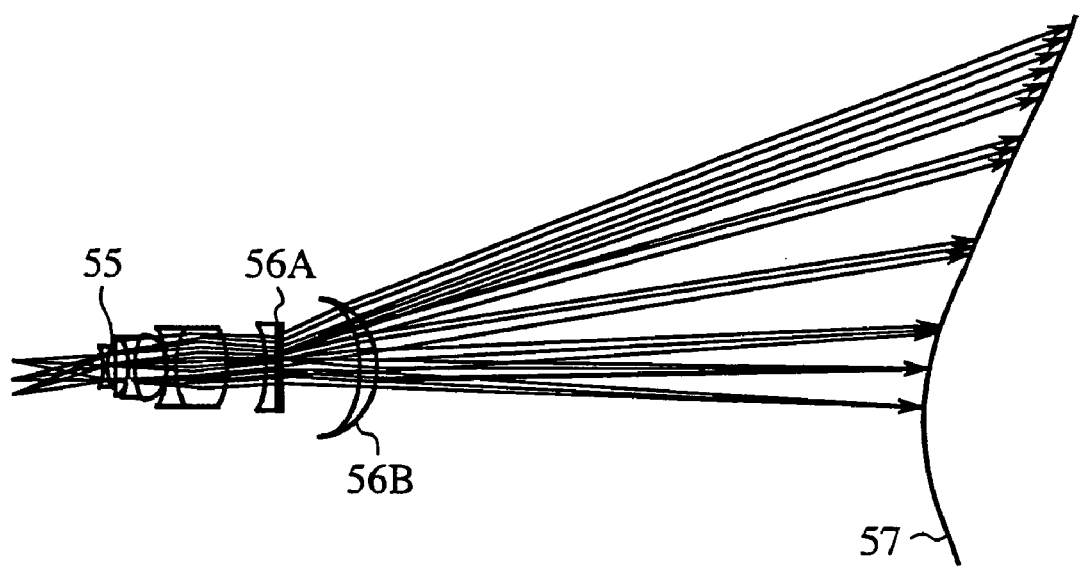
FIG. 21 is a diagram showing the case where aspherical lenses are disposed at places where rays are convergent and divergent.

FIG. 21 shows the results of numerical calculations for ray tracing. An aspherical lens (projecting optical means, a refracting optical part, an aspherical optical element) 55 is placed at the position where the rays from the micro-mirror device 14 (not shown) are convergent, aspherical lenses (projecting optical means, a refracting optical part, aspherical optical elements) 56A and 56B are placed at the position where rays from the asperical lens 55 diverge, and an aspherical convex mirror (projecting optical means, a reflecting part, an aspherical optical element) 57 is placed at the position where rays from the aspherical lens 56B diverge; the light reflected by the aspherical convex mirror 57 is projected onto the screen 18. The aspherical lens 55 effectively reduces curvature of field, whereas the aspherical lenses 56A and 56B and the aspherical convex mirror 57 effectively reduce distortion.

<Numerical Value Example 6A>

FIG. 22 is a table showing, by way of example, the results of numerical calculations in FIG. 21. The aspherical surfaces used in FIG. 22 are defined by the Equations (6) and (7) given below, where z is the amount of sag from a tangent plane passing through the center of rotation of an optical plane, c the curvature at a surface apex (an inverse of the radius of curvature), k is a conic coefficient and r is the distance from the z axis. Incidentally, specifications in FIG. 22 are f=5.57 mm (the focal length at a wavelength of 546.1 nm), NA=0.17 (the numerical aperture on the side of the micro-mirror device), Yob=14.22 mm (the object height at the side of the micro-mirror device) and M=86.3×(the magnification of projection).

$$z = cr^2/[1+\{1-(1+k)c^2r^2\}^{0.5}] + Ar^4+Br^6+Cr^8+Dr^{10}+Er^{12}+Fr^{14}+Gr^{16}+Hr^{18}+Jr^{20} \quad (6)$$

$$z = cr^2/[1+\{1-(1+k)c^2r^2\}^{0.5}] + AR1r+AR2r^2+AR3r^3+\ldots + ARnr^n+\ldots+AR30r^{30} \quad (7)$$

As described above, this embodiment uses the refracting optical lens 54 to provide the over curvature of field that cancels the under curvature of field by the aspherical convex mirror 41; hence, it is possible to display an image corrected for curvature of field as well as distortion.

Further, this embodiment effectively reduces curvature of field at the position where principal rays are convergent and distortion at the position where the principal rays are divergent, by placing aspherical optical elements at such positions, respectively.

The refracting optical lens 54 may be applied as well to the other aspherical convex mirrors in Embodiment 4.

Embodiment 7

Figure 23B:
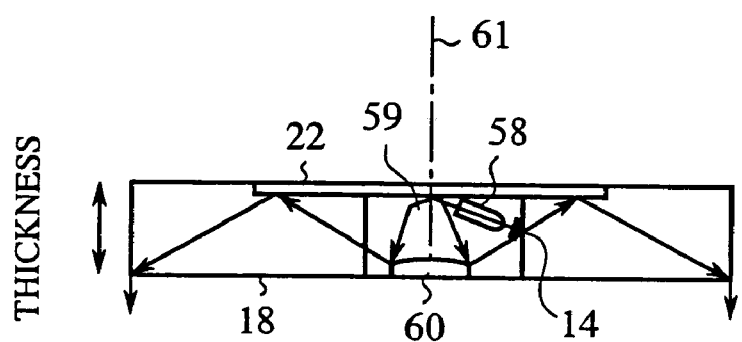
FIG. 23 is a diagram depicting the configuration of an image display device according to a seventh embodiment of the present invention.
Figures 23A, 23C:
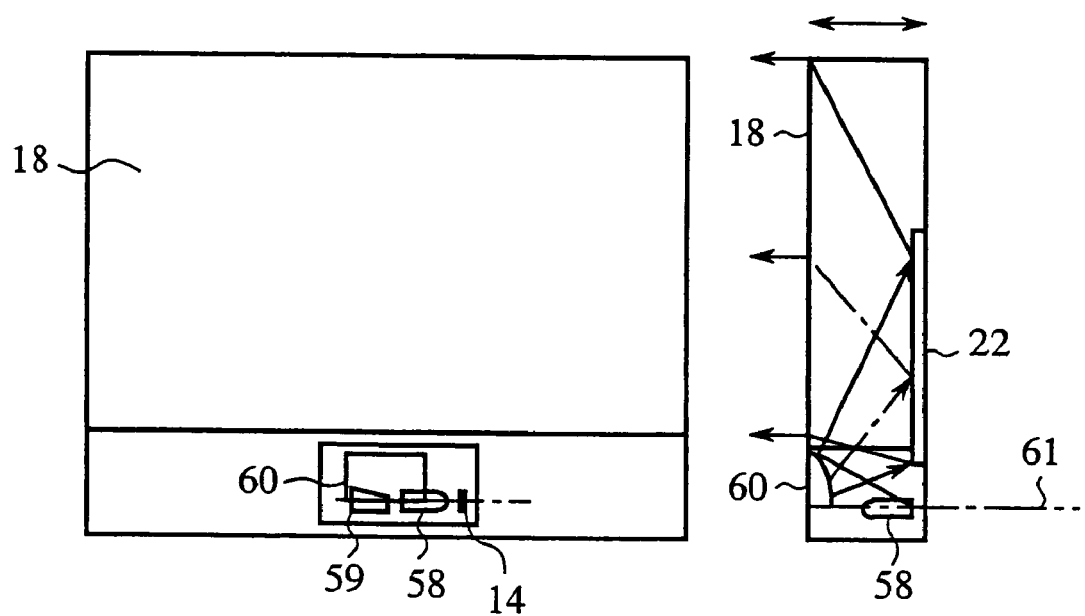

FIGS. 23(a), (b) and (c) are front, top plan and side views of an image display device according to a seventh embodiment (Embodiment 7) of the present invention. Reference numeral 58 denotes a refracting optical lens (projecting optical means, a refracting optical part) that transmits light from the micro-mirror device 14 and corresponds to the refracting optical lens described in respect of the embodiments described above. Reference numeral 59 denotes an path-bending reflector (optical path bending means) for reflecting the light from the refracting optical lens 58; 60 a convex mirror of negative power (projecting optical means, a reflecting part), which is the same convex mirror as those described in the preceding embodiments; 61 denotes the optical axis of the convex mirror 60. For brevity sake, no illumination light source is shown.

The refractive optical lens 58 and the convex mirror 60 are common in optical axis. To provide the illustrated configuration, the path-bending reflector 59 is used to bend the optical axis through an appropriate angle in the horizontal plane containing the optical axis 61 of the convex mirror 60. In other words, the optical axis of the refracting optical lens 58, initially coincident with the optical axis of the convex mirror 60, it turned about the normal to the horizontal plane containing the optical axis 61 of the convex mirror 60 until a proper azimuth is reached. In this way, the refracting optical lens 58 is placed in an empty space of the image display device.

In FIG. 23, the light from the micro-mirror device 14, having passed through the refracting optical lens 58, is reflected first by the path-bending reflector 59 toward the convex mirror 60, and the light reflected by the convex mirror 60 is reflected by the plane mirror 22 referred to previously with respect to Embodiment 1, thereby performing a wide-angle projection onto the screen 18. In particular, the parallel arrangement of the reflecting surface of the plane mirror 22 and the light receiving surface (or an image display surface) of the screen 18 minimizes the depth dimension of the image display device. The point of this embodiment lies in an arrangement in which the light from the refracting optical lens 58 placed in an empty space of the image display device is reflected by the path-bending reflector 59 to the convex mirror 60. Since the refracting optical lens 58 and an illumination light source system (not shown) can be disposed in the empty space, the depth dimension of the image display device can be reduced.

Figure 24B:
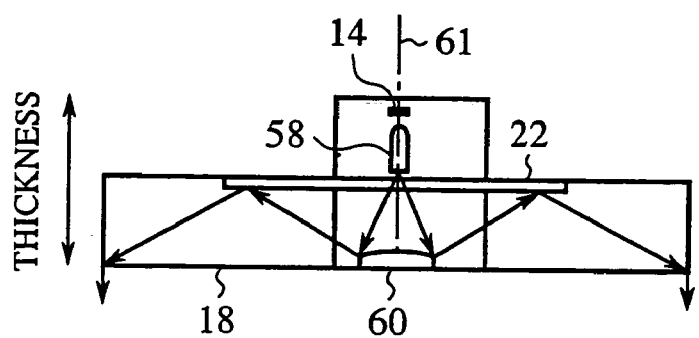
FIG. 24 is a diagram for explaining an effect of the image display device of FIG. 23.
Figure 24A:
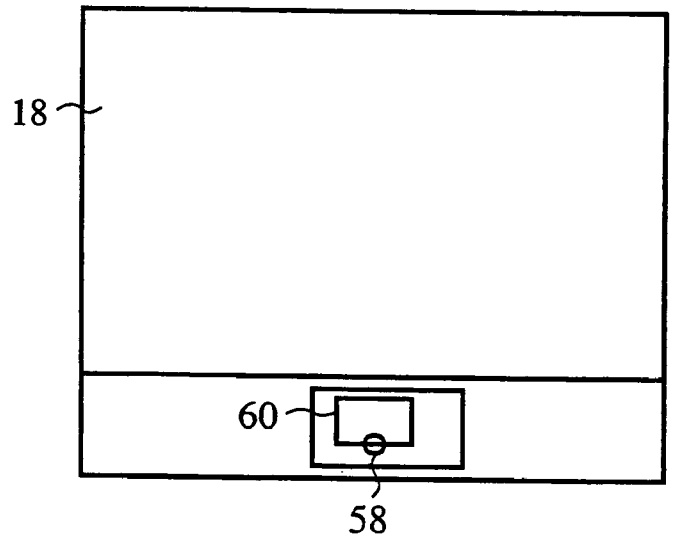
Figure 24C:
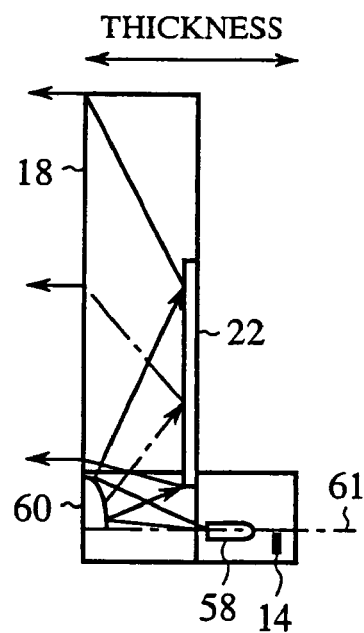
Figure 25B:
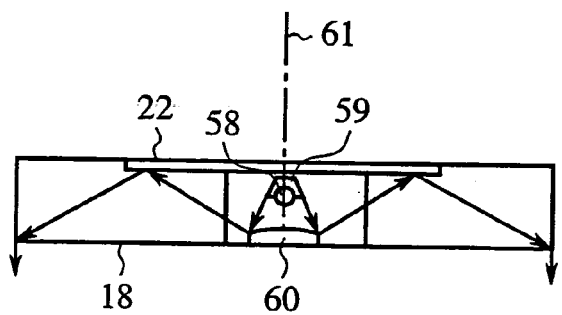
FIG. 25 is a diagram for explaining another effect of the image display device of FIG. 23.
Figure 25A:
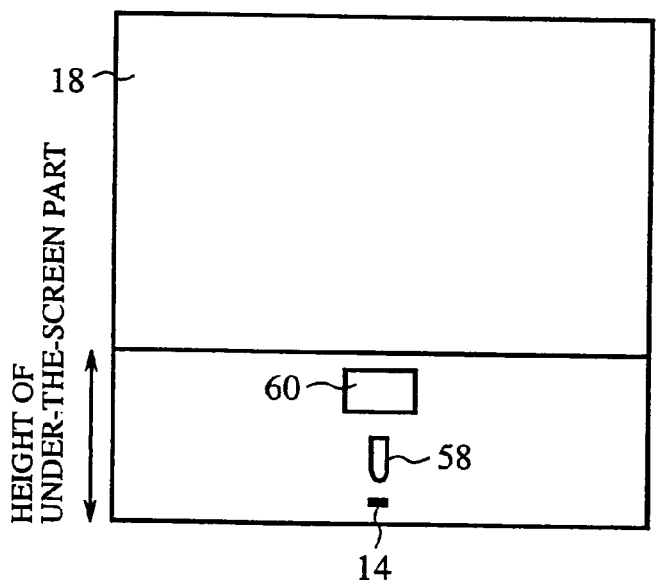
Figure 25C:
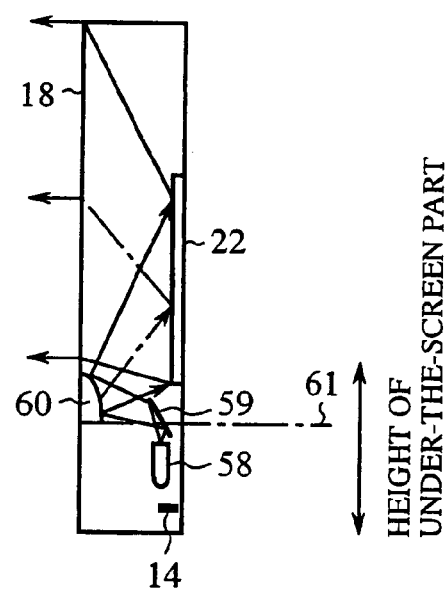

The effect of the path-bending reflector 59 will be seen from comparison of FIG. 23 with FIGS. 24 and 25.

In FIG. 24, since the path-bending reflector 59 is not used, the light having passed through the refracting optical lens 58 strikes directly on the convex mirror 60—this requires the micro-mirror device 14 and the refracting optical lens 58 to be placed at the positions defined by the screen 18, the plane mirror 22 and the convex mirror 60, inevitably making the display device thicker than that of FIG. 23.

In FIG. 25, the path-bending reflector 59 is provided, but since the optical axis of the refracting optical lens 58 is bent in a plane other than the horizontal plane containing the optical axis of the convex mirror 60, it is necessary that the refracting optical lens 58, the micro-mirror device 14 and the illumination light source system (not shown) be disposed below the convex mirror 60, inevitably making the height of the under-the-screen portion larger than in the image display device of FIG. 23.

In FIG. 23, since the light from the refracting optical lens 58 disposed in the empty space is reflected by the path-bending reflector 59 to the convex mirror 60, the depth dimension of the image display device can be further reduced and the height of the under-the-screen portion can be decreased.

It is also possible to use the path-bending reflector in a refracting optical lens (projecting optical means, a refracting optical part) composed of a plurality of lenses, though not shown. That is, the path-bending reflector is inserted between first and second lens means forming the refracting optical lens so that the path-bending reflector transmits the light between the two lenses through reflection. The first and second lens means are each formed by at least one refracting optical lens. In this instance, since the optical axes of the first and second lens means need not be coincident, the refracting optical lens can be formed by bending two optical axes. This also reduces the depth dimension of the image display device as in the case of FIG. 23.

When the refracting optical lens is formed by a pluralty of lenses, a plurality of path-bending reflectors can be used according to the number of lenses used.

Moreover, an path-bending reflector for reflecting light from the refracting optical lens to the convex mirror and an path-bending reflector for reflecting light from an arbitrary lens of the refracting optical lens to a different lens may be combined; this can be designed according to the specifications of the image display device.

As described above, according to this embodiment, since the optical axis of the refracting optical lens 58 is bent, by the path-bending reflector 59, through an appropriate angle in the horizontal plane containing the optical axis 61 of the convex mirror 60 so that the light from the refracting optical lens 58 is reflected to the convex mirror 60, the refracting optical lens 58 and the illumination light source system can be disposed in the empty space of the image display device. Hence, the depth dimension of the image display device can be further decreased and the height of the part under the screen can be made small.

Further, according to this embodiment, since the path-bending reflector is used by which the light from the first lens means forming the refracting optical lens is reflected to the second lens means, the refracting optical lens can be formed by bending the optical axes of the first and second lens means. Hence, the depth dimension of the image display device can be further reduced and the height of the under-the-screen portion can be made small.

Incidentally, this embodiment is applicable to Embodiments 1 to 6.

Embodiment 8

As described previously in connection with Embodiment 6, the optimum optical system configuration for attaining the objective of the present invention can be obtained concretely through numerical calculations for ray tracing by a computer.

Figure 26:
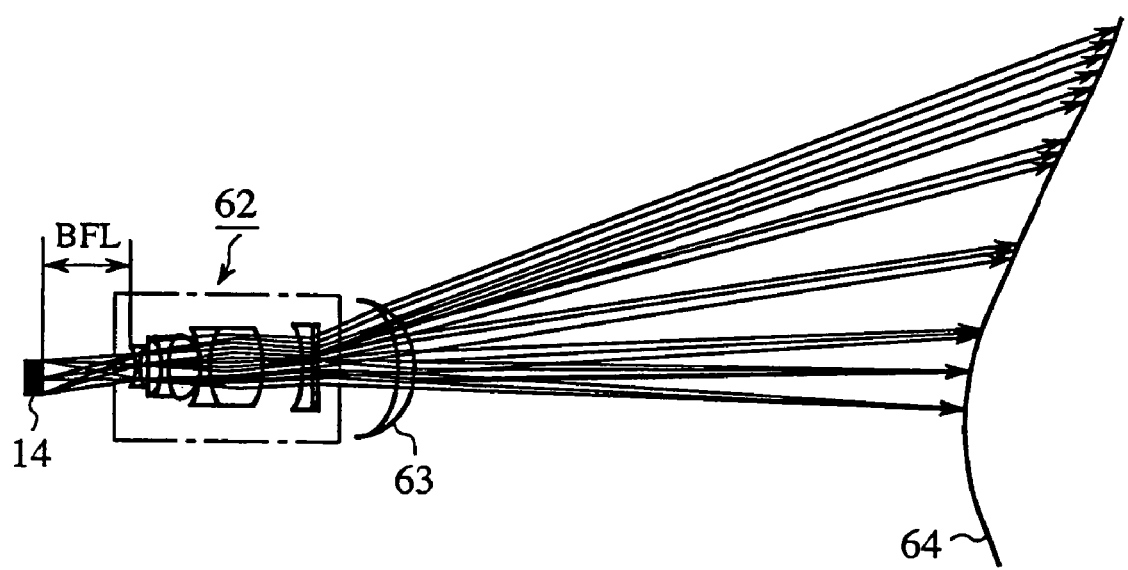
FIG. 26 is a diagram depicting the configuration of an image display device according to an eighth embodiment of the present invention.

FIG. 26 is a diagram illustrating the configuration of an image display device according to an eighth embodiment (Embodiment 8) of the present invention, which utilizes the numerical values (numerical value example 6A) shown in FIG. 21. Reference numeral 14 denotes a micro-mirror device; 62 denotes a retro-focus optical system (projecting optical means, a refracting optical part) formed by positive lenses of positive power and negative lenses of negative power; 63 denotes a refracting optical lens (projecting optical means, a refracting optical part) for making fine adjustments to the angle of emission of light; and 64 denotes an aspherical convex mirror (projecting optical means, a reflecting part) for reflecting the light from the refracting optical lens 63 to correct for distortion. For brevity sake, the illumination light source part and the screen are not shown.

The light from the micro-mirror device 14 passes through the retro-focus optical system 62 and is transmitted by the refracting optical lens 63 to the convex mirror 64, thereafter being projected onto the screen (no shown). The retro-focus optical system 62 has light-gathering power and, at the same time, assists widening of the field angle of the ray to be projected onto the screen. The refracting optical lens 63 corrects for the distortion uncorrected for by the aspherical convex mirror 64. The retro-focus optical system 62 and the refracting optical lens 63 include the various refracting optical lenses referred to in the embodiments described previously.

Figure 27A:
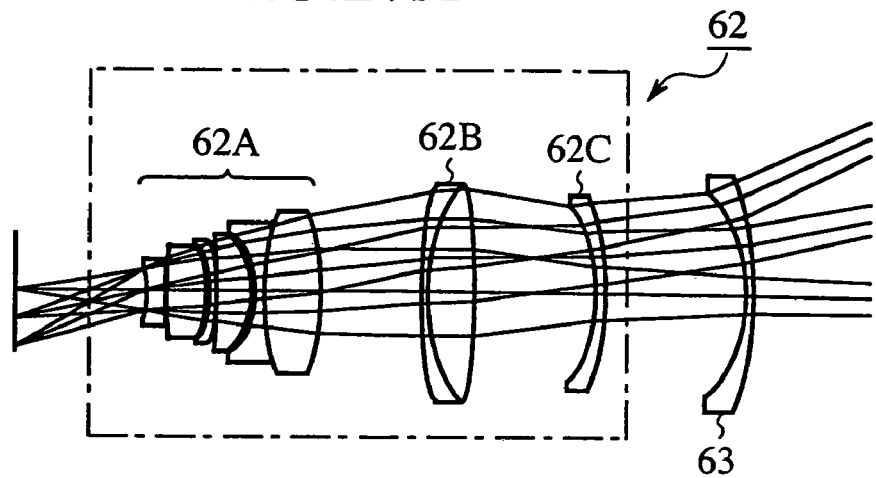
FIG. 27 is a diagram depicting a retro-focus optical system.
Figure 27B:
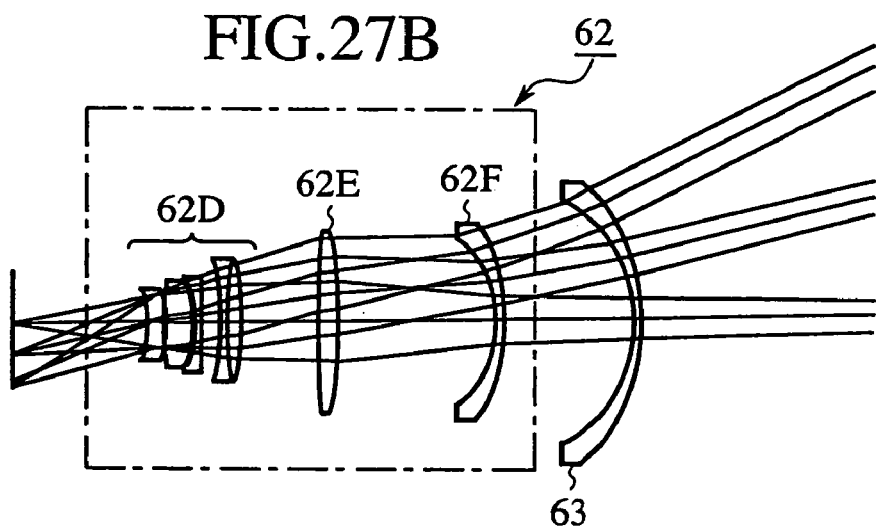
Figure 27C:
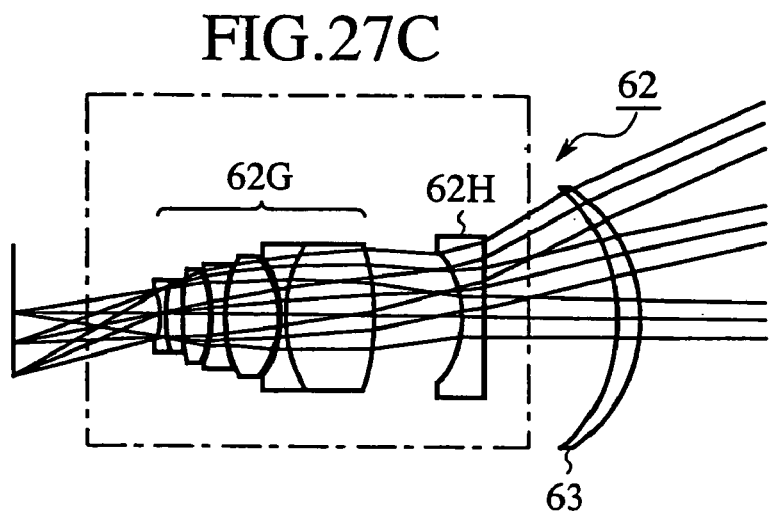

More specifically, the retro-focus optical system 62 is composed of two positive lens groups 62A and 62B and one negative lens group 62C as depicted in FIG. 27(*a*), two positive lens groups 62D and 62E and one negative lens group 62F as depicted in FIG. 27(*b*), or one positive lens group 62G and one negative lens group 62H as depicted in FIG. 27(*c*).

The above configurations are those obtained through numerical calculations to attain the objective of the present invention, and it will readily be understood by conducting again numerical calculations based on the results of numerical calculations shown in respective numerical value examples that the above configuration suppress distortion and curvature of field and reduces the depth dimension of the image display device. Concrete results of numerical calculations are shown below in Numerical Value Examples 8A, 8B and 8C.

<Numerical Value Example 8A>

Figure 29:
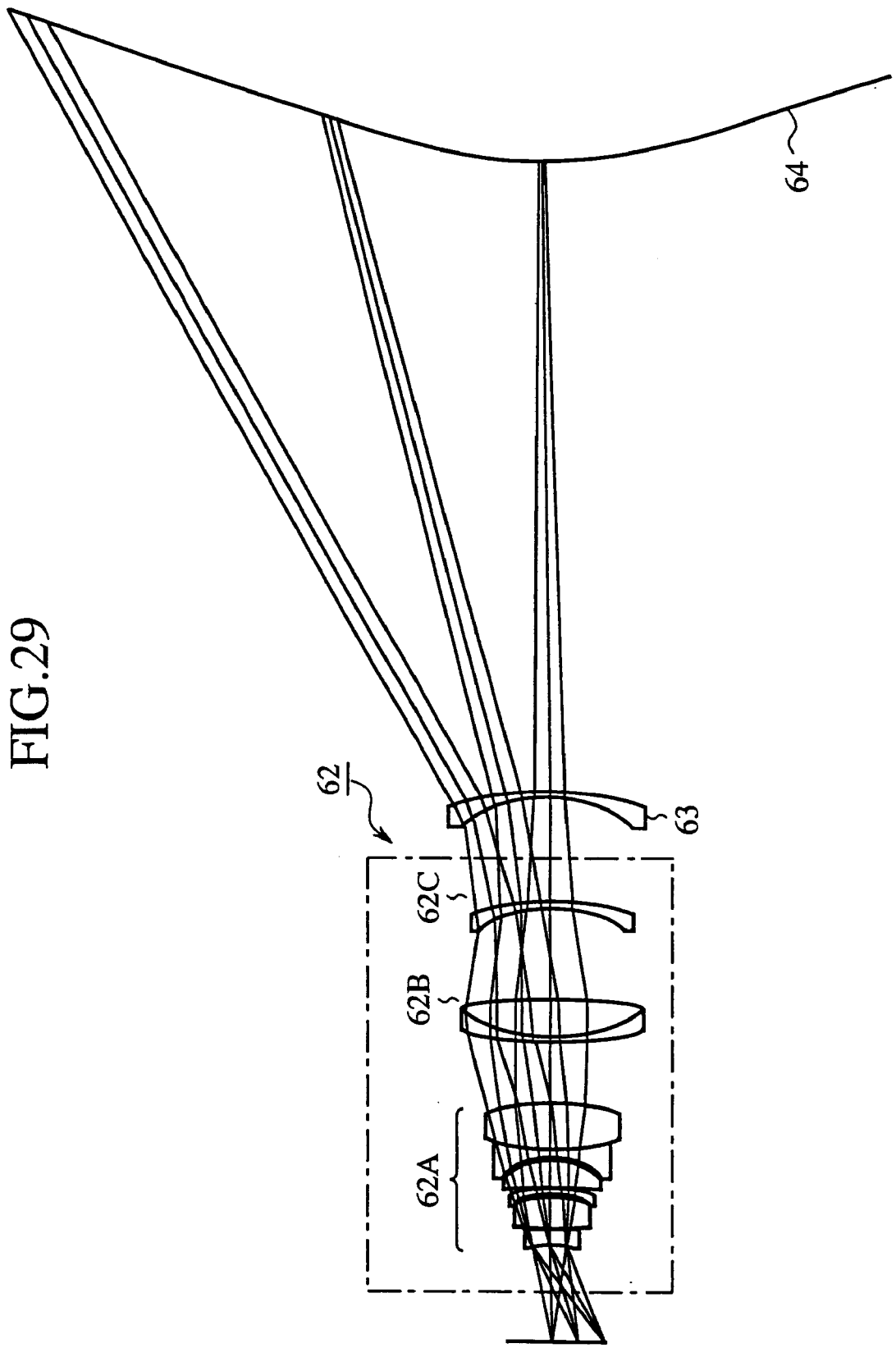
FIG. 29 is a diagram depicting a configuration based on Numerical Value Example 8A.

FIGS. 28 and 29 are a table showing numerical data of Numerical Value Example 8A and the device configuration based on the numerical data, respectively. FIG. 29 corresponds to FIG. 27(*a*). The positive lens group 62B is an achromatic lens composed of positive and negative lenses.

<Numerical Value Example 8>

Figure 31:
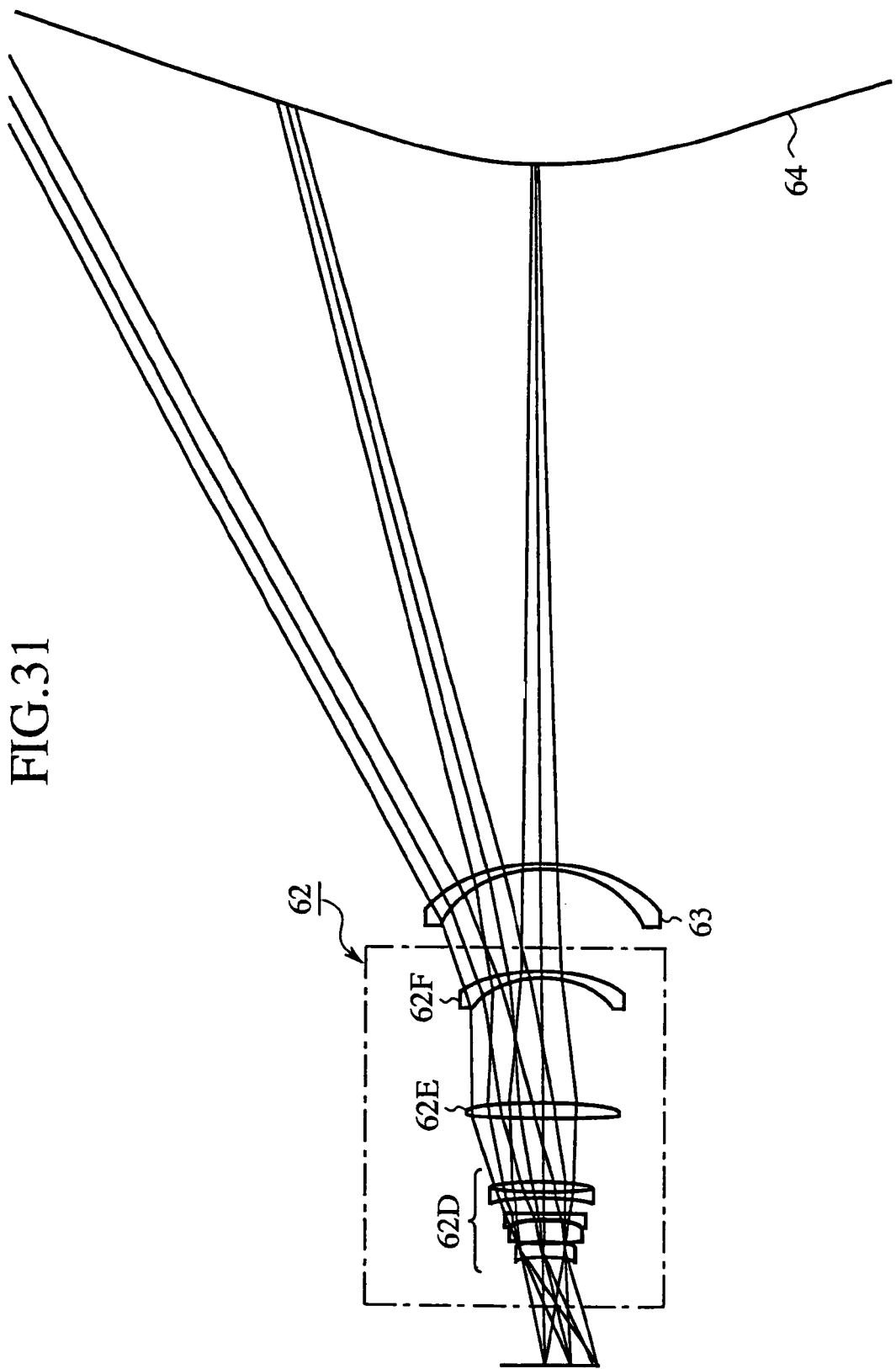
FIG. 31 is a diagram depicting a configuration based on Numerical Value Example 8B.

FIGS. 30 and 31 are a table showing numerical data of Numerical Value Example 8B and the device configuration based on the numerical data, respectively. FIG. 31 corresponds to FIG. 27(*b*). The positive lens group 62E is formed by one lens.

<Numerical Value Example 8C>

Figure 33:
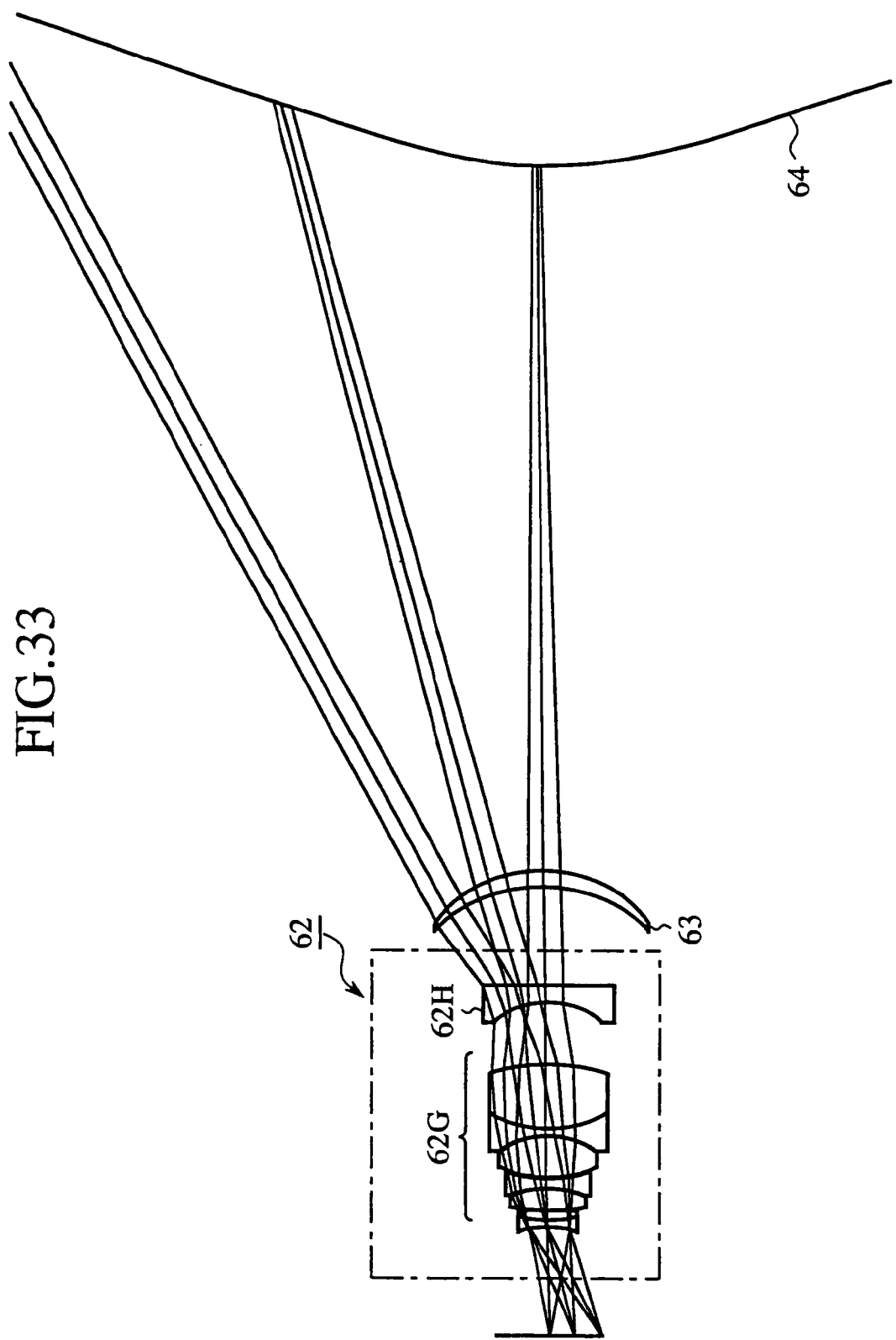
FIG. 33 is a diagram depicting a configuration based on Numerical Value Example 8C.

FIGS. 32 and 33 are a table showing numerical data of Numerical Value Example 8C and the device configuration based on the numerical data, respectively. FIG. 33 corresponds to FIG. 27(*c*).

Figure 39:
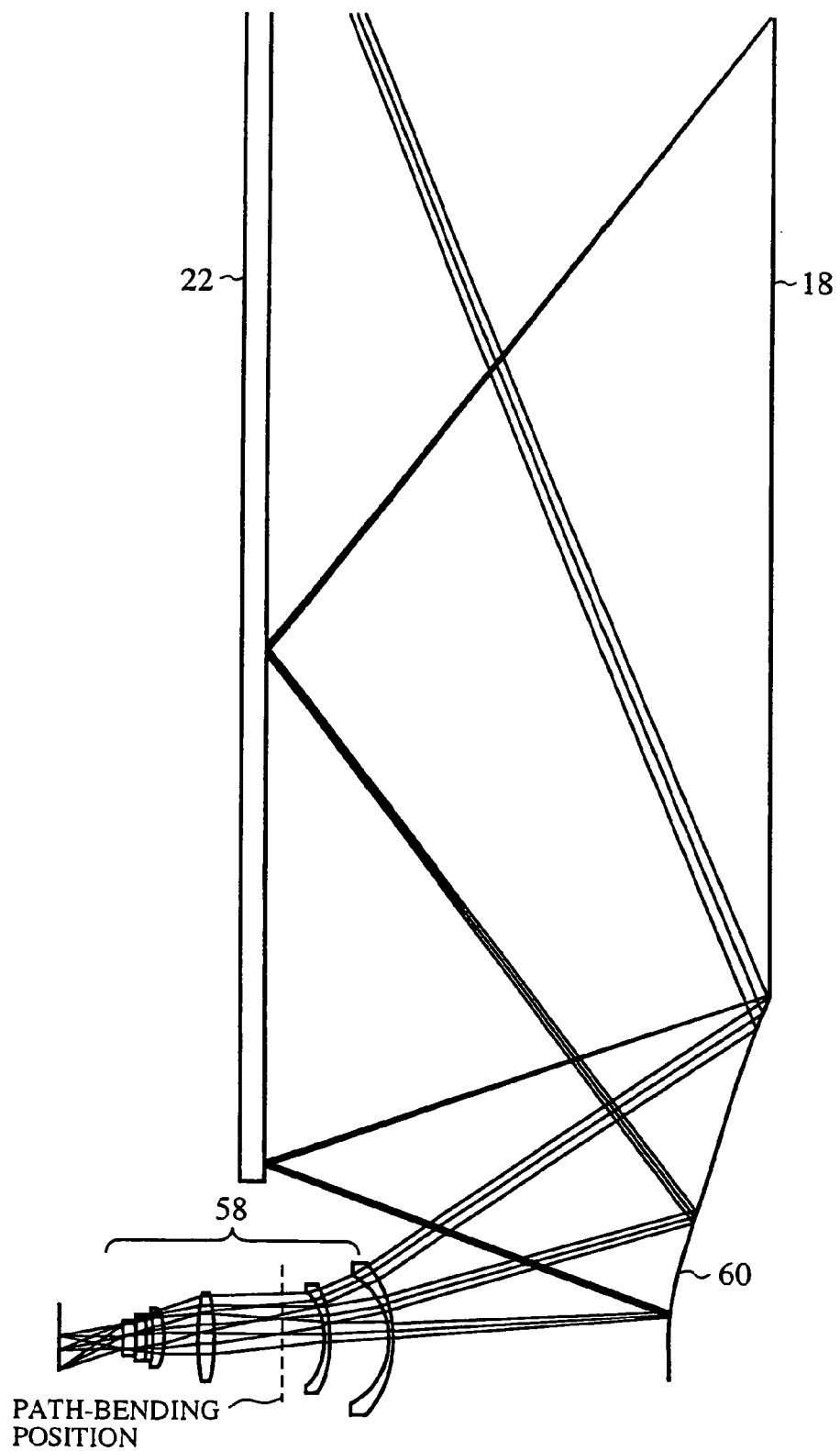
FIG. 39 is a diagram depicting a configuration based on Numerical Value Example 7A.

FIGS. 34 to 37 show Numerical Value Examples 4A and 4B related to Embodiment 4, and FIGS. 38 and 39 show Numerical Value Example 7A related to Embodiment 7.

<Numerical Value Examples 4A & 4B>

Figure 35:
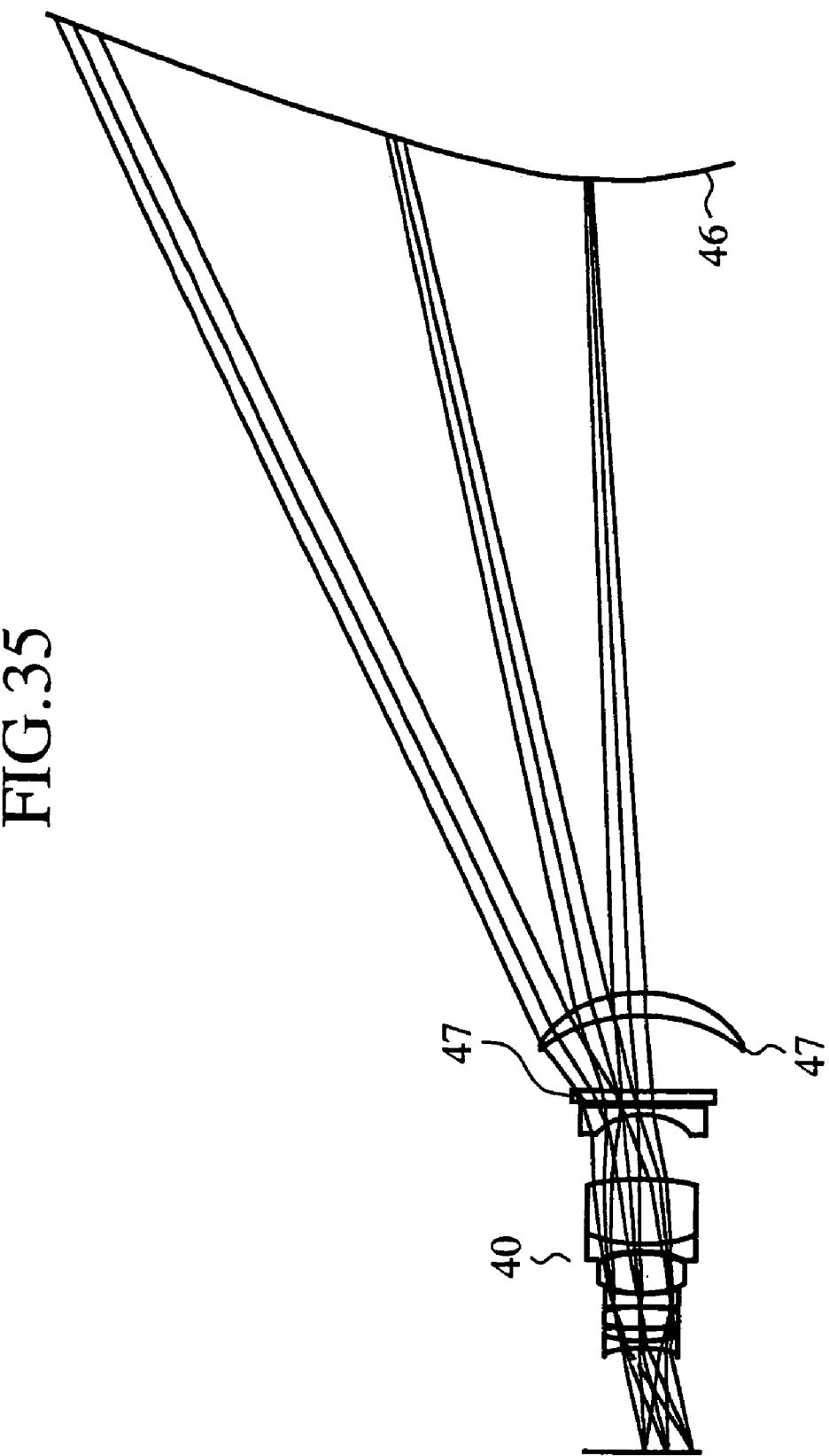
FIG. 35 is a diagram depicting a configuration based on Numerical Value Example 4A.
Figure 37:
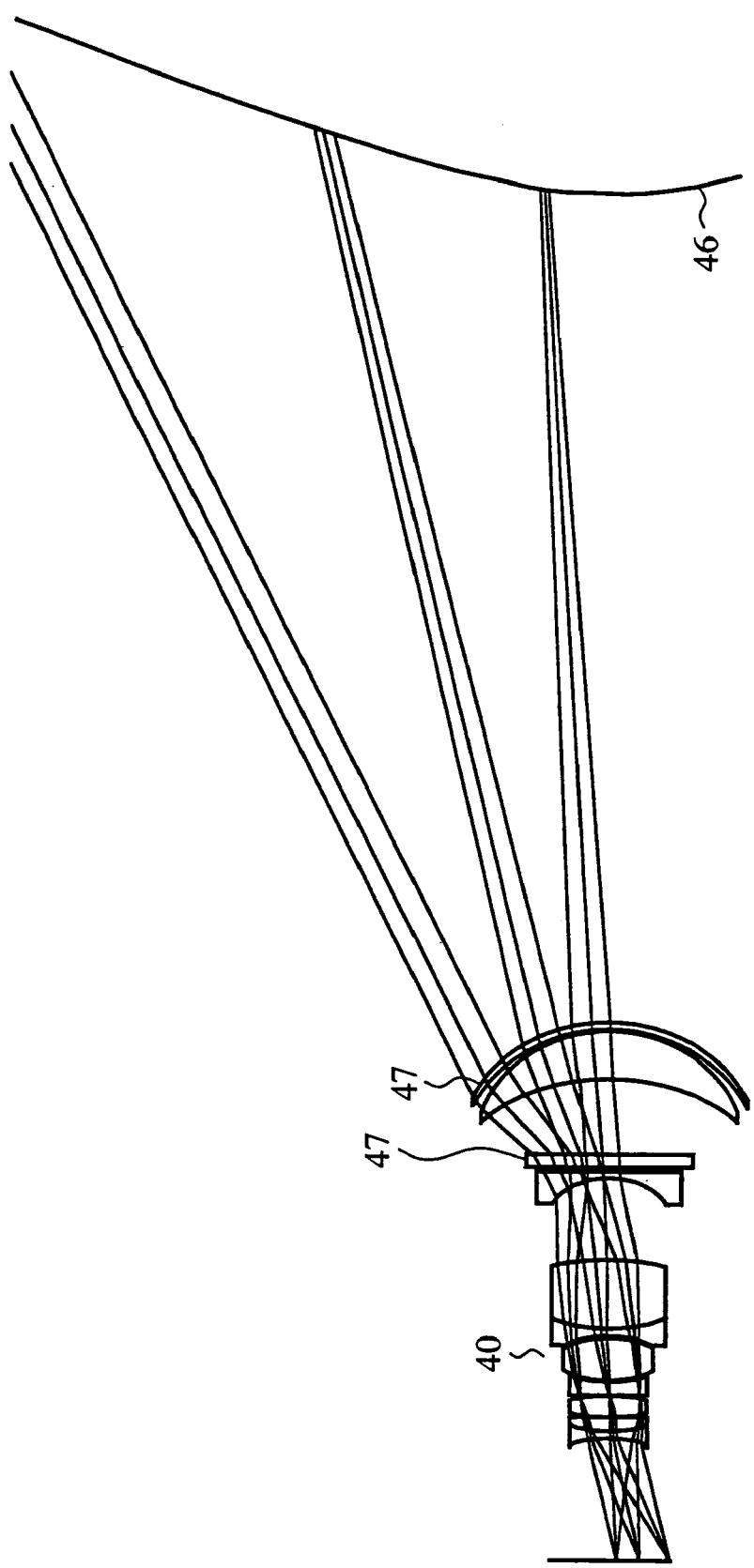
FIG. 37 is a diagram depicting a configuration based on Numerical Value Example 4B.

FIGS. 34 and 35 are a table showing numerical data of Numerical Value Example 4A and the device configuration based on the numerical data, respectively. FIGS. 36 and 37 are a table showing numerical data of Numerical Value Example 4B and the device configuration based on the numerical data, respectively. Either of them corresponds to Embodiment 4, in which that one of the two aspherical lenses 47 near the aspherical convex mirror 46 is made of acrylic resin and the other aspherical lens on the side opposite the aspherical convex mirror 46 is made of polycarbonate.

In general, the temperature coefficients of refractive index and coefficient of linear expansion of plastic materials are two orders of magnitude greater than those of glass. Accordingly, special consideration must be given to the usage when they are used in an environment of large temperature variations. In particular, in Numerical Value Example 4B the two aspherical lenses 47 have their central and peripheral portions formed substantially equal in thickness with a view to reducing the influence of a temperature change on the configuration of the aspherical lenses 47.

<Numerical Value Example 7A>

FIGS. 38 and 39 are a table showing numerical data of Numerical Value Example 7A and the device configuration based on the numerical data, respectively. This example corresponds to Embodiment 7 and is intended to reduce the depth dimension of the display device by placing the path-bending mirror at the position indicated by the broken line.

Incidentally, specifications and equations for calculating the aspherical configurations in all of the above numerical value examples are the same as in the case of Numerical Value Example 6A except the value of the focal length f at the 546.1 nm wavelength. Listed below is the focal lengths f in the respective numerical value examples.

4A: f=5.3881 mm
4B: f=4.9898 mm
7A: f=4.8675 mm
8A: f=5.2190 mm
8B: f=5.0496 mm
8C: f=5.5768 mm

The verification of the numerical data shown in the above numerical value examples reveals that the lenses of the retro-focus optical system 62 have such features as listed below.

(Feature 1) The average value, ave_Nn, of refractive index of the negative lenses and the average value, ave_Np, of refractive indexes of the positive lenses are $1.45 \leq \text{ave\_Nn} \leq 1.722$ and $1.722 < \text{ave\_Np} \leq 1.9$, respectively.

(Feature 2) The average value, ave_vdn, of Abbe's number of the negative lenses and the average value, ave_vdp, of Abbe's number of the positive lenses are $25 \leq \text{ave\_vdn} \leq 38$ and $38 < \text{ave\_vdp} \leq 60$, respectively.

(Feature 3) The difference, dif_ave_N, between the average values of the refractive indexes of glass materials for the positive lenses and the negative lenses is $0.04 \leq \text{dif\_ave\_N} \leq 1$.

(Feature 4) The difference, dif_ave_vd, between the average values of the Abbe's number of the glass materials for the positive and negative lenses is $0 \leq \text{dif\_ave\_vd} \leq 16$.

Features 1 and 2 correspond to the case where the refractive index of the positive lens 48A and the refractive index of the negative lens 48B, which form the refracting optical lens 48 (a Petzval's sum correcting lens) in Embodiment 5, are set high and low, respectively. And materials of Abbe's number in the range of 70 to 90 are also commonly used for achromaticity use, but in the present invention the Abbe's number of the material used is smaller than 60 as will be seen from Feature 2.

The above is the results of numerical value examples obtained with numerical calculations for ray tracing by a computer.

In the present invention, since the micro-mirror device is placed off the common optical axis of the projecting optical system for oblique incidence thereon of light, care should be taken to prevent the effective bundle of rays from being decreased by shading of a portion of light as by a lens frame. With a view to avoid this shading of light, this embodiment employs the FIG. 26 configuration.

In FIG. 26, the back focal length (BFL), which is the distance from micro-mirror device 14 to the lens nearest it, and the distance from the micro-mirror device 14 to the position of an entrance pupil of the retro-focus optical system 62 are chosen to be equal to each other. This minimizes the shading of light, illuminating the screen with increased efficiency. The reason for this will be described below.

Figure 40A:
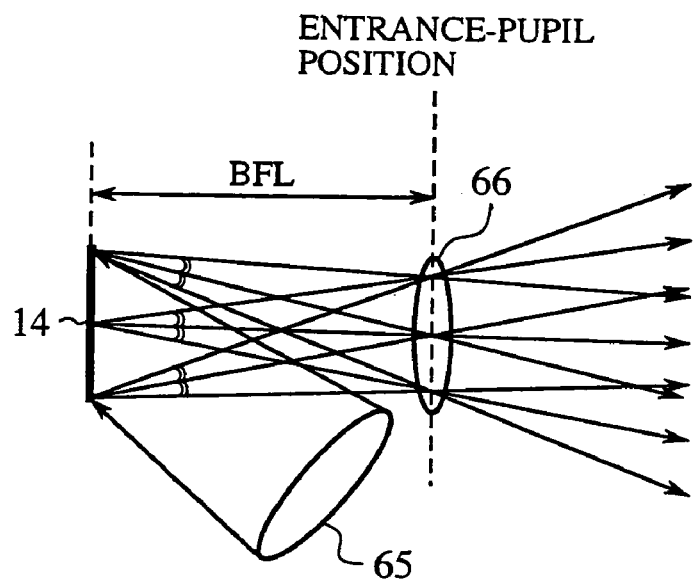
FIG. 40 is a diagram showing the relationships between a back focal length, an entrance-pupil position and a refracting optical lens.

Principal rays reflected off micro-mirrors of the micro-mirror device 14 converge at the position of entrance pupil. The spread angle of the reflected light from each micro-mirror is fixed; when the position of entrance pupil coincides with the back focal length as shown in FIG. 40(a), rays converge mostly on the entrance pupil plane. Hence, the diameter of a refracting optical lens 66 disposed on the entrance pupil plane can be minimized. In this instance, a refracting optical lens 65, which transmits light from the illumination light source (not shown) to the micro-mirror device 14, will not shade the light from the micro-mirror device 14 to the refracting optical lens 66.

Figure 40B:
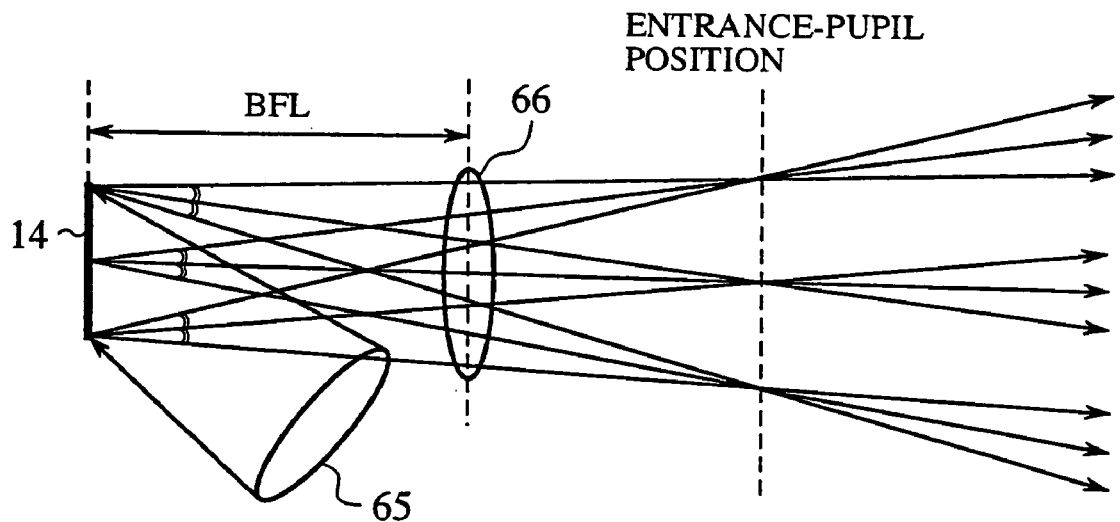

In contrast to the above, when the position of entrance pupil is shifted from the back focal plane with sizes and positions of the refracting optical lenses 65 and 66 and the micro-mirror device 14 held unchanged as depicted in FIG. 40(b), the principal rays from the respective micro-mirrors converge at the shifted position of entrance pupil. Since the spread angle of light is fixed, the rays on the entrance pupil plane 66 spread more than in the case of FIG. 40(a), and the diameter of the lens for receiving such light inevitably increases. And the light incident to the refracting optical lens 66 from the micro-mirror device 14 is shaded by the refracting optical lens 65. This leads to reduction of the effective bundle of rays, resulting in the illumination efficiency being impaired.

For the reasons given above, the distance from the micro-mirror device 14 to the position of entrance pupil is set to be equal to the back focal length—this minimizes the diameter of the refracting optical lens and suppresses shading of light, providing increased illumination efficiency. It is a matter of course to apply the above-described shading minimization scheme to the other embodiments as well. In Numerical Value Examples 4A and 4B the position of entrance pupil and the back focal length are virtually coincident; complete coincidence of them will provide the best results.

As described above, since this embodiment uses the retro-focus optical system 62 composed of positive and negative lens groups, the refracting optical lens 63 for making fine adjustments to the angle of emission of light and the aspherical convex mirror 64 for correcting for distortion, it is possible to suppress distortion and curvature of field, permitting reduction of the depth dimension of the image display device.

According to another aspect of this embodiment, the retro-focus optical system 62 is made up of the positive lens group 62A (62D), the positive lens group 62B (62E) and the negative lens group 62C (62F)—this also suppresses distortion and curvature of field, permitting reduction of the depth dimension of the image display device.

According to another aspect of this embodiment, the retro-focus optical system 62 is made up of the positive lens group 62G and the negative lens group 62H—this also suppresses distortion and curvature of field, permitting reduction of the depth dimension of the image display device.

According to another aspect of the present invention, the average refractive indexes of the negative and positive lenses are set in the ranges of from 1.45 to 1.722 and from 1.722 to 1.9, respectively. This also suppresses distortion and curvature of field, permitting reduction of the depth dimension of the image display device.

According to another aspect of this embodiment, the average Abbe's number of the glass materials for the negative and positive lenses are set in the ranges of from 25 to 38 and from 38 to 60, respectively. This also suppresses distortion and curvature of field, permitting reduction of the depth dimension of the image display device.

According to another aspect of this embodiment, the average refractive indexes of the glass materials for the positive and negative lenses of the refracting optical lens are chosen such that their difference is in the range of from 0.04 to 1. This also suppresses distortion and curvature of field, permitting reduction of the depth dimension of the image display device.

According to another aspect of this embodiment, the average Abbe's number of the glass materials for the positive and negative lenses of the refracting optical lens are chosen such that their difference is in the range of from 0 to 16. This also suppresses distortion and curvature of field, permitting reduction of the depth dimension of the image display device.

According to still another aspect of this embodiment, the back focal length from the micro-mirror device 14 to the refracting optical lens nearest it and the distance from the micro-mirror device 14 to the position of entrance pupil of the retro-focus optical system 62 are set to coincide with each other. This minimizes the diameter of the refracting optical lens and minimizes the shading of light, providing for increased illumination efficiency.

Embodiment 9

This embodiment (Embodiment 9) is intended to meet the Petzval's condition by a negative lens that is interposed between the micro-mirror device and a reflector at a position where the marginal ray is low.

Figure 41A:
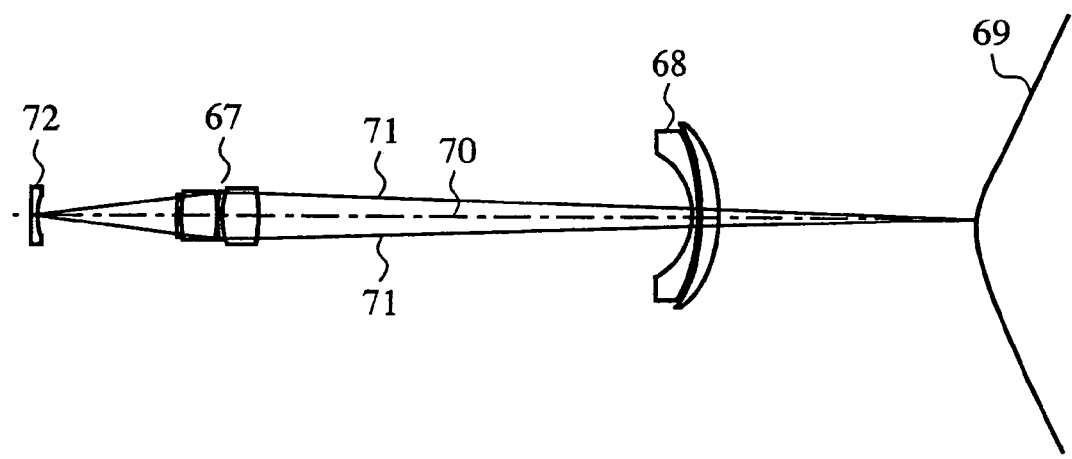
FIG. 41 is a diagram depicting the configuration of an image display device according to a ninth embodiment of the present invention.
Figure 41B:
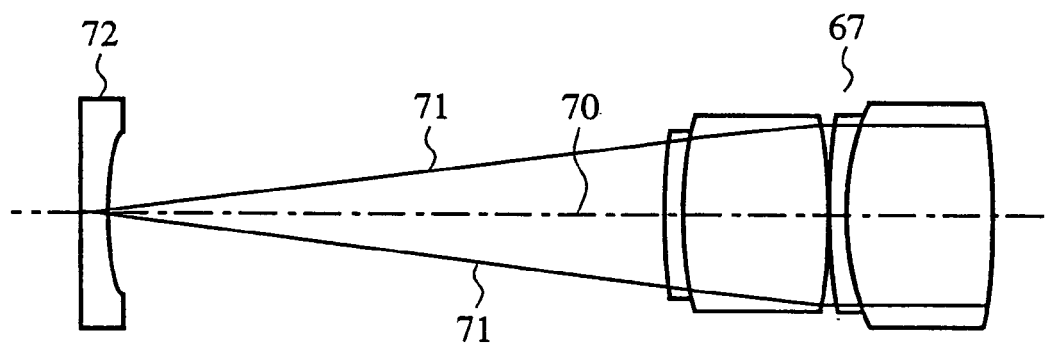

FIG. 41 illustrates the configuration of an image display device according to this embodiment, (a) showing its whole structure and (b) its partially enlarged view. For brevity sake, the illumination light source, the micro-mirror device and the screen are not shown. Reference numerals 67 and 68 denote refracting optical lenses; 69 denotes a convex mirror that has a positive Petzval's sum contributing component; 70 denotes an optical axis common to the refracting optical lenses 67 and 68 and the convex mirror 69; 71 denotes a marginal ray of light traveling from the micro-mirror device (not shown) to the convex mirror 69; and 72 denotes a negative lens disposed at the position where the marginal ray is low.

As referred to previously with reference to Embodiment 5, since the convex mirror 69 has a positive Petzval's sum contributing component, the Petzval's sum of the whole projecting optical system made up of the refracting optical lenses 67 and 68 and the convex mirror 69 readily goes positive, giving rise to a curvature of field. To avoid this, the negative lens 72 having a negative power of large absolute value is used to provide a negative Petzval's sum contributing component, which is utilized to reduce the Petzval's sum of the entire optical system to zero. This permits reduction of the curvature of field.

The point of this embodiment is to place the negative lens 72 at the position where the marginal ray 71 is low. That is, in this embodiment the negative lens 72 is disposed between the micro-mirror device (not shown) and the convex mirror 69 at the position where the marginal ray 71 is low. At this position light converges on the optical axis 70.

With such an arrangement, light converges on and passes through a limited area about the center of the negative lens 72, and consequently, the lens effect of the negative lens 72 on the light is substantially negligible. Accordingly, it is not necessary to take into account the influence of the negative lens 72 on the optical path design based on the refracting optical lenses 67 and 68 and the convex mirror 69, and the positive Petzval's sum contributing component of the projecting optical system can be canceled. Since the influence of the negative lens on the optical path need not be taken into account and the Petzval's condition needs only to be satisfied taking into consideration the absolute value of the negative power of the negative lens 72 and the refractive index of its glass material, the curvature of field can be reduced with ease.

More specifically, the negative lens 72 may also be disposed in the retro-focus optical system 62 of Embodiment 6; furthermore, since the reflecting surface of the micromirror device (the light emitting surface in the case of a transmission spatial light modulator such as liquid crystal) corresponds to the position where the marginal ray 71 is low, a condenser lens (field flattener) may be placed as the negative lens 72 in proximity to the reflecting surface (the light emitting surface).

The negative lens 72 is not limited specifically to a single-lens structure but may be of a multi-lens structure.

As described above, according to this embodiment, since the negative lens 72 is placed at he position where the marginal ray 71 is low, it is possible to easily satisfy the Petzval's condition by generating the negative Petzval's sum contributing component that cancels the positive Petzval's sum contributing component of the projecting optical system, without the need for considering the lens effect of the negative lens 72 on the light passing therethrough. Hence, the curvature of field can be reduced.

Embodiment 10

Embodiment 7 minimizes the thickness or depth dimension of the image display device and the height of the under-the-screen portion of the device by the path-bending reflector 59 interposed between the refracting optical lens 58 and the convex mirror 60 to bend the optical path in the horizontal plane containing the optical axis 61. This embodiment (Embodiment 10) is directed to the conditions for the arrangement of the path-bending reflector 59 and the refracting optical lens 58 relative to the convex mirror 60 in Embodiment 7.

FIG. 42 is explanatory of the conditions for placement of the path-bending reflector 59. FIGS. 42(a) and 42(b) are a side and a top plan view of the image display device, and FIG. 42(c) is a front view of the convex mirror 60. The parts identical to or corresponding to those in FIG. 23 are identified by the, same reference numerals. In FIG. 42, reference numeral 73 denotes the optical axis of the refracting optical lens 58, and 58z denotes the refracting optical lens 58 in the case where it is assumed that the optical bending mirror 59 is removed to bring the optical axis 61 of the convex mirror 60 and the optical axis 73 into alignment with each other.

The optical axes 61 and 73 intersect at an angle θ in the horizontal plane. That is, the optical axis 73 aligned with the optical axis 61 is turned through 180-θ° in the horizontal plane to intersect the optical axis 61 as depicted in FIG. 42(b). Reference characters P and Q denotes two points on the line of intersection between the horizontal plane containing the optical axis 73 and the refracting optical lens 58, the point P being a point that is the closest to the optical path from the path-bending reflector 59 to the convex mirror 60 and the point Q being a point that is the closest to the plane in the flat plane 22 is set.

Now, let b represent the distance between the convex mirror placement plane (reflecting part placement plane) where the convex mirror 60 is disposed and the position of the path-bending reflector 59, and let those of points on the line of intersection between the horizontal plane containing the optical axis 61 and the path-bending reflector 59 which are the closest to and the farthest from the convex mirror placement plane be called the closest point and the farthest points, respectively. Reference character a denotes the distance from the closest point to the convex mirror placement plane, and c denotes the distance from the farthest point to the convex mirror placement plane. The distance c is the longest distance from the convex mirror placement plane to the path-bending reflector 59.

Reference character m denotes the distance from the highest point of the path-bending reflector 59 to the optical axis 61; g denotes the distance from the point Q to the convex mirror placement plane; and f denotes the distance from the position of the exit pupil of the refracting optical lens 58z to the convex mirror placement plane. The distance g is the longest distance from the convex mirror placement plane to the refracting optical lens 58. Accordingly, the sum of the distance from the position of the exit pupil of the refracting optical lens 58 to the path-bending reflector 59 and the horizontal distance from the position of the path-bending reflector 59 to the convex mirror placement plane is equal to the distance f.

As is evident from FIG. 42(a), it is advantageous, for minimization of the height of the under-the-screen portion that is the distance from the lowermost end of the screen 18 to the optical axis 61, to hold the optical path of reflected light 75 from the convex mirror 60 as low as possible, that is, as close to the optical axis 61 as possible. With too low an optical path, however, the optical path is partly intercepted by the path-bending reflector 59, resulting in a shadow being cast on the screen 18. Hence, the size and position of the path-bending reflector 59 must be determined in such a manner as not to intercept the reflected ray from the convex mirror 60 to the lowermost end of the screen 18.

As for the position of the path-bending reflector 59, the distance a is maximized to ensure the passage of the reflected ray from the convex mirror 60 along the lowest possible path. On the other hand, since the thickness or depth dimension of the image display device is limited to a particular value that is determined by the specifications for thickness reduction, the distance c needs to be held smaller than the limit.

In the case of bending the optical path under the conditions mentioned above, if the distance f is too short, the portion of the refracting optical lens containing the point P intercepts the reflected ray from the path-bending reflector 59 to the convex mirror 60. If the refracting optical lens 58 is disposed so that its portion containing the point P will not intercept the reflected ray from the path-bending reflector 59 to the convex mirror 60, the distance a becomes shorter than required. On the other hand, if the distance f is too long, the refracting optical lens 58 is spaced more than necessary from the path-bending reflector 59 owing to the conditions imposed on the positions of the light receiving surface of the convex mirror 60 and the reflector 59. As a result, the path-bending reflector 59 becomes large and its height increases accordingly, intercepting the reflected ray 75 from the convex mirror 60 to the lowermost end of the screen 18. To avoid this, the distance f has the optimum value.

As will be seen FIG. 42(b), if the angle θ of intersection between the optical axes 61 and 73 is set too large, the distance g or c exceeds a thickness or depth dimension limiting value, and the distance a increases, inevitably causing the reflected ray from the convex mirror 60 to travel along a steeper optical path to the lowermost end of the screen 18.

A decrease in the angle θ decreases the distance g or c—this is advantageous from the viewpoint of the thickness of the refracting optical lens 58 or path-bending reflector 59. With too small an angle θ, however, the portion of the refracting optical lens 58 containing the point P projects into the optical path from the path-bending reflector 59 to the convex mirror 60 and intercepts the light, casting a shadow on the screen 18. Accordingly, the angle θ also has the optimum value.

In consideration of the above the path-bending angle θ is determined such that the point P is as close to the optical path from the path-bending reflector 59 to the convex mirror 60 as possible within the range in which the point P does not intercept the reflected light.

Once the angle θ has been determined, it is the distance g or c that places a constraint on the thickness or depth dimension of the image display device; therefore, the distance f is determined so that the longer one of the distances g and c defines the depth dimension of the device. In particular, setting the distances c and g to the same value minimizes the height of the under-the-screen portion.

The angle θ may sometimes be predetermined according to other conditions of the image display device, but it can also be considered to the same as in the above.

The points of the above may be summarized below in paragraphs 1 to 3. With the distance f and the angle θ optimized as mentioned below, it is possible to suppress the height of the under-the-screen portion while satisfying the constraint of the thickness limiting value but without casting a shadow on the screen.

1. In the case of bending the optical path by means of the path-bending reflector 59, the angle θ is set to such a value that the point P of the refracting optical lens 58 is as close to the optical path from the path-bending reflector 59 to the convex mirror 60 as possible within the range in which the point P does not intercept the optical path.

2. When the angle θ is predetermined according to other conditions for placement of the image display device, the distance f is set to such a value that the point P of the refracting optical lens 58 is as close to the optical path from the path-bending reflector 59 to the convex mirror 60 as possible within the range in which the point P does not intercept the optical path and that the distance c or g defines the thickness or depth dimension of the device.

3. With a view to minimizing the height of the under-the-screen portion, the angle θ is set to such a value that the point P of the refracting optical lens 58 is as close to the optical path from the path-bending reflector 59 to the convex mirror 60 as possible within the range in which the point P does not project into the optical path, while at the same time the distance f is set such that the distances c and g are equal to each other and defines the thickness or depth dimension of the device.

When the lens portion of the point P that does not transmit the reflected ray (nontranmittable portion) is removed from the refracting optical lens 58, it is possible to place the refracting optical lens 58 closer to the optical path from the path-bending reflector 59 to the convex mirror 60.

As is evident from, for example, FIGS. 1 and 4, the entire area of the reflecting surface of the convex mirror is not used to project light onto the screen, but the area of the reflecting surface for projecting the light is only one-half or less of the entire reflecting surface area. Accordingly, if such an unnecessary reflecting surface area (nonreflecting area) is removed as in the case of the convex mirror 60 shown in FIG. 42(c), it is possible to downsize the convex mirror accordingly and hence cut the manufacturing cost of the image display device and permit effective use of the limited space inside the image display device. Further, two convex mirror, equally divided from one convex mirror obtained by rotational formation, can be used in two image display deices—this permits simplification of the manufacturing process of image display devices.

Figure 43A:
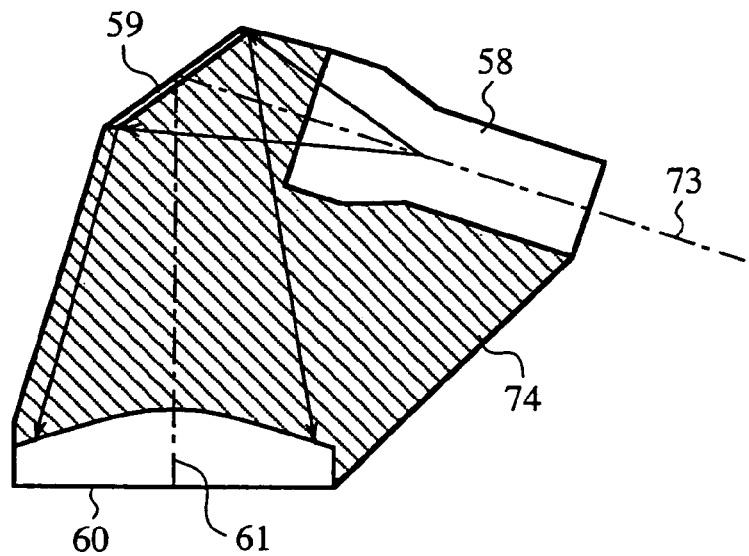
FIG. 43 is a diagram depicting a retaining mechanism for holding a refracting optical lens, a path-bending reflector and a convex mirror.
Figure 43B:
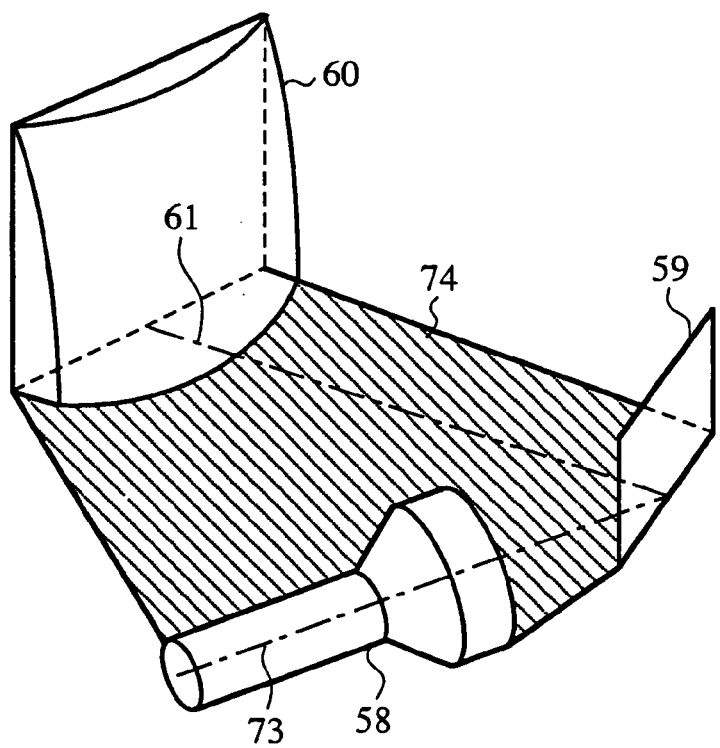

In the present invention, since the refracting optical lens 58, the path-bending reflector 59 and the convex mirror 61 are arranged after their shapes are determined, it is necessary to accurately establish optical paths with the above-mentioned optical components held in place. FIG. 43 depicts a retaining mechanism 74, which is used to hold the refracting optical lens 58, the path-bending reflector 59 and the convex mirror 60 as one piece. The use of such a retaining mechanism 74 allows ease in accurately forming the optical path between the respective optical components with their positional relationships held as predetermined. Further, the refracting optical lens 58, the reflector 59 and the convex mirror 60 are mounted against dislocation by external stress or variations of various environmental conditions (temperature, humidity, etc.)—this stabilizes the performance of the image display device. It is a matter of course that when the path-bending reflector 59 is not used, only the refracting optical lens 58 and the convex mirror 60 can be held by the retaining mechanism.

Moreover, the thickness or depth dimension of the image display device can also be suppressed by placing the path-bending reflector between the first and second lens means of the refractive optical lens 58 as depicted in FIG. 44 instead of interposing the reflector 59 between the refracting optical lens 58 and the convex mirror 60 as mentioned previously with reference to Embodiment 7. In FIG. 44 the parts identical with or corresponding to those in FIG. 42 are identified by the same reference numerals. The light from the micro-mirror device (not shown) passes through the first lens means of the refracting optical lens 58 and is reflected by the path-bending reflector 59, thereafter passing through the second lens means of the lens 58 and traveling to the convex mirror 60.

In this instance, the distance g is the longest distance from the convex mirror placement plane to the refracting optical lens 58. To minimize the height of the under-the-screen portion that is the distance from the lowermost end of the screen 18 to the optical axis 61, it is preferable that the refracting optical lens 58 be spaced as far apart from the convex mirror 60 as possible so that the optical path of the reflected ray 75 from the convex mirror 60 to the lowermost end of the screen 18 is as close to the optical axis 61 as possible. The refracting optical lens 58 intercepts the optical path of the reflected ray 75 if it is lower than the highest point R of the exit surface of the refracting optical lens 58. To avoid this, the refracting optical lens 58 is disposed so that the shortest distance a between it and the convex mirror placement plane is as long as possible. Hence, in the case of FIG. 44, too, there is the optimum value for the distance f from the convex mirror placement plane to the exit pupil of the refracting optical lens 58.

Further, as in the case where the path-bending reflector is interposed between the refracting optical lens and the convex mirror, the path-bending angle θ needs to be minimized from the viewpoint of thickness reduction. With too small an angle θ, however, the first lens means will intercept the optical path from the path-bending reflector to the second lens means. This indicates that there is the optimum value for the angle( in the case of FIG. 44, too.

In Embodiments 7 and 10, a prism may be used as a substitute for the path-bending reflector.

Embodiment 11

Figure 45:
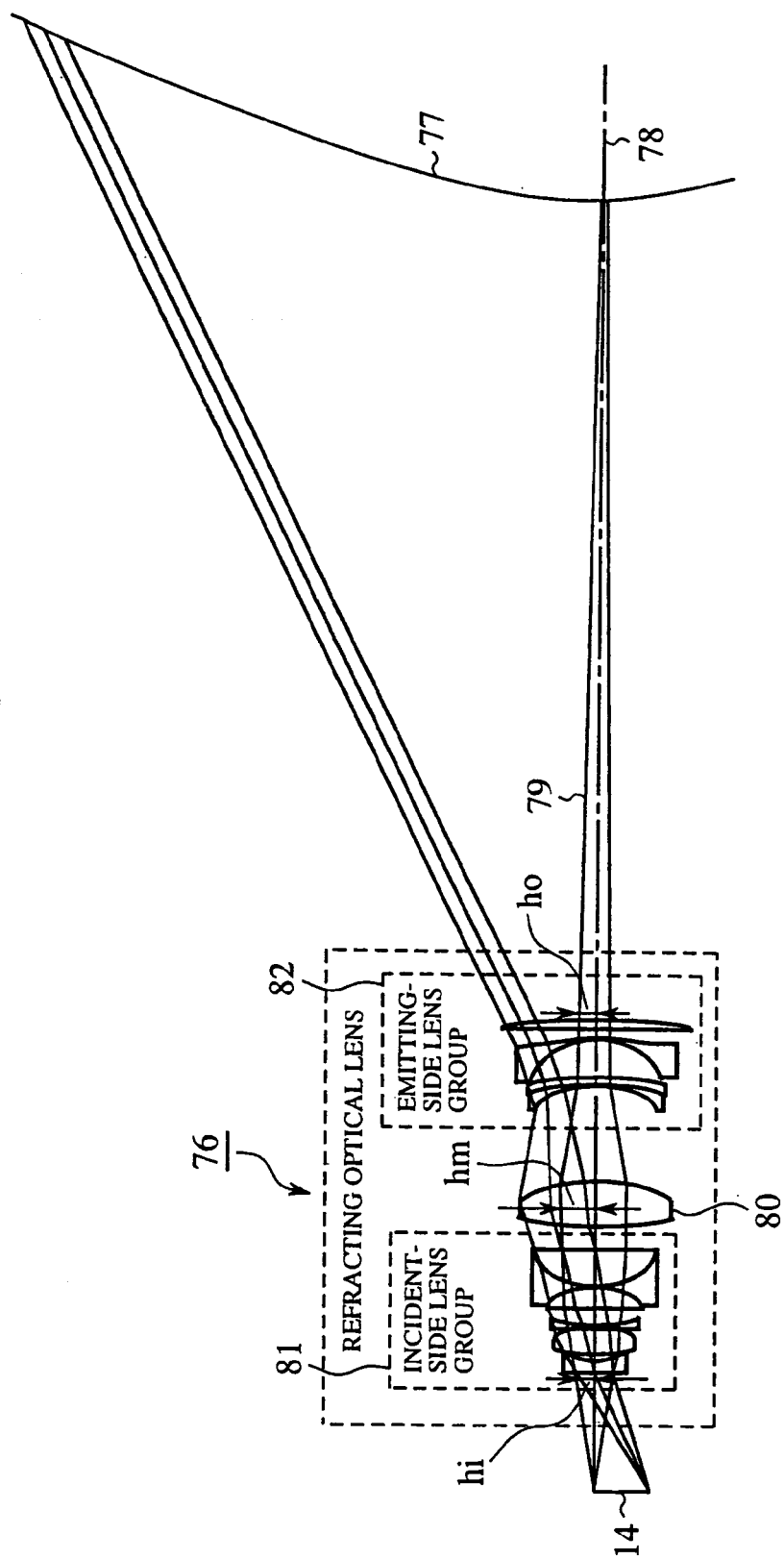
FIG. 45 is a diagram depicting the configuration of an image display device according to an 11th embodiment of the present invention.

FIG. 45 illustrates the configuration of an image display device according to an eleventh embodiment (Embodiment 11) of the present invention. For brevity sake, the illumination optical part and the screen are not shown. In this embodiment, the lens diameters of the light receiving and emitting sides of the refracting optical lens interposed between the micro-mirror device and the reflector are made smaller than the central lens diameter of the refracting optical lens to meet the Petzval's condition and establish an optical system advantageous for path-bending condition.

In FIG. 45, reference numeral 14 denotes a micro-mirror device; 76 denotes a refracting optical lens (refracting optical part); 77 denotes a convex mirror having a positive Petzval's sum contributing component; 78 denotes an optical axis common to the refracting optical lens 76 and the convex mirror 77; and 79 denotes a marginal ray of light that travels from the micro-mirror device 14 to the convex mirror 77.

In the refracting optical lens 76, reference numeral 80 denotes a positive lens disposed at a position where the marginal ray 79 is high, and 81 and 82 denote lens groups disposed at the entrance and exit sides of the positive lens 80, respectively. The light from the micro-mirror device 14 travels to the convex mirror 77 after passing through the entrance-side lens group 81, the positive lens 80 and the exit-side lens group 82 in this order.

Since the convex mirror 77 has the positive Petzval's contributing component as referred to previously with reference to Embodiment 5, the Petzval's sum of the entire projecting optical system is likely to go positive, causing a curvature of field. An increase in the Petzval's sum can be suppressed by minimizing the power of the positive lens forming the refracting optical lens 76.

This embodiment features the placement of the positive lens 80 at the position where the marginal ray 79 is high. That is, when the power of the positive lens 80 is reduced taking into account the Petzval's condition, the effect of the lens action of the positive lens 80 is also lessened. With the positive lens 80 of small power placed at the position of high marginal ray where light spread out as viewed from the optical axis, it is easy to establish a correspondence between minute areas of the light receiving and emitting surfaces of the positive lens 80 and the rays passing through them. This permits more elaborate designing of the light receiving and emitting surfaces of the positive lens 80, sufficiently enhancing its performance for the light passing therethrough.

Contrary to Embodiment 9 in which the operational effect of the negative lens 72 is made virtually negligible by placing it at the position where the marginal ray 71 is low, this embodiment places the positive small power at the position where the marginal ray 79 is high, by which it is possible to suppress an increase of the Petzval's sum without impairing the lens action of the positive lens 80. This will be described below more specifically with reference to FIG. 45.

In FIG. 45, the positive lens 80 at the center of the refracting optical lens 76 is a positive lens of positive power according to this embodiment, which is disposed at the position where the marginal ray 79 is high. With the provision of the entrance and exit side lens groups 81 and 82 of the positive lens 80 as shown, the marginal ray 79 in the positive lens 80 is increased.

FIG. 46 is a table showing Numerical Value Example 11A of this embodiment. The specifications in FIG. 46 are f=−0.74 mm (focal length at a 546.1 nm wavelength), NA=0.17 (aperture number at the micro-mirror device side), Yob=14.2 mm (object height at the micro-mirror device side), and M=86.3 (magnification for projection). The definition of the aspherical configuration is the same as in Numerical Value Example 6A.

Letting hi represent the height of the marginal ray 79 of light incident on the refracting optical lens 76, hm represent the maximum height of the marginal ray 79 of the light passing through the positive lens 80 at the center of the refracting optical lens 76, and ho represent the height of the marginal ray 76 of the light emitted from the refracting optical lens 76, these hi,hm and ho bear such relationships that satisfy 1.05 hi<hm<3 hi and 0.3 hi<ho<hi. That is, since 0.3 hi<ho<hi<hm/1.05<3/1.05·hi, ho is the smallest among the three values that satisfy the above two inequalities.

With the FIG. 45 configuration in which the lens diameter of the exit portion of the refracting optical lens, it is possible not only to meet the Petzval's condition but also to place the refracting optical part closer to the optical path from the path-bending means to the reflector means than in the case of the larger lens diameter as described previously with respect of Embodiment 7; hence, there is also provided a margin in the range of insertion of the path-bending reflector without intercepting the optical path. The positive lens 80 may be formed by a plurality of lenses as described later on in respect of FIG. 53.

As described above, according to this embodiment, the positive lens 80 is interposed between the micro-mirror device 14 and the convex mirror 77 at the place where the marginal ray 79 is high, and the power of the positive lens 80 is reduced to suppress an increase in the Petzval's sum of the optical system. Hence, it is possible to suppress the positive Petzval's sum contributing component of the projecting optical system through effective utilization of the lens action of the positive lens 80, permitting reduction of the curvature of field.

Further, since the height hi of the marginal ray 79 of light incident to the refracting optical lens 76, the maximum heighthm of the marginal ray 79 of light passing through the positive lens 80 disposed intermediately of the refracting optical lens 76 and the height ho of the marginal ray 79 emitted from the refracting optical lens 76 are chosen to satisfy 1.05 hi<hm<3 hi and 0.3 hi<ho<1 hi, it is possible to suppress the positive Petzval's sum contributing component of the projecting optical system, permitting reduction of the curvature of field.

Besides, by satisfying the relationships 1.05 hi<hm<3 hi and 0.3 hi<ho<hi, the lens diameter of the exit portion of the refracting optical lens 76 can be reduced—this provides a margin in the range of insertion of the path-bending reflector.

Embodiment 12

In Embodiment 4 the effective display area of the micro-mirror device 14 is disposed off the optical axis of an odd-order aspherical surface to reflect/transmit light except the central area of the odd-order aspherical surface (a point on the optical axis), projecting the light onto the screen 18. Since the central area about the optical axis is not used, the odd-order aspherical surface can be used, by which the degree of flexibility of the aspherical convex mirror increased to provide enhanced image formation performance. In this embodiment (Embodiment 12) the position of image formation in the peripheral portion is shifted in the direction of the optical axis relative to the position of image formation at the center of the optical axis to provide flexibility in the design of the optical system, thereby increasing the image formation performance.

Figure 47:
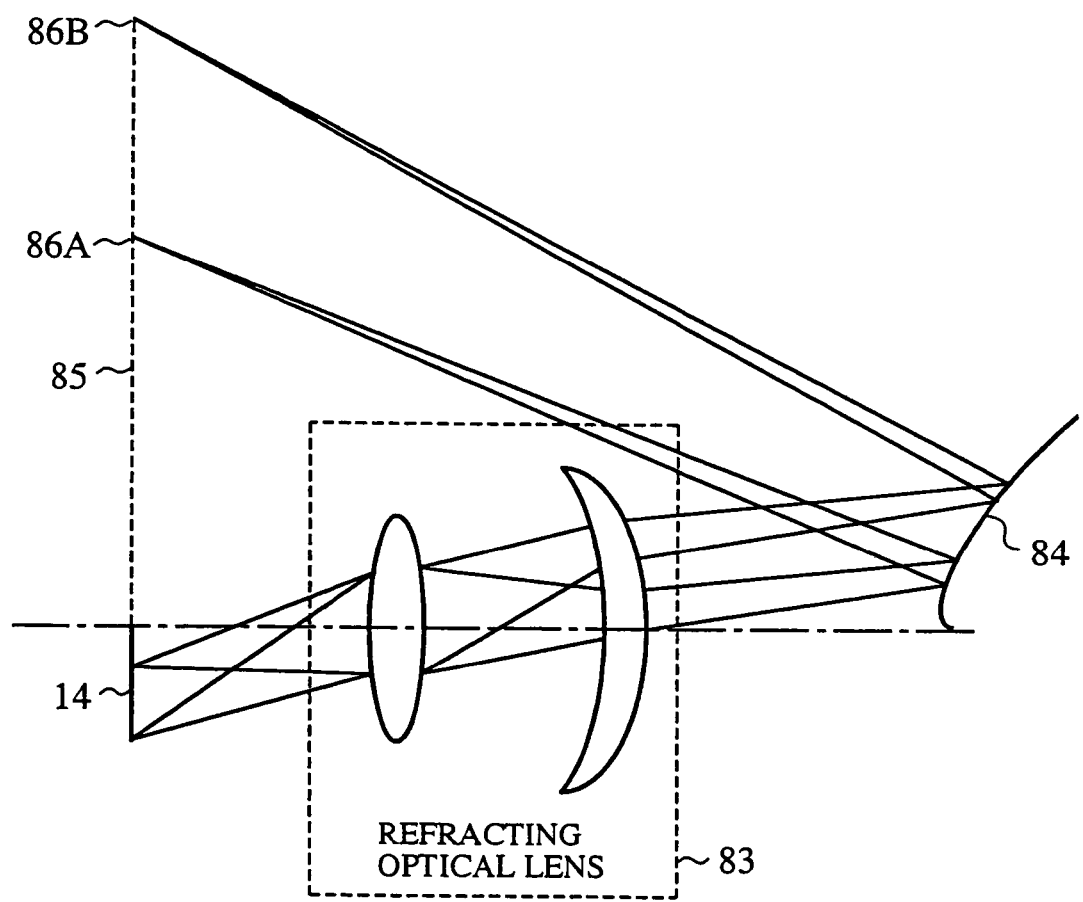
FIG. 47 is a diagram depicting an image formation in an ordinary optical system.

FIG. 47 is a diagram showing image formation in a common optical system. Reference numeral 14 denotes a micro-mirror device disposed off the optical axis; 83 denotes a refracting optical lens (projecting optical means); 84 denotes a convex mirror (projecting optical means); 85 denotes a image formation plane containing an image-forming position at the center of the optical axis and perpendicular to the optical axis; and 86A and 86B denote image-forming positions in the image formation plane 85.

In the optical system of FIG. 47, the image formation plane 85 is set in a plane perpendicular to the optical axis relative to the image-forming position at the center of the optical axis, and the off-axis image-forming positions 86A and 86B are set in the image formation plane 85. In a wide-angle optical system, however, it is difficult to contain two image-forming positions in the same plane, and the image-forming positions are displaced with varying degrees, resulting in the image surface being curved. The curvature of field can be reduced by such schemes described previously with reference to Embodiments 5, 9 and 11.

Figure 48:
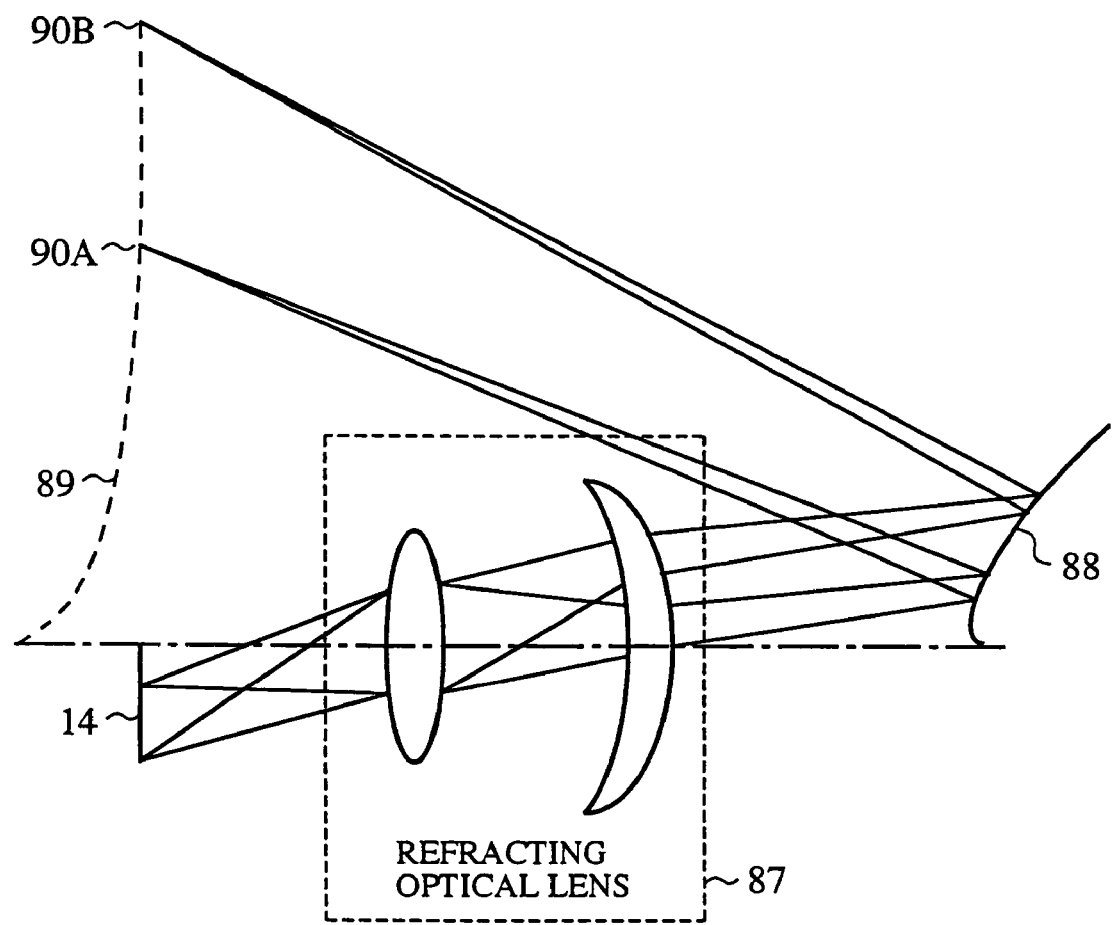
FIG. 48 is a diagram depicting an example of an optical system in which a curvature of field occurs.

In this embodiment, since the center of optical axis is not used, it does not matter even if the image-forming position at the center of the optical axis and the actual off-axis image-forming position differ from each other. FIG. 48 depicts an example of an optical system in which the image surface is curved. Reference numeral 87 denotes a refracting optical leans; 88 denotes a convex mirror; 89 denotes a curved image surface; and 90A and 90B denotes off-axis image-forming positions.

The point of this embodiment is that such a curvature of field as indicated by the curved image surface 89 is allowed in image formation. In this case, a lens configuration free from the constraints of the Petzval's condition is feasible to implement. This relaxes the limitations on the refractive index and dispersion characteristic of the optical material for the refracting optical lens 87, increasing flexibility in its design and hence providing increased image formation performance.

As described above, according to this embodiment, since the image-forming position at the center of the optical axis is set in a plane different from that in which the image-forming position around the optical axis, flexibility in designing the refracting optical lens 87 increases, permitting implementation of an image display device of excellent image formation performance.

Embodiment 13

This embodiment (Embodiment 13) is intended to further reduce the curvature of field.

As shown in the numerical value examples described above, the peripheral portion of the convex mirror is likely to become warped. The curvature of the convex mirror at the center of the optical axis is convex, but the curvature of the warped portion is concave. The reflector of the convex curvature diverges light, whereas the reflector of the concave curvature converges light. Accordingly, it is necessary, for the formation of an image on the screen, that light from the refracting optical part for incidence to the convex mirror be convergent at the center of the optical axis but divergent in the peripheral portion.

Taking into consideration the fact that the lens, which produces a convergent bundle of rays at the center of the optical axis, produces a convergent bundle of rays in the peripheral portion as well, it is easily presumable that much difficulty would be encountered in designing a refracting optical lens that meets the above-mentioned requirements. In other words, the use of an ordinary refracting optical lens will develop a significant curvature of field. Hence, the suppression of warping of the peripheral portion of the convex mirror is highly effective in suppressing the curvature of field. This embodiment is to prevent warping of the peripheral portion of the convex mirror by adding a pupil aberration to the exist pupil of the refracting optical lens as will be described below.

Figure 49:
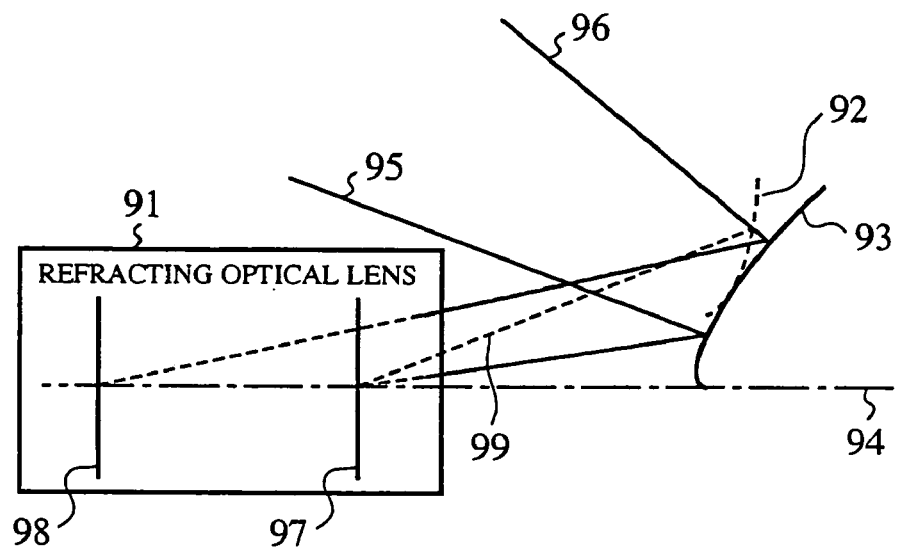
FIG. 49 is a diagram depicting the configuration of an image display device according to a 13th embodiment of the present invention.

FIG. 49 illustrates the configuration of the image display device according to this embodiment. Reference numeral 91 denotes a refracting optical lens (refracting optical part); 92 denotes a convex mirror with its peripheral portion warped; 93 denotes a convex mirror with the warp of its peripheral portion corrected; 94 denotes the optical axis common to the refracting optical lens 91 and the convex mirrors 92 and 93; 95 denotes an emitted ray near the optical axis; 96 a ray reflected by the convex mirror from its peripheral portion; 97 denotes exit pupil of the refracting optical lens 91 for the emitted ray 95; 98 denotes the exit pupil of the refracting optical lens 91 for the reflected ray 96; and 99 denotes a ray from the peripheral portion in the case of emanation from the exit pupil 97.

Usually the emitted ray traveling near the optical axis 94 and the emitted ray from the peripheral portion are both emitted from the exit pupil 97 of the refracting optical lens 91 as indicated by 95 and 99. As will be seen from the relationships of the emitted ray 96, the convex mirrors 92 and the 93, in the case where the emitted ray 96 is reflected by the convex mirror 92 and corrected for distortion, the exit pupil may be at the position indicated by 97, but in the case where the emitted ray 96 is reflected by the convex mirror 93 with its peripheral portion unwarped and corrected for distortion, the exit pupil 97 near the center of the optical axis 94 and the exit pupil 98 for the emitted ray from the peripheral portion need only to be intentionally shifted as depicted in FIG. 49.

By adjusting the position and angle of incidence of light to the convex mirror 93 as described above, it is possible to prevent warping of the marginal portion of the convex mirror and hence suppress the curvature of field. Incidentally, this feature is common to all the numerical value examples mentioned above.

Embodiment 14

This embodiment (Embodiment 14) is intended to provide increased image formation performance by allowing distortion that occurs in the refracting optical part in the vicinity of the center of the optics.

Figure 50:
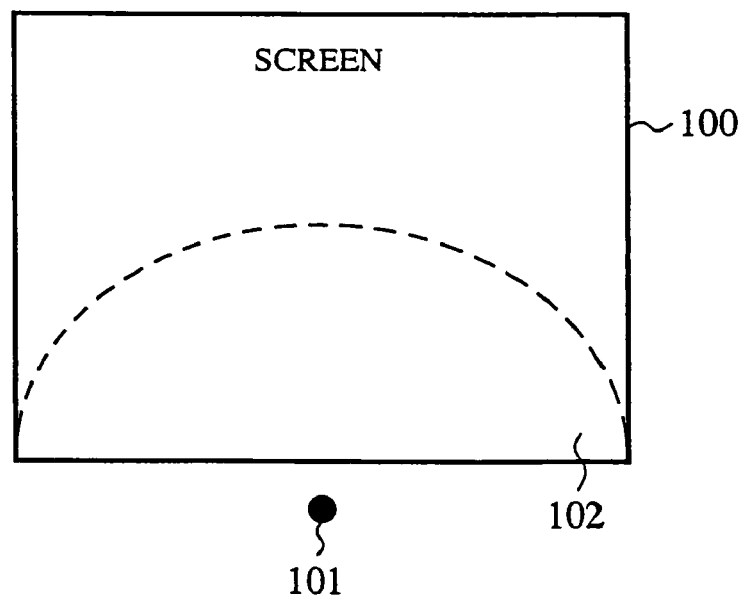
FIG. 50 is a diagram depicting the configuration of an image display device according to a 14th embodiment of the present invention.

FIG. 50 is explanatory of an image display device according to this embodiment. Reference numeral 100 denotes a screen; 101 denotes an optical axis common to a projecting optical system (not shown) and the screen 100; and 102 denotes the maximum range in which a circle with its center at the optical axis 101 crosses only the base of the screen 100.

In the optical system, since the constraint of distortion is a big factor in defining the image formation performance, it is possible to increase the image formation performance by eliminating the constraint. When distortion occurs, an image in the peripheral area of the screen is displayed distorted, or excessively large or small relative to the screen frame. To avoid this, the area subject to the influence of distortion needs to be minimized.

The absolute value of distortion, which is produced by the projecting optical part, is increased within the range 102 of the circle about the optical axis 101 that intersects the base of the screen 100 but does not intersect the other sides as depicted in FIG. 50, and the absolute value of the distortion is held small in the area outside the circle. As a result, the influence of the distortion can be limited only to the base of the screen 100, and near the other three sides images can be formed correctly in rectangular shape.

Further, the distortion that occurs in the optical system is defined by the ratio of distortion to the distance from the optical axis. That is, the actual amount of distortion increases with distance from the optical axis even if the value of optical distortion calculated in percentage is the same. From a visual perspective, a distorted image is not easily discernible in the inside area of the display screen, but when the display screen boundary portion, which ought to be straight, becomes curved owing to distortion of the outermost periphery of the display screen, it is readily discernible. According to the present invention, distortion is produced for one side near the optical axis, and hence linearity of image formation is lost for this side; however, since the distance from the optical axis to this side is short, the relative distortions for the other sides are reduced and the boundary portions along the three sides do not easily become curved. Moreover, if the optical axis lies on this side, linearity is not lost for the outside boundary portion.

Figure 51:
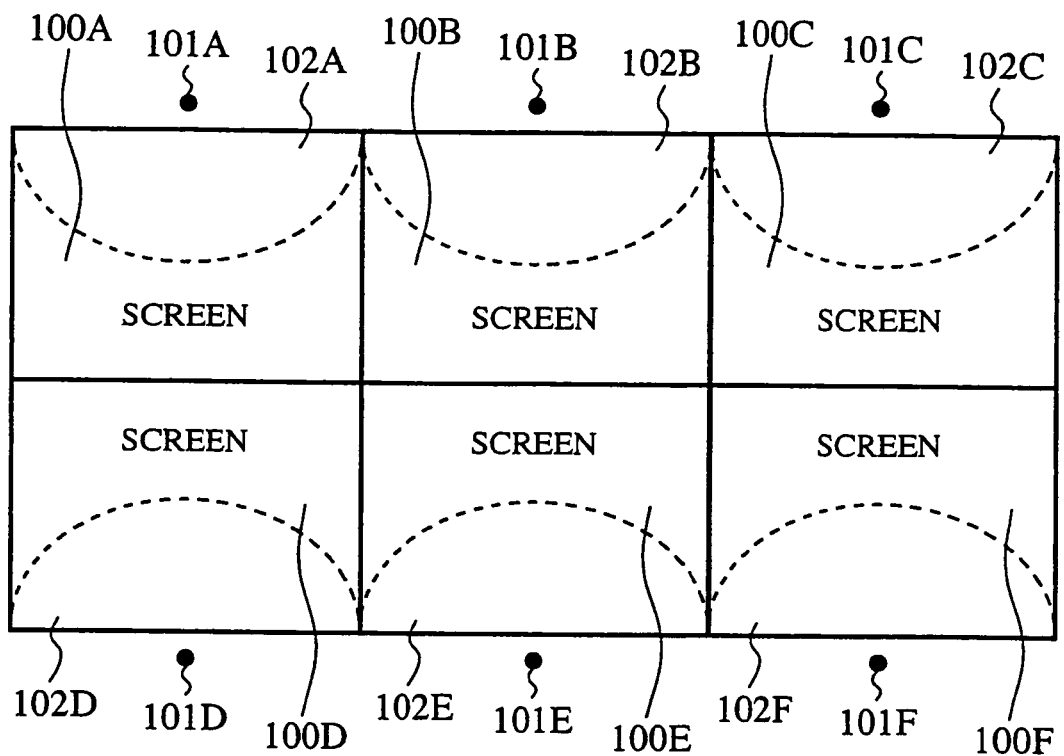
FIG. 51 is a diagram depicting an image display device assembly composed of a plurality of image display devices.

This feature is particularly effective when plural displays are used in combination as depicted in FIG. 51. In FIG. 51, reference numerals 100A to 100F denote screens; 101A to 101F denote optical axes each of which is common to a projecting optical part (not shown) of each image display device and one of the screens 100A to 100F; and 102A to 102F denote the maximum ranges in which circles about the optical axes 101A to 101F intersect only the bases of the screens 100A to 100F.

In such a multi-display as shown in FIG. 51, too, if distortions in the areas along other sides than the base are suppressed, substantially no overlapping of pictures or splitting of a picture occurs at the joints of display screens.

The above configuration is based on numerical calculations. Results of concrete numerical calculations will be given below as Numerical Value Example 14A.

<Numerical Value Example 14A>

Figure 53:
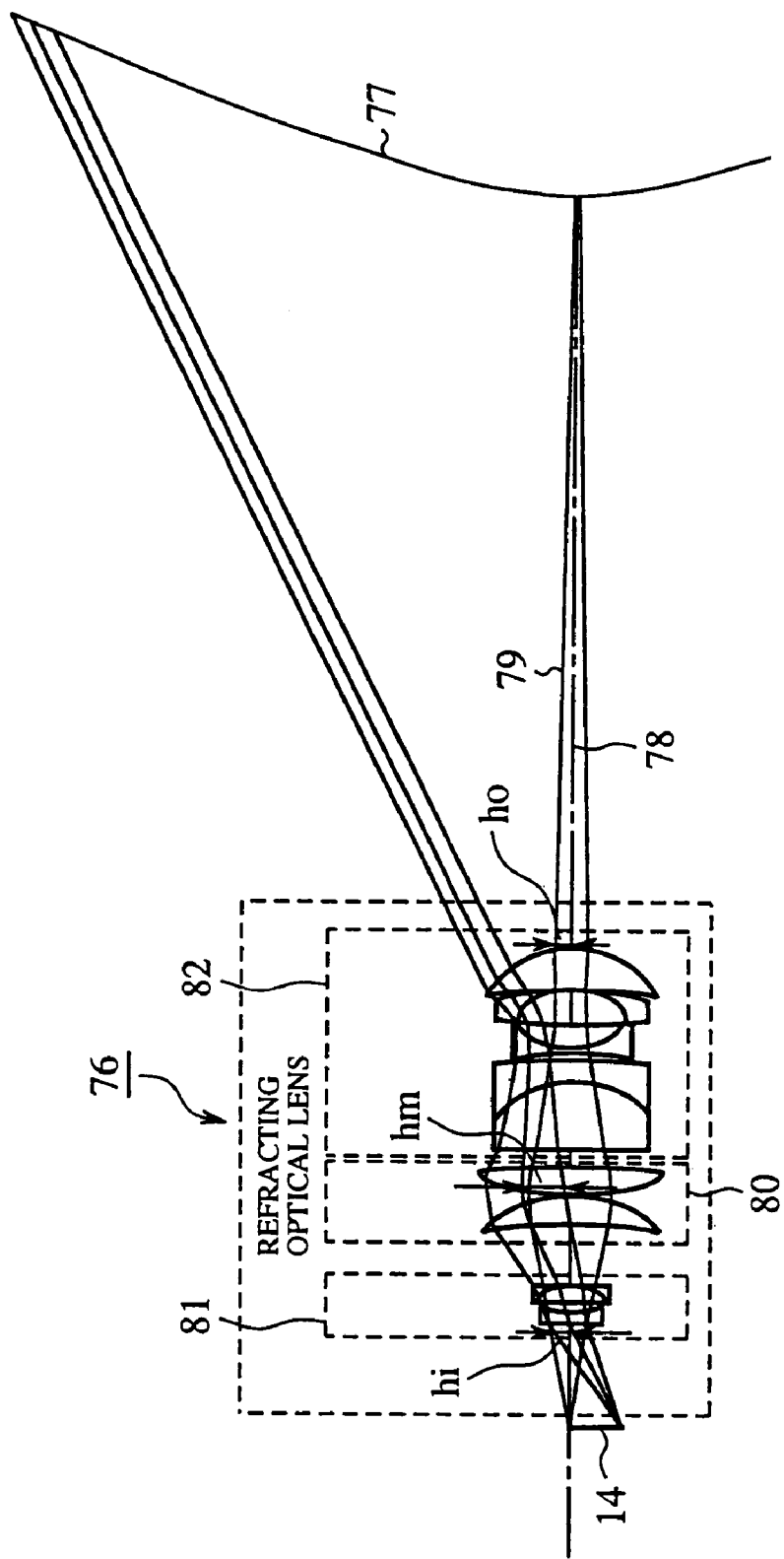
FIG. 53 is a diagram depicting a configuration based on Numerical Value Example 14A.

FIGS. 52 and 53 are a table showing numerical data of this example and a schematic diagram depicting the device configuration based on the numerical data. The specifications in FIG. 52 are f=3.31 mm(focal length at a wavelength of 546.1 nm), NA=0.17 (micro-mirror device side aperture number), Yob=14.65 (micro-mirror device side object height) and M=86.96 (projecting magnification).

Figure 54:
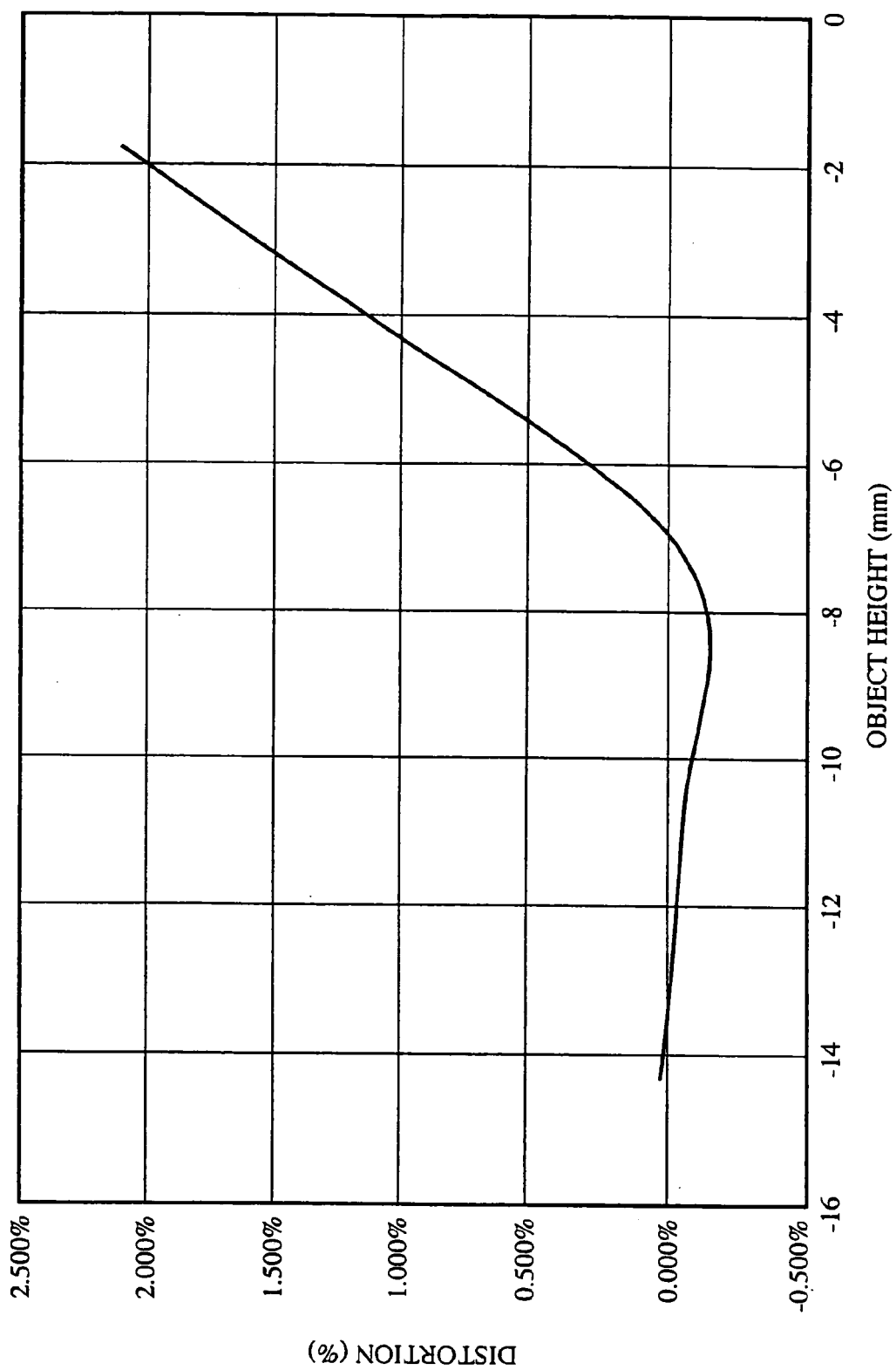
FIG. 54 is a graph showing the results of numerical calculations of distortion in Numerical Value Example 14A.
Figure 55:
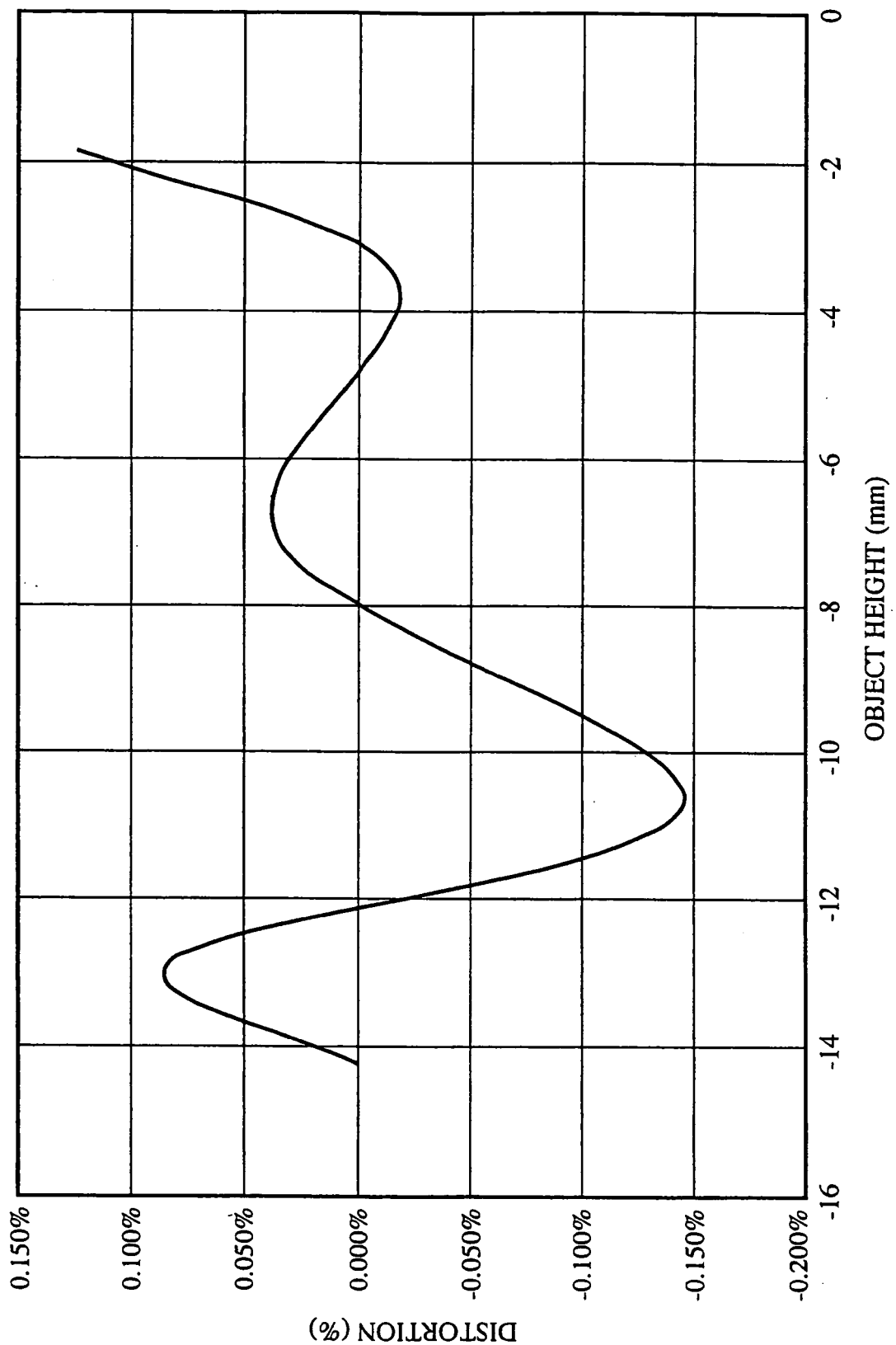
FIG. 55 is a graph showing the results of numerical calculations of distortion in Numerical Value Example 4A.

In FIG. 54 there are shown the results of numerical calculations of distortion in Numerical Value Example 14A. In FIG. 55 there are shown the distortion in Numerical Value Example 4A for comparison with the distortion in the design that allows distortion. As is evident from FIG. 55, the distortion in Numerical Value Example 4A is approximately 0.1% or below, whereas in Numerical Value Example 14A shown in FIG. 54, distortion is allowed up to 2% in the range in which the image height is small which indicates the distance from the optical axis.

Incidentally, the distortion produced in the optical system in the device configuration designed to allow distortion can be corrected for by modifying the mirror surface that is used for path-bending use. That is, the distortion of the entire image display device can be corrected for by distorting the shape of the plane mirror 22 that reflects light from the projecting optical system 17 to bend its optical path to the screen 18.

Embodiment 15

This embodiment (Embodiment 15) implements two design ideas for the convex mirror, the one of which increases the environmental characteristic with respect to a temperature change and the other of which facilitates alignment in the assembling of the image display device.

FIG. 56 is explanatory of the image display device according to this embodiment. FIG. 56(*a*) is a side view of the image display device with the illumination light source system and the screen omitted for brevity sake. FIGS. 56(*b*) and (*c*) are a top plan and a front view of the convex mirror. In FIG. 56, the z-axis is set in the direction of the optical axis of the convex mirror, the x-axis crosses the z-axis at right angles in the plane containing the optical axis, and the y-axis crosses the x- and z-axes at right angles.

In FIG. 56, reference numeral 14 denotes a micro-mirror device; 103A and 103B denote the refractive optical lenses (refracting optical parts) used in the embodiments described so far; 104 denotes a convex mirror (reflecting part) characteristic of this embodiment; and 105 denotes an optical axis common to the refracting optical lenses 103A and 103B and the convex mirror 104. The convex mirror 104 is one that is obtained by cutting off nonreflecting portions 104C from a convex mirror 104O rotationally symmetric with respect to the optical axis 105 (see FIGS. 56(*b*) and (*c*) and Embodiment 10).

Reference numeral 104F denotes a front surface of the convex mirror 104 that reflects rays of light from the refracting optical lenses 103A and 103B, and 104R denotes a rear surface or the back of the convex mirror 104.

In this embodiment the aspherical configuration of the front surface 104 is designed through ray tracing to correct for distortion; hence, if respective portions of the convex mirror contract or expand with different degrees due to a temperature change in the use environment, the shape of the front surface 104 subtly changes and affects the correction for distortion. To cope with such a temperature change, the thickness of the convex mirror 104 from the front 104F to the rear 104R thereof is made uniform—this is the first one of the design ideas of the convex mirror 104.

Figure 57A:
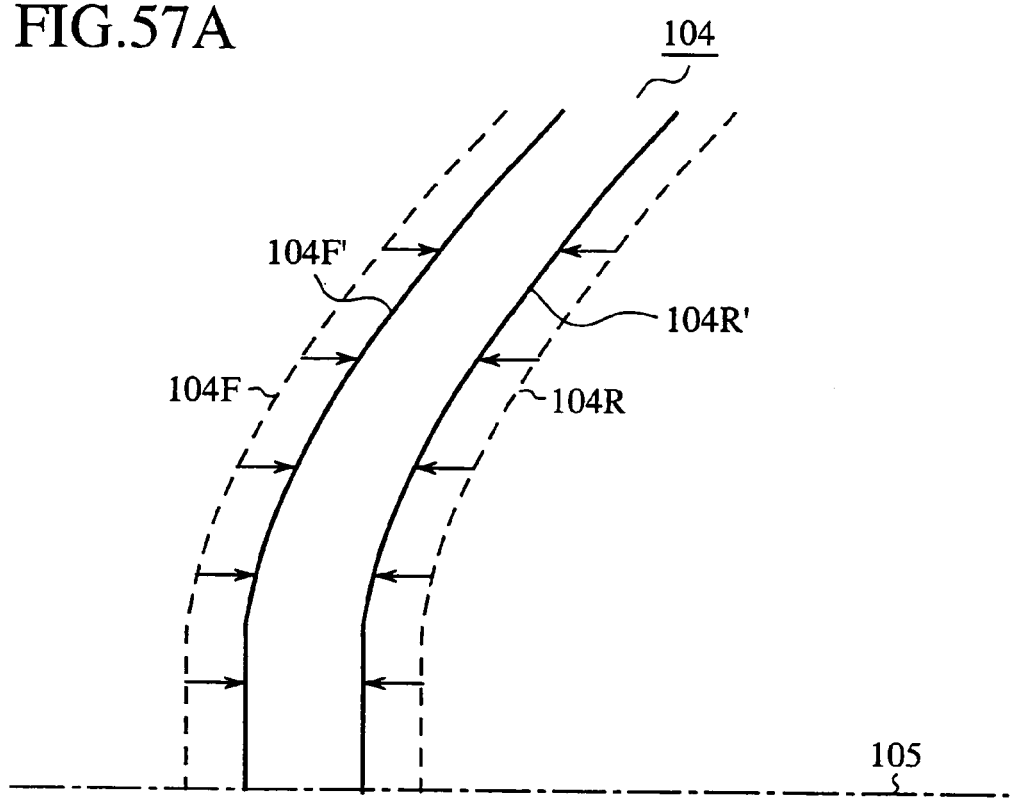
FIG. 57 is a diagram for explaining a configuration change of the convex mirror in its thickwise direction with respect to a temperature change.
Figure 57B:
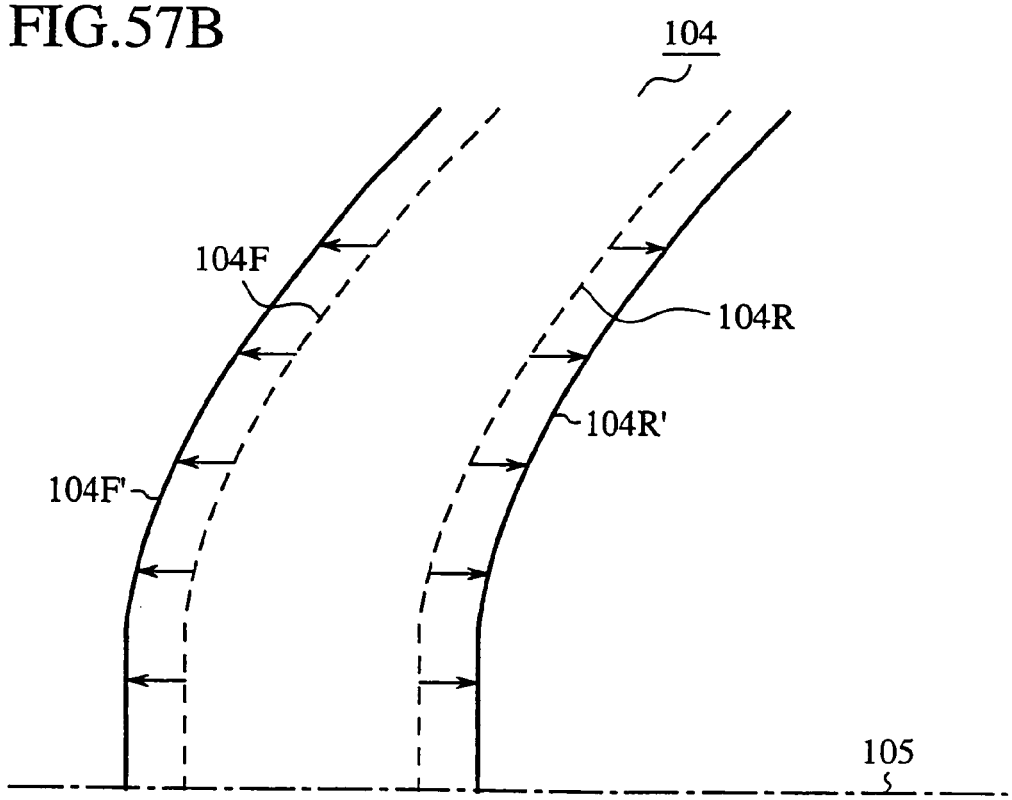

FIG. 57 is explanatory of changes in the form of the convex mirror thickwise thereof by a temperature change. FIG. 57(*a*) shows contraction of the convex mirror 104 and FIG. 57(*b*) its expansion. The parts identical with or corresponding to those in FIG. 56 are identified by the same reference numerals.

Since the convex mirror 104 is made of a material of the same coefficient of linear expansion, the uniform thickness from the front 104F to the rear 104R ensures that the convex mirror 104 undergoes the same thickness variation throughout it when temperature changes. Accordingly, the entire areas of the front and rear surfaces 104F and 104R (indicated by the broken lines) designed through ray tracing contract and expand in parallel to the optical axis 105 as indicated by the solid lines 104'F. and 104R', respectively. Since the convex mirror 104 undergoes the same thickness variation throughout it, the front surface 104F retains the shape of the front surface 104F. Thus it is possible to prevent a change in the shape of the front surface 104 by an ambient temperature change.

The other design idea for the convex mirror 104 is to provide low- and high-reflectivity areas 104L and 104H in the front surface 104F in proximity to the optical axis 105 as depicted in FIG. 56. The reflectivity of the area 104L is appreciably lower than the reflectivity of the area 104H.

In the convex mirror 104 of the image display device of the present invention in which the micro-mirror device 14 is disposed out of alignment with the optical axis 105, since the area of the front surface 104F near the optical axis 105 (non-projecting front area) is not used to reflect light to the screen or plane mirror, the low- and high reflectivity areas 104L and 104H are provided in the front surface 104F in proximity to the optical axis 105.

The area of the front surface 104F close to the optical axis 105 is lower than the point of reflection 106P in the front surface 104F of a ray 106 that travels along an optical path close to the optical axis 105 between the refracting optical lens 103B and the convex mirror 104 as depicted in FIG. 56(a).

The low- and high reflectivity areas 104L and 104H are not aspherical but are formed in a flat area that is circular (semicircular) about the optical axis 105 and crosses it at right angles. Let R represent the distance from the point of intersection of the front surface 104F and the optical axis 105 to the reflecting point 106P. The low- and high reflectivity areas 104L and 104H are formed in concentric circles (semicircles) of radii rL and rH smaller than R, respectively. Since rL>rH, the high-reflectivity area 104H lies inside the low-reflectivity area 104t and the former is closer to the optical axis 105 than the latter.

The provision of the low- and high-reflectivity areas 104L and 104H in the surface of the convex mirror 104 facilitates alignment in the assembling of the image display device.

FIG. 58 is explanatory of an alignment scheme using the convex mirror 104. The parts corresponding to those in FIG. 56 are identified by the same reference numerals and characters.

Reference numeral 107 denotes a laser that emits laser light (straight-traveling light); 108 denotes an isolator that permits the passage therethrough of the laser light from the laser 107 only in one direction to protect the laser 107 from reflected-back light; 109 denotes a half mirror interposed between the isolator 108 and the convex mirror 104; and 110 denotes a detector for detecting the power of the laser light. The arrows marked with 111 and 112 respectively indicate emitted laser light and reflected-back laser light during alignment, and the two-dot-chain line marked with 113 indicates a virtual optical axis formed by the emitted laser light 111 and the reflected-back laser light 112.

Figure 58A:
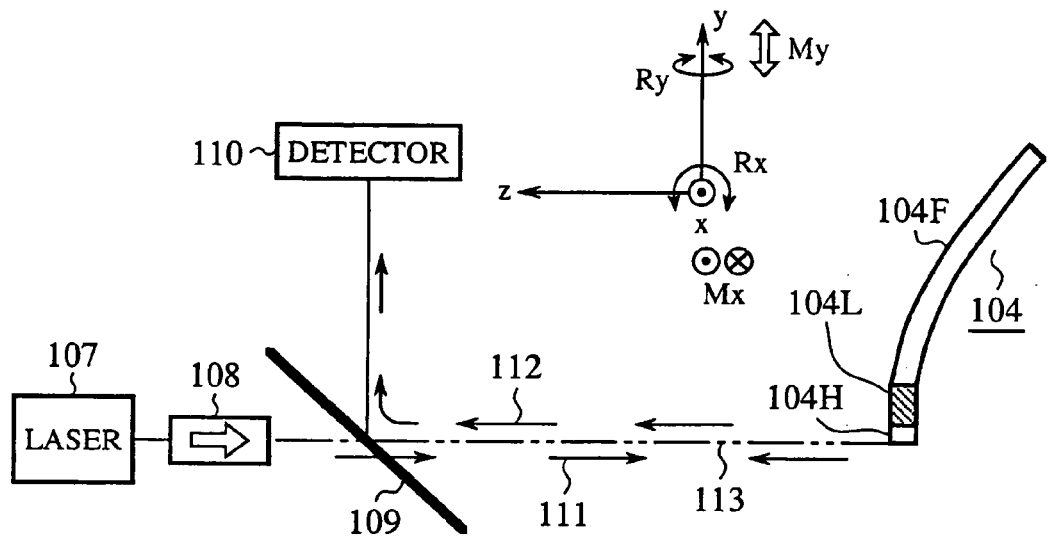
FIG. 58 is a diagram showing a alignment-adjusting method using a convex mirror.

In the first place, the virtual optical axis 113 for the convex mirror 104 is set using the arrangement depicted in FIG. 58(a). The laser light emitted from the laser 107 in parallel to the horizontal passes through the isolator 108 and the half mirror 109 and hence travels toward the convex mirror 104. At this time, the attitude of the convex mirror 104 is fine-tuned by a manipulator or the like for translational adjustment Mx in the x-axis direction, rotational adjustment Rx about the x-axis, translational adjustment My in the y-axis direction and rotational adjustment Ry about the y-axis to reflect the laser light 111 by the high-reflectivity area 104H to the half mirror 109 to maximize the power of the laser light 112 that is detected by the detector 110.

The maximum power of the laser light 112 is detected when the convex mirror 104 takes the most desirable attitude, that is, when the laser light 111 traveling from the half mirror 109 to the convex mirror 104 and the laser light 112 traveling from the convex mirror 104 to the half mirror are completely aligned with each other. With the high-reflectivity area 104H of the plane mirror held at right angles to the laser light 111, the laser light beams 111 and 112 are brought into complete alignment with each other to form the virtual optical axis 113.

When the convex mirror 104 is significantly displaced from its desirable attitude, the laser light 112 reflected by the convex mirror 104 is not incident to the detector 110 through the half mirror 109, and consequently the detector 110 does not, detect power. Even if the convex mirror 104 approaches its desirable attitude, an optical-axis misalignment, if any, will cause reflection of the laser light 111 by the low-reflectivity area 104L of the plan mirror to the half mirror 109. Since the low-reflectivity area 104L is low in reflectivity, the power of the laser light 112 reflected by the half mirror to the detector 110 is low-level; hence, the optical-axis misalignment can be detected. This indicates that the value of the radius rH of the high-reflectivity area needs only to be determined according to acceptable limits of optical-axis misalignment.

Figure 58B:
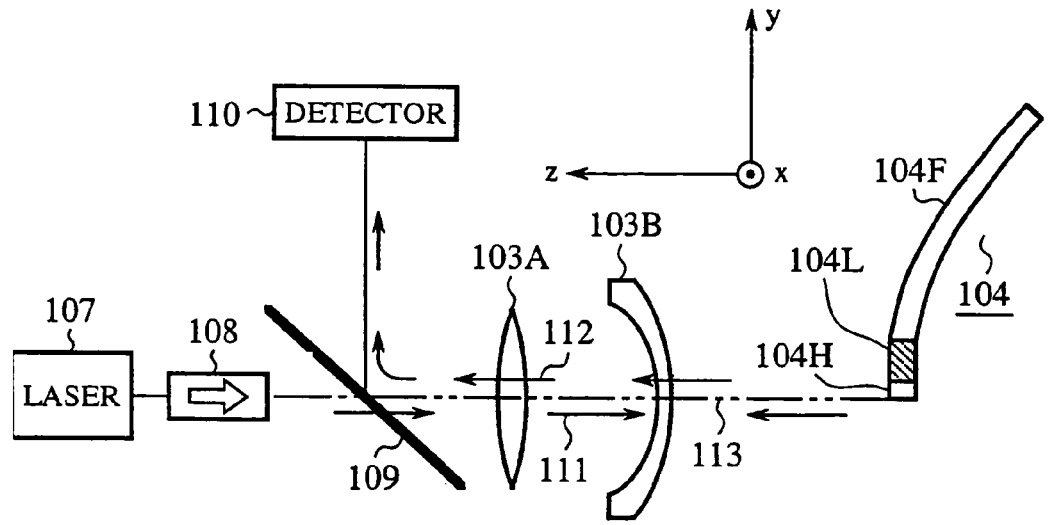
Figure 58C:
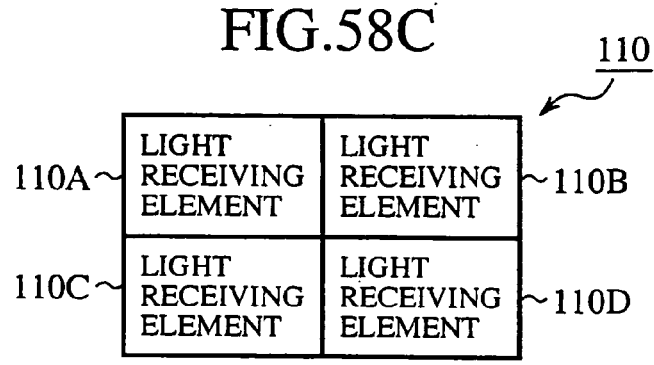

With the light receiving surface of the detector 110 formed by four photodetectors 110A, 110B, 110C and 110D arranged in a 2 by 2 matrix (FIG. 58(c)), the inclinations Rx and Ry of the convex mirror 104 can be detected and adjusted with high accuracy by conducting differential calculations of output signals from the photodetectors 110A to 110D.

Further, by adding the outputs from the four photodetectors 110A to 110D, it is possible not only to detect the power of the light incident to the entire area of the light receiving surface of the detector 110 but also to detect optical axis misalignments Mx and My. Accordingly, this arrangement permits comprehensive adjustments to Mx, My, Rx and Ry.

In this way, the virtual optical axis 113 by the laser light beams 111 and 112 can be produced by making fine adjustments to the attitude of the convex mirror 104 while monitoring the laser light 112 that is detected by the detector 110.

Next, the arrangement of FIG. 58(b) is used to make amendments for alignment between the refracting optical lenses 103A and 103B. The refracting optical lenses 103A and 103B are inserted in the arrangement of FIG. 58(a) with the virtual optical axis 113 produced. In this instance, too, when the refracting optical lenses 103A and 103B assume their desirable attitudes, the laser light beams 111 and 112 pass through the centers of the refracting optical lenses 103A and 103B.

That is, when the laser light beams 111 and 112 pass through the centers of the refracting optical lenses 103A and 103B at right angles, the optical lenses 103A and 103B exert no lens action on the laser light 112, allowing the detector 110 to detect the maximum power of the laser light 112. This state corresponds to the state in which the optical axes of the refracting optical lenses 103A and 103B are aligned with the virtual optical axis 113.

As described above, this embodiment uses the convex mirror 104 of uniform thickness, and hence suppresses a change in the shape of the front surface 104F by a temperature change, providing enhanced environmental characteristic of the image display device.

Further, according to this embodiment, since the convex mirror 104 has in its front surface 104F the low-reflectivity area 104L formed close to the optical axis 105 and the high-reflectivity area 104H formed in closer to the optical axis 105 than the low-reflectivity area 104L, the size of the high-reflectivity area 104H being determined according to the permissible range of the optical-axis misalignment. Accordingly, it is possible to produce the virtual optical axis 113 through monitoring of power by the detector 110 and calculations and hence facilitate alignment of the convex mirror 104 and the refracting optical lenses 103A and 103B in assembling the image display device.

Embodiment 16

Figure 59:
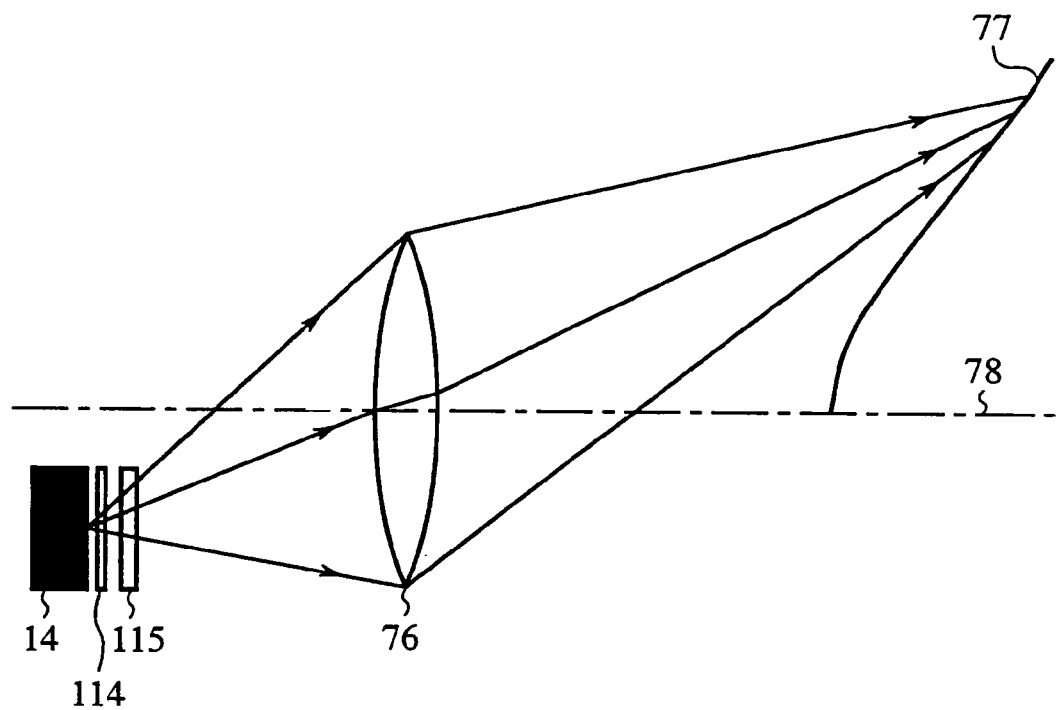
FIG. 59 is a diagram depicting the configuration of an image display device according to a 16th embodiment of the present invention.

FIG. 59 illustrates the configuration of an image display device of a sixteenth embodiment (Embodiment 16) of the present invention. For brevity sake, the illumination light source system, the plane mirror and the screen are not shown.

Reference numeral 14 denotes a micro-mirror device (transmitting means); 114 denotes a cover glass for protecting the reflecting surface (light-emitting surface) of the micro-mirror device 14; 115 denotes a compensator glass (transmitting means) for compensating for variations in the optical thickness of the cover glass 114; 76 and 77 denote the refracting optical lens (refracting optical part) and the convex mirror (reflecting part) used in the embodiments described above, respectively; 78 denotes an optical axis common to the refracting optical lens 76 and the convex mirror 77.

The micro-mirror device 14 has mounted thereon the cover glass 114 for protecting the reflecting surface formed by many micro-mirrors. Light from an illumination light source (not shown), which is made up of a light-emitting means, a parabolic reflector and a condenser lens, is incident to the reflecting surface of the micro-mirror device 14 through the cover glass 114. And the light intensity-modulated by the reflecting surface passes through the cover glass 114 and travels to the refracting optical lens 76 and the convex mirror 77.

By the way, the thickness of the cover glass 114 does not always have a fixed standard value, but it is held within a tolerance defined by the difference between permissible maximum and minimum values of thickness. Accordingly, the cover glass usually has a different thickness. Further, the standard value of thickness may sometimes undergo a design change. Since the light used in the image display device is certain to pass through the cover glass 114, such a thickness variation of the cover glass 114 affects the light passing therethrough, resulting in the design of optical paths throughout the optical system being determined by a different thickness of the cover glass 114.

In this embodiment the compensator glass 115 is interposed between the illumination light source system (not shown) or refracting optical lens 76 and the cover glass 114 to compensate for the thickness variation of the cover glass of the latter.

A description will be given, with reference to FIG. 60, of a scheme for compensating for the thickness variation of the cover glass 114 by the compensator 115.

Figure 60A:
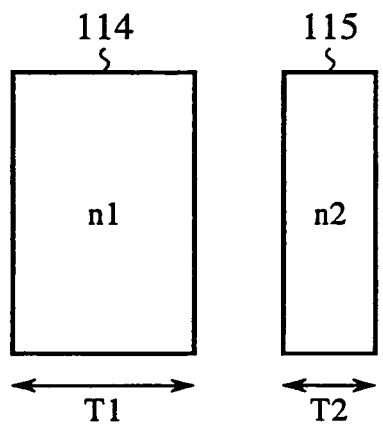
FIG. 60 is a diagram showing the relationship between the thicknesses of a cover glass and a compensator glass.
Figure 60B:
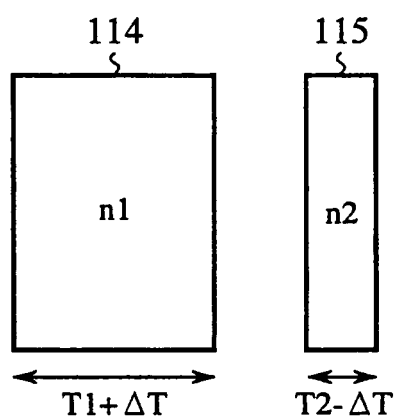
Figure 60C:
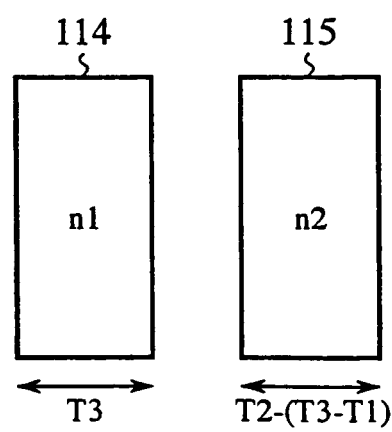

FIGS. 60(*a*) to (*c*) show the relationships between the thickness of the cover glass 114 and the compensator glass 115. It is assumed, for simplicity's sake, that the refractive index n1 of the cover glass 114 and the refractive index n2 of the compensator glass 115 are equal (where n1=n2=n), but the refractive indexes may differ as described later on.

Reference State

FIG. 60(*a*) shows the case where the thickness t1 of the cover glass 114 has a reference value T1. In this instance, light is emitted from and reflected back to the micro-mirror device 14 covered with the cover glass 114 through the compensator glass 115 of a thickness t2=T2. Accordingly, the light equivalently passes through a glass medium of a thickness t=T1+T2 and a refractive index n. Other optical systems such as the illumination light source system, the refracting optical lens 76 and the convex mirror 77 are designed with the assumption that the glass medium of the thickness T1+T2 and the refractive index n is present.

*Compensation Example 1

FIG. 60(*b*) shows the case where the thickness t1 of the cover glass 114 deviates from the reference value T1 by an individual difference ΔT (ΔT containing a plus or minus sign) to T1+ΔT. In this case, the light is emitted from and reflected back to the micro-mirror device 14 covered with the covered glass 114 through the compensator glass 115 of a thickness t2=T2−ΔT.

That is, since the sum total of the thickness t1=T1+ΔT of the cover glass 114 and the thickness t2=T1−ΔT of the compensator glass 115 is the same as the thickness t=T1+T2 as in the reference state, the light emitted from and reflected back to the micro-mirror device 14 equivalently passes through the glass medium of the thickness t=T1+T2 and the refractive index n. Accordingly, although a variation ΔT is caused by the individual difference of the thickness t1 of the cover glass 114, it is possible to cancel the variation ΔT can by changing the thickness t2 of the compensator glass 115, allowing the use of the optical systems in their reference state without involving design changes.

*Compensation Example 2

FIG. 60(*c*) shows the case where the thickness t1 of the cover glass 114 design-changed from the reference value T1 to another reference value T3. In this case, light is emitted from and reflected back to the micro-mirror device 14 covered with the cover glass 114 through the compensator glass 115 of a thickness t2=T2−(T3−T1)=T2−ΔT.

As is the case with Compensation Example 1, the sum total of the thickness t1=T1+(T3−T1)=T1+ΔT of the cover glass 114 and the thickness t2=T2−(T3−T1)=T2−ΔT of the compensator glass 115 is the same value t=T1+T2 in the above-mentioned reference state; hence, the light emitted from and reflected back to the micro-mirror device 14 equivalently passes through the glass medium of the thickness t=T1+T2 and the refractive index n. Accordingly, although the thickness deviation ΔT is caused by the design change of the thickness t1 of the cover glass 114 from the reference value T1 to T3, it is possible to cancel the thickness deviation ΔT by changing the thickness t2 of the compensator glass 115, permitting the use of the optical systems in their reference state without involving design changes.

As will be seen from the above, in this embodiment, depending on whether the variation (or deviation) in the thickness t1 of the cover glass 114 increases or decreases from the reference value T1, the reference value T2 of the thickness t2 of the compensator glass 115 is decreased or increased by the variation (or deviation) ΔT to obtain the fixed sum total t1=T1+T2. Hence, the glass medium of the refractive index n and the thickness t=T1+T2 can be regarded as being equivalently mounted on the reflecting surface of the micro-mirror device 14, and the optical systems in their reference state can be used intact regardless of the variation (or thickness deviation). Of course, this embodiment is not limited specifically to the micro-mirror device 14 but is also applicable to liquid crystal or other spatial light modulator.

While in the above the cover glass 114 and the compensator glass 115 have been described to have the same refractive index n, it is more realistic to consider the cover glass 114 and the compensator glass 115 in terms of their optical thickness on the assumption that they have different refractive indexes n1 and n2.

That is, assuming that the cover glass 114 and the compensator glass 115 have optical thicknesses t1/n1 and t2/n2, respectively, the thickness t2 and refractive index n2 of the compensator glass 115 are so chosen as to satisfy the condition "t1/n1+t2/2=constant." This permits compensation for variations in the thickness t1 and refractive index n1 of the cover glass 114.

With the use of a mechanism (compensator glass attaching and detaching mechanism) by which the compensator glass 115 is detachably mounted on the light-incident side of a lens-barrel (not shown) holding the refracting optical lens 76, the compensator glass 115 can be replaced with one that has the optimum thickness corresponding to a change in the thickness of the cover glass 114 or its thickness variation.

<Numerical Value Example 16A>

Figure 62:
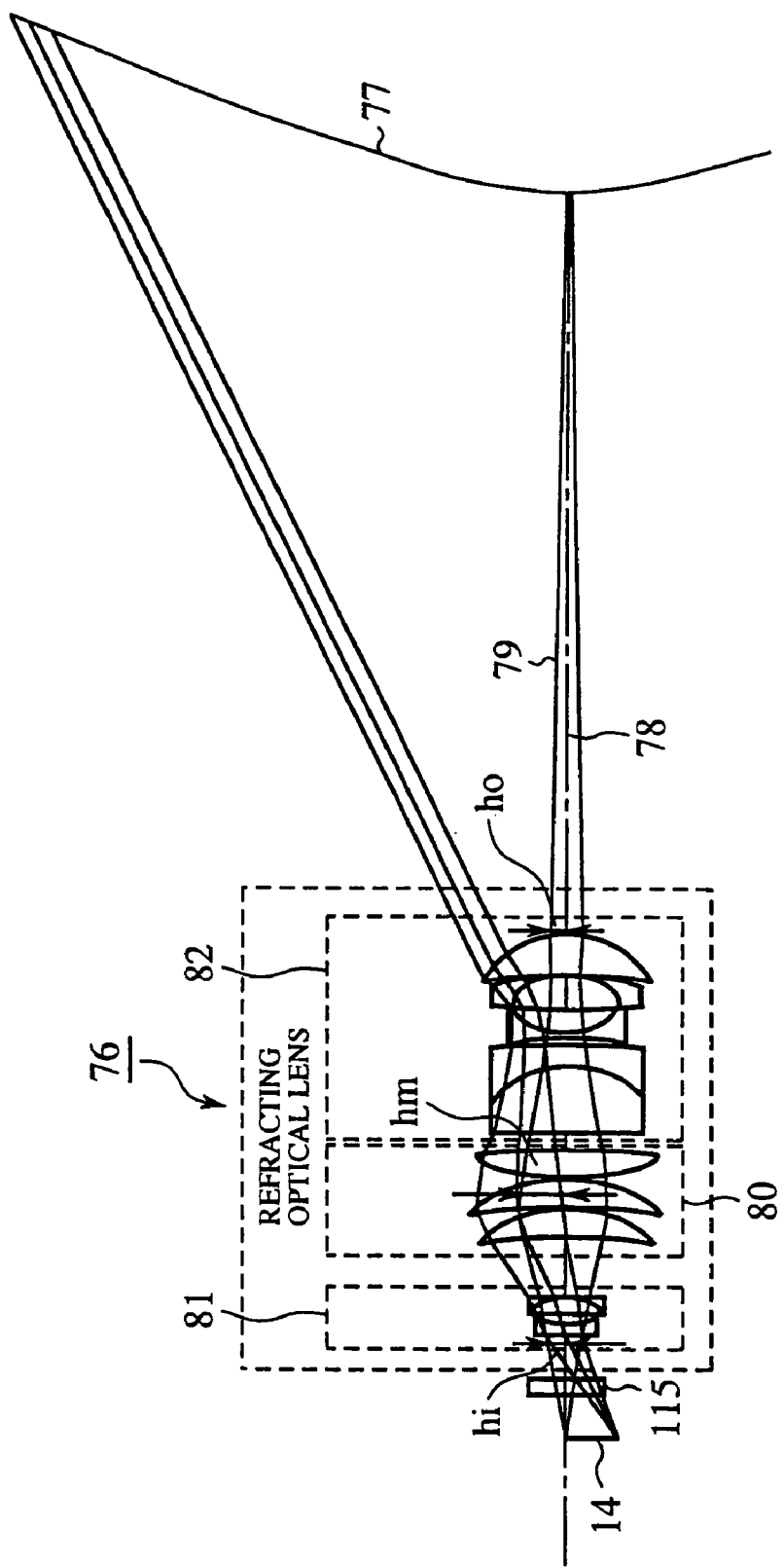
FIG. 62 is a diagram depicting a configuration based on Numerical Value Example 16A.

The results of numerical calculations in the case of using the compensator glass 115 will also be described below in brief FIGS. 61 and 62 are a table showing numerical data of this example and a diagram depicting the device configuration based on the numerical data. The parts or components identical with or corresponding to those in FIGS. 45 and 59 are identified by the same reference numerals. The specifications in FIG. 61 are f=3.39 mm (focal length at the 546.1 nm wavelength), NA=0.17 (micro-mirror device side numerical aperture) Yob=14.65 mm (micro-mirror device side object height) and M=86.96 (projecting magnification). In FIG. 62 the cover glass 114 is shown as a unitary structure with the compensator glass 115 since the former was calculated as being contained in the latter.

In FIG. 61 the 4.5 mm thickness of the second surface is given as the sum of the thicknesses of the cover glass 114 and the compensator glass 115. This is the result of correction for aberration made on the assumption, for instance, that the reference thickness of the cover glass was 3 mm and the thickness of the compensator glass 1.5 mm.

As described above, according to this embodiment, there is disposed between the cover glass 114 mounted on the reflecting surface of the micro-mirror device 14 and the refracting optical lens 76 or illumination light source system the compensator glass 115 of an optical thickness that is decreased or increased in accordance with a variation in the optical thickness of the cover glass which is increased or decreased according to a manufacturing tolerance or design change. Since light is emitted from and reflected back to the reflecting surface of the micro-mirror device 14 through the compensator glass 115, the thickness variation of the cover glass 114 can be canceled and the reflecting surface of the micro-mirror device 14 can be regarded as being protected by a glass medium of a fixed optical thickness at all times. This permits utilization of the illumination light source system, the refracting optical lens 76 and the convex mirror 77 without involving design changes.

Moreover, since provision is made to detachably mount the compensator glass 115 on the light-incident side of the lens-barrel (not shown) holding the refracting optical lens 76, the compensator glass 115 can be replaced with one that has the optimum thickness corresponding to a thickness change of the cover glass 114 or its thickness variation.

Embodiment 17

FIG. 63 is a perspective view of an image display device that uses the plane mirror 22 in Embodiment 1 (FIG. 4) and the path-bending reflector 59 in Embodiments 7 and 10 (FIG. 23 and others). The parts identical with or corresponding to those in FIGS. 4 and 23 are identified by the same reference numerals and characters. For brevity sake, the converging optical system including the illumination light source system, the micro-mirror device and the refracting optical lens are not shown.

Reference numeral 116 denotes generally the image display device of a rectangular prismatic configuration; 117 denotes a under-the-screen portion of the image display device 116; and 118 denotes the horizontal bottom of the image display device 116. The plane in which the screen 18 and the convex mirror 60 are placed and the plane in which the plane mirror 22 is placed cross the bottom 118 at right angles. The plane that contains the optical axis 61 and crosses the bottom 118 divides the image display device into halves. The ξ-axis is normal to the screen 18, the ψ-axis is normal to the bottom 118, and the ζ-axis is perpendicular to the ξ- and ψ-axes.

Reference numeral 119 denotes a ray that is reflected at a point P (third point) on the convex mirror (reflecting part) 60 toward a point Q (second point) on the plane mirror 22; and 120 denotes a ray that is reflected at the point Q on the plane mirror 22 toward a point R (first point) on the screen (display means) 18. The point R is on the base of a square image display on the screen 18 (which base is parallel to and close by the bottom 118) and is the remotest point from the center of the image. Reference numerals 121 and 122 denotes segments formed by projecting the rays 119 and 120 onto the bottom 118 from the ψ-axis direction, and points P', Q' and R' (third, second and first points of projection) formed by projecting the points P, Q and R onto the bottom 118 from the ψ-axis direction.

Figure 63B:
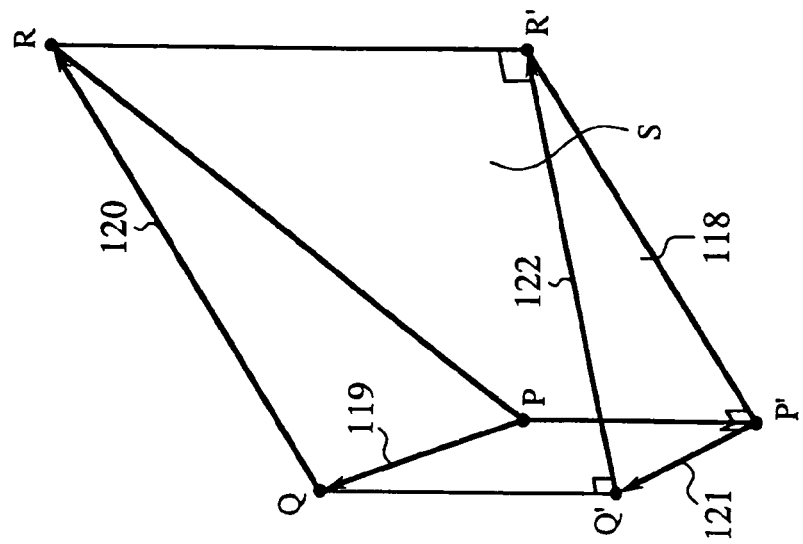
FIG. 63 is a diagram illustrating the configuration of an image display device using a plane mirror and a path-bending reflector.

FIG. 63(b) shows a space (placement space) S defined by the points P, Q, R, P', Q' and R'. In this embodiment, attention is paid to the space S as a space for placement of the converging optical system and care is taken not to increase the height of the under-the-screen portion 117. The rays 119 and 120 are rays corresponding to the point R; if components of the converging optical system are so placed in the space S as not to shade the rays 119 and 120, they will not shade all the other rays.

FIG. 64 depicts the configuration of an image display device according to this embodiment, FIG. 64(a) being a front view of the under-the-screen portion of the image display device as viewed from the ξ-axis direction and FIG. 64(b) a top plan view of the image display device as viewed from the ψ-axis direction. The parts identical with or corresponding to those in FIGS. 1, 4, 23 and 63 are identified by the same reference numerals and characters. FIGS. 65(a) and (b) show, in section, the image display device in the planes A–A' and B–B' perpendicular to the screen 18. The plane B–B' is closer to the segment Q–Q' than the plane A–A'.

In FIG. 64, reference numeral 123 denotes an illumination light source system (transmitting means, illumination light source part, principal part of converging optical system) composed of a luminous or light emitting element 11, a parabolic mirror 12 and a condenser lens 13; 124 denotes a color wheel (transmitting means, principal part of converging optical system) which sequentially colors rays (illumination light) from the illumination light source system 123 in three primary colors; 125 denotes a rod integrator (transmitting means, principal part of converging optical system) which receives light from the color wheel 124 on its plane of incidence and emits light of illuminance distribution made uniform from its pane of emission; 126 denotes a relay lens (transmitting means, principal part of converging optical system) which relays the light from the rod integrator 125.

Reference numerals 127 and 128 denote a second path-bending reflector (second path-bending means) and a third path-bending reflector (third path-bending means) characteristic of this embodiment; and 129 denotes a field lens (transmitting means) which launches the light from the relay lens 125 to the micro-mirror device (transmitting means, reflection type image information imparting part) 14. The light from the relay lens 126 is reflected by the second and third path-bending reflectors 127 and 128 in this order toward the field lens 129.

The converging optical system for gathering light to the micro-mirror device 14 comprises the illumination light source system 123, the color wheel 124, the rod integrator 125, the relay lens 126, the second and third path-bending reflectors 127 and 128, and the field lens 129; in particular, the illumination light source system 123, the color wheel 124, the rod integrator 125 and the relay lens 126 will hereinafter be referred to as principal components of the converging optical system.

Reference numeral 130 denotes an optical axis common to the principal components of the converging optical system, and 131 denotes an excess space in the image display device 116. In an ordinary image display device such an excess space is removed and hence is not regarded as a space where to place optical components. In FIG. 64 the principal components of the light-gathering system are disposed in he space S with the optical axis 130 held in parallel to the bottom 118 of the display device 116 and the light receiving surface of the screen 18 for the reasons given below.

Figure 66:
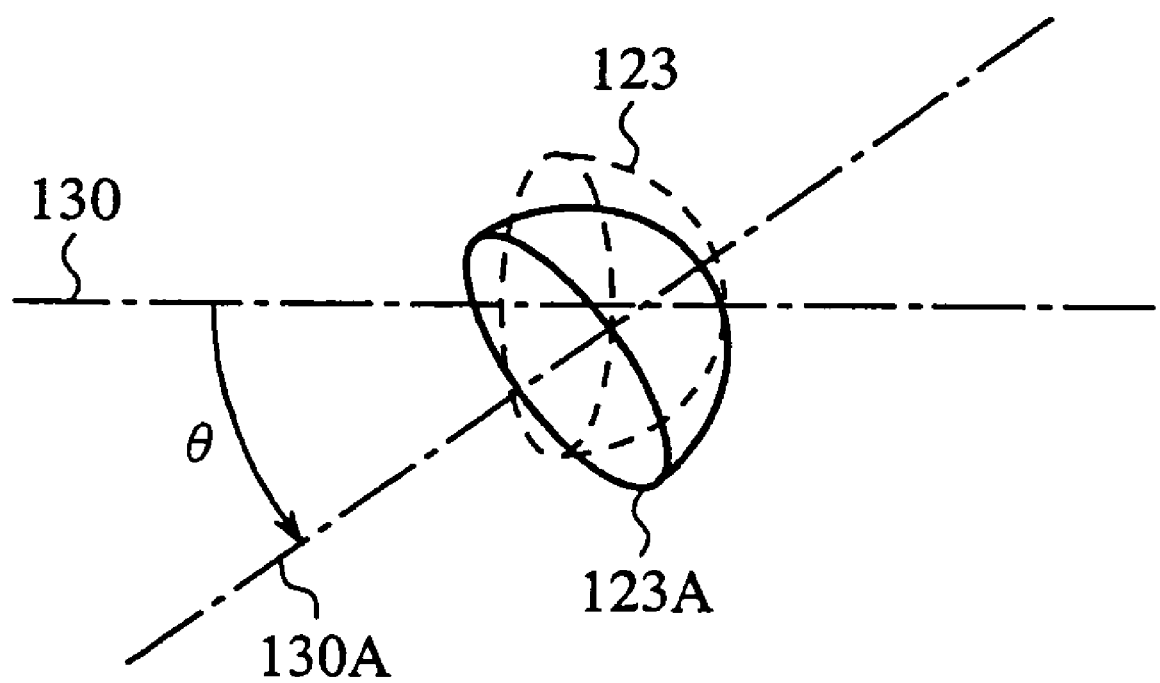
FIG. 66 is a diagram depicting an illumination light source system with its optical axis tilting.

When the illumination light source system 123 having the optical axis 130 in the horizontal plane inclines to a position 123A with an optical axis 130A and the angle θ between the optical axes 130 and 130A is in excess of a prescribed value (15°, for instance) as depicted in FIG. 66, the internal temperature distribution of the light emitting member 11 (short-arc discharge lamp) of the light source 123 goes out of spec, leading to reduction of its service life. This can be avoided by the above-mentioned arrangement. When turned about the optical axis 130, however, the illumination light source system 123 does not present any problem.

Figure 67A:
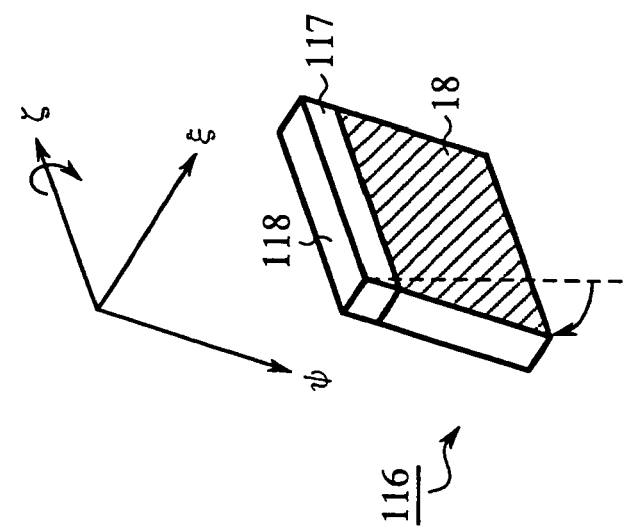
FIG. 67 is a diagram showing various usages of the image display device.
Figure 67B:
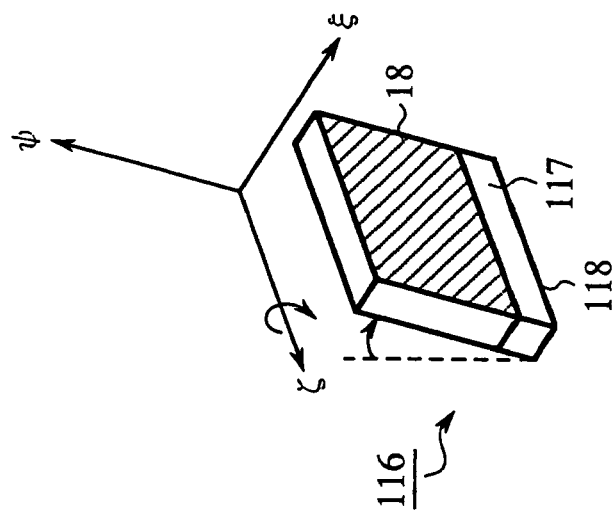
Figure 67C:
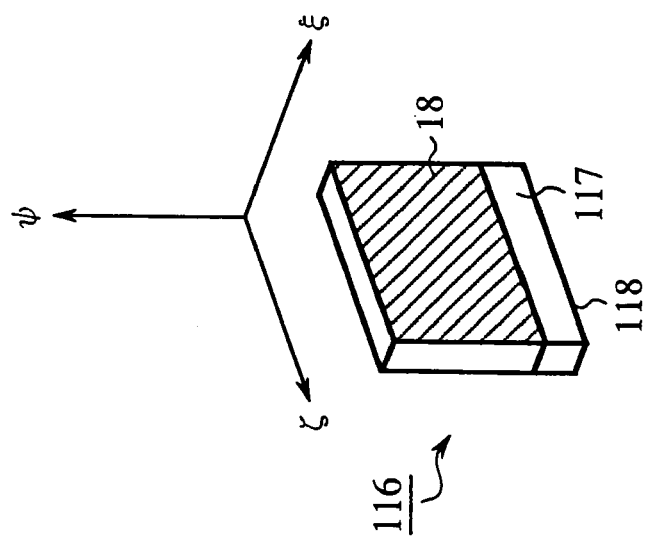

FIG. 67 depicts usage patterns of the image display device 116. In FIG. 67(*a*) the bottom 118 held horizontal; in FIG. 67(*b*) the bottom 118 is held somewhat oblique to the horizontal plane, for example, when the image display device 116 is hung on a wall; and in FIG. 67(*c*) the bottom 118 is held somewhat oblique to the horizontal plane when the image display device is hung on a wall upside down. The above arrangement is to deal with such usage patterns of the image display device 116.

Moreover, the FIG. 64 arrangement is aimed at reducing the thickness of the image display device 116 (minimization of the size in the ξ-axis direction) and suppressing the height of the under-the-screen portion 117 (minimization of the size of the under-the-screen portion 117 in the ψ-axis direction). With such an arrangement, even if the image display device 116 is tilted as depicted in FIGS. 67(*b*) and (*c*), the illumination light source system 123 is turned about the optical axis 130; therefore, it is possible to deal with various usage patterns of the image display device 116 without shortening the useful life of the illumination light source system 123. In this instance, large optical components are placed in a region closer to the plane B–B' than that A–A' so that they do not shade the light (indicated by the hatch lines) from the convex mirror 60 to the screen 18.

Incidentally, as described previously with reference to Embodiments 7 and 10, the plane mirror 22 is held in parallel to the screen 18, and the positions of the refracting optical lens 58 and the micro-mirror device 14 are determined by the positions of the path-bending reflector 59 and the convex mirror 60 properly disposed with respect to the plane mirror 22. Accordingly, the second and third path-bending reflectors 127 and 128 are interposed between the relay lens 126 and the field lens 129 so that the light from the principal components of the converging optical system placed in the space S is incident to the micro-mirror device 14. The position of the second path-bending reflector 127 placed above the third path-bending reflector 128 is set as low as possible so as not to shade the emitted light from the convex mirror 60.

The reason for which the second and third path-bending reflectors 127 and 128 are disposed between the relay lens 126 and the field lens 129 is that although the relative positions of other optical components determined by optical conditions such as image formation, the path length from the relay lens 126 to the field lens 129 can appropriately be determined by adjusting their focal lengths.

As described above, the principal part of the converging optical system is disposed in the space S with the optical axis 130 held in parallel to the bottom 118 and the screen 18 of the image display device 116, and second and third path-bending reflectors 127 and 128 transmit the light traveling from the relay lens 126 toward the field lens 129. With such an arrangement, it is possible to converge light from the principal part of the converging optical system in the space S onto the micro-mirror device 14 that is a reflecting type spatial light modulator.

Figure 68:
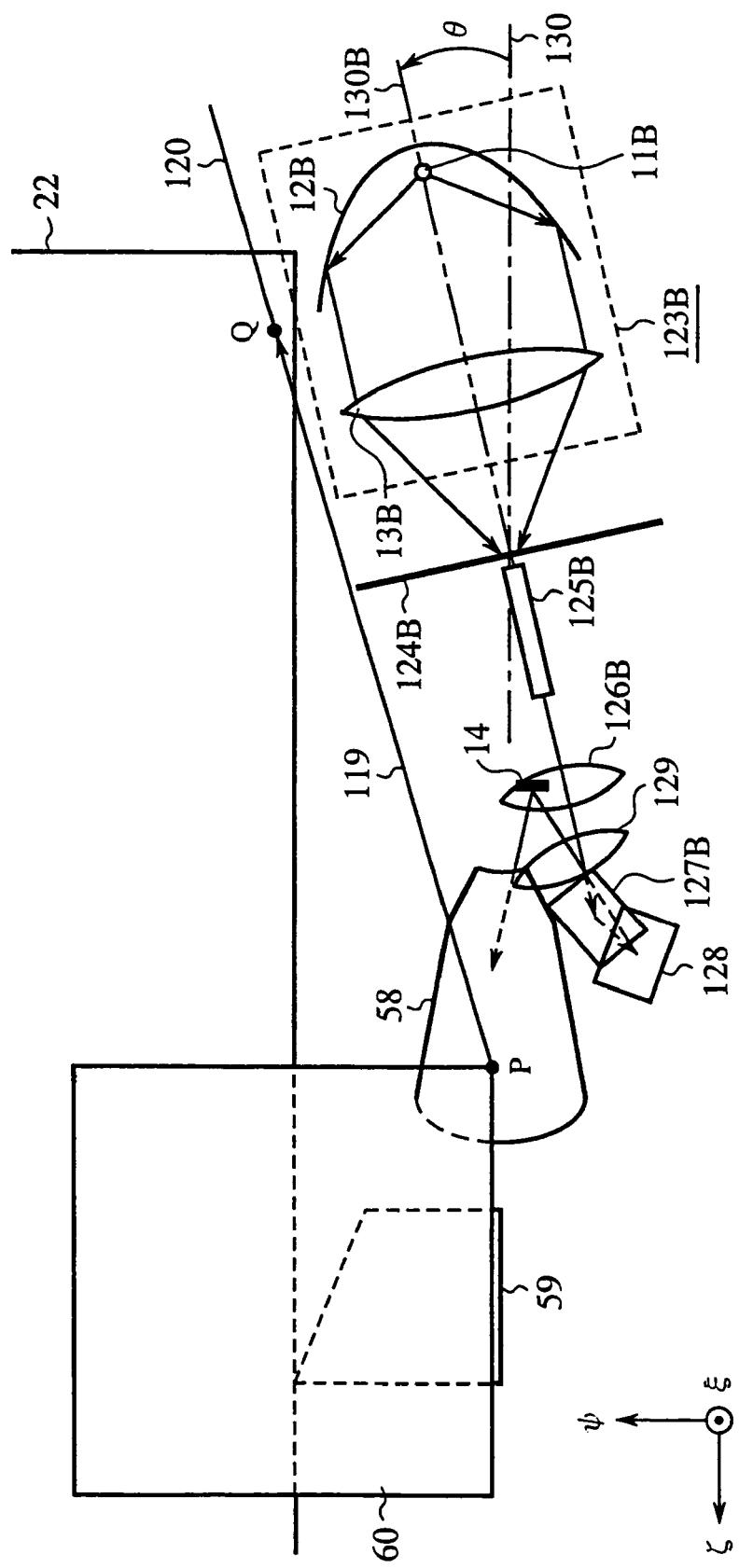
FIG. 68 is a diagram depicting the configuration of an image display device according to a 17th embodiment of the present invention.

The height of the under-the-screen portion 117 can also be suppressed by such a scheme as described just below. That is, when the optical axis 130 is set in parallel to the bottom 118, it is also likely that the height of the under-the-screen portion 117 (the position of the bottom 118 in the ψ-axis direction) is determined by such large-diameter components as the illumination light source system 123 and the color wheel 124. Then, the optical axis 130B of the principal part of the converging optical system, which is comprised of an illumination light source system 123B, a color wheel 124B, a rod integrator 125B and a relay lens 126B, is tilted at an angle θ as depicted in FIG. 68. Of course, the tilt angle θ is within a prescribed value of the illumination light source system 123B.

The optical axis 130B is tilted so that it is parallel to the screen 18 and that a point of intersection of the illumination light source system 123B and the optical axis 130B is higher than a point of intersection of the relay lens 126B and the optical axis 130B in the ψ-axis direction (in the vertical direction). In this instance, care should be taken so that the tilt angle θ is held within the prescribed value and that the illumination light source 12B and the color wheel 124B will not shade the rays 119 and 120. As the optical axis 130B is tilted, the position of the second path-bending reflector 127B in the ψ-axis direction becomes lower and the positions of the illumination light source system 123B and the color wheel 124B in the ψ-axis direction become higher. And the height of the under-the-screen portion 117 is determined by the third path-bending reflector 128 at the lowest position.

Figure 69:
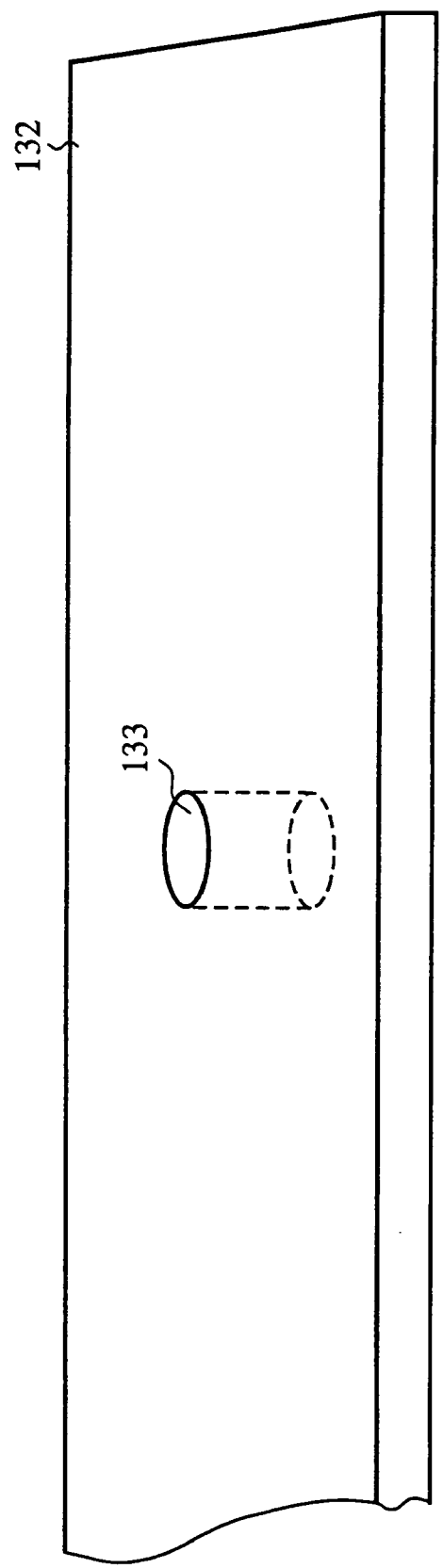
FIG. 69 is a diagram depicting an adjustment table having made therein a hole for receiving a third path-bending reflector.

Furthermore, a hole 133 for receiving the third path-bending reflector 128 may also be made in an adjustment table 132 that is placed under the converging optical system to hold its components and makes adjustments to their positions (FIG. 69). This allows further reduction of the height of the under-the-screen portion 117.

While in the above the second and third path-bending reflectors 127 and 128 each have been described to be a plane mirror, this embodiment is not limited specifically thereto but each path-bending reflector may be formed by two or one curved mirror. By using a curved mirror as at least one of the second and third path-bending reflectors 127 and 128 and contriving its curved reflecting surface (optical surface), ray control can be effected with flexibility.

Further, as is the case with the path-bending reflector 59 in Embodiments 7 and 10, at least one of the second and third path-bending reflectors 127 and 128 may be formed by a prism that has a plane or curved refracting surface (optical surface).

By this, it is possible to boost various optical performance features such as the illumination efficiency for the micro-mirror device 14, the image-formation condition of the emitting surface of the rod integrator 125 for the micro-mirror device 14, the image-formation condition of the Fourier transform plane of the relay lens 126 system for the entrance pupil of the refracting optical lens 58 and uniform illuminance distribution of illumination light of the micro-mirror device 14.

As described above, according to this embodiment, the point R on the base of a square image displayed on the screen 18 and the farthest away from the center of the image, the point of reflection Q of the ray 120 on the plane mirror 120 toward the point R, the point of reflection P of the ray 119 on the convex mirror 60 toward the point Q, and the points P', Q' and R' of projection of the points P, Q and R onto the bottom 118 from the direction normal thereto are joined by segments to form the space S, in which the principal part of the converging optical system (in the FIG. 64 example, the illumination light source system 123 to the relay lens 126) is disposed—this permits suppression of the height of the under-the-screen portion 117 within the range of the thickness or depth dimension of the image display device defined by the plane mirror 22 and the screen 18.

Further, since this embodiment is provided with the second path-bending reflector 127 which reflects light from the principal part of the converging optical system composed of the illumination light source system 123 to the relay lens 126 and the third path-bending reflector 128 which launches the reflected light from he second path-bending reflector 127 to the micro-mirror device 14 through the field lens 129, light can be converged, by the principal part of the converging optical system placed in the space S, to the micro-mirror device 14 that is a reflection type spatial light modulator.

Further, since the optical axis 130 of the principal part of the converging optical system is set in parallel to the screen 18 and the bottom 118, it is possible to adapt the image display device 116 for various usage patterns by suppressing the height of the under-the-screen portion 117 without reducing the useful life of the illumination light source system 123.

Further, since the optical axis 130 of the principal part of the converging optical system is set in parallel to the screen 18 and the bottom 118 and is tilted within a prescribed value of the tilt angle of the illumination light source system 123B so that the position of its light emitting member 11B in the ψ-axis direction is higher than the position of the relay lens 126B in the ψ-axis direction, it is possible to adapt the image display device 116 for various usage patterns by suppressing the height of the under-the-screen portion 117 without reducing the useful life of the illumination light source system 123.

Besides, since this embodiment is provided with the adjustment table 132 for supporting the converging optical system and for receiving the third path-bending reflector 128 in the hole 133, the height of the under-the-screen 117 can be further reduced.

Further, since at least one of the second and third path-bending reflectors 127 and 128 is formed by a curved mirror, various modifications of its curved surface configuration furnishes freedom of ray control, making it possible to improve various optical performance features.

Figure 63A:
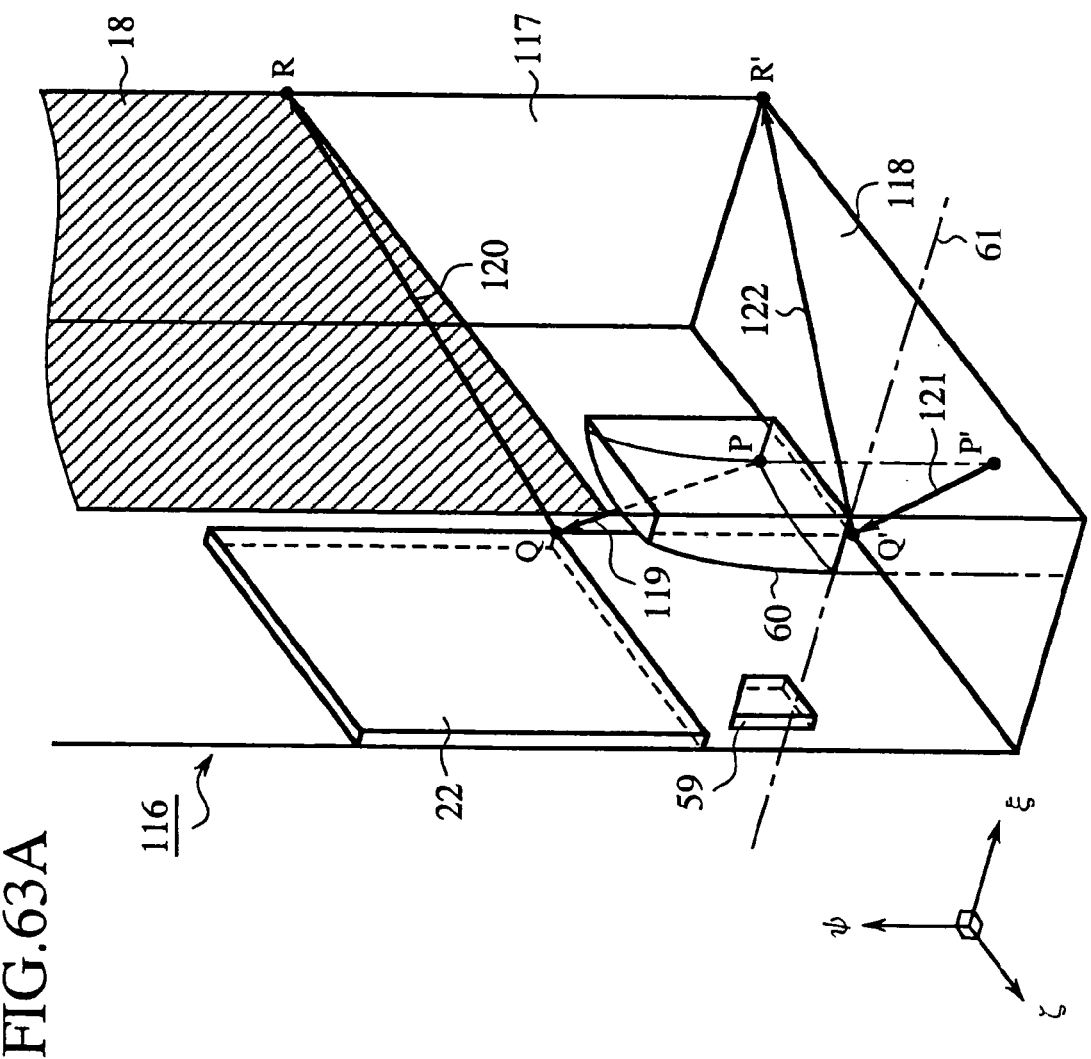

Incidentally, since the image display device 116 in FIG. 63(a) is divided into equal halves, each device has two symmetric spaces S. It is recommended in this case to place the converging optical system in the one space S and other components such as the power supply in the other space S.

Moreover, in the case of using a liquid crystal or similar transmission type spatial light modulator in the image display device, it is recommended to employ a system configuration in which the converging optical components from the illumination light source system 123 to the field lens 129 of the common optical axis 130 is disposed in the space S and the optical axis 130 is held substantially in parallel to the ξ-ζ plane as in the cases of FIGS. 64 and 68 for direct incidence of light to the transmission type spatial light modulator without using the second and third path-bending reflectors 127 and 128.

Further, by providing a known TIR prism (total internal reflection prism) that transmits light from the third path-bending reflector 128 to the micro-mirror device 14 and light from the latter to the refracting optical lens 58, this embodiment can be applied as well to a telecentric projecting optical system in which the entrance pupil of the refracting optical lens 58 is apparently at the point at infinity.

Embodiment 18

While Embodiment 4 has been described to employ a refracting optical lens that is an injection molding of a plastic synthetic resin, the convex mirror projecting optical means, reflecting part) used in each embodiment may also be formed of the plastic synthetic resin. As is the case with the refracting optical lens, the use of the plastic resin allows case in forming an aspherical or similar surface configuration of the convex mirror and enables its low-cost, mass production.

An important point in making the convex mirror of synthetic resin is measures against a temperature change in environments where the image display device is actually used. A modification of the aspherical surface configuration of the convex mirror or displacement of the optical axis by thermal expansion/shrinkage due to a temperature change will degrade the optical performance of the image display device. A description will be given below of a convex mirror having taken protective measures against temperature changes.

Figure 70B:
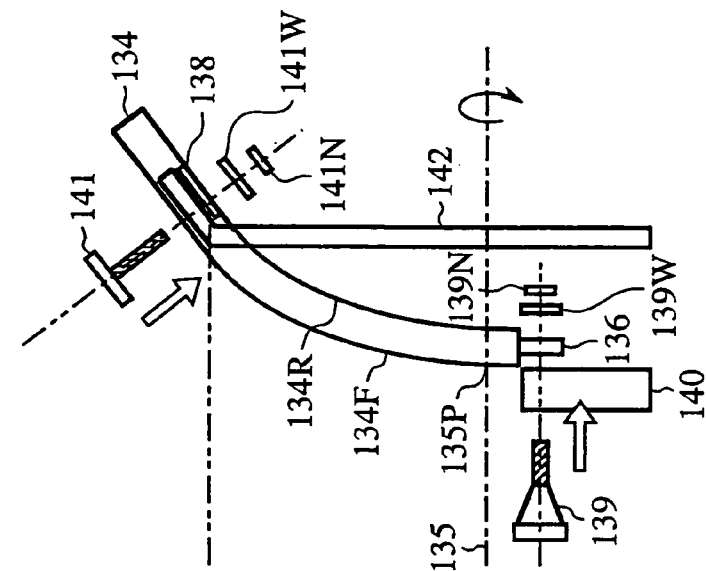
FIG. 70 is a diagram depicting the configuration of an aspherical convex mirror for use in an image display device according to an 18th embodiment of the present invention.
Figure 70C:
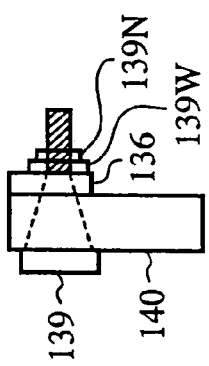
Figure 70A:
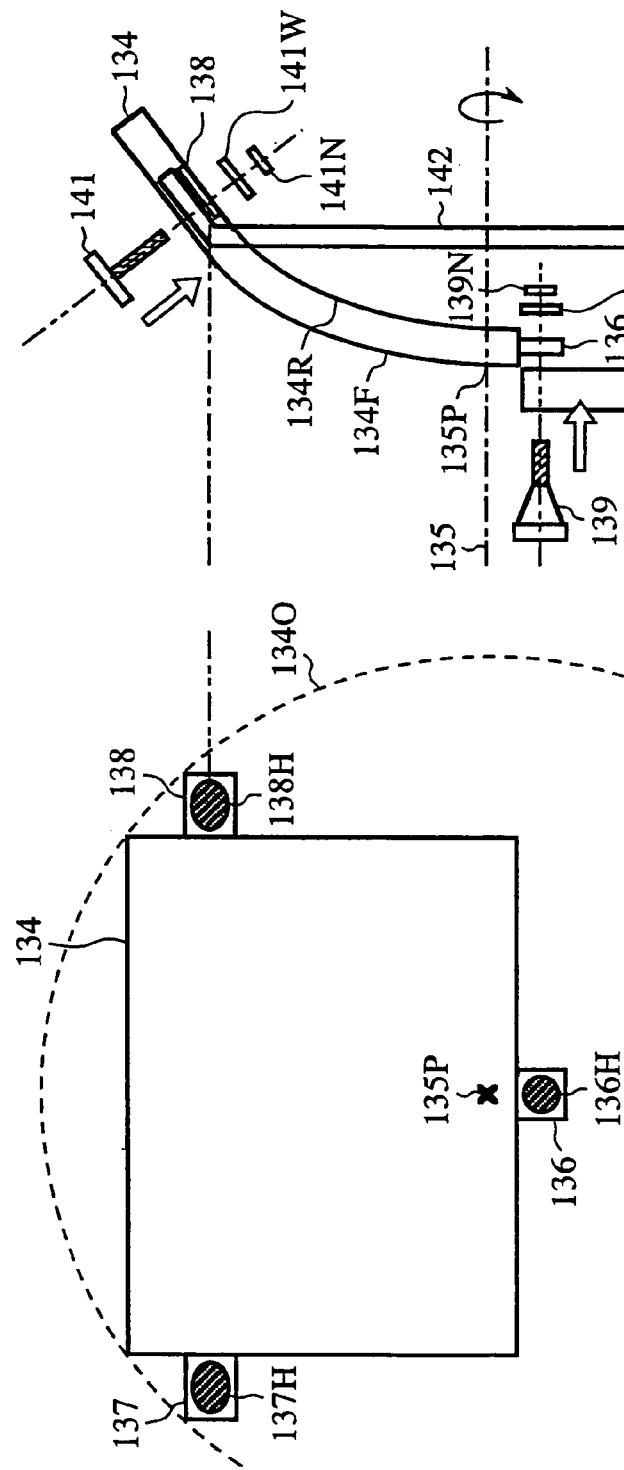

FIG. 70 schematically illustrates a convex mirror for use in the image display device according to an eighteenth embodiment (Embodiment 18) of the present invention. FIGS. 70(a) and (b) are a front and a side view of the convex mirror.

Reference numeral 134 denotes generally a convex mirror (projecting optical means, reflecting part) made of synthetic resin, which convex mirror is the same as in the embodiments described above. Reference numeral 135 denotes the optical axis of the convex mirror 134. The convex mirror 134 has such a shape that the nonreflecting portion, which does not project light (optical image signal) onto the screen, is cut off from an aspherical convex mirror 134O that is rotationally symmetric with respect to the optical axis 135 (FIG. 70(a), see Embodiment 10). The thickness of the convex mirror 134 from the front surface 134F to the rear surface 134R is uniform (FIG. 70(b), see Embodiment 15).

At the time of cutting off the nonreflecting part, first, second and third screwing parts 136, 137 and 138 having screw holes 136H, 137H and 138H, respectively, are provided in the convex mirror 134. The convex mirror 134 is secured to the image display device by screwing at the first to third screwing parts 136 to 138 as described below. To minimize distortion of the reflecting surface of the convex mirror 134, the screwing parts 136 to 138 and the screw holes 136H to 138H may preferably be formed simultaneously with the formation of the convex mirror 134.

FIG. 70(a) is a front elevation of the convex mirror 134 appearing square as viewed from the direction of the optical axis 135. The first screwing part 136 is disposed close to the optical axis 135. That is, the first screwing portion 136 is positioned on the base of the convex mirror 134 at a location nearest the apex 135P (indicated by a cross in FIG. 70(a)) of the convex mirror, defined by the front surface 134F and the optical axis 135, so that the eccentric distance from the optical axis 135 to the center of the screw hole 136H is minimized. The range of the eccentric distance will be described later.

The first screwing part 136 is pivotally mounted at a position in a plane of the convex mirror 134 perpendicular to the optical axis 135 by a taper screw 139, a washer 139W and a nut 139N on the mounting surface of a convex mirror mounting mechanism (first reflecting part mounting mechanism) 140 fixed to the convex mirror 134. The pivotal mounting of the first screwing part 136 prevents complete freedom of movement of the convex mirror 134 except turning about the direction of insertion of the taper screw 139 into the screw hole 136H.

For such pivotal mounting of the first screwing part 136, a through hole of the mounting mechanism 140 and the screw hole 136H of the first screwing part 136 are so tapered as to snugly receive the taper screw 139. The taper screw 139 is inserted through the mounting mechanism 140 and the screw hole 136H and then tightened down by means of the washer 139W and the nut 139N. The tapering of the through hole of the convex mirror mounting mechanism 140 and the screw hole 136H of the first screwing part 136 ensures pivotal mounting of the convex mirror 134 on the image display device. After screwing, the tapered portion of the taper screw 139 remains in the convex mirror mounting mechanism 140 and the screw end portion projected out therefrom is fixed by the washer 139W and the nut 139N.

The second and third screwing parts 137 and 138 are provided on the left- and right-hand sides of the convex mirror 134 in its front elevation in FIG. 70(a) so that an isosceles triangle defined by segments joining the centers of the second and third screwing parts 137 and 138 and the convex-mirror apex 135P is maximized.

The second and third screwing parts 137 and 138 are each slidably mounted by a straight screw 141 on the mounting surface of a convex mirror mounting mechanism (second or third reflecting part mounting mechanism) 142 of the image display device. The slidable mounting of the second and third screwing parts 137 and 138 allows them to slide on the mounting surface of the convex mirror mounting mechanism 142 upon occurrence of thermal expansion/shrinkage of the convex mirror 134.

For the slidable mounting, the diameters of the screw holes 137H and 138H of the second and third screwing parts 137 and 138 all have a diameter than that of the straight screw 141. The mounting surface of the convex mirror mounting mechanism 142 is large in area and inclined in the direction of sliding of the second and third screwing parts 137 and 138. The mounting surface being held in contact with the second and third screwing parts 137 and 138. The straight screw 141 is inserted through the convex mirror mounting mechanism 142 and the screw hole 137H (138H) and then tightened, for example, by a washer 141W and a nut 141N loosely to such an extent as to allow sliding of the screwing part 137 (138) on the mounting surface of the convex mounting mechanism 142 upon occurrence of thermal expansion/shrinkage of the convex mirror 134. To ensure smooth sliding movement of the screwing part, a lubrication layer containing a lubricant is interposed, as required, between the mounting surface of the convex mirror mounting mechanism 142 and the screwing part 137 (138).

As described above, this embodiment features that the convex mirror 134 is secured to the image display device at three points by the first to third screwing parts 136 to 138 to thereby protect the convex mirror 134 from a temperature change. Next, a description will be given of how the convex mirror 134 reacts to a temperature change.

FIG. 71 depicts how the convex mirror 134 at room temperature thermally expands with a temperature rise. The components corresponding to those in FIG. 70 are indicated by similar reference numerals. In FIG. 71 the convex mirror 134 at room temperature and a thermally expanded convex mirror 134' are depicted one on the other. The unprimed reference numerals indicate components of the convex mirror 134 at room temperature, and the primed reference numerals indicate components of the thermally expanded convex mirror 134'.

Figure 71A:
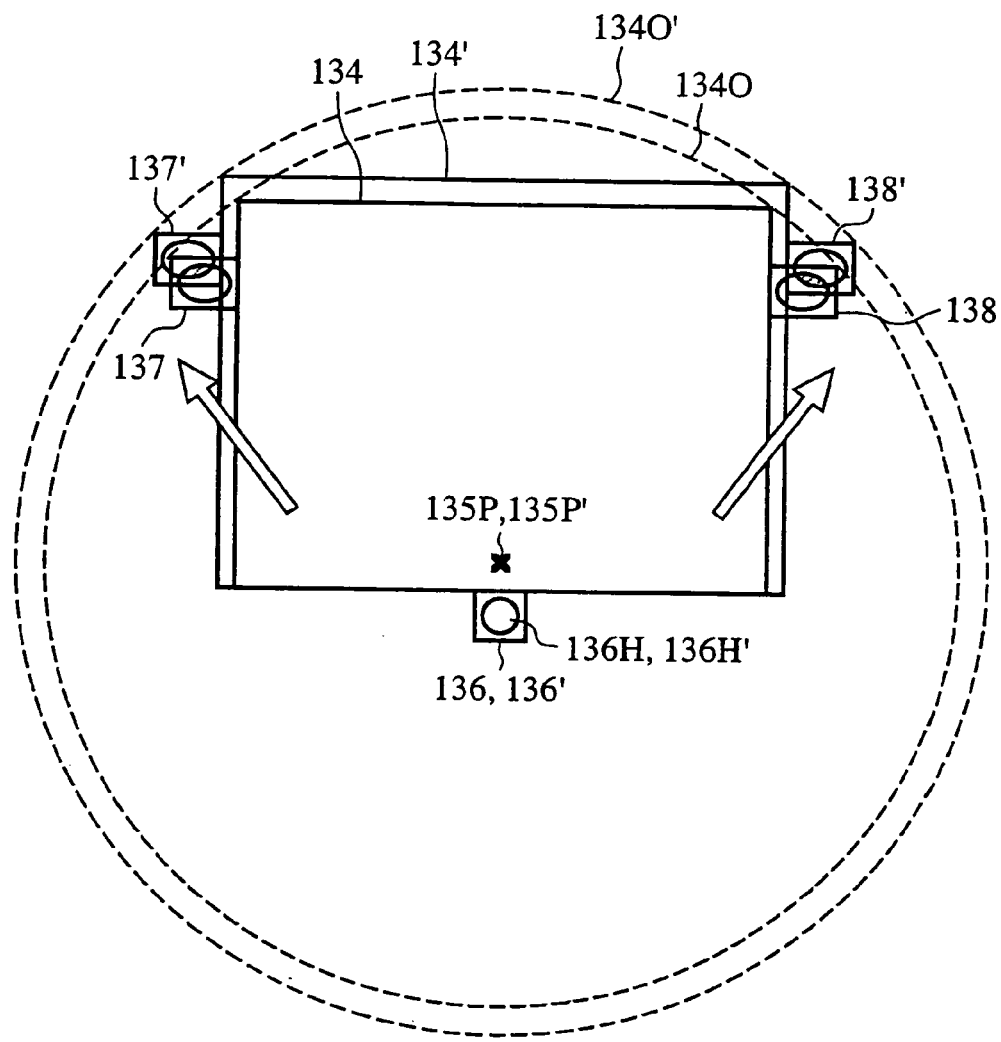
FIG. 71 is a diagram for explaining the operation of a convex mirror that thermally expands due to a temperature change.

In FIG. 71(a), the first screwing part 136 is pivotally secured at the position in the plane of the convex mirror 134 perpendicular to the optical axis 135, and hence it serves as a steady point against stress deformation, applying stress of deformation by thermal expansion to other parts of the convex mirror 134. In this case, displacement of the optical axis 135 can be minimized since the first screwing part 136 is provided in proximity to the optical axis 135 with a predetermined eccentric distance therebetween.

Figure 71B:
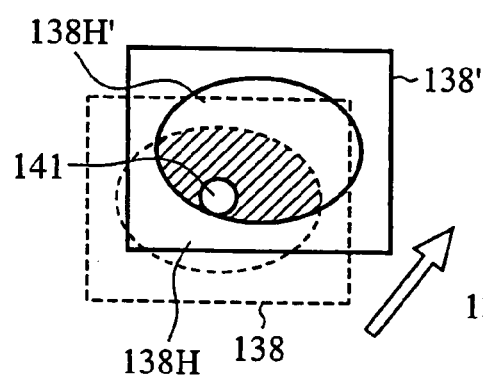

The stresses resulting from thermal expansion by a temperature change are converted to displacement of the slidably mounted second and third screwing parts 137 and 138. FIG. 71(b) depicts on an enlarged basis the third screwing part at room temperature (indicated by the broken lines) and the third screwing part 138' thermally expanded to a maximum (indicated by the solid lines).

As referred to previously, since the diameter of the screw hole 138H (137H) of the third screwing part 138 is larger than the diameter of the straight screw 141, the third screwing part 138 slides along the mounting surface of the convex mirror mounting mechanism 142. Accordingly, as temperature changes or rises, the convex mirror 134 thermally expands but its front surface 134F does not change its surface configuration—this prevents degradation of the optical performance of the image display device by the temperature change. Of course, the same is true of thermal shrinkage.

Figure 71C:
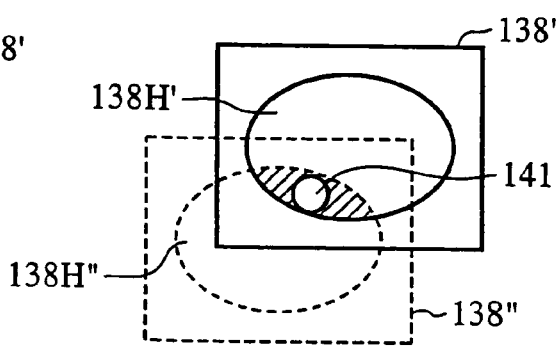

As will be understood from FIG. 71(c), the relative diameters of the screw hole 138H and the straight screw 141 can be determined, based on temperature specifications of the image display device, depending on the positional relationship between the screw hole 138H' at the time of maximum expansion and the screw hole 138H" at the time of minimum shrinkage (the amount of displacement of the screw hole 138). The diameters of the screw hole 137H and the straight screw 142 relative to each other can similarly be determined.

Figure 72A:
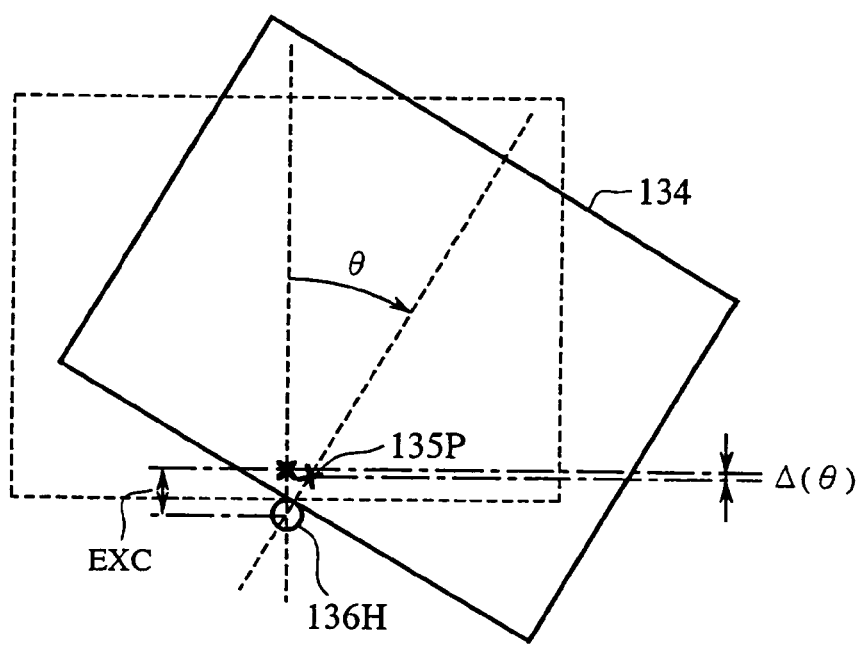
FIG. 72 is a diagram for explaining a displacement$\Delta(\theta)$ of the optical axis of the convex mirror when it turns an angle $\theta$ about a first screwing part spaced an eccentric distance EXC apart from the optical axis.
Figure 72B:
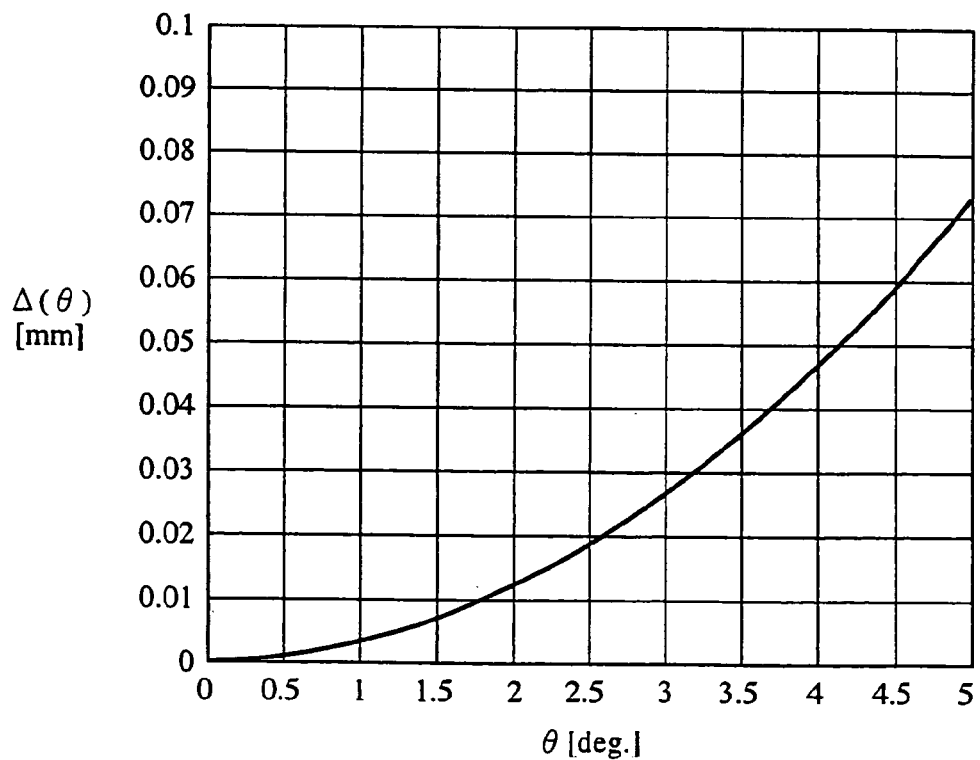

Incidentally, the eccentric distance of the first screwing part 136 from the convex-mirror apex 135P can determined by such a scheme as described below. FIG. 72 is a diagram for explaining a displacement Δ(θ) of the convex-mirror apex 135P produced when the convex mirror 134 was turned about the first screwing part 136 of the eccentric distance EXC. The components corresponding to those in FIG. 70 are identified by similar reference numerals.

Since the convex mirror 134 is pivotally secured by the first screwing part 136, the position of the convex-mirror apex 135P is also determined by the first screwing part 136. Accordingly, in the assembling of the image display device the displacement Δ(θ) of the convex-mirror apex 135P is produced at the time of pivotal mounting of the first screwing part 136.

That is, as depicted in FIG. 72(*a*), when the convex mirror 134 is turned an angle θ about the screw hole 136H deviating from the convex-mirror apex 135P by the eccentric distance EXC, the displacement Δ(θ) of the convex-mirror apex 135P in the perpendicular direction is caused by an assembling error. In view of this, it is recommended to determine the eccentric distance EXC of the first screwing part 136 from the size of the convex mirror 134 and an adjustable range of the turning error θ in the assembling step so that the displacement Δ(θ) falls within given limits.

In FIG. 72(*a*), the displacement Δ(θ) of the optical axis 135 is given by $\Delta(\theta)=EXC \cdot [1-\cos(\theta \cdot \pi/180)]$. FIG. 72(*b*) shows, based on this equation, the relationship between the turning error θ and the displacement Δ(θ), for example, when the eccentric distance EXC=20 mm.

Assume, for example, that the adjustable range of the turning error θ is 2 deg. And the maximum permissible value of the displacement Δ(θ) is 0.1 mm. Since Δ(θ)<0.02 mm for θ=2 deg. as indicated by the curve in FIG. 72(*b*), it will be seen that the convex mirror 134 with the eccentric distance EXC of the first screwing part 136 set to 20 mm has a sufficient, more than five-fold margin of assembling.

It is also possible that EXC=0 mm, that is, that the center of the screw hole 136H coincides with the convex-mirror apex 135P. Naturally, in this case the displacement Δ(θ) of the convex-mirror apex 135P does not occur, and consequently the convex mirror 134 can be held in more ideal conditions.

In FIG. 70, the first to third screwing parts 136 to 138 are shown to be further to the side of the rear surface 134R than the convex mirror mounting mechanisms 140 and 142. The reason for this is that the convex mirror mounting mechanisms 140 and 142 maintain the geometries of the front surface 134F formed with high precision and, at the same time, direct the stress applied to the convex mirror 134 by a temperature change to the rear surface 134R, changing its surface configuration. Thus, the front surface 134F is kept insusceptible to a temperature change.

Figure 73A:
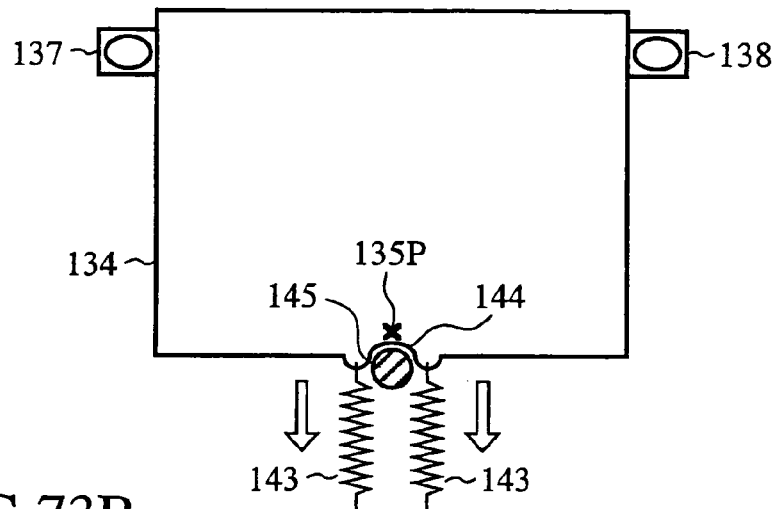
FIG. 73 is a diagram depicting modified structures of the convex mirror adopting measures against temperature variations.
Figure 73B:
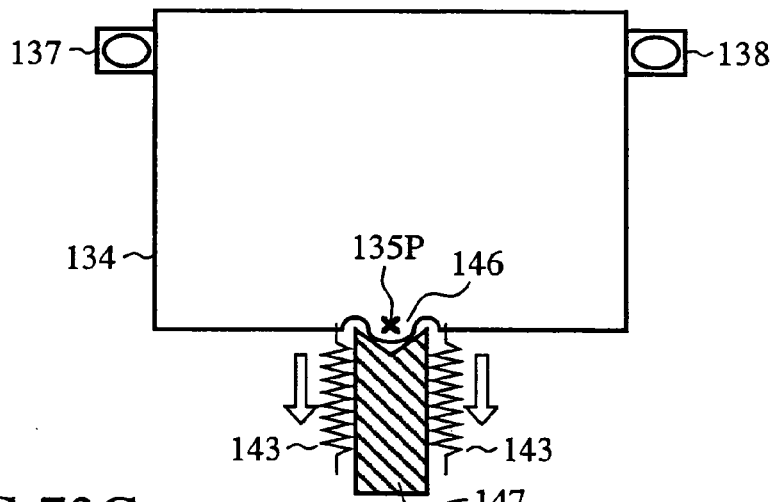

Though described above to have the configuration depicted in FIG. 70, the convex mirror 134 is not limited specifically thereto but may be of such geometries as depicted in FIG. 73.

FIGS. 73(*a*) to (*c*) are front views illustrating modified forms of the convex mirror 134 which similarly adopt measures against a temperature change. The parts corresponding to those in FIG. 70 are identified by the same reference numerals.

In FIG. 73(*a*) the first screwing part 136 is substituted with a recess 144 formed in the lower marginal edge of the convex mirror 134 for forced engagement with a cylindrical support 145. The convex mirror 134 is normally biased downward by a pair of springs 143 anchored at one end thereto on both sides of the recess 144 to press it against the cylindrical support 145.

In FIG. 73(*b*) the first screwing part 136 is substituted with a protrusion 146 formed in the lower marginal edge of the convex mirror 134 for forced engagement with a V-shaped groove of a V-grooved support 147. As is the case with FIG. 73(*a*), the convex mirror 134 is normally biased downward by the pair of springs 143 arranged on both sides of the V-grooved support 147 to press the protrusion 146 against the V-shaped groove of the support 147. In this instance, positioning of the convex-mirror apex 135P at the center of the arcuate protrusion 146 reduces the aforementioned eccentric distance to zero, holding the convex mirror 134 in more ideal conditions.

FIG. 73(*c*) depicts still another modified form, in which the second and third screwing part 137 and 138 are disposed on the upper side of the convex mirror 134 opposite the first screwing part 136, in which case the same results as in the case of FIG. 70 are obtainable.

Figure 74:
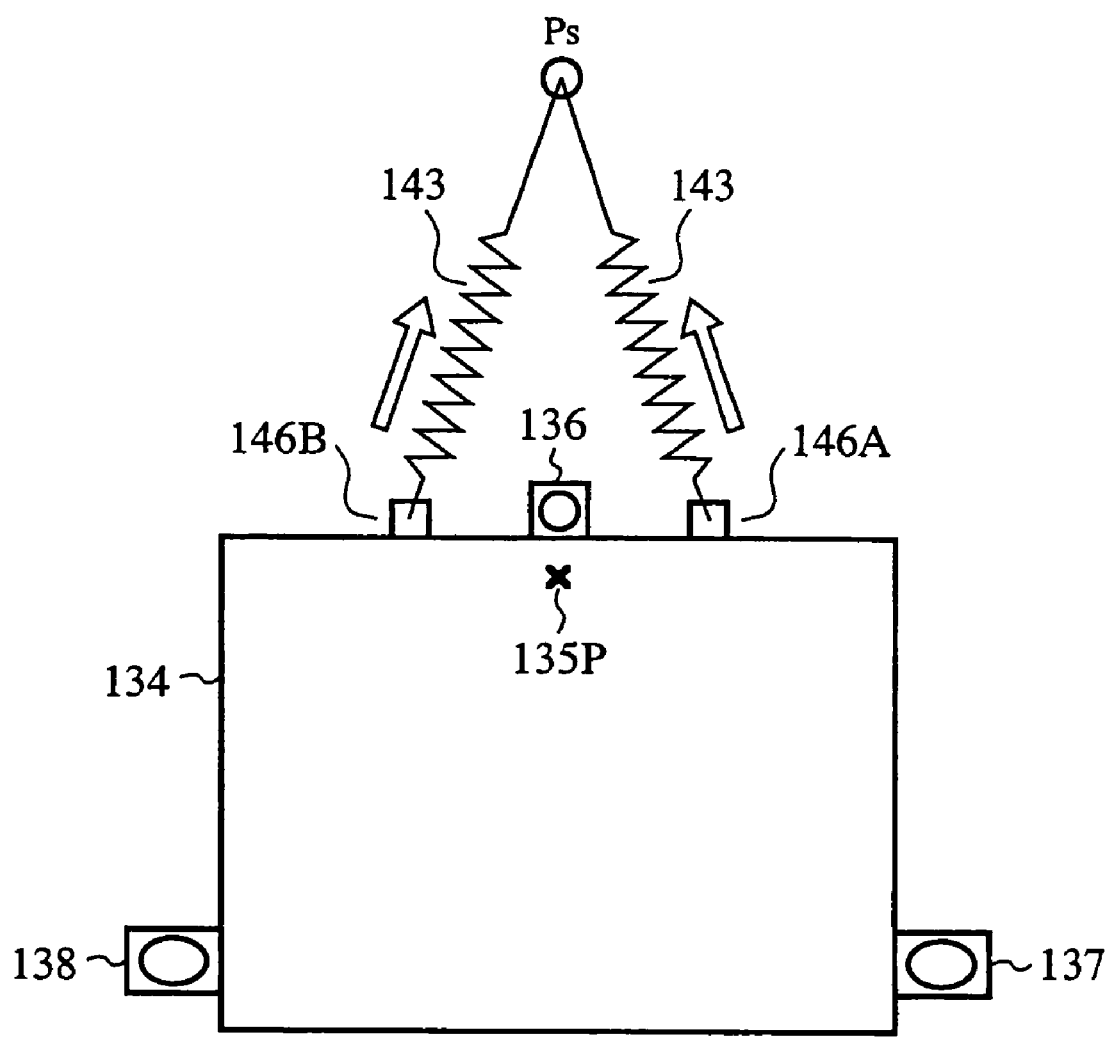
FIG. 74 is a diagram depicting another modified structure of the convex mirror for use in an image display device that is used upside down.

When the image display device is placed upside down (see Embodiment 17), the convex mirror 134 is pulled, as shown in FIG. 74, by a pair of springs 143 anchored at one end to spring retainers 146A and 146B and at the other end at one point Ps.

In this case, the point Ps is located higher than the first screwing part 136, and the tensile forces of the springs 143 for the convex mirror 134 are adjusted to be in balance. This distributes the stresses, which concentrate at the first screwing part 136, to the springs 143, providing increased reliability for the first screwing part 136.

As described above, according to this embodiment, the convex mirror is made of synthetic resin—this facilitate molding of the convex mirror, and enables mass-production of such convex mirrors at low cost.

Further, according to this embodiment, the convex mirror 134 is provided with: the first screwing part 136 pivotally secured to the lower side of the convex mirror 134 at the position the predetermined eccentric distance EXC away from the convex-mirror apex 135P; the second screwing part 137 slidably held on the left-hand side of the convex mirror 134; and the third screwing part 138 slidably held on the right-hand side of the convex mirror 134. With such an arrangement, it is possible to prevent deformation of the convex mirror 134 and displacement of the convex-mirror apex 135P by thermal expansion/contraction due to a temperature change; accordingly, the optical performance of the image display device can be prevented from degradation.

Further, according to this embodiment, since the convex mirror mounting mechanism 140 and the first screwing part 136 are screwed by the taper screw 139 and have tapered screws that conform to the taper of the taper screw 139, the first screwing part 136 can be pivotally secured to the convex mirror 134.

Further, according to this embodiment, the convex mirror 134 is provided with: the recess 144 formed in the lower marginal edge of the convex mirror 134 at the position the predetermined eccentric distance EXC away from the convex-mirror apex 135P; the cylindrical support 145 for engagement with the recess 144; the two springs 143 anchored at one end to the convex mirror 134 on both sides of the recess 144 for pulling the convex mirror 134 downward; and the second and third screwing parts 137 and 138 slidably held on the convex mirror 134. With such an arrangement, too, it is possible to prevent deformation of the convex mirror 134 and displacement of the convex-mirror apex 135P by thermal expansion/contraction due to a temperature change; accordingly, the optical performance of the image display device can be prevented from degradation.

Further, according to this embodiment, the convex mirror 134 is provided with: the arcuate protrusion 146 formed on the lower side of the convex mirror 134 in proximity to the convex-mirror apex 135P; the V-grooved support 147 for receiving the protrusion 145 in its V-shaped groove; the two springs 143 anchored at one end to the convex mirror 134 on both sides of the protrusion 146 for pulling the convex mirror 134 downward; and the second and third screwing parts 137 and 138 slidably held on the convex mirror 134. Such an arrangement also makes it possible to prevent deformation of the convex mirror 134 and displacement of the convex-mirror apex 135P by thermal expansion/contraction due to a temperature change; accordingly, the optical performance of the image display device can be prevented from degradation.

Further, according to this embodiment, the two springs 143 are provided which are anchored at one end to the convex mirror 134 on both sides of the first screwing part 136 and at the other end to a common spring retaining point. With such an arrangement, when the image display device is placed upside down, the stresses that concentrate on the first screwing part 136 can be distributed to the springs 143—this provides increased reliability of the first screwing part 136.

Further, according to this embodiment, since the screwing parts 136, 137 and 138 are held in contact with the front surface 134F of the convex mirror 134 through the convex mirror mounting mechanisms 140 and 142, the reflecting surface of the convex mirror 134 can be disposed with high precision.

While in the above the convex mirror 134 has been described to be rotationally symmetric with respect to the optical axis 135, this embodiment is also applicable to optical components made of synthetic resin which are rotationally asymmetric with respect to the optical axis 135.

The numbers of the second and third screwing part 137 and 138 are not limited specifically to one but may also be two or more.

Embodiment 19

Figure 75:
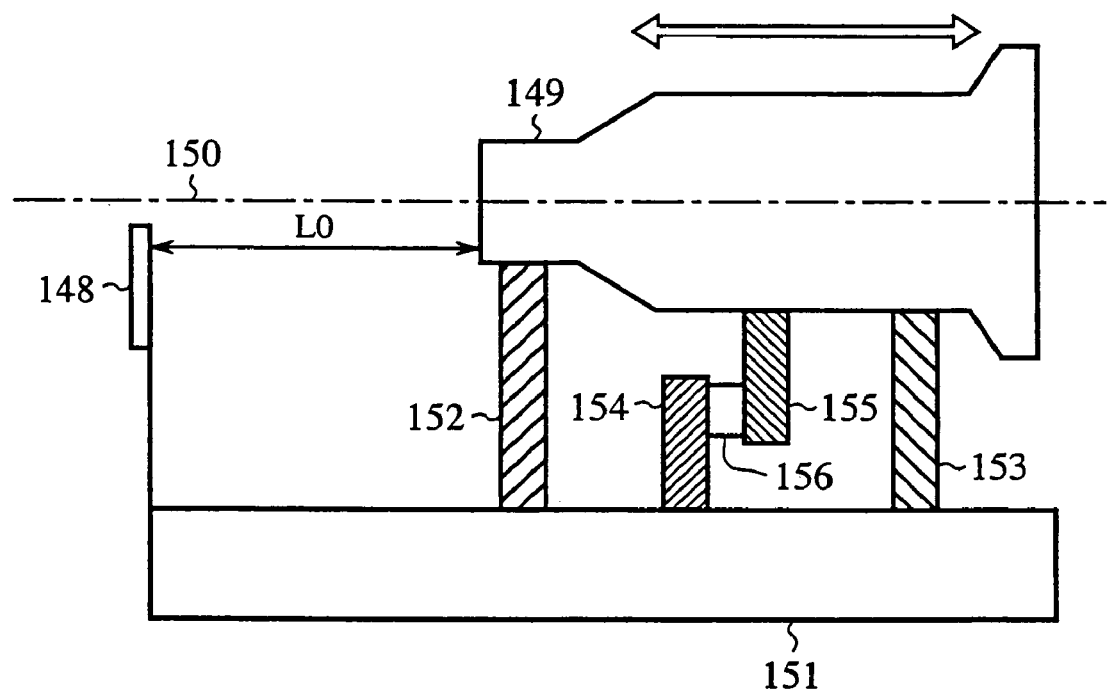
FIG. 75 is a diagram depicting the configuration of an image display device according to a 19th embodiment of the present invention.

FIG. 75 schematically illustrates an image display device according to a nineteenth embodiment (Embodiment 19) of the present invention, which also adopts measures against a temperature change. For brevity sake, the illumination light source system, the convex mirror and components following it are not shown.

Reference numeral 148 denotes a micro-mirror device (transmitting means, image information imparting means); 149 denotes the same refracting optical lens as those used in the foregoing embodiments; 150 denotes the optical axis of the refracting optical lens 149; and 151 denotes an optical base (retaining mechanism) on which the micro-mirror device 148, the refracting optical lens 149 and other optical components are mounted. The optical base 151 corresponds to the retaining mechanism 74 depicted in FIG. 43 (see Embodiment 10), and holds, as one piece, path-bending reflectors and a convex mirror (not shown), including the micro-mirror device 148 in this case.

Reference numerals 152 and 153 denote two supports fixed to the optical base 151, by which the refracting optical lens 149 is slidably supported. The refracting optical lens 149 is adapted to be slidable on he supports 152 and 153 in the direction of the optical axis 150.

Reference numeral 154 denotes a mounting plate fixed to the optical base 151; 155 denotes a mounting plate fixed to the underside of the refracting optical lens 149; and 156 denotes a piezoelectric element that changes its length in the direction of the optical axis 150 according to a DC control voltage from a power supply (not shown). The piezoelectric element 156 is held between the mounting plates 154 and 155 that are disposed between the sliding supports 152 and 153.

The light (optical image signal) emitted from the micro-mirror device 148 travels through the refracting optical lens 149 to the convex mirror, the plane mirror and the screen (though not shown) as described previously with reference to the foregoing embodiments. In this instance, even if the focus of the image displayed on the screen is initially adjusted, for example, at room temperature, the image may sometimes become out of focus due to an ambient temperature change.

This defocusing is caused by different spacing of respective lens groups and respective lenses in the refracting optical lens 149 and different temperature distributions and coefficients of linear expansion of the optical base 151 and respective optical components mounted on the optical base 151; that is, the defocusing phenomenon is attributable to displacement of the relative positions of the optical components owing to different degrees of their thermal expansion or contraction in the direction of the optical axis 150. A particularly important issue with this phenomenon is a change in the distance L0 from the micro-mirror device 148 to the refracting optical lens 149 in the direction of the optical axis 150. It is well-known from the results of numerical analysis that the change in the length L0 significantly affects the defocusing phenomenon. This involves two factors, one is that the distance L0 for the optimum focus changes to L0A due to temperature variations of lenses, and the other is that the distance L0 itself physically changes to L0B due to a temperature change. In this instance, when the relationship L0A=L0B is maintained regardless of a temperature change, no defocusing will occur. When such relationship is not maintained, defocusing will occur.

To compensate for the change in the distance L0B−L0A, this embodiment employs the piezoelectric element 156 whose length can be adjusted by a control voltage in the direction of the optical axis 150. That is, initial focus adjustment is made with the piezoelectric element 156 supplied with an initial offset of the control voltage. And the control voltage to be applied to the piezoelectric element 156 is increased or decreased according to a temperature change in the use environment of the image display device.

As the length of the piezoelectric element 156 is thus changed, the distance between the mounting plates 154 and 155 holding the piezoelectric element 156 between them is changed, and consequently the refracting optical lens 149 slides along the optical axis 150 on the sliding supports 152 and 153.

For example, when the distance L0B−L0A becomes longer than the initially adjusted value due to a temperature change, the control voltage is decreased to reduce the length of the piezoelectric element 156. As a result, the refracting optical lens 149 slides on the sliding supports 152 and 153 toward the micro-mirror device 148 along the optical axis 150; hence, the distance L0 affected by the temperature change returns to the initially adjusted value.

When the distance L0B−L0A becomes shorter than the initially adjusted value, the control voltage is increased to increase the length of the piezoelectric element 156. As a result, the refracting optical lens 149 slides on the sliding supports 152 and 153 away from the micro-mirror device 148 along the optical axis 150; hence, the distance L0 affected by the temperature change returns to the initially adjusted value.

As described above, the FIG. 75 structure is adapted to compensate for the change in the distance L0, which significantly affects defocusing, by controlling the control voltage that is applied to the piezoelectric element. Hence, defocusing by the temperature change can be controlled.

Figure 76:
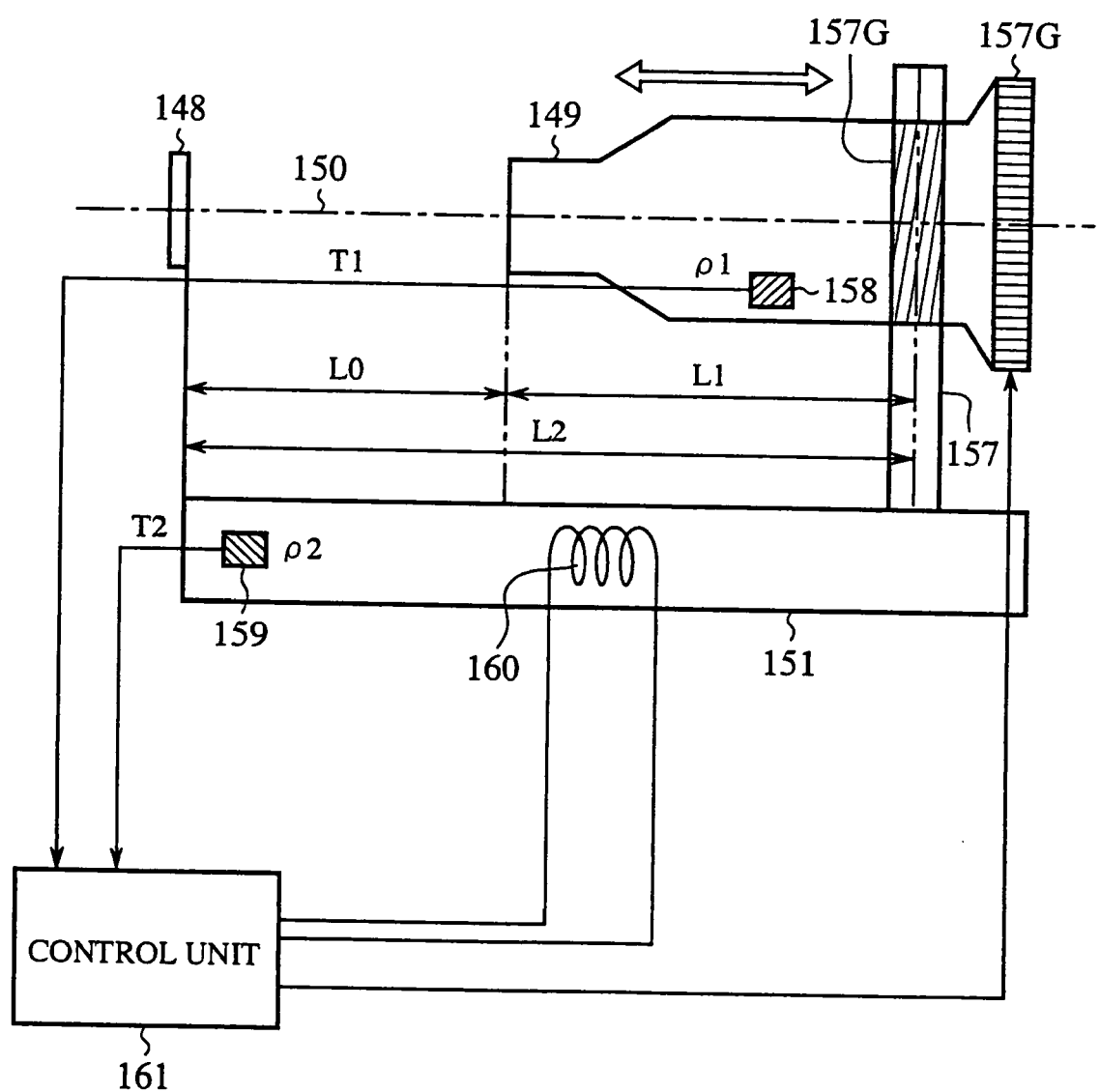
FIG. 76 is a diagram depicting the configuration of a modified form of the image display device according to the 19th embodiment of the present invention.

FIG. 76 illustrates another arrangement that implements the measures against the temperature change responsible to defocusing. The parts and components corresponding to those in FIG. 75 are identified by the same reference numerals. For brevity sake, the illumination light source system, the convex mirror and the optical components following it are not shown.

Reference numeral 157 denotes a gear support fixedly planted on the optical base 151, for moving the refracting optical lens 149 in the direction of the optical axis 150 precisely without much play in that direction by a gear mechanism 157G containing a motor and so forth. Reference numerals 158 and 159 denote temperature sensors for sensing the lens-barrel temperature T1 of the refracting optical lens 149 and the temperature T2 of the optical base 151, respectively.

Reference numeral 160 denotes a heater/cooler for heating/cooling the optical base 151, such as a Peltier device. Reference numeral 161 denotes a control unit such as a CPU, which effects feedback control of the gear mechanism 157G and the heater/cooler 160 according to the temperatures T1 and T2.

While the FIG. 75 example utilizes the piezoelectric element to adjust the distance L0B−L0A, this example uses the gear mechanism 157G to move the refracting optical lens 149 in the direction of the optical axis 150 to adjust the distance L0B−L0A. The arrangement of FIG. 76 also produces the same effects as those obtainable with the FIG. 75 example.

The FIG. 76 example features feedback control of the gear mechanism 157G and the heater/cooler 160 by the control unit 161 according to the temperatures T1 and T2 of the refracting optical lens 149 and the optical base 151 that are sensed in real time by the temperature sensors 158 and 159.

Let the coefficients of linear expansion of the lens barrel of the refracting optical lens 149 and the optical base 151 be represented by ρ1 and ρ2, respectively, the length of the refracting lens 149 from its light receiving surface to the position of the gear support 157 in the direction of the optical axis 150 by L1 (where L0+L1=L2) and the temperatures of both of the refracting optical lens 149 and the optical base 151 during the initial focus adjustment by T0.

In the case where temperature gradients occur in the image display device placed in its use environment and the length L0 changes to L0B=L0+ΔL0, the temperature sensors 158 and 159 sense the temperatures of the refracting optical lens 149 and the optical base 151. Let the thus sensed temperatures be represented by T1 and T2 (where T1≠T2). At this time, a length variation ΔL0B is given by ΔL0B=L2·ρ2·(T2−T0)−L1·ρ1·(T1−T0). The length variation ΔL0B that provides optimum focusing at the lens-barrel temperature T1 is prestored in the control unit 161.

The control unit 161 calculates the physical length variation ΔL0B, and adjusts the gear mechanism 157G to compensate for the length L0 so that an optical focus shift amount ΔL0B−ΔL0A is reduced to zero. As a result, the refracting optical lens 149 is moved in the direction of the optical axis 150 by the gear mechanism 157G in such a manner as to cancel the optical focus shift amount ΔL0B−ΔL0A (focus compensation amount), thereby holding the image in focus on the screen (not shown) independently of the temperature change in the use environment. Of course, the gear mechanism 157G may also be driven by a control voltage as is the piezoelectric element 156.

Upon receiving information about the temperatures T1 and T2 from the temperature sensors 158 and 159, the control unit 161 may intentionally heat/cool the optical base 151 by the heater/cooler 160 to control the distance L2 through utilization of thermal expansion/contraction of the optical base 151 instead of controlling the distance L0 through adjustment of the gear mechanism 157G. This also suppresses the temperature gradients that are responsible for defocusing, and hence keeps the image in focus on the screen (not shown) independently of temperature variations in the use environment.

Incidentally, it is possible to use either one or both of the gear mechanism 157G and the heater/cooler 160 in combination with the temperature sensors 158–159 and the control unit 161.

No particular limitations are imposed on the numbers and positions of temperature sensors and heater/cooler combinations.

It is also possible to heat/cool the refracting optical lens 149 by the heater/cooler 160 within the range over which no particular problem arises in terms of the performance of the image display device.

The combination of the temperature sensors 158–159 and the control unit 161 can be used in place of the piezoelectric element 156 in FIG. 75 example.

Moreover, since the temperatures T1 and T2 sensed by the temperature sensors 158 and 159 do not always reflect the focus of the image, it is possible to provide a learning mechanism in the control unit 161 to take measures against temperature changes.

That is, an operator makes initial focus amendments to the image display device at a certain environmental temperature T3, and stores in the control unit 161 the length $[L0]_{T3}$ at that time. Following this, the operator makes similar initial focus amendments at an environmental temperature T4 (≠T3), and stores in the control unit 161 the length $[L0]_{T4}$ at this time as well.

Then, the control unit 161 derives an interpolation relation by linear interpolation from two focus-adjustment points (T3,$[L0]_{T3}$) and (T4,$[L0]_{T4}$). And the control unit 161 senses, by a temperature sensor, an arbitrary environmental temperature Tx of the image display device placed in the actual environment, then calculates the optimum length $[L0]_{Tx}$ for the environmental temperature Tx from the interpolation relation, and compensates for the length L0 (amount of compensation for defocusing) by the piezoelectric element 156 or gear mechanism 157G.

By performing the learning step three or more times n (three or more focus-adjustment points) and deriving the interpolation relation from the relationship between n values of the optimum lengths corresponding to the respective temperatures, the image can be corrected for defocusing with more accuracy.

In this learning control system, since the operator visually checks environmental temperatures and the focuses on a one-to-one correspondence basis and stores them in the control unit 161, the focus adjustment can be made with increased accuracy. In this instance, the temperature sensor is provided in the image display device so as to sense environmental temperatures.

Further, for the same reasons as given in respect of the learning control system, it is possible to detect the focus of the image to be displayed on the screen and effect feedback control based on the focus information instead of using the temperatures T1 and T2 that do not always reflect defocusing.

FIG. 77 illustrates another modification of the image display device according to this embodiment. The parts corresponding to those in FIGS. 75 and 76 are identified by the same reference numerals.

Reference numeral 162 denotes the convex mirror (projecting optical means, reflecting part) used in the embodiments described above; 163 denotes a plane mirror (Embodiment 1); and 164 denotes a screen (display means). The display image on the screen 164 is an overlay indication, which is divided to an image display area 165 and a non-image-display area 166. For example, in the case of a 1024-by-768 dot display screen of XGA Standards, when 12 dots are reduced on all sides of the image, the display image area 165 become 1000-by-744 dots and the non-image-display area 166 becomes a 12-dot wide band as indicated by diagonal shading.

Reference numeral 167 denotes a miniature reflector, and 168 denotes a charge-coupled device or CCD. The miniature reflector 167 reflects light that is projected onto the non-image-display area 166 from the plane mirror 163. Upon receiving the light reflected by the miniature reflector 167, CCD 168 supplies the control unit 161 with focus information obtained from the received light.

In this example one micro-mirror of the micro-mirror device 148 is controlled so that CCD 168 always receives light corresponding to a one-dot display image, for instance. The light receiving surface of CCD 168 and the image formation surface of the screen 164 are located at the same optical distance from the projecting optical system composed of the refracting optical lens 149 and the convex mirror 162.

The light from the micro-mirror device 148 mostly travels via the route [refracting optical lens 149—convex mirror 162—plane mirror 163] to the screen 164 in this order, displaying an image in the image display area 165. The light of the one-dot display image, which is incident on the non-image-display area 166 of the screen 164 via the same route as mentioned above, is reflected by the miniature reflector 167 for incidence to CCD 168.

CCD 168 makes reference to all pixels therein, then obtains, from the light of the one-dot display image, focus information about the image to be displayed in the image display area 165, and provides it as first focus information to the control unit 161. The control unit 161 analyzes the first focus information, and effects feedback control of the refracting optical lens 149 of the FIG. 75 or 76 structure, thereby adjusting the focus of the image.

In general, upon making the focus adjustment, the position on the screen where the image is just in focus may somewhat shift due to optical nonuniformity. To avoid this, by making reference to every pixel in CCD 168 upon each focus adjustment, it is possible to correct for the displacement of the focus position on CCD 168

The light from the feedback-controlled refracting optical lens 149 is mostly focused into an image in the image display area 165. The light of the one-dot display image toward the non-image-display area 166 is detected by the miniature reflector 167 and CCD 168 as second focus information, which is used for feedback control of the refracting optical lens 149 by the control unit 161. The third and subsequent rounds of operation are also similarly performed.

Since the focus information is detected by CCD 168 from the light of the one-dot display image for incidence to the non-image-display area 166, focus adjustments that directly reflect defocusing can be made without using secondary information such as temperature.

When a focus adjustment is made in the projecting optical system, there are cases where the projecting optical system is somewhat displaced or its distortion characteristic slightly varies, leading to a slight displacement of the position of the one-dot display image on CCD 168. Also when the image display device is moved in its entirety, a change in the external stress applied to the image display device may sometimes cause slight mechanical deformation of the projecting optical system, resulting in the position of the one-dot display image being shifted a little.

In any case, CCD 168 is made large in size for the range of displacement of an image (sufficiently large for displacement of the image and measuring area) so that the one-dot display image, even if displaced, will not get out of CCD 168. With such an arrangement, the detection of the position of the one-dot display image and the related information for each measurement will permit accurate focus adjustment without affecting the measured result even if the image is displaced.

Methods for analyzing the focus information by the control unit 161 will be described below in a little more detail.

Figure 78A:
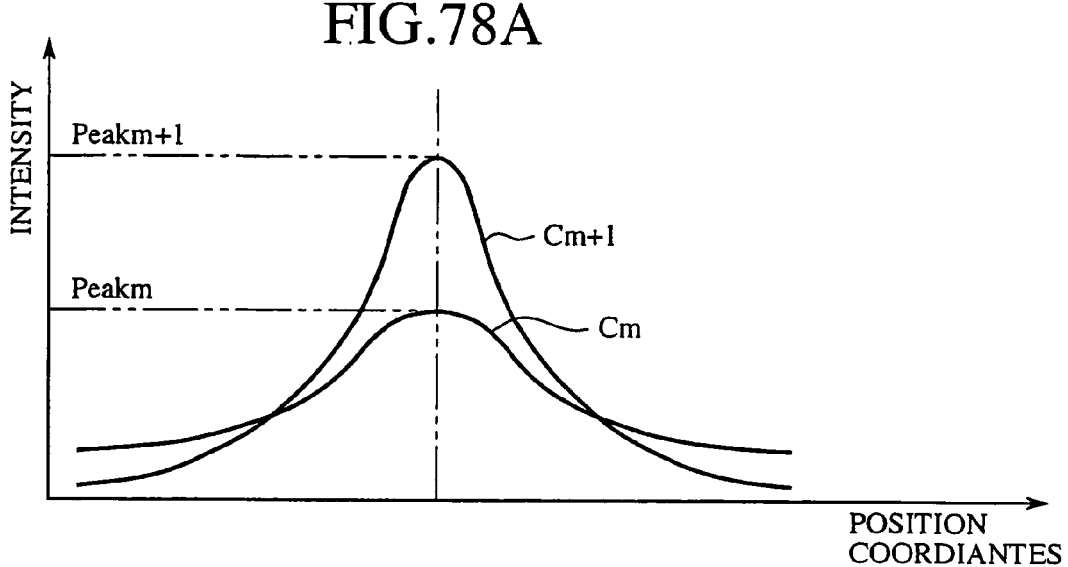
FIGS. 78(a) to (c) graphs showing how to analyze focus information by a control unit.
Figure 78B:
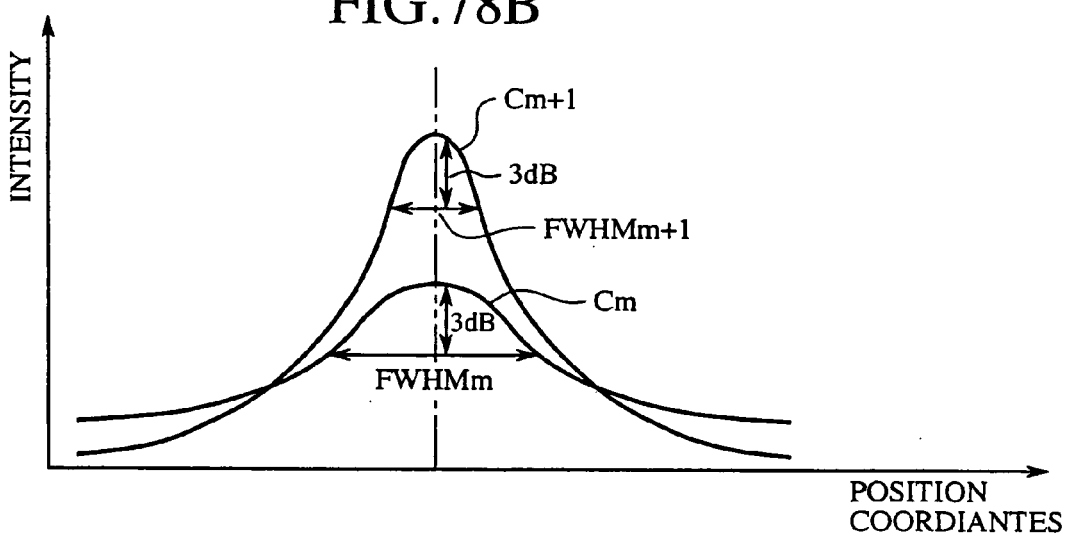
Figure 78C:
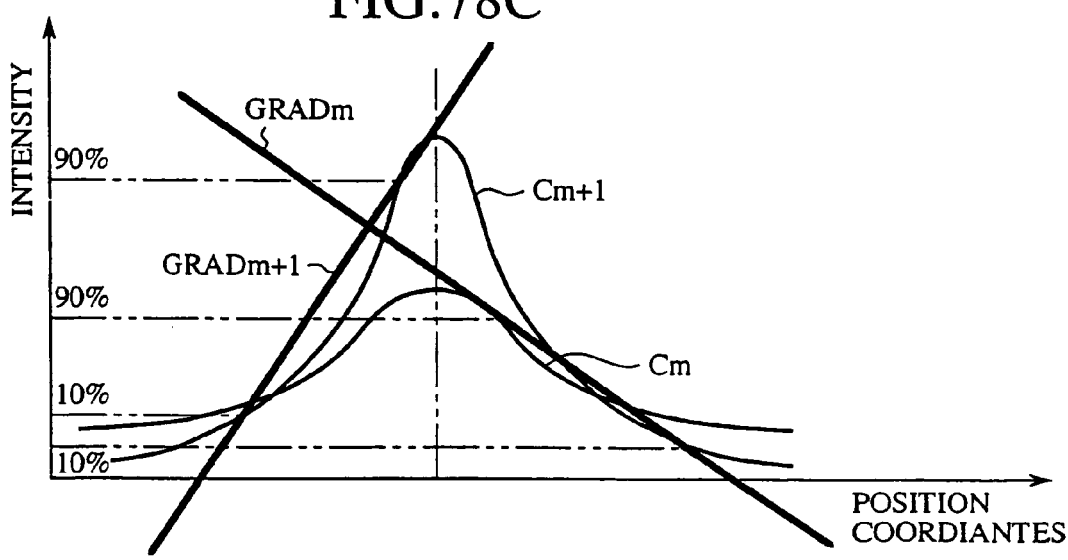

FIGS. 78($a$) to ($c$) show three methods for analyzing the focus information. The abscissa represents the coordinates of the light receiving surface of CCD 168, which are two-dimensional in practice, and the ordinate represents light intensity.

Reference character Cm and Cm+1 indicate m-th and (m+1)-th (where m=1, 2, . . . ) pieces of focus information, representing light intensity distribution characteristics. Concretely, Cm and Cm+1 are electric signals obtainable from each unit light receiving element of CCD 168 of a two-dimensional array-like structure, and the electric signals each have a profile proportional to the illuminance distribution of the one-dot display image that is incident on CCD 168.

In FIG. 78($a$), Peakm and Peakm+1 indicate intensity peak values of the pieces of focus information Cm and Cm+1, respectively. In FIG. 78($b$), FWHMm and FWHMm+1 indicate full width half maximum values of the pieces of focus information Cm and Cm+1, respectively.

In FIG. 78($c$), GRADm and GRADm+1 indicate the shoulder gradients that are converted from peak values in the pieces of focus information Cm and Cm+1, respectively; for example, they indicate the gradients of straight lines joining particular points on the pieces of focus information Cm and Cm+1 where 10% and 90% of the peak intensity can be obtained. What is intended to means by the shoulder gradient is the gradient of a straight line joining two points where $\alpha$ and $\beta$ % (0%<$\alpha$, $\beta$<100%, $\alpha \neq \beta$) can be obtained.

In the analysis method of FIG. 78($a$), the control unit 161 exercises feedback control of the refracting optical lens 149 so that the peak value Peakm+1 available from the (m+1)-th focus information becomes larger than the peak value Peak of the m-th focus information.

Figure 73C:
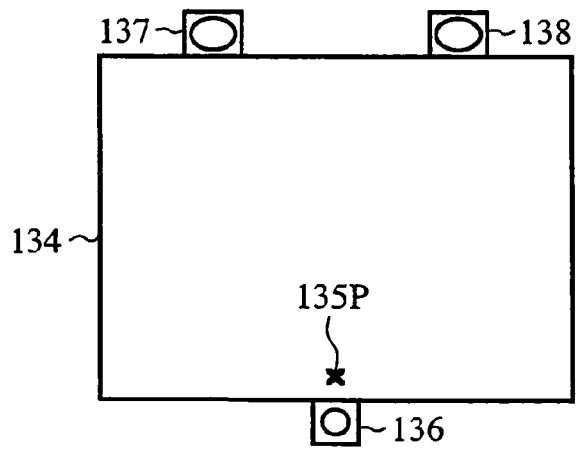

In the case of FIG. 78(b), the control unit 161 effects feedback control of the refracting optical lens 149 so that the full width half maximum value FWHMm+1 available from the (m+1)-th focus information becomes smaller than the full width half maximum value FWHMm from the m-th focus information. In the case of FIG. 73(c) the control unit 161 effects feedback control of the refracting optical lens 149 so that the shoulder gradient GRADm+1 available from the (m+1)-th focus information becomes larger than the shoulder gradient GRADm from the m-th focus information.

Of course, the width that provides a predetermined level in the focus information (width of a predetermined level) may be minimized to other widths than the full width half maximum, such as a $1/e^2$ width or a $1/10$ intensity width.

In any case, the focus of the image that is displayed in the image display area 165 can be adjusted through utilization of the focus information available in CCD 168.

Figure 77A:
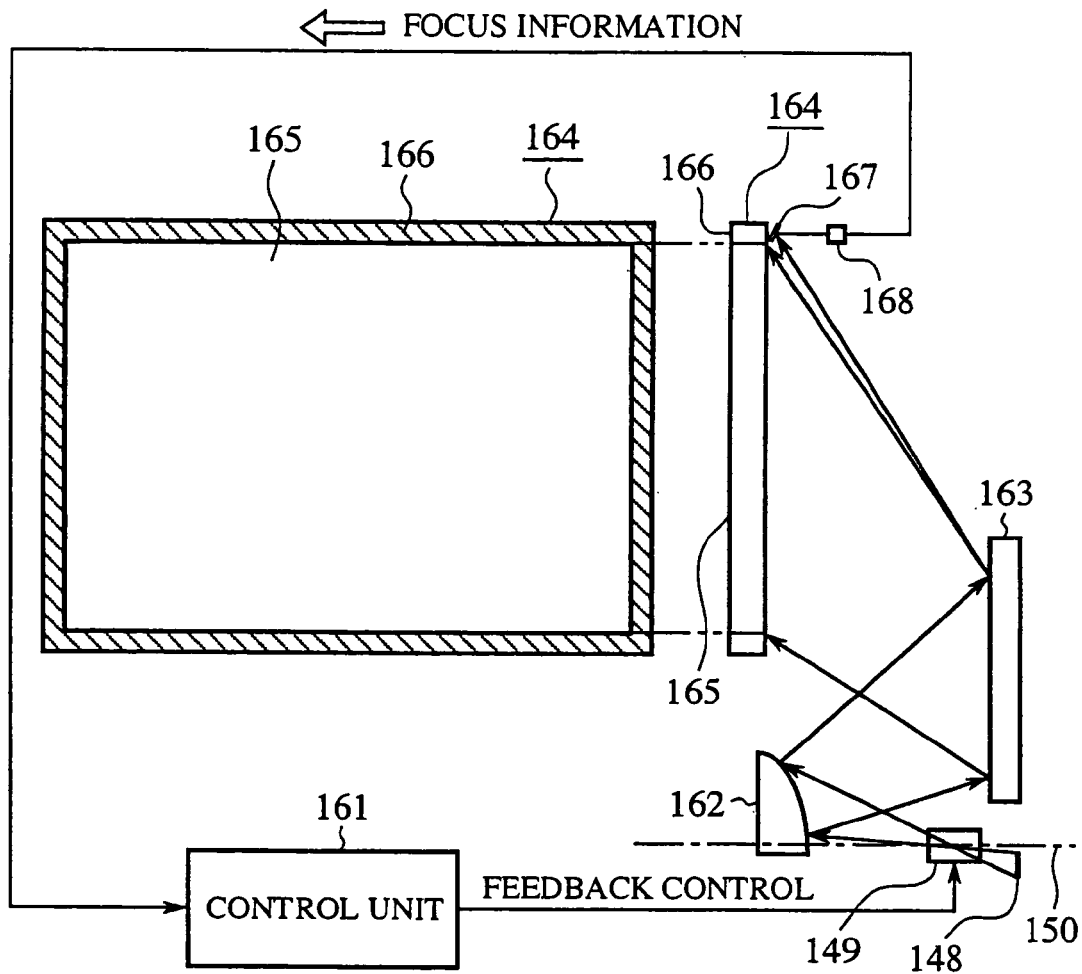
FIG. 77 is a diagram depicting the configuration of another modified form of the image display device according to the 19th embodiment of the present invention.
Figure 77B:
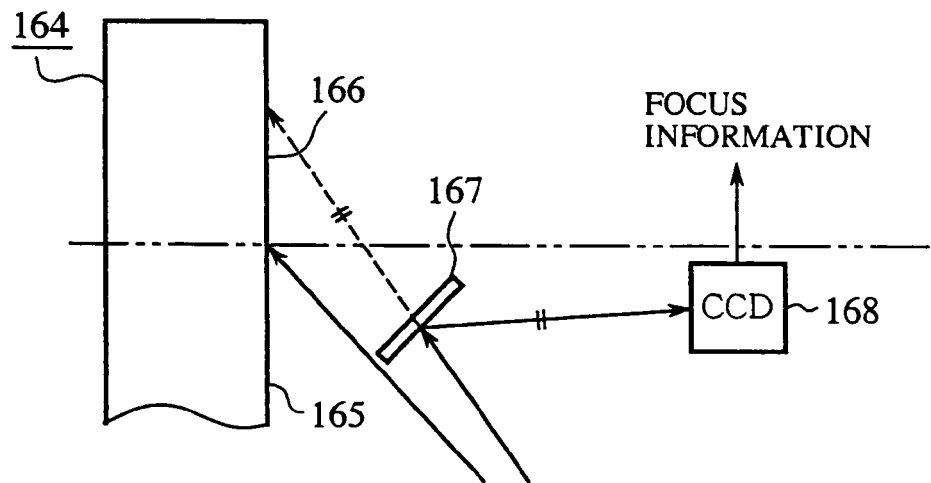

In FIG. 77(a) the miniature reflector 167 and CCD 168 are placed in the non-image-display area 166, but when the cabinet (indicated by the two-dot chain line) of the image display device is placed in the closest proximity to the edge of the image display area 165 as depicted in FIG. 77(b), the miniature reflector 167 is particularly effective. That is, in such a limited situation by the cabinet it is possible to place the miniature reflector 167 and CCD 168 in the cabinet without shading the light to be projected onto the image display area 165 and detect the focus information.

The positions of the miniature reflector 167 and CCD 168 need to fulfill such conditions as mentioned below.

1. Place the miniature reflector 167 at a location some distance from the screen 164.
2. Make the distance between the miniature reflector 167 and CCD 168 equal to the optical path from the miniature reflector 167 to the screen 164.

Figure 79:
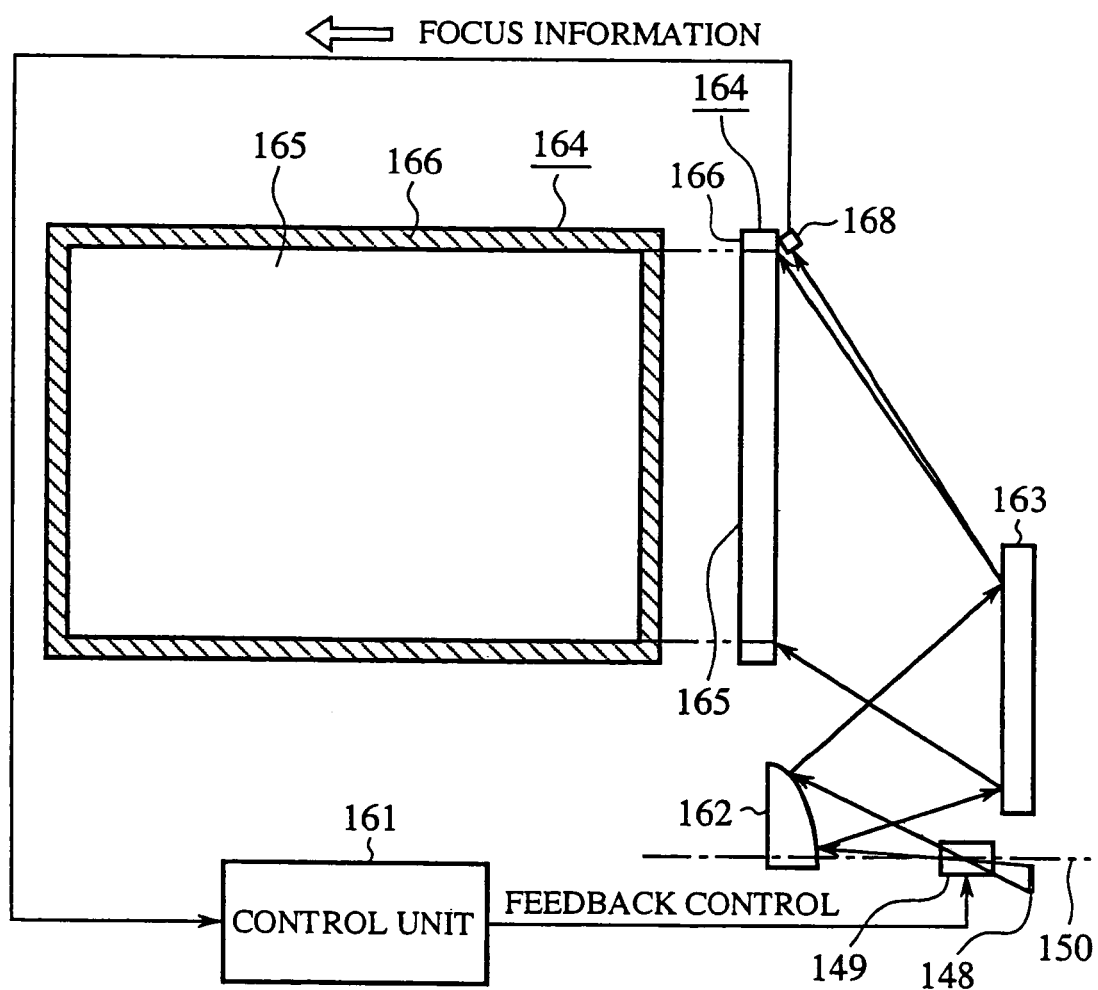
FIG. 79 is a diagram depicting the configuration of another modified form of the image display device according to the 19th embodiment of the present invention.

It is also possible, of course, to detect the illuminance distribution of light corresponding to one dot directly by only CCD 168 placed at an arbitrary location in the non-image-display area 166 as depicted in FIG. 79.

A display pattern for focus adjustment use may be a linear or cross-shaped display image other than the one-dot display image.

Now a description will be given of a numerical value example related to the measures against temperature variations.

While in the above the whole structure of the refracting optical lens 149 is moved for focus adjustment, this embodiment is not limited specifically thereto. Since the refracting lens 149 is made up of a plurality of lenses as referred to above, the focus adjustment could similarly be performed by shifting some of the lenses forming the refracting optical lens 149 or the convex mirror 162 by such a method as described previously with reference to FIGS. 75 to 78. In the case of shifting the convex mirror 162, the gear support 157 equipped with the gear mechanism 157G is used to hold the convex mirror and the gear mechanism 157G is driven.

Figure 80:
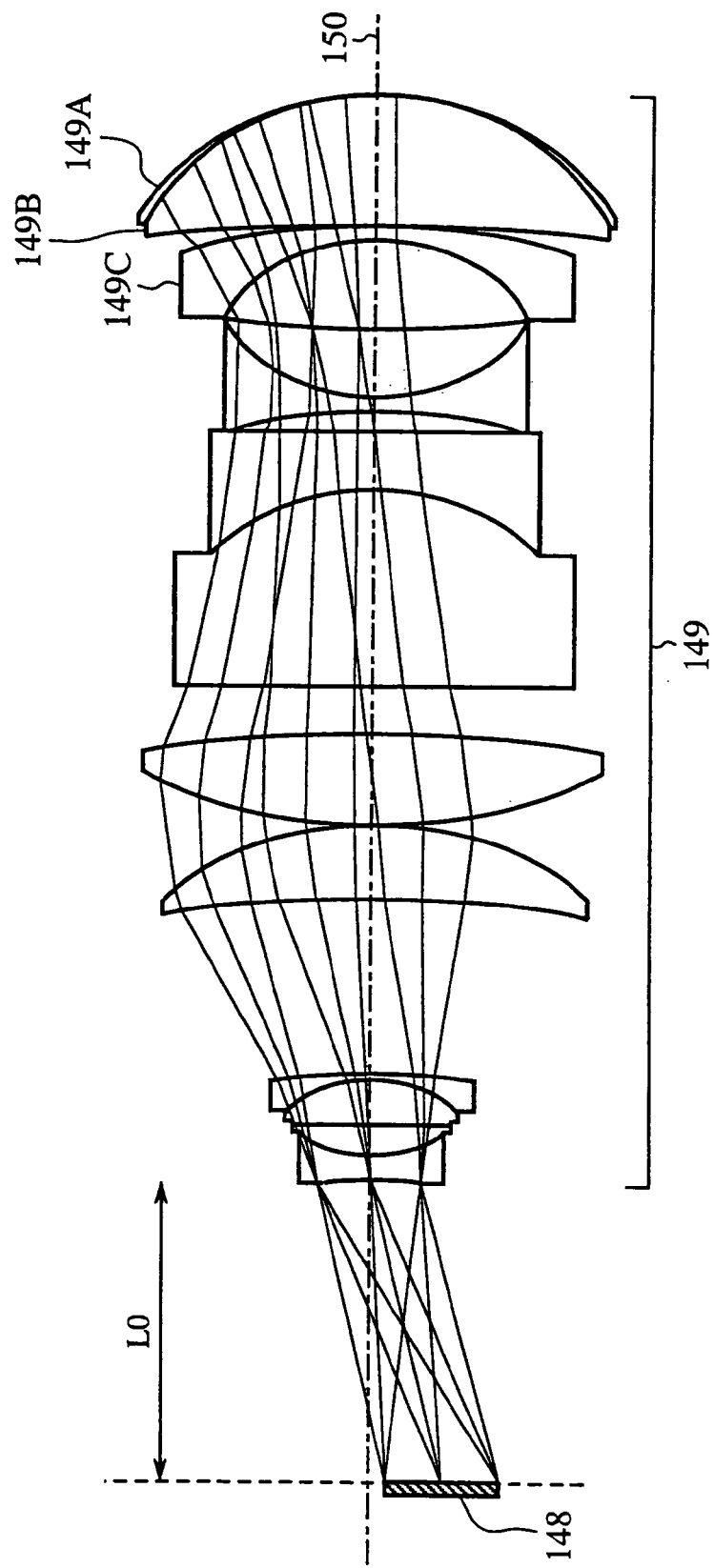
FIG. 80 is a diagram showing an example of a method for compensating for defocusing by shifting some of lenses forming a refracting optical lens.

For example, the configuration of the image display device (FIG. 53) referred to in connection with Numerical Value Example 14A is depicted again in FIG. 80. The results of numerical calculations have revealed that when the lenses 149A, 149B and 149C, which are closer to the convex mirror (not shown) than any other lenses forming the refracting optical lens 149, are moved in the direction of the optical axis 150, a change in the distance L0 from the micro-mirror device 148 to the refracting optical lens 149 can be compensated for with the degradation of the image formation performance kept to a minimum.

Finally, a description will be given below of the measures against temperature variations that cause displacements of the respective components in the direction perpendicular thereto.

Figure 81:
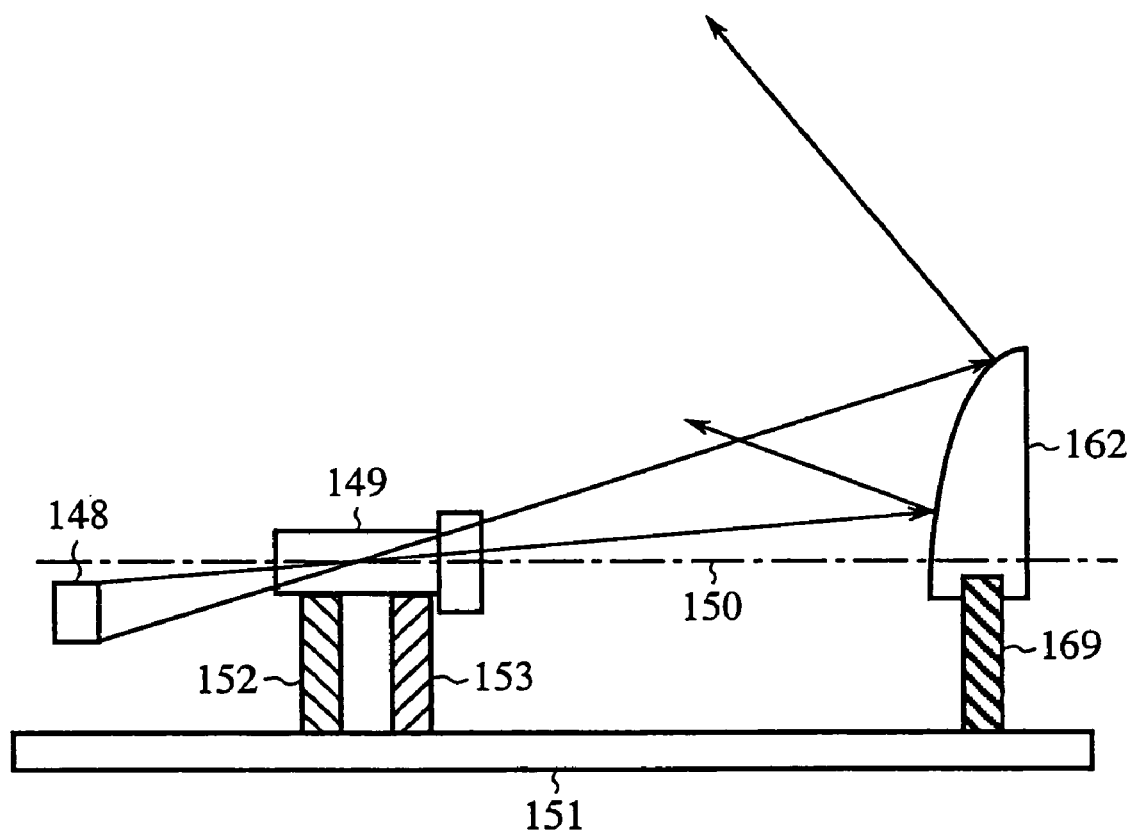
FIG. 81 is a diagram depicting the configuration of another modified form of the image display device according to the 19th embodiment of the present invention.

As depicted in FIG. 81, the displacements of the respective components on the optical base (retaining mechanism) 151 in the perpendicular direction (in the direction of the normal to the optical base 151), which are caused by temperature variations, could be settled by making such a design that the sliding supports 152 and 153 of the refracting optical lens 149 and the support 169 for fixedly supporting the convex mirror 162 to the optical base 151 are equal in the product of the height and the coefficient of linear expansion in the perpendicular direction.

As a result, all the components are equally displaced vertically by a temperature change—this prevents misalignment of the optical axis 150 in the vertical direction. Although in FIG. 81 the support of the micro-mirror device 148 is not shown, the product of its height and coefficient of linear expansion in the vertical direction is made equal to those of the other supports.

As described above, this embodiment is provided with: the two sliding supports 152 and 153 planted on the optical base 151, for slidably supporting all or some of the lenses of the refracting optical lens 149; the mounting plates 154 and 155 fixed to the top of the optical base 151 and the underside of all or some of the lenses of the refracting optical lens 149 and disposed between the sliding supports 152 and 153; and the piezoelectric element 156 which is held between the mounting plates 154 and 155 and changes its length in the direction of the optical axis 150 with the control voltage. Hence, defocusing by a temperature change can be avoided.

Further, since the gear support 157 is provided which is mounted on the optical base 151 and driven by the gear mechanism 157G to move all or some of the lenses of the refracting optical lens 149 in the direction of the optical axis 150, defocusing by a temperature change can be avoided.

Further, since the heater/cooler 160 is provided for at least one of the optical base 151 and the refracting optical lens 149, it is possible to suppress the occurrence of temperature gradients in the use environment, preventing defocusing.

Further, this embodiment is provided with: the temperature sensor 158 for sensing the lens-barrel temperature T1 of the refracting optical lens 149; the temperature sensor 159 for sensing the internal temperature T2 of the optical base 151; and the control unit 161 for calculating the optimum value of the length L0 or the temperature difference $\Delta T$ from the lens-barrel temperature T1 and the internal temperature T2 and for effecting feedback control of at least one of the piezoelectric element 156, the gear mechanism 157G and the heater/cooler 160. Hence, it is possible to make adjustment to prevent defocusing.

Further, this embodiment is provided with: the temperature sensor for sensing temperature in the use environment; and the control unit 161 for calculating a length L0 suitable for the temperature in the use environment by a linear interpolation equation having a length $[L0]_{T3}$ of an environmental temperature T3 at the time of initial focus adjustment and a length $[L0]_{T4}$ of an environmental temperature T4 at the time of initial focus adjustment and for effecting feedback control of the piezoelectric element 156 or gear mechanism 157G. Hence, it is possible to establish a one-to-one correspondence between environmental temperatures and focus values for accurate focus adjustment.

Further, since this embodiment is provided with CCD 168 for detecting focus information from the light that is incident on the non-image-display area 166 of the screen 164, and the control unit 161 that analyzes the focus information available from CCD 168 and effects feedback control of the piezoelectric element 156 or gear mechanism 157, it is possible to make focus amendments based directly on defocusing without using temperature or similar secondary information.

Further, since this embodiment uses the miniature reflector 167 by which the light for incidence on the non-image-display area 166 is reflected to CCD 168, it is possible to detect the focus information even if the cabinet of the image display device is placed in closest proximity to the image display area 165.

Further, according to this embodiment, the control unit 161 uses, as focus information, the intensity distribution characteristic profile of the light incident on CCD 168, and effects feedback control in a manner to maximize the peak value Peakm of the focus information; hence, defocusing can be reflected directly in the focus adjustment.

Further, according to this embodiment, the control unit 161 uses, as focus information, the intensity distribution characteristic profile of the light incident on CCD 168, and effects feedback control in a manner to minimize the full width half maximum FWHMm of the focus information; hence, defocusing can be reflected directly in the focus adjustment.

Further, according to this embodiment, the control unit 161 uses, as focus information, the intensity distribution characteristic profile of the light incident on CCD 168, and effects feedback control in a manner to maximize the shoulder gradient GRADm of the focus information; hence, defocusing can be reflected directly in the focus adjustment.

Further, since the sliding supports 152 and 153 for the refracting optical lens 149 and the fixing support 169 for the convex mirror 162 are designed to be equal in the product of the heights and coefficients of linear expansion in the vertical direction, it is possible to prevent misalignment of the optical axis 150 in the vertical direction.

While in the above the micro-mirror device has been described as the spatial light modulator, the same results as those described above could be obtained with other spatial light modulator such as a transmission or reflection type liquid crystal.

Embodiment 20

Figure 82A:
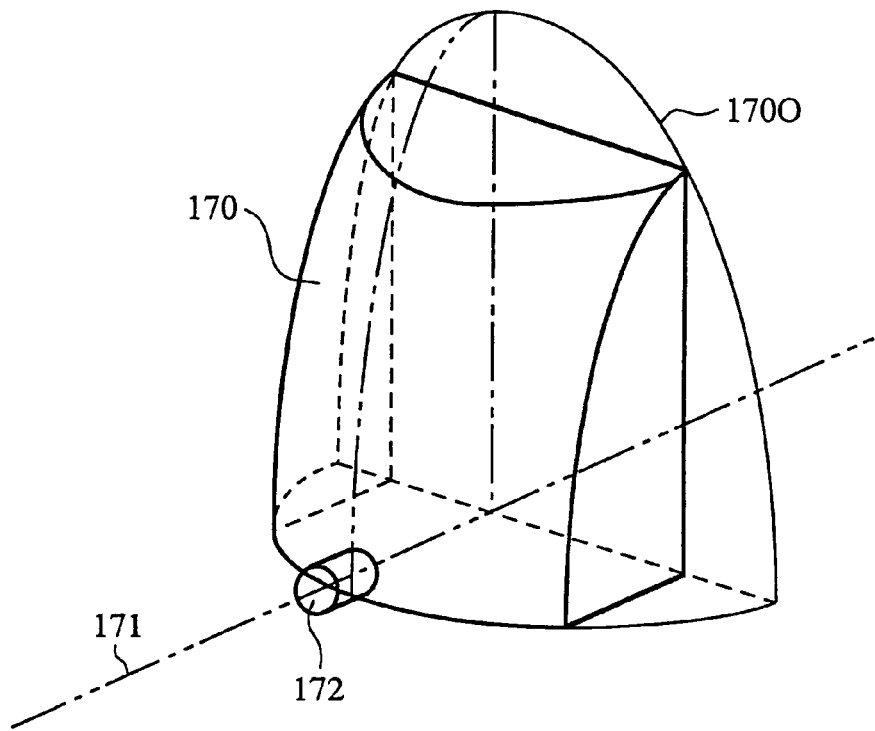
FIG. 82 is a diagram depicting the configuration of a convex mirror for use in the image display device according to a 20th embodiment of the present invention.

FIG. 82 schematically illustrates the configuration of a convex mirror for use in the image display device according to a twentieth embodiment (Embodiment 20) of the present invention. Reference numeral 170 denotes the convex mirror (projecting optical means, reflecting part) used in each embodiment. This convex mirror 170 is formed by cutting off a nonreflecting portion from a convex mirror 170O that is rotationally symmetric about an optical axis 171, and it has a reflecting protrusion 172 in its front surface in the neighborhood of the optical axis 171 (non-projection front surface).

Figure 82B:
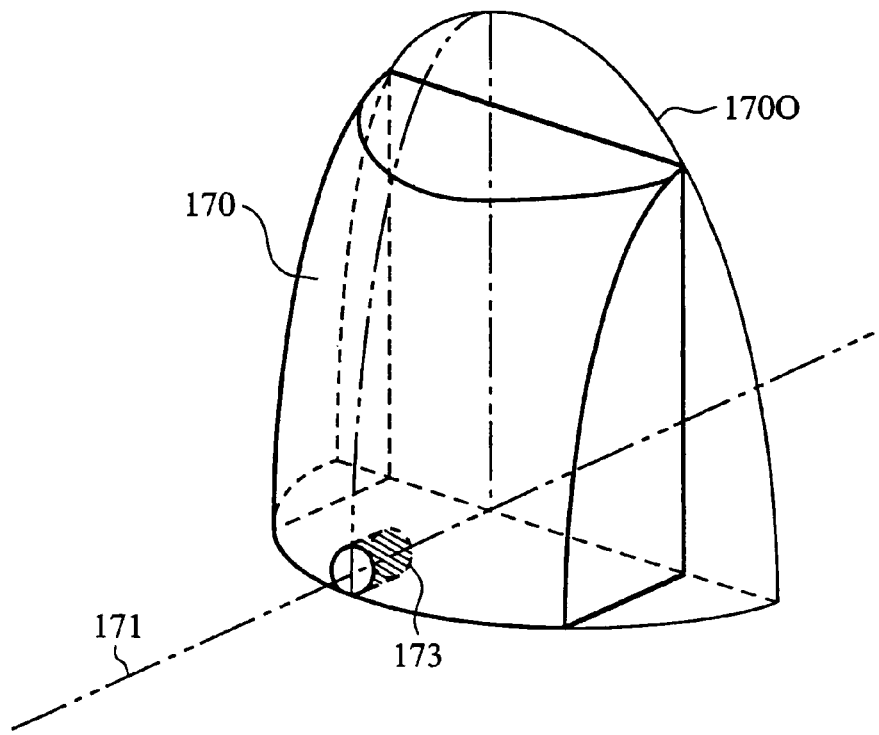

The reflecting protrusion 172 is obtained by protruding the high- and low-reflectivity areas 104H and 104L of the convex mirror 104 in Embodiment 15 or by rendering the both areas into one high-reflectivity area. The reflecting protrusion 172 protrudes from the front surface of the convex mirror 170 and is used to adjust the alignment of the image display device as described below. A reflecting recess 173 may be made in the convex mirror 170 as depicted in FIG. 82(b) in place of the reflecting protrusion 172. Naturally, the reflecting recess 173 is formed by recessing the high- and low-reflectivity areas 104H and 104L of the convex mirror 104 in Embodiment 15 or by rendering the both areas into one high-reflectivity area. The reflecting surface of each of the reflecting protrusion 172 and the reflecting recess 173 is a planar surface and its normal is parallel to the optical axis 171.

Figure 83:
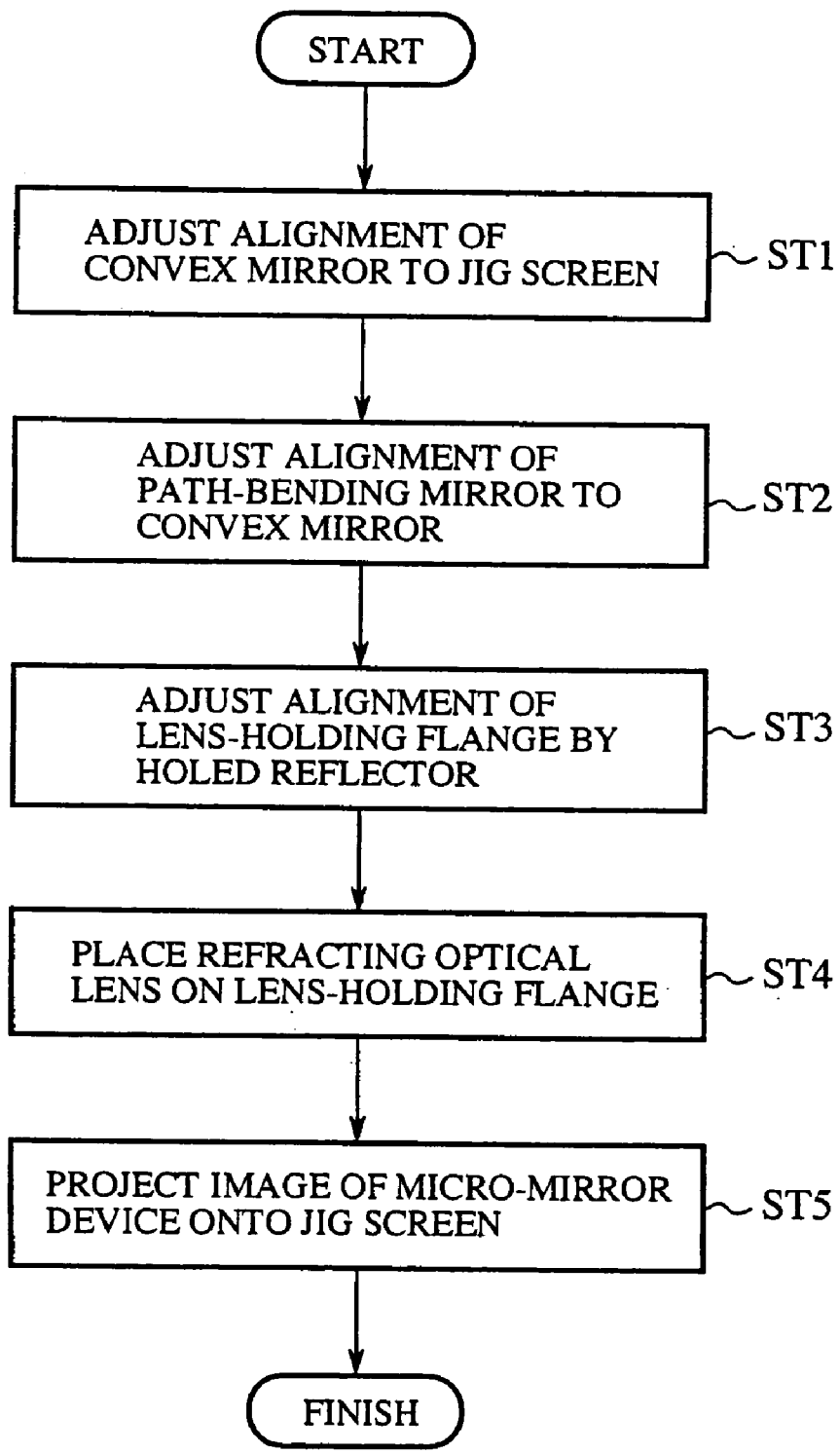
FIG. 83 is a flowchart showing an alignment-adjusting procedure according to the 20th embodiment of the present invention.

FIG. 83 is a flowchart showing the procedure for adjusting the alignment according to this embodiment. FIGS. 84 to 88 are diagrams showing a sequence of steps involved in adjusting the alignment. The parts corresponding to those in FIG. 82 are identified by the same reference numerals.

<ST1: Adjustment for Alignment of Convex Mirror with Jig Screen>

In FIG. 84(a), a laser light source 174 and a jig screen (jig display means) 176 are arranged so that parallel rays from the former are parallel to the normal to the latter. The laser light source 174 emits a bundle of parallel rays that is larger in cross section than the reflecting protrusion 172, and the bundle of parallel rays is incident on the jig screen 176 at right angles thereto through a beam splitter 175.

The jig screen 176 has a through hole (first through hole) 176H drilled therethrough around the optical axis (FIG. 84(b)). A portion of the bundle of parallel rays having passed through the beam splitter 175 passes through the through hole 176H and reaches the reflecting protrusion 172 of the convex mirror 170 mounted on an optical base 177 (retaining mechanism, see FIG. 43 and Embodiment 10).

The convex mirror 170 reflects the incident bundle of parallel rays by the reflecting protrusion 172 back in the direction opposite to the emitted bundle of parallel rays, and the thus reflected-back light passes through the through hole 176H. After passing through the through hole 176H the reflected-back bundle of parallel rays strikes on the beam splitter 175, and travels therein in a direction perpendicular to the bundle of parallel rays emitted from the laser light source 174, thereafter being converged by a condenser lens 178 to the center of a four-segment split detector 179 (detector in FIG. 58(c)).

By adjusting the attitude of the convex mirror 170 so that four light receiving elements of the four-segment split detector 179 detect light of equal power, the outgoing and incoming paths of bundles of parallel rays between the through hole 174H and the reflecting protrusion 172 are brought into alignment with the optical axis 171 (virtual optical axis), by which the convex mirror 170 put into alignment with the jig screen 176.

<ST2: Adjustment for Alignment of Path-Bending Reflector with Convex Mirror>

After aligning the convex mirror 170 with the jig screen 176 as depicted in FIG. 84(a), the laser light source 174, the beam splitter 175 and the condenser lens 178 with their relative positions held unchanged are moved to bring the center of the bundle of parallel rays from the laser light source 174 and the beam splitter 175 into coincidence with an ideal optical axis of the refracting optical lens. This is followed by adjusting the alignment of the path-bending reflector (see FIG. 23 and others and Embodiments 7 and 19) with the convex mirror 170.

Figure 85:
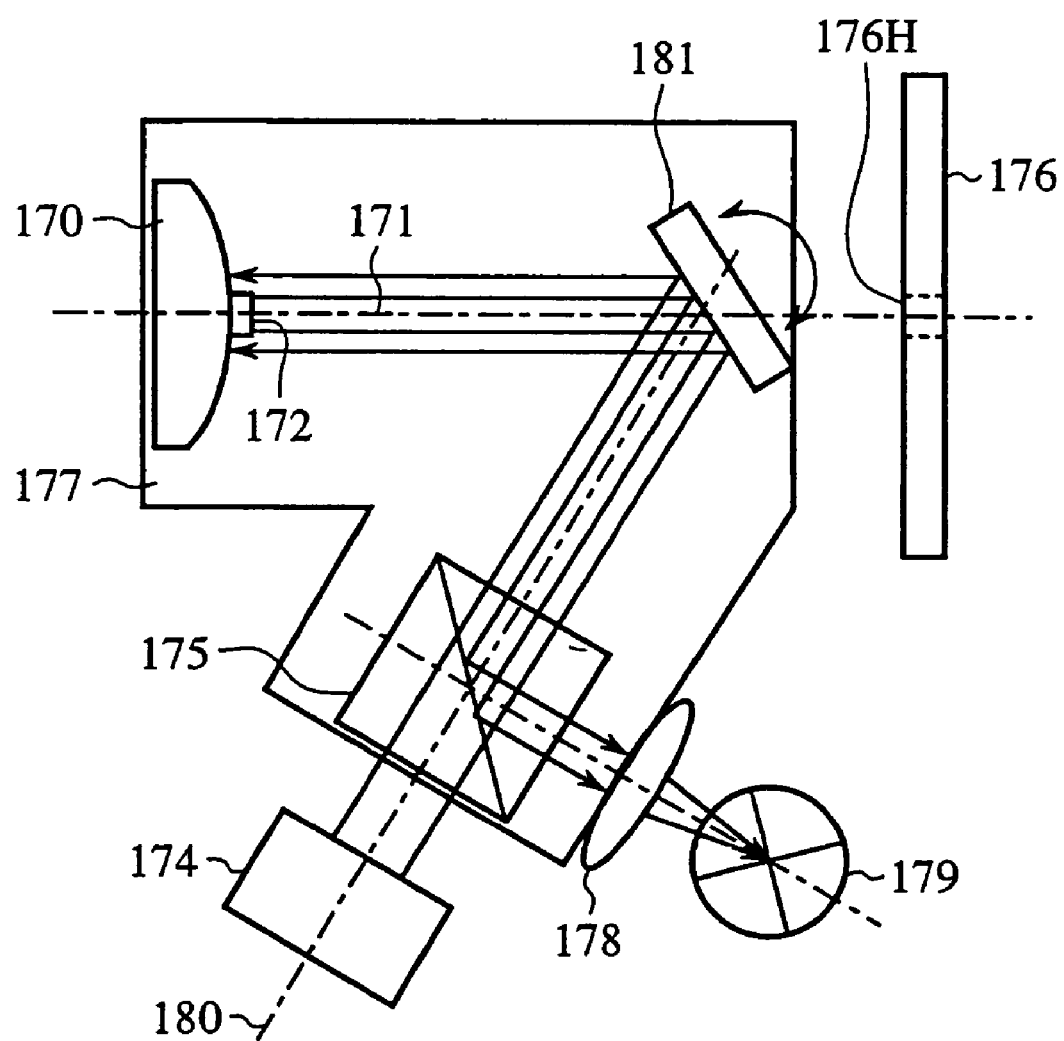
FIG. 85 is a diagram how optical system components are sequentially arranged by the alignment-adjusting method.

In FIG. 85, a bundle of parallel rays larger in cross section than the reflecting protrusion 172 is emitted from the laser light source 174 through the beam splitter 175, and is reflected by a path-bending reflector 181 at a predetermined position to the reflecting protrusion 172. Since the reflecting protrusion 172 forms a reflecting surface smaller in cross section than the bundle of parallel rays incident thereon, only part of the incident bundle of parallel rays is reflected by the reflecting protrusion 172 back to the path-bending reflector 181.

The bundle of parallel rays reflected back by the reflecting protrusion 172 is reflected by the path-bending reflector 181 to the beam splitter 175, and converged by the condenser lens 178 to the four-segment split detector 179. As is the case with FIG. 84(a), when the adjustment of alignment of the path-bending reflector 181 with the convex mirror 170 (adjustment of an angle of swing (and tilt) by two axes) is ideal, the light receiving elements of the four-segment split detector 179 detects light of equal power.

At this time, the outgoing and incoming paths of the bundle of parallel rays via the path-bending reflector 181 coincide with each other, and a virtual optical axis of the ideal optical axis 180 of the refracting optical lens is produced by the bundle of rays from the laser light source 174.

<ST3: Adjustment for Alignment of Lens-Holding Flange by Holed Reflector>

Figure 86A:
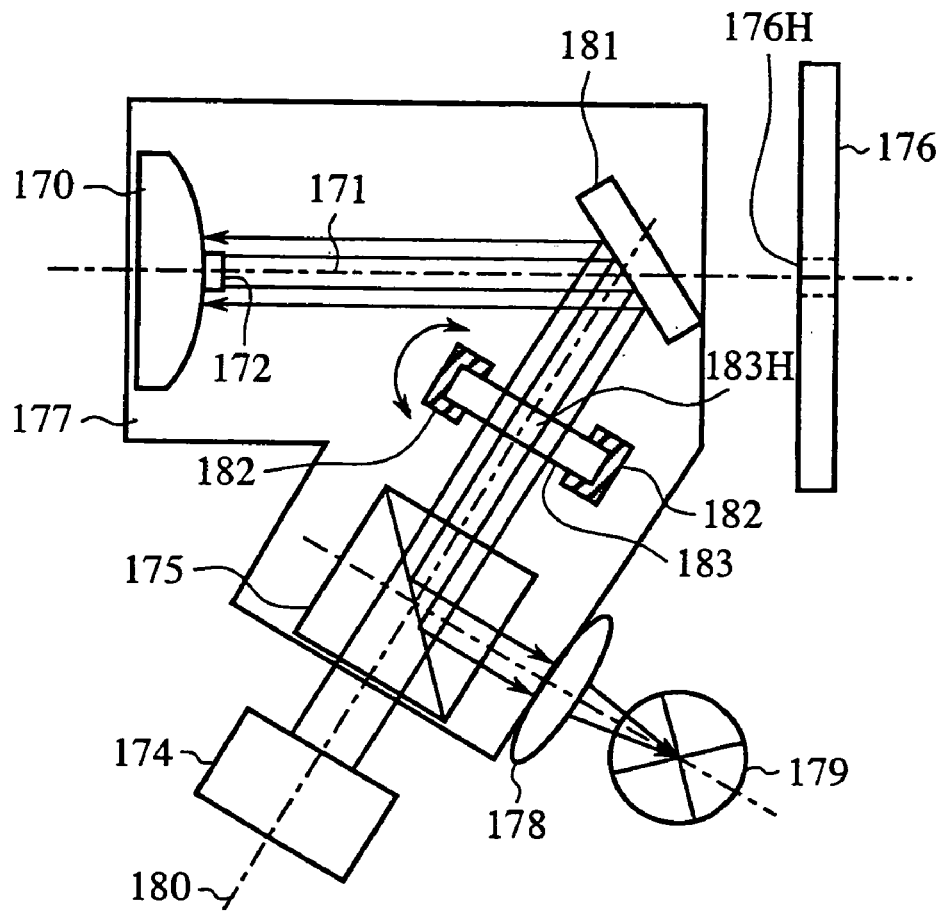
FIG. 86 is a diagram how optical system components are sequentially arranged by the alignment-adjusting method.
Figure 86B:
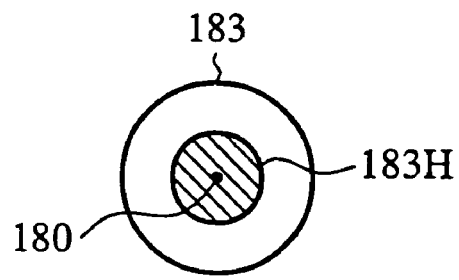

A lens-holding flange 182, which ultimately holds the refracting optical lens and a holed reflector 183 mounted on the lens-holding flange 182 in place of the refracting optical lens are provided on the ideal optical axis 180 created in the FIG. 85 step (FIG. 86(a)). The holed reflector 183 has a centrally disposed through hole (second through hole) 183H (FIG. 86(b)), through which the bundle of parallel rays from the laser light source 174 and the beam splitter 175 passes. The surrounding area of the through hole 183H forms a reflecting surface.

In FIG. 86(a), the bundle of parallel rays having passed through the through hole 183H is reflected by the path-bending reflector 181 to the reflecting protrusion 172. The bundle of parallel rays reflected by the reflecting protrusion 172 is reflected again by the path-bending reflector 181, then passes through the through hole 183H of the holed reflector 183, and travels to the beam splitter 175, thereafter being detected by the four-segment split detector 179 after being converged thereto by the condenser lens 178.

The bundle of rays reflected by the reflecting surface around the through hole 183H of the holed reflector 183 is also incident on the four-segment split detector 179 while being superimposed on the above-said bundle of parallel rays. When the adjustment for alignment of the lens-holding flange 182 and the holed reflector 183 with the convex mirror 170 (adjustment of two-axis swing of the lens-holding flange 182) is ideal, the light receiving elements of the four-segment split detector 179 detect light of equal power.

<ST4: Mounting of Refracting Optical Lens on Lens-Holding Flange>

Figure 87:
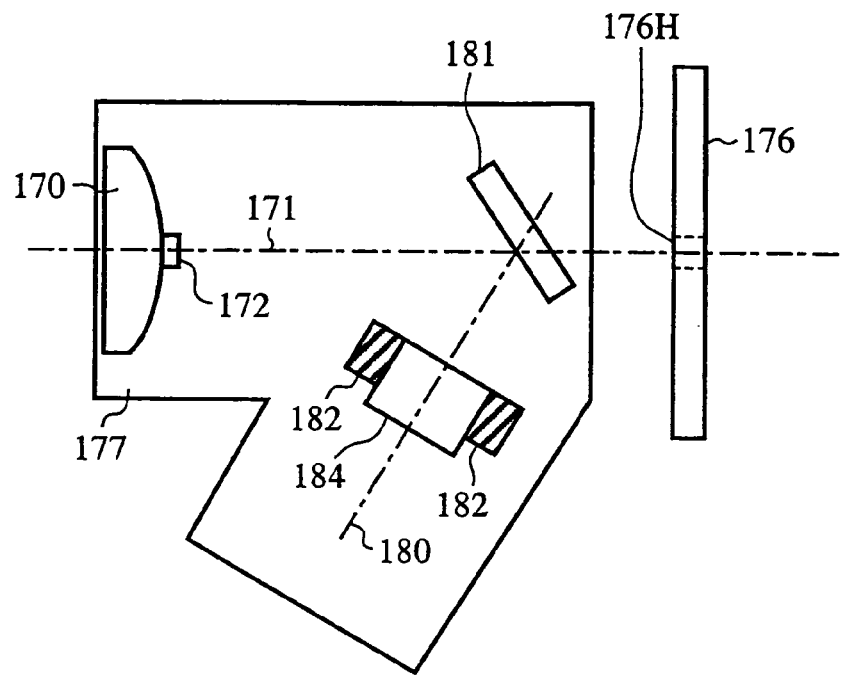
FIG. 87 is a diagram how optical system components are sequentially arranged by the alignment-adjusting method.

The holed reflector 183 is removed from the lens-holding flange 182 ideally aligned with the convex mirror 170, and a refracting optical lens (projecting optical means, refracting optical part) 184 is mounted on the lens-holding flange 182 instead. The laser light source 174, the beam splitter 175, the condenser lens 178 and the four-segment split detector 179 are also removed (FIG. 87).

<ST5: Projection of Image of Micro-Mirror Device onto Jig Screen>

Figure 88:
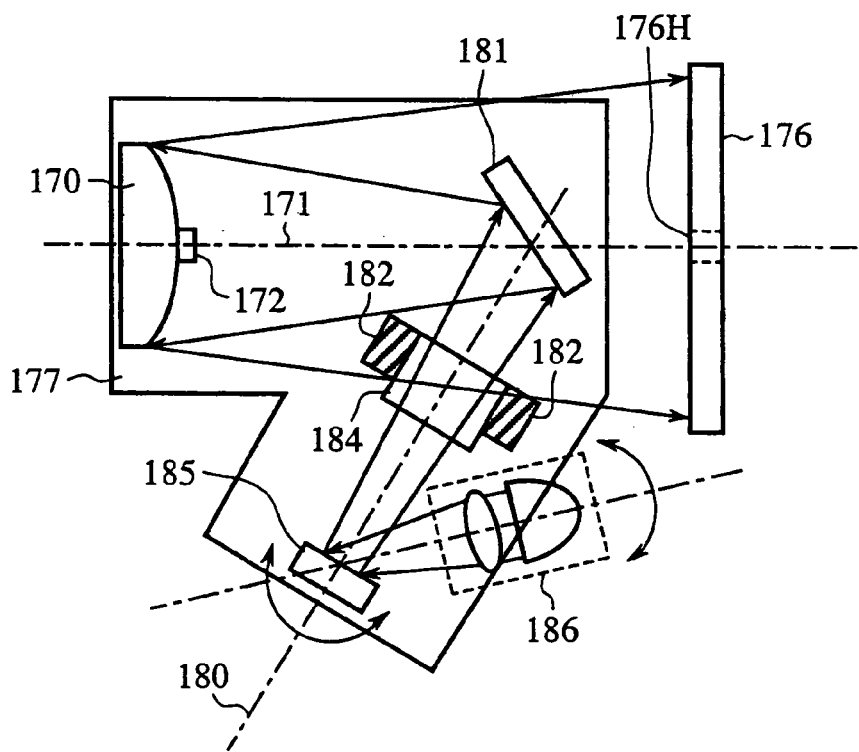
FIG. 88 is a diagram how optical system components are sequentially arranged by the alignment-adjusting method.

In FIG. 88 a micro-mirror device (transmitting means, image information imparting part) 185 is disposed at a predetermined position, and the micro-mirror device 185 is illuminated by an illumination light source system (transmitting means, illumination light source part). The light from the illumination light source system 186, which has obtained image information in the micro-mirror device 185, is projected onto the jig screen 176 via the refracting optical lens 184, the path-bending reflector 181 and the convex mirror 170.

By making adjustment to the alignment between the illumination light source system 186 and the micro-mirror device 185 (adjustments including (1) two in-plane axes, (2) one axis about normal to plane, (3) two swing axes and (4) one axis moving in direction of normal to plane; (1) and (2) importance for determining the display position, and (3) and (4) importance for securing the image formation performance) so that the projected light forms an image at a normal position on the jig screen 176, a series of adjustments for alignment is completed.

As described above, according to this embodiment, since the reflecting protrusion 172 or reflecting recess 173 is provided in the front surface of the convex mirror 170 in the vicinity of the optical axis 105, alignment of the optical components can easily be adjusted in the assembling of the image display device.

Further, the alignment adjusting method according to this embodiment comprises: step ST1 wherein a bundle of parallel rays having passed through the through hole 176H of the jig screen 176 is reflected by the reflecting protrusion 172 (or reflecting recess 173), thereby bringing the outgoing and incoming paths of light into alignment with each other between the reflecting protrusion 172 (reflecting recess 173) and the through hole 176H; step ST2 wherein a bundle of parallel rays, that is coincides with the ideal optical axis 180 of the refracting optical lens, is reflected by the path-bending reflector 181 and then by the reflecting protrusion 172 (or reflecting recess 173), thereby bringing the outgoing and incoming paths of light into alignment with each other between the reflecting protrusion 172 (or reflecting recess 173); step ST3 wherein a bundle of parallel rays for incidence on the path-bending reflector 181 is passed through the through hole 183H of the holed reflector 183 mounted on the lens-holding flange 182, and a bundle of rays reflected by surrounding area of the through hole 183H of the holed reflector 183 and the bundle of rays reflected to and back between the path-bending reflector 181 and the reflecting protrusion 172 (or reflecting recess 173) are caused to travel in the same direction; step ST4 wherein the holed reflector 183 is removed from the lens-holding flange 182 and the refracting optical lens 184 is mounted thereon instead; and step ST5 wherein the light from the illumination light source 186 and the micro-mirror device 185 is formed into an image at the normal position on the jig screen 176 via the refracting optical lens 184, the path-bending reflector 181 and the convex mirror 170. Hence, alignment of the optical components can easily be adjusted systematically in the assembling of the image display device.

While in steps ST1 to ST5 the multi-component alignment has been described to adjust by making the split outputs from the four-segment split detector 179 equal, it is also possible to employ a visual observation device in which a ground-glass jig bearing a cross as a target of alignment is placed at the position of the four-segment split detector 179 for visually observing a bundle of rays converged on the ground-glass jig through the use of an eyepiece or the like.

Since the above method is to adjust an angle deviation of the reflecting surface, a device capable of measuring the tile of a plane by using the same jig, such as an autocollimator, can also be used.

Of course, the method described above in Embodiment 20 is also possible with the convex mirror 104 in Embodiment 15, and the method in Embodiment 15 is also possible with the convex mirror 170 in Embodiment 20.

Embodiment 21

Figure 89:
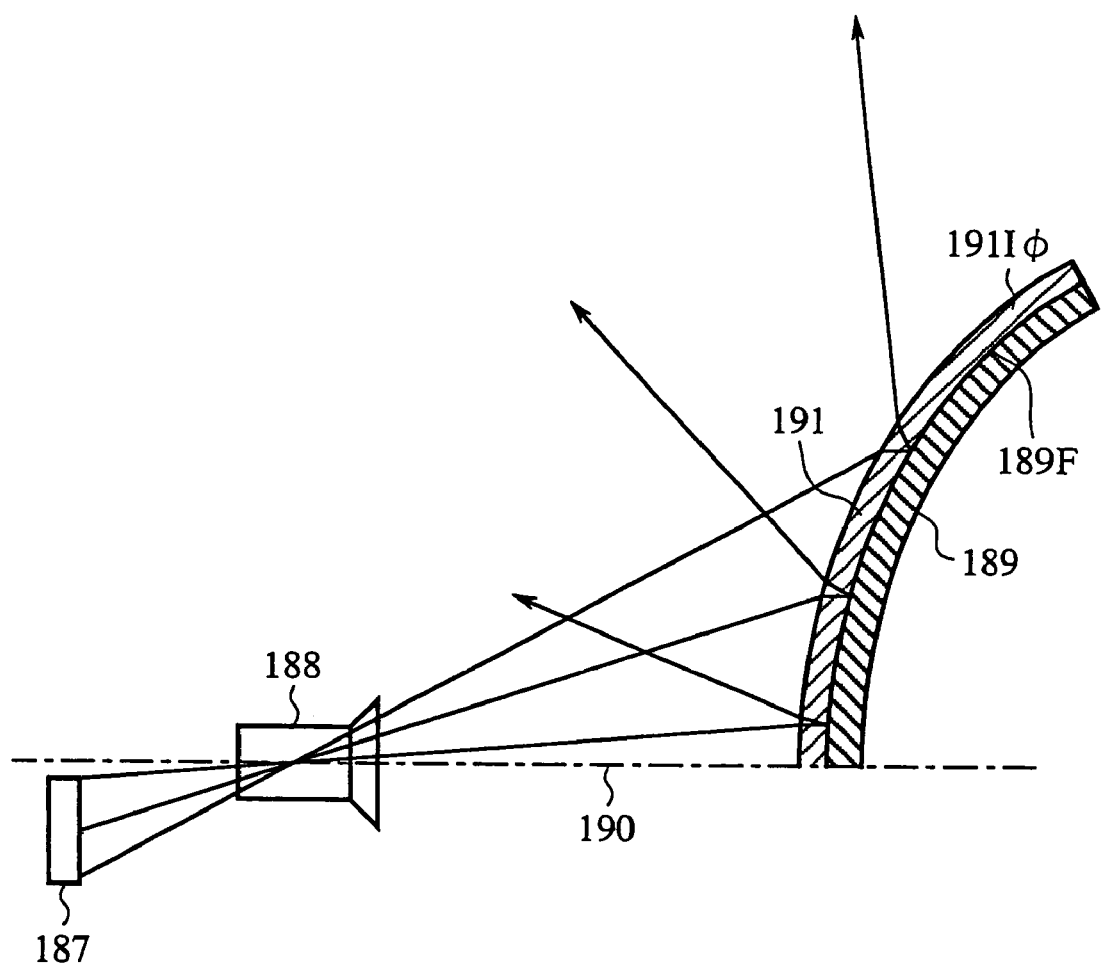
FIG. 89 is a diagram depicting the configuration of an image display device according to the 21st embodiment of the present invention.

FIG. 89 illustrates the configuration of an image display device according to a twenty-first embodiment (Embodiment 21) of the present invention. For brevity sake, the illumination light source system, the plane mirror and the screen are not shown.

Reference numeral 187 denotes a micro-mirror device; 188 denotes the same refracting optical lens (projecting optical means, refracting optical part) as used in each embodiment described above; 189 denotes the same convex mirror (projecting optical means, reflecting part) as used in each embodiment described above; 190 denotes an optical axis common to the refracting optical lens 188 and the convex mirror 189; and 191 denotes a lens layer of glass or synthetic resin joined to the front surface 189F of the convex mirror 189.

In FIG. 89, light (optical image signal) from the micro-mirror device 187 and the refracting optical lens 188 is refracted first on the plane of incidence/emission 191Iφ of the lens layer 191, then passes therethrough, and strikes on the front surface 189F of the convex mirror 189. And the light reflected off the front surface 189F of the convex mirror 189 is transmitted through the lens layer 191 again and refracted on its plane of incidence/emission 191Iφ to the plane mirror or screen (not shown).

That is, the light directed to and reflected back by the convex mirror 189 undergoes an optical action according to the shape or medium of the plane of incidence/emission 191Iφ of the lens layer 191. Accordingly, appropriate designs of the surface configuration and material (refractive index, dispersive power) of the lens layer 191 will permit more precise path control.

As described above, according to this embodiment, since the front surface 189F of the convex mirror 189 is covered with the lens layer 191, appropriate selections of the shape, refractive index and dispersive power of the plane of incidence/emission 191Iφ of the lens layer 191 increases the flexibility of path designing, providing increased precision in path control.

Embodiment 22

An image display device cabinet is often designed making effective use of a plurality of slanting surfaces. This is intended to make a flattened image display device look flatter.

FIG. 90 shows an outward appearance of a cabinet in which the image display device of each embodiment is housed, FIGS. 90(*a*), (*b*) and (*c*) being front, side and top plan views, respectively. For brevity sake, the optical components from the illumination light source system to the convex mirror are not shown.

Reference numeral 192 denotes a screen; 193 denotes an under-the-screen part in which the optical components not shown are housed; 194 denotes a cabinet front portion defined by the screen 192 and the under-the-screen part 193; 195 denotes a plane mirror (plane mirror 22 in FIG. 4, see Embodiment 1) placed in parallel to the screen 192; 196 denotes a cabinet rear portion in which the plane mirror 195 is housed; 197U, 197L and 197R denote slanting surfaces of upper and left- and right-handed portions (upper slanting surface, left-handed slanting surface and right-handed slanting surface) of the cabinet; and 198 denotes the bottom of the image display device.

The height of the cabinet front portion 194 is determined by the height of the screen 192 and the height of the under-the-screen portion 193, and the width of the cabinet front portion 194 is determined by the width of the screen 192. The height and width of the cabinet rear portion 196 are determined by the height and width of the plane mirror 195. In this case, however, the dimensions of the cabinet rear portion 196 are not always be determined by the plane mirror 195; when the plane mirror 195 is not used according to the configuration of the image display device, the geometries of the cabinet rear portion 196 are determined by the convex mirror or the like.

The height and width of the cabinet rear portion 196 are smaller than the height and width of the cabinet front portion 194 because the screen 192 is provided in the latter. Similar comments apply to ordinary image display devices.

The cabinet depicted in FIG. 90 is designed so that three slanting surfaces 197U, 197L and 197R and the horizontal bottom 198 surround the space defined by the large cabinet front portion 194 and the small cabinet rear portion 196 between them. The cabinet front portion 194 and the cabinet rear portion 196 have shapes obtained by cutting off corners of rectangular prisms by the left- and right-handed slanting surfaces 197L and 187R, respectively (FIG. 90(*c*)).

Such a structure offers an unobstructed view of the cabinet rear portion 196 when the image display device is viewed diagonally (from the direction of the arrow in FIG. 90(*c*))—this gives a visual impression of the reduced thickness of the image display device. As compared with the case of combining box-shaped cabinets into a multi-screen structure, if the screens 192 are held in the same plane, the slanting surfaces are not contiguous; therefore, the image display device having the slanting surfaces 197U, 197L and 197R is difficult to implement the multi-screen structure (Embodiment 14).

The image display device of this embodiment employs a cabinet designed to realize the multi-screen structure as described below.

FIG. 91 depicts an outward appearance of the cabinet of the image display device according to a twenty-second embodiment (Embodiment 22) of the present invention, FIGS. 91(*a*), (*b*) and (*c*) being its front, side and top plan views. The parts corresponding to those in FIG. 90 are identified by the same reference numerals.

The cabinet of FIG. 91 is characterized by a structure in which corners 194C and 196C of the cabinet front and rear portions 194 and 196 are not cut off by the slanting surfaces 197L and 197R, leaving planes 194P parallel to the screen 192 on the back of the front cabinet portion 194 (on the side near the cabinet rear portion 196) and planes 196V vertical to the screen 192 on both sides of the cabinet rear portion 196 (FIG. 91(*c*)).

This structural feature gives visual impressions that the image display device is particularly flat, and at the same time, produces the following effects in combining two or more image display devices into a one-piece structure.

Figure 93:
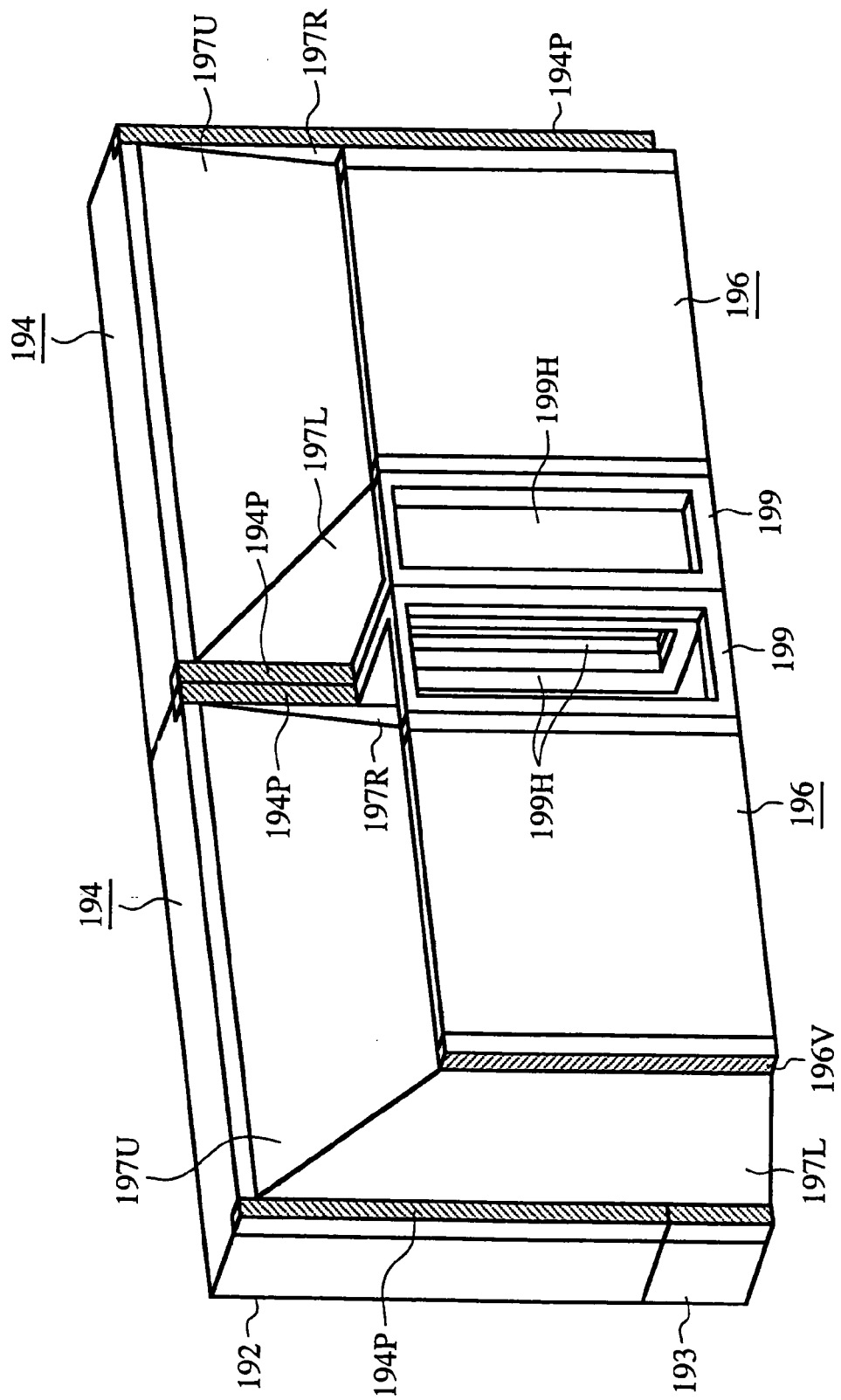
FIG. 93 is a diagram showing how the two image display devices are assembled into a one-piece structure.

FIGS. 92 and 93 are a top plan and a perspective view showing the case of combining two image display devices into a one-piece structure. The parts corresponding to those in FIGS. 90 and 91 are identified by the same reference numerals. In this case, the two image display devices are assembled in side by side relation to display a large image in the lateral direction.

Reference numeral 199 denotes connectors of L-shaped cross section, which are used to connect the image display devices. In the left-hand one of the two combined display image devices in FIG. 92(*a*), the parallel surface 194P on the right-hand side of the image display device and an end face (first end face) 199A of the connector 199 are connected, and the vertical surface 196V on the right-hand side of the image display device and an end face (second end face) 199B of the connector 199 are connected (FIG. 92(*b*)). Similarly, another connector 199 are connected to the left-hand image display device, and then the two connectors 199 are coupled together through their connecting surfaces 199C.

The end faces 199A and 199B are perpendicular to each other, the parallel surface 194P and the vertical surface 196V are have substantially the same area, and the end face 199B and the connecting surfaces 199C are parallel to each other. By virtue of such structural features, the image display devices can be assembled into a one-piece structure with high accuracy and with high efficiency as in the case of assembling image display devices housed in box-shaped cabinets.

The above advantage is obtained by providing the parallel and vertical surfaces 194P and 196V in the cabinet of the image display device so as to allow the use of the connector 199. In the cabinet of FIG. 90, forces that are applied by the slanting surfaces 197L and 197R to the connector act in directions in which they are displaced from each other; hence, the above-mentioned advantage cannot readily be obtained.

A through hole 199H is drilled through the connecting surface 199*c* and a rear panel 199D of the connector 199 so that exhausting air and heat and cabling can be carried out using the space defined by the connector 199 and the slanting surfaces 197L and 197R (FIG. 93).

In this instance, the air and heat exhausting and cabling are carried out through the slanting surfaces 197L and 197R. With cables run through the holes 199H, the back of the image display device becomes completely flat, and hence can be held in close contact with, for example, a wall surface of a room.

The vertical height of the connector 199 is not particularly limited, and is usually smaller than the height of the image display device.

Figure 94:
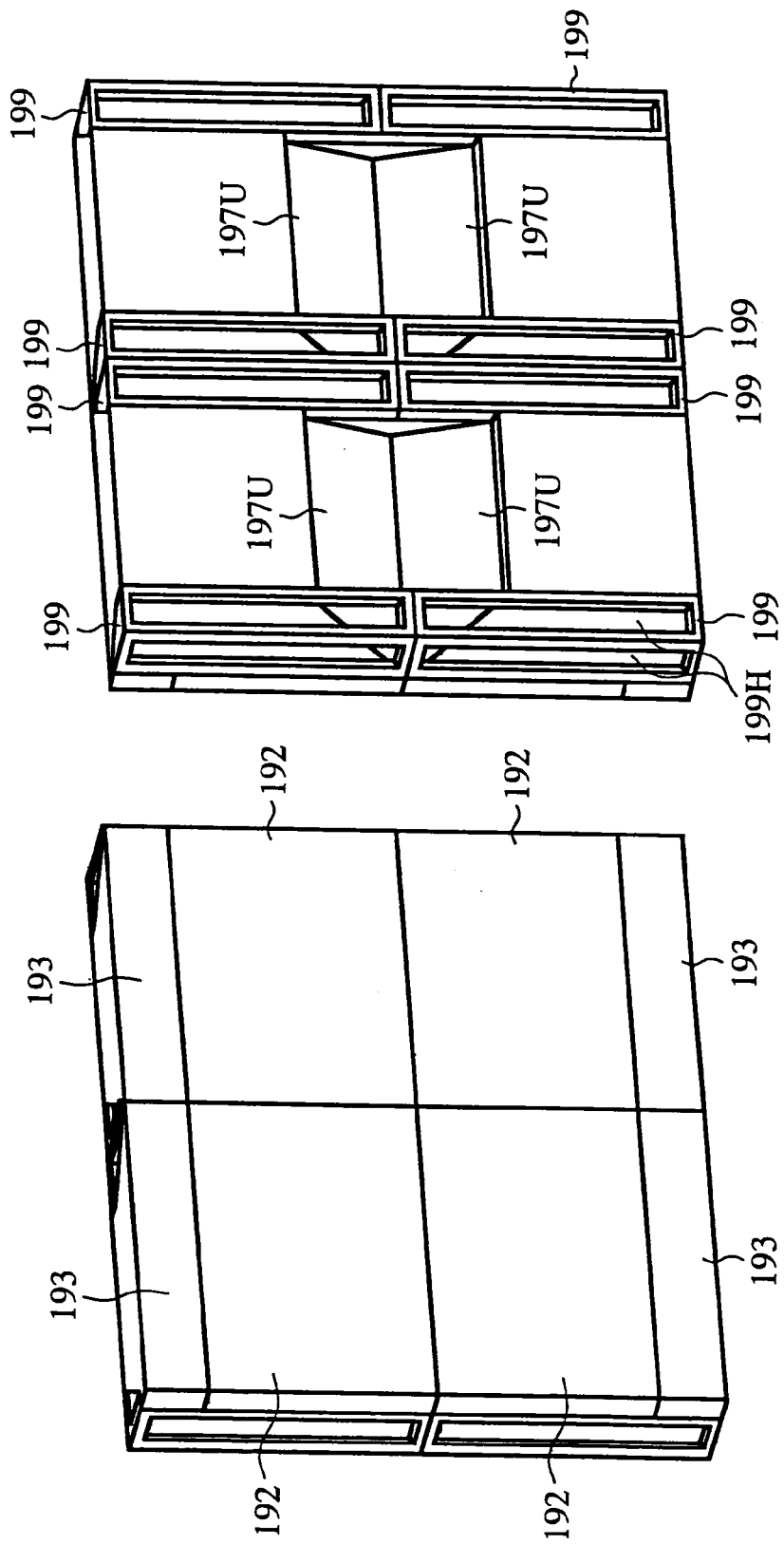
FIG. 94 is a diagram showing the case where four image display devices assembled into a one-piece structure.
Figure 95:
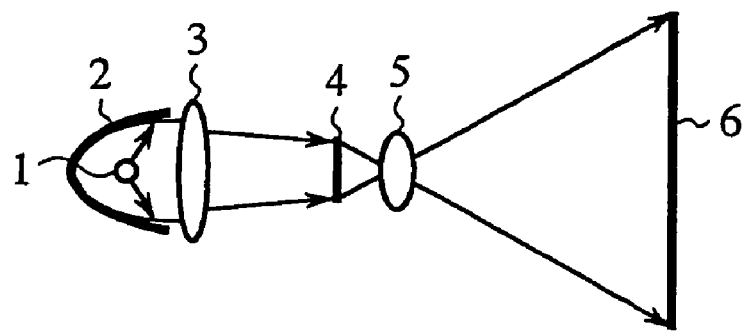
FIG. 95 is a diagram showing the configuration of a conventional image display device.

FIG. 94 shows the case where four image display devices are assembled into a one-piece structure, FIGS. 94(*a*) and (*b*) being a front perspective and a rear perspective view. The parts corresponding to those in FIGS. 90 to 93 are identified by the same reference numerals. In this example, two pairs of image display devices assembled in side by side relation are prepared. The image display devices of the one pair are mounted upside down on the image display devices of the other pair with a view to providing an image display large in both vertical and horizontal directions.

In FIG. 94, air and heat exhausting and cabling can be carried out using a space defined by the slanting surfaces 197U of the upper and lower image display devices. In this case, too, the image display device assembly can be held in close contact with the wall of a room, for instance. Besides, by connecting the upper and lower image display devices with end faces of the slanting surfaces 197U of the connectors 199 in contact with each other, the upper and lower image display devices can be arranged with accuracy, with ease and in a short time. In order to couple the upper and lower image display devices with third end faces of the connectors 199 held in contact, the connectors 199 have the same height as that of each image display device and the third end faces are formed perpendicular to the screen (the third end faces being perpendicular to the end faces 199A and 199B).

As described above, according to this embodiment, the image display device is housed in a cabinet that is provided with: the cabinet front portion 194 disposed on the bottom panel 198 and having provided therein the screen 192; the cabinet rear portion 196 disposed on the bottom panel 198 and having housed therein the plane mirror 195; and the slanting surfaces 197U, 197L and 197R provided between the cabinet front portion 194 and the cabinet rear portion 196. The slanting surfaces 197L and 197R are formed in a manner to leave the parallel surfaces 194P parallel to the screen 192 in the cabinet front portion on the side near the cabinet rear portion 196 and the vertical surfaces 196V perpendicular to the screen 192. This cabinet structure accurate and efficient assembling of image display devices into a one-piece structure.

Further, according to this embodiment, the connector 199, which has the end face 199A for connection with either one of the parallel surfaces 194P on the left- and right-hand sides of each image display device, the end face 199B for connection with the vertical surface 199V on the same side as the parallel surface 194P and the connection surface 199C parallel to the end face 199B, is connected to such a connector 199 of another image display device. This cabinet structure accurate and efficient assembling of image display devices into a one-piece structure as in the case of assembling image devices housed in box-shaped cabinets.

Further, according to this embodiment, since air and heat exhausting and cabling are led out of the cabinet through the slanting surfaces 197U, 197L and 197R, the image device assembly can be held in close contact with the wall of a room, for instance. When the display image assembly is placed with its back kept up against the wall and its upper and lower portions open, a triangular space defined by the connector 199 and the slanting surface 197R (197L) can be used a heat exhausting duct in the vertical direction. The triangular space functions as a chimney, providing increased heat exhausting efficiency.

While the foregoing embodiments have been described to use micro-mirror device as the spatial light modulator, liquid crystal may also be used as the spatial light modulator. In such case, too, it is possible to obtain an image display device that is flatter than conventional image display devices using liquid crystal.

As described previously with reference to Embodiment 1, various spatial light modulators other than the micro-mirror device and liquid crystal can be used in the present invention.

Moreover, as depicted in FIGS. 3 and 13, according to the present invention, the whole optical system is rotationally symmetric about the optical axis common to the refracting optical lens and the convex mirror. In view of the fact that when the optical axis is not made common to the refracting optical lens and the convex mirror, the optical system becomes asymmetric with respect to the optical axis, such a common use of the optical axis allows ease in fabricating the refracting optical lens and the convex mirror by rotational molding, and facilitates adjusting alignment as well.

EFFECT OF THE INVENTION

As described above, according to an aspect of the present invention, there is provided an image display device which comprises projecting optical means composed of a reflecting part for reflecting the optical image signal, and a refracting optical part for correcting for a distortion if the reflecting part has the distortion and for projecting the optical image signal onto the reflecting part, and wherein said display means receives said optical image signal through said projecting optical means. It is therefore possible to compensate for the distortion of the optical image signal by the reflecting part and display a magnified image on the display means. This permits placement of the display means at the position optimal for reduction of the depth dimension of the image display device, and hence brings about an effect of making the depth dimension of the image display device smaller depth dimension than in the past.

According to another aspect of the present invention, there is provided an image display device which comprises projecting optical means composed of a reflecting part having a reflecting surface for reflecting the optical image signal, and a refracting optical part having a refracting surface for projecting said optical image signal onto the reflecting part, and wherein the display means receives the optical image signal through the projecting optical means and at least one of the reflecting surface and the refracting surface is aspherical. Accordingly, it is possible to reduce the depth dimension of the image display device and correct for distortion of light to be projected onto the display means.

According to another aspect of the present invention, transmitting means comprises an illumination light source part for emitting illumination light, and a reflecting type image information providing part for receiving the illumination light emitted from the illumination light source part and for providing image information to the illumination light and reflecting the illumination light as the optical image signal. Accordingly, the illumination light source can be disposed on the side of the reflecting surface of the reflecting type image information providing part that emits an optical signal—this permits implementation of an image display device of a smaller depth dimension that the conventional image display device using a liquid crystal or similar transmitting type spatial light modulator.

According to another aspect of the present invention, the reflecting part has a rotationally symmetric aspherical surface for reflecting the optical image signal transmitted from the transmitting means. The reflecting part can easily be manufactured by mirror-finish lathing—this permits substantial reduction of manufacturing costs.

According to another aspect of the present invention, since the reflecting part is a convex mirror of negative power, the reflecting part can easily be fabricated.

According to another aspect of the present invention, since the reflecting part is a Fresnel mirror of negative power, it is possible to magnify an image without the need for correcting for distortion by a refracting optical part—this facilitates design and fabrication of an image display devices, and permits further reduction of the depth dimension of the image display device.

According to another aspect of the present invention, the reflecting part has a reflecting surface that is formed by a low dispersive medium and a high dispersive medium stacked in the direction in which to transmit the optical image signal sent from the transmitting means, has a negative power and reflects the optical image signal having passed through the low and high dispersive media. With such an arrangement, an optical signal can be projected over a wide angle by a reflecting surface of a gentle convex configuration, and the distortion by the reflecting surface can be compensated for in the optical element by adjusting the thicknesses of the low dispersion glass and the high dispersion glass—this allows ease in compensating for the distortion.

According to another aspect of the present invention, since the reflecting part has a reflecting surface formed so that its convex curvature is large around an optical axis and becomes smaller toward the periphery of the reflecting surface, it is possible to further correct for distortion of light that is projected onto the display means.

According to another aspect of the present invention, since the reflecting part has an odd-order aspherical reflecting surface obtained by adding odd-order terms to a polynomial composed of even-order terms, it is possible to realize a projecting optical system capable of correcting for distortion and achieving an excellent image formation characteristic for light projected from an off-axis position.

According to another aspect of the present invention, since the refracting optical part has odd-order aspherical refracting surfaces obtained by adding odd-order terms to a polynomial composed of even-order terms, it is possible to locally modify the configuration of the refracting surface, facilitating reduction of distortion and permitting improvement in the off-axis image formation performance.

According to another aspect of the present invention, since the reflecting part or refracting optical part reflects or refracts the optical image signal by the reflecting or refracting surface except around the optical axis of the reflecting or refracting part, excellent image formation performance can be achieved.

According to another aspect of the present invention, since the refracting optical part is provided with a curvature-of-field correcting means for canceling a curvature of field of the reflecting part, it is possible to correct for distortion and display an image corrected for curvature of field.

According to another aspect of the present invention, since the refracting optical part is provided with a positive lens of positive power, a negative lens of negative power and having a refractive index lower than that of the positive lens, and a Petzval's sum correcting lens for correcting for a Petzval's sum contributing component of said reflecting part, it is possible to correct for distortion and correct for a curvature of field by meeting the Petzval's condition—this provides increased image formation performance.

According to another aspect of the present invention, since the projecting optical means has an aspherical optical surface at places where principal rays of the optical image signal to be projected onto the reflecting part from the transmitting means are divergent and/or convergent, it is possible to effectively reduce a curvature of field at the place where the principal rays are convergent and distortion at the place where the principal rays are divergent.

According to another aspect of the present invention, the projecting optical means is provided with path-bending means for reflecting the optical image signal from the refracting optical part to the reflecting part, and since the optical axis of the refracting optical part is bent at an appropriate angle in a horizontal plane containing the optical axis of the reflecting part, it is possible to reduce the depth dimension of the image display device and the height of the under-the screen portion.

According to another aspect of the present invention, since the projecting optical means is provided with path-bending means for reflecting the optical image signal from first lens means to second lens means, it is possible to further reduce the depth dimension of the image display device and the height of the under-the screen portion.

According to another aspect of the present invention, since the refracting optical part has at least one lens formed of synthetic resin, it is possible to increase productivity of the refracting optical part, cutting the manufacturing costs of the image display device.

According to another aspect of he present invention, since the refracting optical part and the reflecting part are rotationally symmetric about an optical axis made common to them, it is possible to easily fabricate them through rotational formation and adjust them into alignment with each other.

According to another aspect of the present invention, since a plane mirror is provided to reflect the optical signal from the projecting optical means to the display means, it is possible to achieve thickness reduction of the image display device through maximum utilization of the space therein.

According to another aspect of the present invention, since a light receiving surface of said display means and a reflecting surface of said plane mirror are held in parallel to each other, it is possible to achieve thickness reduction of the image display device.

According to another aspect of the present invention, the refracting optical part comprises a retro-focus optical system composed of a positive lens group of positive power and a negative lens group of negative power, and a refracting optical lens for fine-tuning the angle of emission of the optical image signal from the retro-focus optical system to the reflecting part. With such an arrangement, it is possible to suppress the occurrence of distortion and curvature of field and reduce the depth dimension of the image display device.

According to another aspect of the present invention, since the retro-focus optical system is composed of two positive lens groups and one negative lens group, it is possible to suppress the occurrence of distortion and curvature of field and reduce the depth dimension of the image display device.

According to another aspect of the present invention, the retro-focus optical system is composed of one positive lens group and one negative lens group, it is possible to suppress the occurrence of distortion and curvature of field and reduce the depth dimension of the image display device.

According to another aspect of the present invention, the refracting optical part comprises negative lenses having an average value of refractive indexes in the range of 1.45 to 1.722 and having negative power, and positive lenses having an average value of refractive indexes in the range of 1.722 to 1.9 and having positive power. With such an arrangement, it is possible to suppress the occurrence of distortion and curvature of field and reduce the depth dimension of the image display device.

According to another aspect of the present invention, the refracting optical part comprises negative lenses having an average value of Abbe's number in the range of 25 to 38 and having negative power, and positive lenses having an average value of Abbe's number in the range of 38 to 60 and having positive power. With such an arrangement, it is possible to suppress the occurrence of distortion and curvature of field and reduce the depth dimension of the image display device.

According to another aspect of the present invention, the refracting optical part comprises positive lenses made of glass materials and negative lenses made of glass materials, the difference between average refractive indexes of the glass materials for the positive and negative lenses is in the range of 0.04 to 1. With such an arrangement, it is possible to suppress the occurrence of distortion and curvature of field and reduce the depth dimension of the image display device.

According to another aspect of the present invention, the refracting optical part comprises positive lenses made of glass materials and negative lenses made of glass materials, the difference between average Abbe's number of the glass materials for the positive and negative lenses is in the range of 0 to 16. With such an arrangement, it is possible to suppress the occurrence of distortion and curvature of field and reduce the depth dimension of the image display device.

According to another aspect of the present invention, a back focal length from the closest one of a plurality of lenses forming the refracting optical part to a light emitting surface of the transmitting means to the light emitting surface is equal to the distance from the light emitting surface of the transmitting means to the position of an entrance pupil of the refracting optical part. With such an arrangement, it is possible to minimize the diameter of the lens and minimize shading of light, providing increased illumination efficiency.

According to another aspect of the present invention, since the projecting optical means has negative lenses of negative power provided at the position of low marginal ray, it is possible to easily satisfy the Petzval's condition by generating the negative Petzval's sum contributing component that cancels the positive Petzval's sum contributing component of the projecting optical system, without the need for considering the lens effect of the negative lens on the light passing therethrough. Hence, the curvature of field can be reduced.

According to another aspect of the present invention, since the angle of bending the optical axis of the refracting optical part is set such that the refracting optical part is as close to a path from the path-bending means to the reflecting part as possible without intercepting the optical path, it is possible to suppress the height of the under-the-screen portion while satisfying the constraint of the thickness limiting value but without casting a shadow on the screen.

According to another aspect of the present invention, since the angle of bending the optical axis of the first lens means is set such that the first lens means is as close to a path from the path-bending means to the second lens means as possible without intercepting the optical path, it is possible to suppress the height of the under-the-screen portion while satisfying the constraint of the thickness limiting value but without casting a shadow on the screen.

According to another aspect of the present invention, since the longest distance from the refracting optical part to a reflecting part placement plane is chosen within a range smaller than a thickness limiting value, it is possible to suppress the height of the under-the-screen portion while satisfying the constraint of the thickness limiting value but without casting a shadow on the screen.

According to another aspect of the present invention, since the longer one of the longest distance from a reflecting part placement plane to the path-bending means and the longest distance from the reflecting part placement plane to the refracting optical part is equal to a thickness limiting value, it is possible to suppress the height of the under-the-screen portion while satisfying the constraint of the thickness limiting value but without casting a shadow on the screen.

According to another aspect of the present invention, since the longest distance from a reflecting part placement plane to the path-bending means and the longest distance from the reflecting part placement plane to the refracting optical part are equal to each other, the under-the-screen portion can be minimized.

According to another aspect of the present invention, since the refracting optical part has a shape obtained by removing a non-transmitting portion that does not transmit the optical image signal, it is possible to dispose the refracting optical part closer to the path from the path-bending reflector to the reflecting part and further reduce the height of the under-the-screen portion while satisfying the constraint of the thickness limiting value.

According to another aspect of the present invention, since the reflecting part has a shape obtained by removing a non-reflecting portion that does not reflect the optical image signal to the display means, the reflecting part can be formed small accordingly, making it possible to cut the manufacturing cost of the image display device and permit effective use of the space inside the image display device. Further, two convex mirror, equally divided from one convex mirror obtained by rotational formation, can be used in two image display devices.

According to another aspect of the present invention, since a retaining mechanism is used for retaining the refracting optical part and the reflecting part as a one-piece structure, it is possible to fix the relative positions of the refracting optical part and the reflecting part, permitting accurate formation of paths between optical components and hence further stabilizing the performance of the image display device.

According to another aspect of the present invention, a retaining mechanism is used for retaining the refracting optical part, the path-bending means and the reflecting part as a one-piece structure, it is possible to fix their relative positions, permitting accurate formation of paths between optical components and hence further stabilizing the performance of the image display device.

According to another aspect of the present invention, since the refracting optical part has positive lenses of positive power provided at the position of high marginal ray, it is possible to suppress the positive Petzval's sum contributing component of the projecting optical system through effective utilization of the lens action of the positive lens, permitting reduction of the curvature of field.

According to another aspect of the present invention, letting hi represent the height of the marginal ray of light incident to the refracting optical part, hm the maximum height of the marginal ray in a positive lens disposed at the center of the refracting optical part and ho represent the height of the marginal ray of light emitted from the refracting optical part, the refracting optical part satisfy the relationships 1.05 hi<hm<3 hi and 0.3 hi<ho<1 hi. With such an arrangement, it is possible to suppress the positive Petzval's sum contributing component of the projecting optical system and hence reduce the curvature of field. Furthermore, the lens diameter of the light emitting portion of the refracting optical part can be reduced, providing a margin in the range of insertion of the path-bending reflector.

According to another aspect of the present invention, the projecting optical means has poor optical performance in an unused area around its optical axis but has high image formation performance in an area to be used other than that around the optical axis. This relaxes the limitations on the refractive index and dispersion characteristic of the optical material for the refracting optical lens 87, increasing flexibility in its design and hence providing increased image formation performance.

According to another aspect of the present invention, since the projecting optical means is adapted so that an image-forming position at the center of the optical axis and an image-forming position around the optical axis are not in the same plane, it is possible to increase flexibility in the design of the refracting optical part, permitting implementation of an image display device of excellent image formation performance.

According to another aspect of the present invention, since the projecting optical means allows distortion in the vicinity of the center of the optical axis to increase the image formation performance of the area to be used, it is possible to reduce relative distortion to sides of the screen except one side nearest to the optical axis, preventing the corresponding boundary portions from being curved.

According to another aspect of the present invention, since the projecting optical means limits the range of degradation of the optical performance to the range of the field angle related only to the base of the screen, it is possible to limit the influence of distortion only to the base around the optical axis and hence form a correct rectangular image on the other three sides. Further, in the case of a multi-display with two display devices placed one on the other and three or more display devices arranged side by side, no overlapping of pictures or splitting of a picture occurs at the joints of display screens.

According to another aspect of the present invention, since a plane mirror for reflecting the light from the projecting optical means to the display means has a shape that corrects for distortion of the projecting optical means, it is possible to correct for distortion throughout the image display device.

According to another aspect of the present invention, the refracting optical part has a construction in which an exit pupil of light emitted toward the central area of the reflecting part around the optical axis thereof and an exit pupil of light emitted toward the peripheral area of the reflecting part are spaced apart to thereby adjust the position and angle of incidence of the emitted light toward the reflecting part. Accordingly, it is possible to suppress warping of the peripheral portion of the reflecting part and hence suppress curvature of field.

According to another aspect of the present invention, since the reflecting part has a uniform thickness from its front surface as a reflecting surface for reflecting the optical image signal to the rear surface provided behind the front surface, it is possible suppress a configuration change of the front surface by a temperature change, enhancing the environmental characteristics of the image display device.

According to another aspect of the present invention, the reflecting part has a planar low-reflectivity surface provided on a non-projecting front surface about the optical axis of the reflecting part and a planar high-reflectivity surface smaller in area than the low-reflectivity surface and provided in the low-reflectivity surface about the optical axis. Accordingly, it is possible to produce the virtual optical axis through monitoring of power by a detector and calculations and hence facilitate alignment of the convex mirror and the refracting optical lenses in assembling the image display device.

According to another aspect of the present invention, the transmitting means is provided with a cover glass for protecting an image information light emitting surface and a compensator glass of an optical thickness that decreases or increases as a change in the optical thickness of the cover glass increases or decreases, the transmitting means emitting the image information light to the refracting optical part through the cover glass and the compensator glass. Hence, the thickness variation of the cover glass 14 can be canceled and the reflecting surface of the micro-mirror device 14 can be regarded as being protected by a glass medium of a fixed optical thickness at all times. This permits utilization of the illumination light source system, the refracting optical lens 76 and the convex mirror 77 without involving design changes.

According to another aspect of the present invention, since the refracting optical part is provided with means for detachably mounting the compensator glass on the side of incidence of the illumination light from the transmitting means, a compensator glass of the optimum thickness can be used to deal with thickness changes and variations of the cover glass.

According to another aspect of the present invention, the image display device further comprises a bottom perpendicular to the reflecting surface of the plane mirror and the light receiving surface of the display means, and an optical component is disposed in a space defined by segments joining: a first point present on the base of a square image displayed on the display means and the farthest from the center of the image; a second point on the plane mirror to which light toward the first point is reflected; a third point on the reflecting part to which light toward the second point is reflected; a first projected point by projecting the first point to the bottom from the direction normal to the bottom; a second projected point by projecting the second point to the bottom from the direction normal to the bottom; and a third projected point by projecting the third point from the direction normal to the bottom. The height of the under-the-screen portion can be suppressed by simultaneously fulfilling the constraint of the depth dimension of the image display device defined by the plane mirror and the display means.

According to another aspect of the present invention, the transmitting means comprises: a converging optical system principal part composed of an illumination light source part for emitting illumination light, a color wheel for coloring emitted light from the illumination light source part in three primary colors one after another, a rod integrator for receiving the illumination light from the illumination light source part and for emitting illumination light of a uniform illuminance distribution from a light emitting surface, and a relay lens for relaying the illumination light from the rod integrator; a field lens for directing principal rays of the illumination light from the relay lens to the same direction; and a reflecting type image information providing part for providing image information to the illumination light from the field lens. The converging optical system principal part is disposed as the optical component in the space, and is further provided with second and third path-bending means for reflecting the illumination light from the converging optical system principal part to the field lens. Accordingly, it is possible to converge light on the reflecting type spatial light modulator by the converging optical system principal part disposed in the above-said space.

According to another aspect of the present invention, since the optical axis of the converging optical system principal part is parallel to the light receiving surface of the display means and the bottom, it is possible to adapt the image display device for various usage patterns by suppressing the height of the under-the-screen portion without reducing the useful life of the illumination light source system.

According to another aspect of the present invention, the optical axis of the converging optical system principal part is parallel to the lightreceiving surface of the display means and is tilted so that the intersection point of the illumination light source part and the optical axis is higher than the intersection point of the relay lens and the optical axis in the vertical direction. Accordingly, it is possible to adapt the image display device for various usage patterns by suppressing the height of the under-the-screen portion without reducing the useful life of the illumination light source system.

According to another aspect of the present invention, the transmitting means is provided with an adjustment table for mounting the converging optical system principal part and the field lens, the adjustment table having a hole for receiving the third path-bending means. This permits further reduction of the height of the under-the-screen portion.

According to another aspect of the present invention, since at least one of the second and third path-bending means has a curved optical surface, various modifications of its curved surface configuration furnishes freedom of ray control, making it possible to improve various optical performance features.

According to another aspect of the present invention, since the reflecting part is made of synthetic resin, its aspeherical or similar surface configuration of the convex mirror can be easily formed and the reflecting part can be mass-produced at low cost.

According to another aspect of the present invention, the reflecting part is rectangular in front configuration viewed form the direction of its optical axis, a nonreflecting portion of the reflecting part that does not reflect the optical image signal to the display means being removed. The reflecting part is provided with: a first screwing part provided on the lower side of the rectangular front configuration close to but spaced a predetermined eccentric distance apart from the optical axis of the reflecting part and pivotally secured to a first reflecting part mounting mechanism; a second screwing part provided on another side of the rectangular front configuration and slidably held on a second reflecting part mounting mechanism; and a third screwing part provided still another side of the rectangular front configuration and slidably secured to a third reflecting part mounting mechanism. With such an arrangement, it is possible to prevent deformation of the reflecting part and displacement of its optical axis by thermal expansion/contraction due to a temperature change; accordingly, the optical performance of the image display device can be prevented from degradation.

According to another aspect of the present invention, the first reflecting part mounting mechanism and said first screwing part are screwed together by a taper screw and each have a screw hole conforming to a tapered portion of said taper screw. This ensures pivotal securing of the first screwing part.

According to another aspect of the present invention, the reflecting part is rectangular in front configuration viewed form the direction of its optical axis, a nonreflecting portion of the reflecting part that does not reflect the optical image signal to the display means being removed. The reflecting part is provided with: a recess provided on the lower side of the rectangular front configuration close to but spaced a predetermined eccentric distance apart from the optical axis of the reflecting part; a cylindrical support for engagement with the recess; two springs fixed at one end to the reflecting part on both sides of the recess, for biasing the reflecting part; a second screwing part provided on another side of the rectangular front configuration and slidably held on a second reflecting part mounting mechanism; and a third screwing part provided still another side of the rectangular front configuration and slidably secured to a third reflecting part mounting mechanism. With such an arrangement, it is possible to prevent deformation of the reflecting part and displacement of its optical axis by thermal expansion/contraction due to a temperature change; accordingly, the optical performance of the image display device can be prevented from degradation.

According to another aspect of the present invention, the reflecting part is rectangular in front configuration viewed form the direction of its optical axis, a nonreflecting portion of the reflecting part that does not reflect the optical image signal to the display means being removed. The reflecting part is provided with: protrusion provided on the lower side of the rectangular front configuration close to but spaced a predetermined eccentric distance apart from the optical axis of the reflecting part; a V-grooved support having a V-shaped groove for engagement with the protrusion; two springs fixed at one end to the reflecting part on both sides of the protrusion, for biasing the reflecting part; a second screwing part provided on another side of the rectangular front configuration and slidably held on a second reflecting part mounting mechanism; and a third screwing part provided still another side of the rectangular front configuration and slidably secured to a third reflecting part mounting mechanism. With such an arrangement, it is possible to prevent deformation of the reflecting part and displacement of its optical axis by thermal expansion/contraction due to a temperature change; accordingly, the optical performance of the image display device can be prevented from degradation.

According to another aspect of the present invention, since the reflecting part is provided with two springs fixed at one end to the reflecting part on both sides of the first screwing part and at the other end to a common point, for biasing the reflecting part. With such an arrangement, when the image display device is placed upside down, the stresses that concentrate on the first screwing part 136 can be distributed to the springs 143—this provides increased reliability of the firs screwing part 136.

According to another aspect of the present invention, since the first, second and third screwing parts hold the reflecting part with its reflecting front surface in contact with the first, second and third reflecting part mounting mechanisms, the reflecting surface of the reflecting part can be positioned with high precision.

According to another aspect of the present invention, the image display device further comprises: two sliding supports mounted on the retaining mechanism, for slidably supporting all or some of lenses of the refracting optical part; a first mounting plate disposed between the two sliding support and fixed to the retaining mechanism; a second mounting plate disposed between the two sliding supports and fixed to the lower ends of all or some of the lenses of the refracting optical part; and a piezoelectric element held between the first and second mounting plates and expanding or contracting in the direction of the optical axis of the refracting optical part as a control voltage applied to the piezoelectric element increases or decreases. With such an arrangement, it is possible to make focus adjustments to deal with defocusing due to a temperature variation.

According to another aspect of the present invention, the image display device further comprises a gear mechanism supported on a gear support provided on the retaining mechanism, for moving the reflecting part, or all or some of lenses of the refracting optical part in the direction of the optical axis of the refracting optical part. With such an arrangement, it is possible to make focus adjustments to deal with defocusing due to a temperature variation.

According to another aspect of the present invention, since the image display device further comprises a heater/cooler for heating/cooling at least one of the refracting optical part held on the retaining mechanism and the retaining mechanism, it is possible, by suppressing temperature gradients, to make focus adjustment to deal with defocusing due to temperature variations.

According to another aspect of the present invention, the image display device further comprises: a temperature sensor for sensing a lens-barrel temperature of the refracting optical part; a temperature sensor for sensing the internal temperature of the retaining mechanism; and a control unit for controlling at least one of the piezoelectric element, the gear mechanism and the heater/cooler according to a focus-compensation amount calculated from the lens-barrel temperature and the internal temperature. With such an arrangement, it is possible to make focus adjustment to deal with defocusing due to temperature variations.

According to another aspect of the present invention, the image display device further comprises: a temperature sensor for sensing an environmental temperature; and a control unit for controlling at least one of the piezoelectric element, the gear mechanism and the heater/cooler according to a focus-compensation amount calculated by adding the environmental temperature to a linear interpolation equation derived from at least two different focus adjustment points. Hence, it is possible to establish a one-to-one correspondence between environmental temperatures and focus values for accurate focus adjustment.

According to another aspect of the present invention, the image display device further comprises: a CCD for detecting focus information from light to be incident to a non-image-display area of the display means; and a control unit for controlling at least one of the piezoelectric element, the gear mechanism and the heater/cooler according to the result of analysis of the focus information. Hence, the focus can be adjusted based directly on defocusing without using temperature or similar secondary information.

According to another aspect of the present invention, since the image display device further comprises a miniature reflector for reflecting to the CCD the light to be incident to the non-image-display area of the display means, it is possible to detect the focus information even if the cabinet of the image display device is placed in closest proximity to the image display area.

According to another aspect of the present invention, since the control unit regards the intensity distribution of the light received by the CCD as focus information, analyzes a peak value of the focus information and effects control to increase the peak value, the focus can be adjusted based directly on defocusing.

According to another aspect of the present invention, since the control unit regards the intensity distribution of the light received by the CCD as focus information, analyzes the width of a predetermined level of the focus information and effects control to decrease the width of the predetermined level, the focus can be adjusted based directly on defocusing.

According to another aspect of the present invention, since the control unit regards the intensity distribution of the light received by the CCD as focus information, analyzes the inclination of a shoulder of the focus information and effects control to increase the inclination, the focus can be adjusted based directly on defocusing.

According to another aspect of the present invention, the retaining mechanism is provided with a plurality of supports for supporting the refracting optical part and the reflecting part, the plurality of supports having the same product of their height and coefficient of linear expansion. Hence, it is possible to prevent the optical axis from displacement in the perpendicular direction.

According to another aspect of the present invention, since the reflecting part has a high- or low-reflectivity surface, or a reflecting protrusion or reflecting recess that is high-reflectivity over the entire area of its reflecting surface, the optical system components can easily be adjusted into alignment with each other.

According to another aspect of the present invention, since the reflecting part has a lens layer covering its front surface for reflecting said optical image signal, it is possible to increase the flexibility of path designing, providing increased precision in path control.

According to another aspect of the present invention, the image display device comprising: a cabinet front portion provided on the bottom of a cabinet and having display means; a cabinet rear portion provided on the bottom; and upper slanting surface, a left-hand slanting surface and right-hand slanting surface provided between the cabinet front portion and the cabinet rear portion and defining a housing space together with the bottom. The left- and right-hand slanting surfaces leave left- and right-hand parallel surfaces parallel to the display means on the back of the cabinet front portion and perpendicular surface perpendicular to the display means on both side of the cabinet rear portion. With such an arrangement, it is possible to assemble a plurality image display device into a one-piece structure with high precision and with high efficiency.

According to another aspect of the present invention, the image display device further comprises a connector having a first end face for connection with either one of the left- and right-hand parallel surfaces, a second end face for connection to that one of the perpendicular surfaces on the same side of said either one of the parallel surfaces, and a connection face parallel to the second end face. The connection surface is coupled to a connection face of another connector. As is the case with assembling image display devices housed in box-shaped cabinets, it is possible, therefore, to assemble a plurality image display device into a one-piece structure with high precision and with high efficiency.

According to another aspect of the present invention, the connector has the same height as that of the image display device and is provided with a third end face perpendicular to the first and second end faces, for connection to the another connector. Hence, image display devices can be placed one on the above.

According to another aspect of the present invention, since air and heat are discharged or cables are extended out of the cabinet through the upper, left- and right-hand slanting surfaces, the image display device can be placed in close with the wall of a room, for instance.

According to another aspect of the present invention, a method of adjustment for correct alignment comprises the steps of: applying rectilinearly propagating light to a reflecting part and adjusting the attitude of the reflecting part so that the outgoing path of said rectilinearly propagating light for incidence to a high-reflectivity surface of the reflecting part and the incoming path of the rectilinearly propagating light reflected by the high-reflectivity surface come into alignment with each other; and applying the rectilinearly propagating light on the outgoing path to the high-reflectivity surface of the reflecting part through the refracting optical part, emitting from the refracting optical part the rectilinearly propagating light on the incoming path reflected by the high-reflectivity surface and adjusting the attitude of the refracting optical part to maximize the power of the rectilinearly propagating light emitted from the refracting optical part. Hence, the optical system components can be easily and systematically adjusted into alignment with each other.

According to still another aspect of the present invention, a method of adjustment for correct alignment, which comprises the steps of: reflecting a bundle of parallel rays, applied perpendicularly to a jig display means and having passed through a first through hole, by a high-reflectivity surface of a reflecting part to bring outgoing and incoming paths of a bundle of parallel rays into alignment between the high-reflectivity surface and the first through hole; reflecting a bundle of parallel rays about an ideal optical axis of a refracting optical part by a path-bending reflector to the high-reflectivity surface to bring outgoing and incoming paths of the bundle of parallel rays into alignment between the high-reflectivity surface and the path-bending reflector; mounting, on a lens-holding flange, a holed reflector having a second through hole made in alignment with the optical axis of the refracting optical part, and reflecting a bundle of parallel rays about an ideal optical axis of the refracting optical part by the path-bending reflector to the high-reflectivity reflector through the second through hole, by which the direction of travel of the bundle of parallel ray reflected by the holed reflector and the direction of travel of the bundle of parallel rays on an incoming path reflected by the high-reflectivity surface to the path-bending reflector are brought into coincidence with each other; removing the holed reflector from the lens-holding flange and placing the refracting optical part on the lens-holding flange instead; and placing an illumination light source part and an image information providing part at predetermined positions, rendering the illumination light from the illumination light source part by the image information providing part to an optical image signal, and applying the optical image signal via the refracting optical part, the path-bending reflector and the reflecting part to the jig display means to form an image of the optical image signal on the jig display means at a normal position. Hence, the optical system components can be easily and systematically adjusted into alignment with each other.

What is claimed is:

1. An image display device comprising:
    an optical imaging arrangement for providing image information to illumination light and for transmitting the image information as an optical image signal;
    a projecting optical arrangement for receiving the optical image signal and for projecting the optical image signal;
    a display for receiving the optical image signal through said projecting optical arrangement and for displaying an image based on the image information; and
    a plane mirror for reflecting the optical image signal output from said projecting optical arrangement on said display,
    wherein said image display device has a bottom positioned on a plane that orthogonally intersects a plane on which receiving surface of said display is positioned; and
    wherein at least a part of said optical imaging arrangement is disposed in a placement space defined by linking with a line, respectively: a first point present on the basis of an image displayed on said display and furthest from the center of the image with a first projected point formed by projecting the first point to said bottom from the direction normal to the bottom; a second point on said plane mirror on which light toward the first point is reflected with a second projected point formed by projecting the second point to said bottom from the direction normal to said bottom; and a third point on said projecting optical arrangement on which light toward the second point is reflected with a third projected point formed by projecting the third point to said bottom from the direction normal to said bottom.

2. The image display device according to claim 1, wherein said projecting optical arrangement comprises:
    a refracting optical part for projecting the optical image signal transmitted from said optical imaging arrangement, and a reflecting part for reflecting the optical image signal projected by said refracting optical part.

3. The image display device according to claim 2, wherein said refracting optical part and a reflecting surface of said plane mirror are held in parallel to each other.

4. The image display device according to claim 3, wherein said optical imaging arrangement comprises: a converging optical system principle part composed of an illumination light source part for emitting illumination light; a color wheel for coloring an emitted light from said illumination light source part one after another; a rod integrator for equalizing illumination distribution of an outgoing end face of the illumination light from said illumination light source part; a relay lens for relaying the illumination light from said rod integrator; a field lens for collimating principle light of the illumination light emitted from said relay lens; and reflecting type image information providing part for providing the image information to the illumination light from said field lens and for reflecting it as an optical image signal, and wherein said converging optical system principle part is disposed in the placement space as a constituent element, and is further provided with an optical path-bending arrangement for reflecting consecutively the illumination light from said converging optical system principle part to said field lens.

5. The image display device according to claim 4, wherein an optical axis of said converging system principle part is parallel to said bottom and said receiving surface of said display.

6. The image display device according to claim 4, wherein an optical axis of said converging optical system principle part is parallel to said receiving surface of said display, and is tilted so that an intersecting point of said illumination light source part and the optical axis is higher than an intersecting point of said relay lens and the axis in the vertical direction.

7. The image display device according to claim 6, wherein said optical imaging arrangement further comprises an adjustment table for mounting the converging optical system principle part and said field lens, and said adjustment table has a receiving hole for receiving an optical path-bending element.

8. The image display device according to claim 4, wherein at least one optical surface of said optical path-bending arrangement is formed in the shape of a curved surface.

* * * * *